(12) United States Patent
Minami et al.

(10) Patent No.: US 11,921,377 B2
(45) Date of Patent: Mar. 5, 2024

(54) OPTICAL ELEMENT, VARIFOCAL ELEMENT, AND HEAD MOUNTED DISPLAY

(71) Applicant: Sharp Display Technology Corporation, Kameyama (JP)

(72) Inventors: Daisuke Minami, Kameyama (JP); Hiroaki Asagi, Kameyama (JP); Kiyoshi Minoura, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/072,105

(22) Filed: Nov. 30, 2022

(65) Prior Publication Data

US 2023/0176424 A1 Jun. 8, 2023

(30) Foreign Application Priority Data

Dec. 2, 2021 (JP) .................................. 2021-196017
Apr. 11, 2022 (JP) .................................. 2022-065194

(51) Int. Cl.
*G02F 1/13363* (2006.01)
*G02F 1/1335* (2006.01)
(Continued)

(52) U.S. Cl.
CPC ... *G02F 1/133638* (2021.01); *G02B 27/0172* (2013.01); *G02F 1/13712* (2021.01);
(Continued)

(58) Field of Classification Search
None
See application file for complete search history.

(56) References Cited

U.S. PATENT DOCUMENTS 6,028,656 A * 2/2000 Buhrer ................ G02F 1/13471
349/196
6,210,012 B1 * 4/2001 Broer ................ G02F 1/133617
362/84

(Continued)

FOREIGN PATENT DOCUMENTS

| JP | 2009-524106 A | 6/2009 |
| JP | 2014-528597 A | 10/2014 |
| JP | 2021-501361 A | 1/2021 |

OTHER PUBLICATIONS

Modifying Light, Joseph A. Castellano, American Scientist, Sep.-Oct. 2006, vol. 94, No. 5, pp. 438-445 (2006).*

*Primary Examiner* — Ryan Crockett
(74) *Attorney, Agent, or Firm* — ScienBiziP, P.C.

(57) ABSTRACT

Provided is an optical element including: a liquid crystal cell including a first substrate, a liquid crystal layer, and a second substrate; and a quarter-wave film. The liquid crystal layer contains liquid crystal molecules twist-aligned. The liquid crystal cell includes electrodes. The electrodes are disposed to enable switching between a first state and a second state by application of voltage to the liquid crystal layer. The switching between the first state and the second state controls a polarization state of light incident on the liquid crystal cell. Circularly polarized light incident on the liquid crystal cell is converted to first linearly polarized light in the first state while converted to second linearly polarized light in the second state. Linearly polarized light incident on the liquid crystal cell is converted to first circularly polarized light in the first state while converted to second circularly polarized light in the second state.

28 Claims, 72 Drawing Sheets

(51) Int. Cl.
  *G02F 1/1343* (2006.01)
  *G02F 1/1337* (2006.01)
  *G02B 27/01* (2006.01)
  *G02F 1/137* (2006.01)
  *G02F 1/29* (2006.01)

(52) U.S. Cl.
  CPC .. *G02F 1/133526* (2013.01); *G02F 1/133541* (2021.01); *G02F 1/133637* (2021.01); *G02F 1/133711* (2013.01); *G02F 1/134309* (2013.01); *G02F 1/294* (2021.01)

(56) References Cited

U.S. PATENT DOCUMENTS

| | | | |
|---|---|---|---|
| 6,463,189 B1* | 10/2002 | Wu | G02B 6/3566 |
| | | | 310/330 |
| 10,379,419 B1 | 8/2019 | Lu et al. | |
| 10,955,672 B1* | 3/2021 | Wheelwright | G02B 27/286 |
| 2006/0291053 A1* | 12/2006 | Robinson | G02B 30/25 |
| | | | 359/465 |
| 2007/0263141 A1* | 11/2007 | Yang | G02F 1/133514 |
| | | | 349/106 |
| 2010/0225876 A1 | 9/2010 | Escuti et al. | |
| 2013/0027656 A1 | 1/2013 | Escuti et al. | |
| 2013/0077040 A1 | 3/2013 | Escuti et al. | |
| 2016/0231551 A1* | 8/2016 | Berner | G02B 21/0028 |
| 2018/0335630 A1* | 11/2018 | Lu | G02F 1/13439 |
| 2019/0227375 A1* | 7/2019 | Oh | G09G 5/00 |
| 2022/0146888 A1 | 5/2022 | Oh et al. | |
| 2022/0382080 A1* | 12/2022 | Cheng | G02F 1/0136 |

\* cited by examiner (Light-emitting side)

(Light incident side)

(Light-emitting side)

(Light incident side)

(Light-emitting side)

(Light incident side)

(Light-emitting side)

(Light incident side)

FIG.30

FIG.60
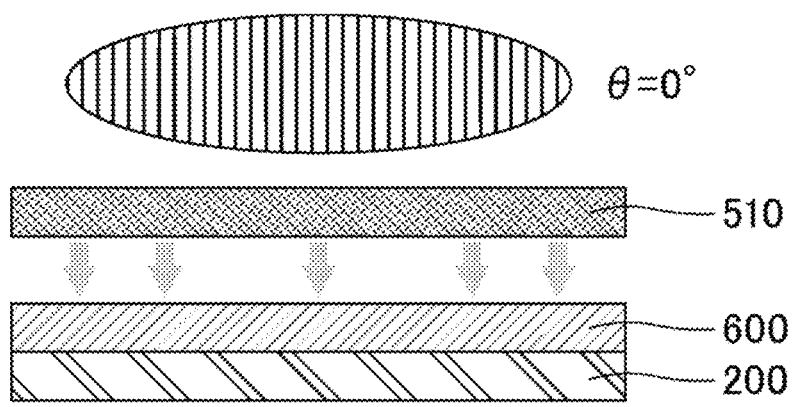
θ=0°
510
600
200
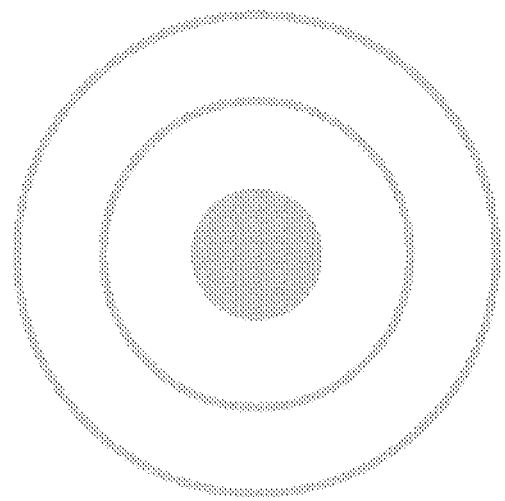

FIG.61
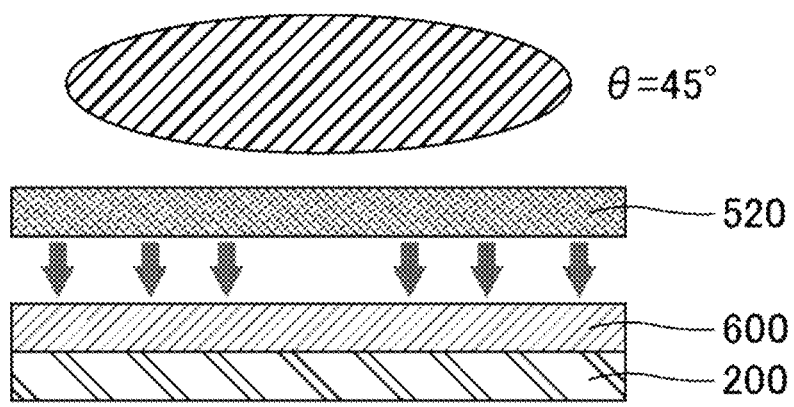
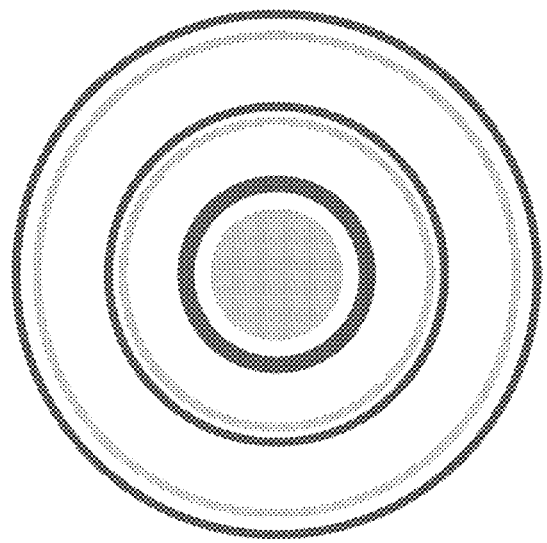

FIG.62
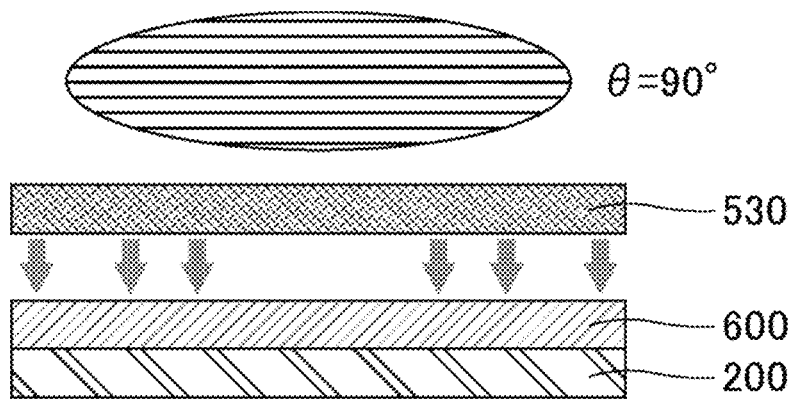
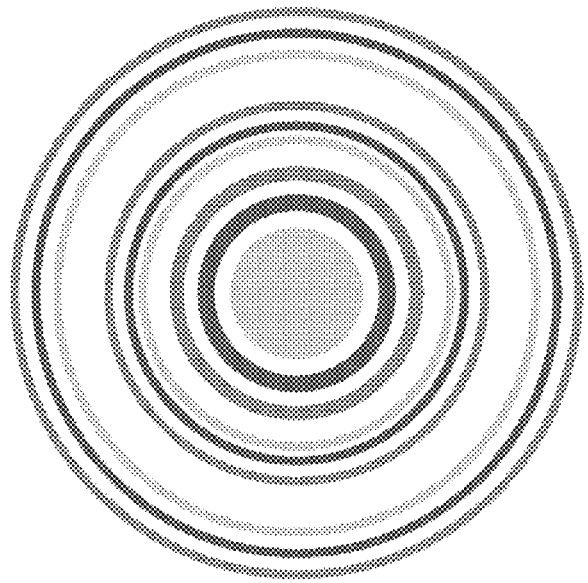

FIG.63
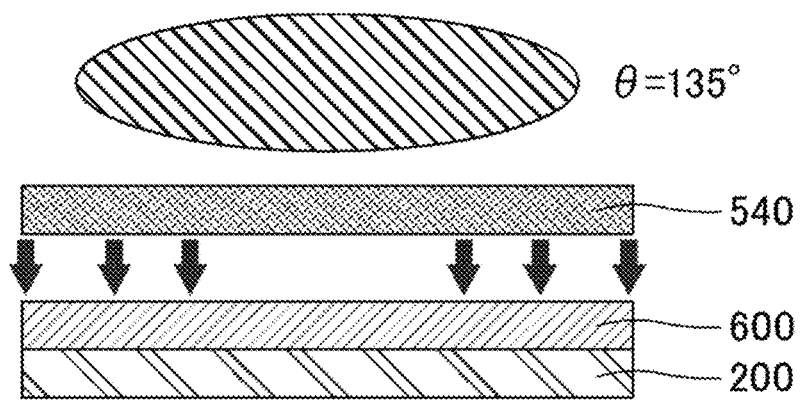
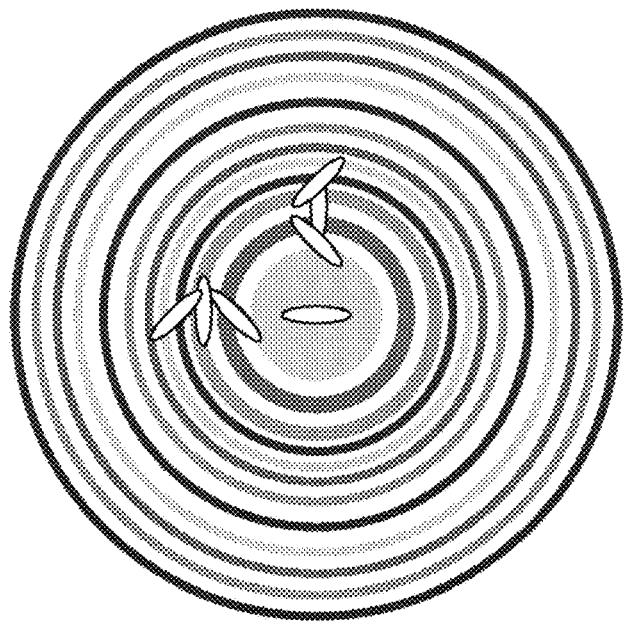
FIG.64
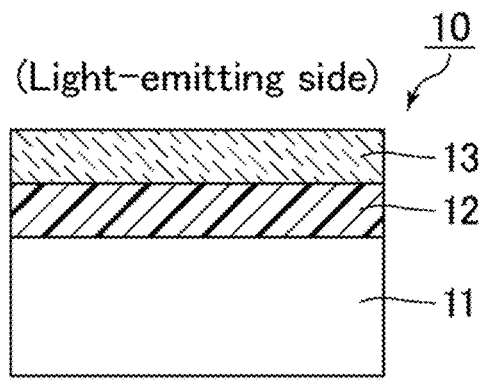

First state    Second state

First state

Second state

First state

Second state

First state

Second state (Light-emitting side) 30,30B (Light incident side)

FIG.82

OPTICAL ELEMENT, VARIFOCAL ELEMENT, AND HEAD MOUNTED DISPLAY

CROSS-REFERENCE TO RELATED APPLICATIONS

The present application claims priority under 35 U.S.C. § 119 to Japanese Patent Application No. 2021-196017 filed on Dec. 2, 2021 and Japanese Patent Application No. 2022-065194 filed on Apr. 11, 2022, the contents of which are incorporated herein by reference in their entirety.

BACKGROUND OF THE INVENTION

Field of the Invention

The following disclosure relates to optical elements, varifocal elements including the optical element, and head mounted displays including the varifocal element.

Description of Related Art

There have been suggestions to use varifocal optical systems including a Pancharatnam-Berry (PB) lens in combination with other optical element(s) such as a switchable half wave plate (sHWP) in devices such as head mounted displays. A sHWP can switch between left and right-handed circularly polarized lights using liquid crystals.

Techniques related to varifocal optical systems include, for example, a display device disclosed in JP 2021-501361 T which includes a waveguide and a broad bandwidth adaptive lens assembly. The waveguide is configured to guide light in a lateral direction parallel to an output surface of the waveguide, and is further configured to outcouple the guided light through the output surface. The broad bandwidth adaptive lens assembly is configured to incouple and to diffract therethrough the outcoupled light from the waveguide.

U.S. Ser. No. 10/379,419 B1 discloses a varifocal block including a sHWP and a plurality of liquid crystal lenses.

JP 2009-524106 T discloses an achromatic polarization switch that transforms linearly polarized light of an initial polarization orientation, including a first liquid crystal (LC) cell having a first axis of orientation relative to the initial polarization orientation; and a second LC cell having a second axis of orientation relative to the first axis of orientation.

JP 2014-528597 T discloses an optical element including first and second stacked birefringent layers having respective local optic axes that are rotated by respective twist angles over respective thicknesses of the first and second layers and are aligned along an interface between the first and second layers.

BRIEF SUMMARY OF THE INVENTION

None of JP 2021-501361 T, U.S. Ser. No. 10/379,419 B1, JP 2009-524106 T, and JP 2014-528597 T seemingly can easily achieve a device structure that can switch between polarization modulation and no polarization modulation in a broad bandwidth and has a thin profile. The polarization modulation is a state where the polarization state conversion between left and right-handed circularly polarized lights is performed. The no polarization modulation is a state where the polarization state conversion between left and right-handed circularly polarized lights is not performed.

In response to the above issues, an object of the present invention is to provide an optical element that can switch between polarization modulation and no polarization modulation in a broad bandwidth and has a thin profile; a varifocal element including the optical element; and a head mounted display including the varifocal element.

(1) One embodiment of the present invention is directed to an optical element including: a liquid crystal cell including a first substrate, a liquid crystal layer, and a second substrate; and a quarter-wave film, the liquid crystal layer containing liquid crystal molecules twist-aligned between the first substrate and the second substrate, the liquid crystal cell including, in at least one of the first substrate or the second substrate, electrodes for voltage application to the liquid crystal layer, the electrodes disposed to enable switching between a first state and a second state by application of voltage to the liquid crystal layer, the first state aligning the liquid crystal molecules near the first substrate in a first alignment direction, the second state aligning the liquid crystal molecules near the first substrate in a second alignment direction perpendicular to the first alignment direction in a plan view, the switching between the first state and the second state controlling a polarization state of light incident on the liquid crystal cell, wherein circularly polarized light incident on the liquid crystal cell is converted to first linearly polarized light in the first state, while in the second state, converted to second linearly polarized light whose polarization direction is perpendicular to a polarization direction of the first linearly polarized light in a plan view, and wherein linearly polarized light incident on the liquid crystal cell is converted to first circularly polarized light in the first state, while in the second state, converted to second circularly polarized light whose rotation direction is reverse to a rotation direction of the first circularly polarized light.

(2) In an embodiment of the present invention, the optical element includes the structure (1), the liquid crystal cell further includes a first weak anchoring horizontal alignment film between the first substrate and the liquid crystal layer, and a second weak anchoring horizontal alignment film between the liquid crystal layer and the second substrate, the electrodes include, in the first substrate, a first comb-teeth electrode composed of a comb-teeth-shaped pixel electrode and a comb-teeth-shaped common electrode with comb teeth of these electrodes fitting each other, and include, in the second substrate, a second comb-teeth electrode composed of a comb-teeth-shaped pixel electrode and a comb-teeth-shaped common electrode with comb teeth of these electrodes fitting each other, and in a plan view, an extension direction of the first comb-teeth electrode is oblique to the extension direction of the second comb-teeth electrode.

(3) In an embodiment of the present invention, the optical element includes the structure (1), the liquid crystal cell further includes a weak anchoring horizontal alignment film between the first substrate and the liquid crystal layer and a vertical alignment film between the liquid crystal layer and the second substrate, the electrodes include, in the first substrate, a first comb-teeth electrode composed of a comb-teeth-shaped pixel electrode and a comb-teeth-shaped common electrode with comb teeth of these electrodes fitting each other, and a second comb-teeth electrode overlapping the first comb-teeth electrode via an insulating layer and composed of a comb-teeth-shaped pixel electrode and a comb-teeth-shaped common electrode with comb teeth of these electrodes fitting each other, and in a plan view, an extension direction of the first comb-teeth electrode is perpendicular to an extension direction of the second comb-teeth electrode.

(4) In an embodiment of the present invention, the electrodes include, in the first substrate, a first comb-teeth electrode composed of a comb-teeth-shaped pixel electrode and a comb-teeth-shaped common electrode with comb teeth of these electrodes fitting each other, and a second comb-teeth electrode overlapping the first comb-teeth electrode via a first insulating layer and composed of a comb-teeth-shaped pixel electrode and a comb-teeth-shaped common electrode with comb teeth of these electrodes fitting each other, and include, in the second substrate, a third comb-teeth electrode composed of a comb-teeth-shaped pixel electrode and a comb-teeth-shaped common electrode with comb teeth of these electrodes fitting each other, and a fourth comb-teeth electrode overlapping the third comb-teeth electrode via a second insulating layer and composed of a comb-teeth-shaped pixel electrode and a comb-teeth-shaped common electrode with comb teeth of these electrodes fitting each other, and in a plan view, an extension direction of the first comb-teeth electrode is perpendicular to an extension direction of the second comb-teeth electrode, an extension direction of the third comb-teeth electrode is perpendicular to an extension direction of the fourth comb-teeth electrode, and the extension direction of the first comb-teeth electrode is oblique to the extension direction of the third comb-teeth electrode.

(5) In an embodiment of the present invention, the optical element includes the structure (1), the liquid crystal cell further includes a bistable alignment film providing stable alignment in two directions, between the first substrate and the liquid crystal layer, the electrodes include, in the first substrate, a first comb-teeth electrode composed of a comb-teeth-shaped pixel electrode and a comb-teeth-shaped common electrode with comb teeth of these electrodes fitting each other, and include, in the second substrate, a second comb-teeth electrode composed of a comb-teeth-shaped pixel electrode and a comb-teeth-shaped common electrode with comb teeth of these electrodes fitting each other, and in a plan view, an extension direction of the first comb-teeth electrode is oblique to an extension direction of the second comb-teeth electrode.

(6) In an embodiment of the present invention, the optical element includes the structure (1), the liquid crystal cell further includes a first vertical alignment film between the first substrate and the liquid crystal layer and a second vertical alignment film between the liquid crystal layer and the second substrate, the electrodes include, in the first substrate, a planar first electrode and a second electrode overlapping the first electrode via a first insulating layer and provided with slits, and include, in the second substrate, a planar third electrode and a fourth electrode overlapping the third electrode via a second insulating layer and provided with slits, and in a plan view, an extension direction of the slits in the second electrode is oblique to an extension direction of the slits in the fourth electrode.

(7) In an embodiment of the present invention, the optical element includes the structure (1), (2), (3), (4), (5), or (6), and an anisotropy of refractive index Δn of the liquid crystal layer is not greater than 0.12.

(8) In an embodiment of the present invention, the optical element includes the structure (1), (2), (3), (4), (5), (6), or (7), the quarter-wave film is a first quarter-wave film, and the optical element further includes a second quarter-wave film facing the liquid crystal cell across the first quarter-wave film.

(9) In an embodiment of the present invention, the optical element includes the structure (8), and the first quarter-wave film exhibits reverse wavelength dispersion.

(10) In an embodiment of the present invention, the optical element includes the structure (8) or (9), and an in-plane phase difference introduced by the first quarter-wave film at a wavelength of 450 nm is not less than 0.7 times and not more than 1 times the in-plane phase difference introduced by the first quarter-wave film at a wavelength of 550 nm.

(11) In an embodiment of the present invention, the optical element includes the structure (8), (9), or (10), and an in-plane phase difference introduced by the first quarter-wave film at a wavelength of 650 nm is not less than 1 times and not more than 1.3 times the in-plane phase difference introduced by the first quarter-wave film at a wavelength of 550 nm.

(12) In an embodiment of the present invention, the optical element includes the structure (8), (9), (10), or (11), and an in-plane phase difference introduced by the first quarter-wave film at a wavelength of 550 nm is not less than 30 nm and not more than 230 nm.

(13) In an embodiment of the present invention, the optical element includes the structure (8), (9), (10), (11), or (12), and the second quarter-wave film exhibits flat wavelength dispersion.

(14) In an embodiment of the present invention, the optical element includes the structure (8), (9), (10), (11), (12), or (13), and an in-plane phase difference introduced by the second quarter-wave film at a wavelength of 550 nm is not less than 110 nm and not more than 175 nm.

(15) Another embodiment of the present invention is directed to a varifocal element including: the optical element including the structure (1), (2), (3), (4), (5), (6), (7), (8), (9), (10), (11), (12), (13), or (14); and a Pancharatnam-Berry lens.

(16) In an embodiment of the present invention, the optical element includes the structure (15), and the Pancharatnam-Berry lens is disposed in the optical element.

(17) Yet another embodiment of the present invention is directed to a head mounted display including the varifocal element including the structure (15) or (16).

(18) In an embodiment of the present invention, the optical element includes the structure (1), the liquid crystal cell further includes a first vertical alignment film between the first substrate and the liquid crystal layer, and a second vertical alignment film between the liquid crystal layer and the second substrate, the liquid crystal layer contains liquid crystal molecules having a negative anisotropy of dielectric constant, and at least one of the first vertical alignment film or the second vertical alignment film is configured to control a tilt direction of the liquid crystal molecules with no voltage applied.

(19) In an embodiment of the present invention, the optical element includes the structure (18), and the electrodes include, in at least one of the first substrate or the second substrate, a planar electrode and an electrode overlapping the planar electrode via an insulating layer and provided with slits.

(20) In an embodiment of the present invention, the optical element includes the structure (18) or (19), and the pitch of the electrode provided with slits is not smaller than 1 μm and not greater than 5 μm.

(21) In an embodiment of the present invention, the optical element includes the structure (18), (19), or (20), and at least one of the first vertical alignment film or the second vertical alignment film is a weak anchoring vertical alignment film.

(22) In an embodiment of the present invention, the optical element includes the structure (18), (19), (20), or (21), and a retardation Δnd introduced by the liquid crystal layer at a wavelength of 550 nm with voltage applied is not less than 180 nm and not more than 280 nm.

(23) In an embodiment of the present invention, the optical element includes the structure (18), (19), (20), (21), or (22), and an anisotropy of refractive index Δn of the liquid crystal layer is not greater than 0.12.

(24) In an embodiment of the present invention, the optical element includes the structure (18), (19), (20), (21), (22), or (23), and light incident on the optical element is circularly polarized light.

(25) Yet another embodiment of the present invention is directed to a varifocal element including: the optical element including the structure (18), (19), (20), (21), (22), (23), or (24); and a Pancharatnam-Berry lens.

(26) In an embodiment of the present invention, the varifocal element includes the structure (25), and the Pancharatnam-Berry lens is disposed in the optical element.

(27) Yet another embodiment of the present invention is directed to a head mounted display including the varifocal element including the structure (25) or (26).

The present invention can provide an optical element that can switch between polarization modulation and no polarization modulation in a broad bandwidth and has a thin profile; a varifocal element including the optical element; and a head mounted display including the varifocal element.

BRIEF DESCRIPTION OF THE DRAWINGS

FIG. 30 shows the polarization states in the F-2.5 mode in the varifocal element of Modified Example 1 of Embodiment 7.

FIG. 60 is a schematic view showing the first alignment treatment in production of the varifocal element of Example 7.

FIG. 61 is a schematic view showing the second alignment treatment in the production of the varifocal element of Example 7.

FIG. 62 is a schematic view showing the third alignment treatment in the production of the varifocal element of Example 7.

FIG. 63 is a schematic view showing the fourth alignment treatment in the production of the varifocal element of Example 7.

FIG. 64 is a schematic cross-sectional view of an optical element of Embodiment 9.

FIG. 82 shows the polarization states in the F-2.5 mode in the varifocal element of the modified example of Embodiment 13.

DETAILED DESCRIPTION OF THE INVENTION

Figure 1:
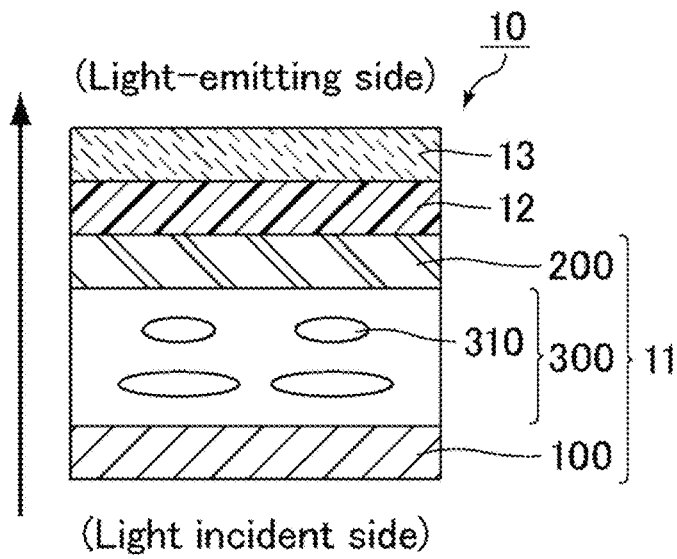
FIG. 1 is a schematic cross-sectional view of an optical element of Embodiment 1.

Hereinafter, embodiments of the present invention are described. The present invention is not limited to the following embodiments. The design may be modified as appropriate within the range satisfying the configuration of the present invention. In the following description, the same components or components having the same function in different drawings are commonly provided with the same reference sign so as to appropriately avoid repetition of description. The configurations of the present invention may appropriately be combined without departing from the spirit of the present invention.

(Definition of Terms)

The "azimuth" herein means the direction in question in a view projected onto the surface of a substrate closer to the light emitting side of the optical element and is expressed as an angle (azimuthal angle) formed with the reference azimuth. The reference azimuth (0°) is set to the alignment direction of liquid crystal molecules near the first substrate in the first state in a view projected onto the surface of the substrate closer to the light emitting side of the optical element. In other words, the alignment direction of liquid crystal molecules near the first substrate in the first state is set at an azimuthal angle of 0°. The azimuthal angle measures positive in the counterclockwise direction from the reference azimuth and measures negative in the clockwise direction from the reference azimuth. The counterclockwise direction and the clockwise direction are both the rotational directions when the optical element is viewed from its light emitting side. The azimuthal angle represents a value measured in a plan view of the light emitting side of the optical element.

The expression herein that two straight lines (including axes, directions, and azimuths) are perpendicular to each other means that they are perpendicular to each other in a plan view of the light emitting side of the optical element. The expression that one of two straight lines is oblique to the other means that the one straight line is oblique to the other in a plan view of the light emitting side of the optical element. Also, an angle formed by two straight lines means an angle formed by one of the straight lines and the other straight line in a plan view of the light emitting side of the optical element.

The expression herein that two straight lines (including axes, directions, and azimuths) are perpendicular to each other means that the angle formed by the straight lines is 90°±3°, preferably 90°±1°, more preferably 90°±0.5°, particularly preferably 90° (perfectly perpendicular). The expression herein that two straight lines are parallel to each other means that the angle formed by the straight lines is 0°±3°, preferably 0°±1°, more preferably 0°±0.5°, particularly preferably 0° (perfectly parallel).

The in-plane direction retardation (in-plane phase difference) Rp is defined by Rp=(ns−nf)d. The thickness direction retardation Rth is defined by Rth=(nz−(nx+ny)/2)d. In the formulas, ns represents nx or ny, whichever is greater, while of represents nx or ny, whichever is smaller; nx and ny each represent a principal refractive index in the in-plane direction of a birefringent layer (including a phase difference film (retarder) and a liquid crystal layer); nz represents a principal refractive index in the out-of-plane direction, i.e., the direction perpendicular to a surface of the birefringent layer; and d represents the thickness of the birefringent layer.

The measurement wavelength for optical parameters such as a principal refractive index and a phase difference herein is 550 nm unless otherwise specified.

Hereinafter, embodiments of the present invention are described. The present invention is not limited to the following embodiments. The design may be modified as appropriate within the range satisfying the configuration of the present invention.

Embodiment 1

Figure 2:
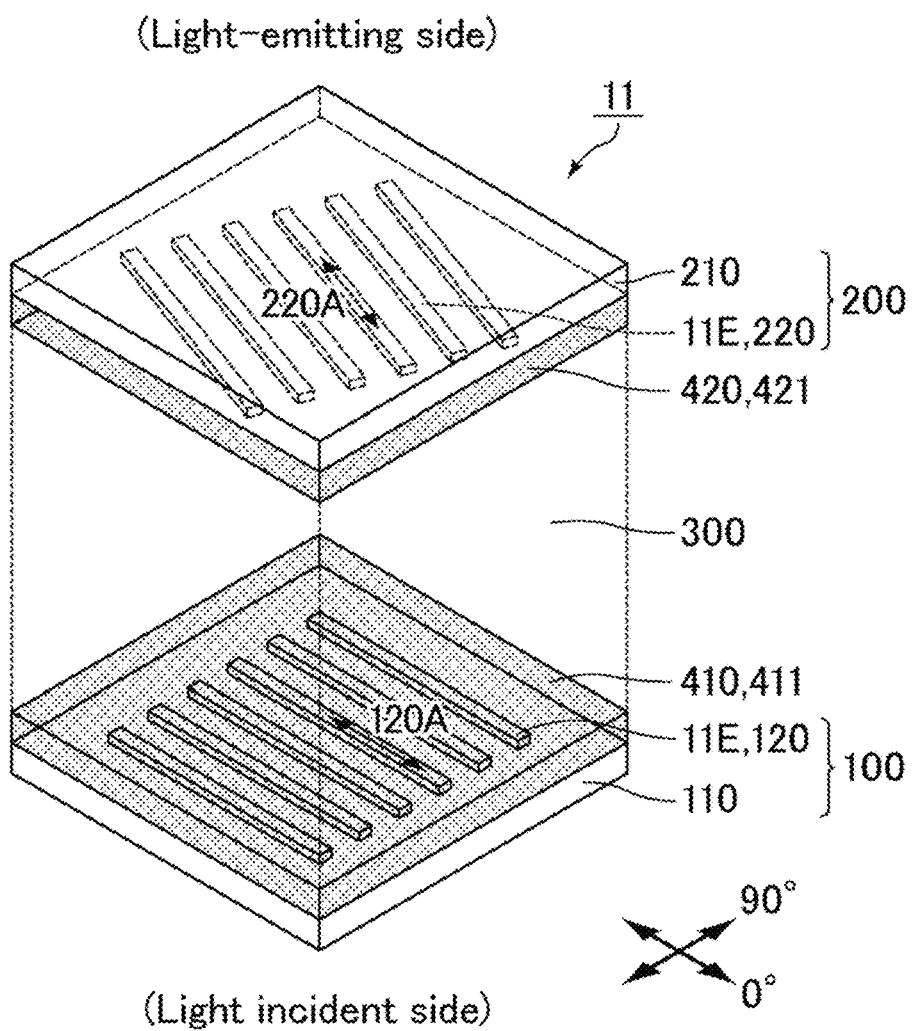
FIG. 2 is a schematic perspective view of a liquid crystal cell in the optical element of Embodiment 1.
Figure 3:
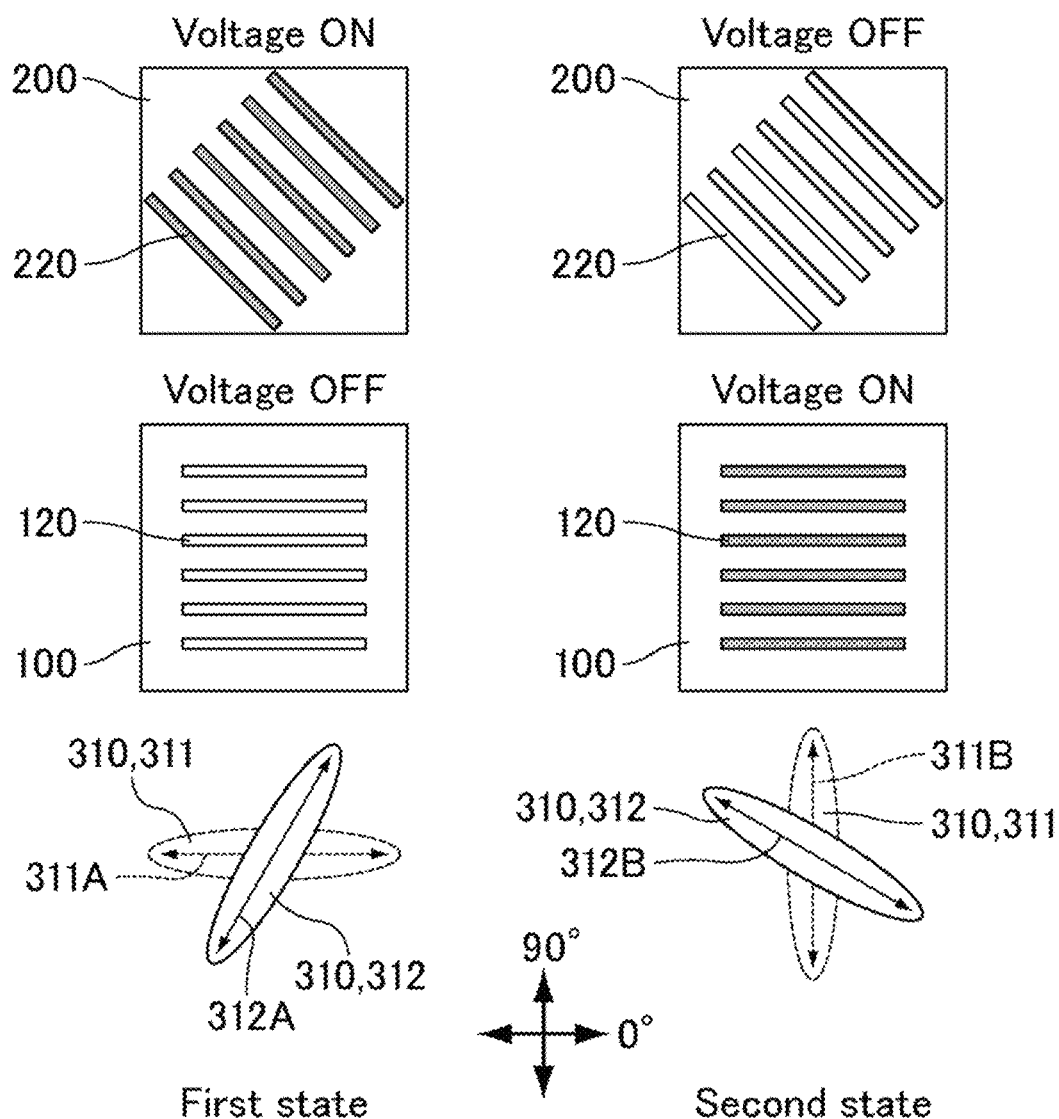
FIG. 3 includes schematic views showing the alignments of liquid crystal molecules in a first state and a second state in the optical element of Embodiment 1.
Figure 4:
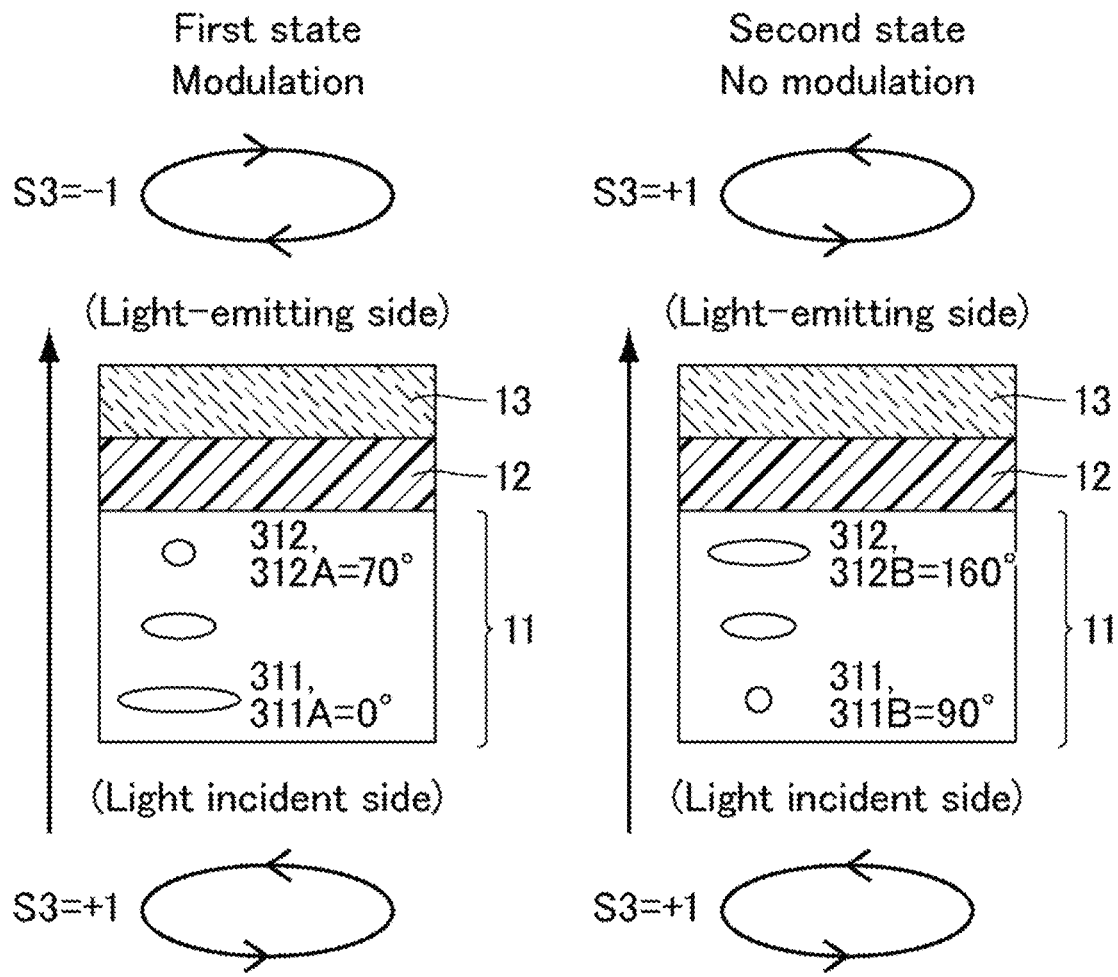
FIG. 4 includes schematic views showing the polarization states in the first state and the second state in the optical element of Embodiment 1.
Figure 5:
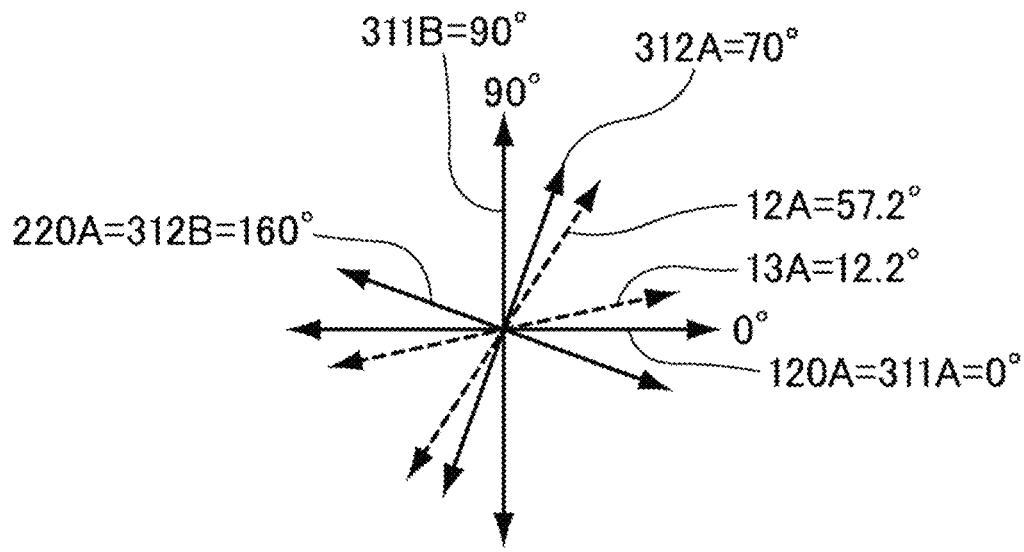
FIG. 5 shows examples of axis azimuths in the optical element of Embodiment 1.

FIG. 1 is a schematic cross-sectional view of an optical element of Embodiment 1. FIG. 2 is a schematic perspective view of a liquid crystal cell in the optical element of Embodiment 1. FIG. 3 includes schematic views showing the alignments of liquid crystal molecules in a first state and a second state in the optical element of Embodiment 1. FIG. 4 includes schematic views showing the polarization states in the first state and the second state in the optical element of Embodiment 1. FIG. 5 shows examples of axis azimuths in the optical element of Embodiment 1.

As shown in FIG. 1 to FIG. 5, an optical element 10 of the present embodiment includes a liquid crystal cell 11 including a first substrate 100, a liquid crystal layer 300, and a second substrate 200; and a first quarter-wave film 12 as the above quarter-wave film. The liquid crystal layer 300 contains liquid crystal molecules 310 twist-aligned between the first substrate 100 and the second substrate 200. The liquid crystal cell 11 includes, in at least one of the first substrate 100 or the second substrate 200, electrodes 11E for voltage application to the liquid crystal layer 300. The electrodes 11E are disposed to enable switching between a first state and a second state by application of voltage to the liquid crystal layer 300. The first state aligns the liquid crystal molecules 311 near the first substrate 100 in a first alignment direction 311A. The second state aligns the liquid crystal molecules 311 near the first substrate 100 in a second alignment direction 311B perpendicular to the first alignment direction 311A in a plan view. The switching between the first state and the second state controls the polarization state of light incident on the liquid crystal cell 11. Circularly polarized light incident on the liquid crystal cell 11 is converted to first linearly polarized light in the first state, while in the second state, converted to second linearly polarized light whose polarization direction is perpendicular to a polarization direction of the first linearly polarized light in a plan view. Linearly polarized light incident on the liquid crystal cell 11 is converted to first circularly polarized light in the first state while converted to second circularly polarized light whose rotation direction is reverse to a rotation direction of the first circularly polarized light in the second state. This configuration enables switching in a broad bandwidth between a state where circularly polarized light incident on the optical element 10 is emitted without any modulation and a state where circularly polarized light incident on the optical element 10 is emitted after being modulated, while controlling the thickness of the optical element 10. In other words, this configuration enables an optical element 10 that can switch between polarization modulation and no polarization modulation in a broad bandwidth and has a thin profile.

The liquid crystal molecules 311 near the first substrate 100 are aligned in the first alignment direction 311A in the first state while aligned in the second alignment direction 311B perpendicular to the first alignment direction 311A in a plan view in the second state. The alignment direction of liquid crystal molecules near the first substrate means the alignment direction of liquid crystal molecules horizontally aligned in the vicinity of the first substrate. Specifically, when an alignment film on the liquid crystal layer side of the first substrate is a horizontal alignment film, the alignment direction of liquid crystal molecules near the first substrate means the alignment direction of liquid crystal molecules in the first substrate side interface of the liquid crystal layer. When an alignment film on the liquid crystal layer side of the first substrate is a vertical alignment film, liquid crystal molecules in the first substrate side interface of the liquid crystal layer are vertically aligned, and thus the alignment direction of liquid crystal molecules near the first substrate means the alignment direction of horizontally aligned liquid crystal molecules that are closer to the center of the liquid crystal layer than the liquid crystal molecules in the first substrate side interface are.

Similarly, the alignment direction of liquid crystal molecules near the second substrate means the alignment direction of liquid crystal molecules horizontally aligned in the vicinity of the second substrate. Specifically, when an alignment film on the liquid crystal layer side of the second substrate is a horizontal alignment film, the alignment direction of liquid crystal molecules near the second substrate means the alignment direction of liquid crystal molecules in the second substrate side interface of the liquid crystal layer. When an alignment film on the liquid crystal layer side of the second substrate is a vertical alignment film, liquid crystal molecules in the second substrate side interface of the liquid crystal layer are vertically aligned, and thus the alignment direction of liquid crystal molecules near the second substrate means the alignment direction of horizontally aligned liquid crystal molecules that are closer to the center of the liquid crystal layer than the liquid crystal molecules in the second substrate side interface are.

The alignment direction of liquid crystal molecules near the first substrate and the alignment direction of liquid crystal molecules near the second substrate can each be determined from a Mueller matrix output from Axoscan (available from Opto Science, Inc.) as a result of measurement on the liquid crystal cell. Specifically, the measurement on the liquid crystal cell containing positive liquid crystal molecules is performed during no voltage application, while the measurement on the liquid crystal cell containing negative liquid crystal molecules is performed during voltage application (for example, 5 V). Also, the software for fitting the liquid crystal cell thickness or the liquid crystal twist angle in Axoscan can be used to determine the alignment direction of liquid crystal molecules near the first substrate and the alignment direction of liquid crystal molecules near the second substrate.

Switching between the first state and the second state controls the polarization state of light incident on the liquid crystal cell 11. Circularly polarized light incident on the liquid crystal cell 11 is converted to first linearly polarized light in the first state, while in the second state, converted to second linearly polarized light whose polarization direction is perpendicular to the polarization direction of the first linearly polarized light in a plan view. Linearly polarized light incident on the liquid crystal cell 11 is converted to first circularly polarized light in the first state while converted to second circularly polarized light whose rotation direction is reverse to the rotation direction of the first circularly polarized light in the second state.

Circularly polarized light incident on the liquid crystal cell 11 needs to be only substantially converted to first linearly polarized light in the first state. For example, in the first state, the light may be the first linearly polarized light at wavelengths of around 550 nm (specifically, wavelengths of not shorter than 530 nm and not longer than 570 nm) and elliptically polarized light at the other wavelengths. Also in the second state, the circularly polarized light needs to be only substantially converted to second linearly polarized light. For example, in the second state, the light may be the second linearly polarized light at wavelengths of around 550 nm (specifically, wavelengths of not shorter than 530 nm and not longer than 570 nm) and elliptically polarized light at the other wavelengths.

Linearly polarized light incident on the liquid crystal cell 11 needs to be only substantially converted to first circularly polarized light in the first state. For example, in the first state, the light may be the first circularly polarized light at wavelengths of around 550 nm (specifically, wavelengths of not shorter than 530 nm and not longer than 570 nm) and elliptically polarized light at the other wavelengths. Also in the second state, the linearly polarized light needs to be only substantially converted to second circularly polarized light. For example, in the second state, the light may be the second circularly polarized light at wavelengths of around 550 nm (specifically, wavelengths of not shorter than 530 nm and not longer than 570 nm) and elliptically polarized light at the other wavelengths.

Although the case is described where circularly polarized light is incident on the liquid crystal cell 11 in the present embodiment, the same effect can be achieved when linearly polarized light is incident on the liquid crystal cell 11.

The liquid crystal cell 11 sequentially includes the first substrate 100, the liquid crystal layer 300, and the second substrate 200. The optical element 10 generates electric fields in two in-plane directions in at least one of the first substrate 100 or the second substrate 200 to enable switching between the first state and the second state.

For example, switching between the first state and the second state can be enabled by disposing a weak anchoring alignment film exerting an alignment regulating force very close to 0 in at least one of between the first substrate 100 and the liquid crystal layer 300 or between the second substrate 200 and the liquid crystal layer 300. Specific examples of the weak anchoring alignment film include an alignment film called slide film capable of maintaining the alignment of liquid crystal molecules and an alignment film exerting an alignment regulating force in two directions, i.e., the directions of an azimuthal angle of 0° and an azimuthal angle of 90°. The details are described below.

As shown in FIG. 1, preferably, the optical element 10 of the present embodiment further includes a second quarter-wave film 13 facing the liquid crystal cell 11 across the first quarter-wave film 12. This configuration enables switching between polarization modulation and no polarization modulation in a broader bandwidth. The following describes a case where the optical element 10 includes, sequentially from the light incident side toward the light emitting side, the liquid crystal cell 11, the first quarter-wave film 12, and the second quarter-wave film 13.

As shown in FIG. 2, the liquid crystal cell 11 further includes a first weak anchoring horizontal alignment film 411 between the first substrate 100 and the liquid crystal layer 300 and a second weak anchoring horizontal alignment film 421 between the liquid crystal layer 300 and the second substrate 200. The electrodes 11E include, in the first substrate 100, a first comb-teeth electrode 120 composed of a comb-teeth-shaped pixel electrode and a comb-teeth-shaped common electrode with comb teeth of these electrodes fitting each other, and include, in the second substrate 200, a second comb-teeth electrode 220 composed of a comb-teeth-shaped pixel electrode and a comb-teeth-shaped common electrode with comb teeth of these electrodes fitting each other. In a plan view, an extension direction 120A of the first comb-teeth electrode 120 is oblique to an extension direction 220A of the second comb-teeth electrode 220.

This configuration, with no voltage applied to the first comb-teeth electrode 120 and with voltage applied to the second comb-teeth electrode 220, causes circularly polarized light (for example, right-handed circularly polarized light) incident on the liquid crystal cell 11 to be first linearly polarized light after passing through the liquid crystal cell 11. In other words, the first state can be achieved. In addition, the first linearly polarized light, after passing through the first quarter-wave film 12 and the second quarter-wave film 13, is converted in a broad bandwidth to circularly polarized light in a different polarization state (for example, left-handed circularly polarized light) from the circularly polarized light incident on the liquid crystal cell 11. In this manner, the first state achieves polarization modulation where circularly polarized light incident on the optical element 10 is emitted after being converted to circularly polarized light in a different polarization state (for example, right-handed circularly polarized light is converted to left-handed circularly polarized light) in a broad bandwidth.

The above configuration, with voltage applied to the first comb-teeth electrode 120 and with no voltage applied to the second comb-teeth electrode 220, causes circularly polarized light (for example, right-handed circularly polarized light) incident on the liquid crystal cell 11 to be second linearly polarized light whose polarization direction is perpendicular to the polarization direction of the first linearly polarized light in a plan view after passing through the liquid crystal cell 11. In other words, the second state can be achieved. In addition, the second linearly polarized light, after passing through the first quarter-wave film 12 and the second quarter-wave film 13, is emitted in a broad bandwidth as circularly polarized light in the same polarization state (for example, right-handed circularly polarized light) as the circularly polarized light incident on the liquid crystal cell 11. In this manner, the second state achieves no polarization modulation where circularly polarized light incident on the optical element 10 is emitted in the same polarization state (for example, while remaining as right-handed circularly polarized light) in a broad bandwidth.

In the present embodiment, the case is described where the optical element 10 includes, sequentially from the light incident side toward the light emitting side, the liquid crystal cell 11, the first quarter-wave film 12, and the second quarter-wave film 13. This stacking order may be reversed. Specifically, the optical element 10 may include, sequentially from the light incident side toward the light emitting side, the second quarter-wave film 13, the first quarter-wave film 12, and the liquid crystal cell 11. Also with this configuration, the first state achieves polarization modulation where circularly polarized light incident on the optical element 10 is emitted after converted to circularly polarized light in a different polarization state (for example, right-handed circularly polarized light is converted to left-handed circularly polarized light) in a broad bandwidth, while the second state achieves no polarization modulation where circularly polarized light incident on the optical element 10 is emitted in the same polarization state (for example, while remaining as right-handed circularly polarized light) in a broad bandwidth. Reversal of the stacking order requires appropriate adjustment of the slow axis 12A of the first quarter-wave film 12 and the slow axis 13A of the second quarter-wave film 13.

The liquid crystal layer 300 contains the liquid crystal molecules 310 twist-aligned between the first substrate 100 and the second substrate 200. In each of the first state and the second state, the liquid crystal molecules 310 are twist-aligned from the first substrate 100 toward the second substrate 200.

The twisted alignment of the liquid crystal molecules 310 is achieved by, for example, adding a chiral dopant to a liquid crystal material. The chiral dopant may be any known one. Examples of the chiral dopant include S-811 (available from Merck KGaA).

The angle formed by the alignment direction (first alignment direction) 311A of the liquid crystal molecules 311 near the first substrate 100 and the alignment direction 312A of liquid crystal molecules 312 near the second substrate 200 in a plan view in the first state is preferably not smaller than 57° and not greater than 82°, more preferably not smaller than 63° and not greater than 75°, still more preferably not smaller than 66° and not greater than 72°. This configuration enables switching between polarization modulation and no polarization modulation in a broader bandwidth. Hereinafter, an angle formed by the alignment direction of liquid crystal molecules near the first substrate and the alignment direction of liquid crystal molecules near the second substrate in a plan view is also referred to as a twist angle.

The angle formed by the alignment direction (second alignment direction) 311B of the liquid crystal molecules 311 near the first substrate 100 and the alignment direction 312B of the liquid crystal molecules 312 near the second substrate 200 in a plan view in the second state is preferably not smaller than 57° and not greater than 82°, more preferably not smaller than 63° and not greater than 75°, still more preferably not smaller than 66° and not greater than 72°. This configuration enables effective switching between polarization modulation and no polarization modulation in a broad bandwidth. The twist angle in the first state and the twist angle in the second state may be the same as or different from each other, and are preferably the same as each other.

In a plan view, the angle α formed by the extension direction 120A and the extension direction 220A (where a is a real number greater than 0° and smaller than 90°) and the twist angle A of the liquid crystal molecules 310 in the liquid crystal layer 300 in the first state and the second state preferably satisfy the following Formula AX1, more preferably the following Formula AX2, still more preferably the following Formula AX3. This configuration enables effective switching between polarization modulation and no polarization modulation in a broad bandwidth.

$85°-A \leq \alpha \leq 95°-A$ (Formula AX1)

$88°-A \leq \alpha \leq 92°-A$ (Formula AX2)

$\alpha = 90°-A$ (Formula AX3)

The twist angle A is preferably not smaller than 60° and not greater than 80°, more preferably not smaller than 64° and not greater than 76°, still more preferably not smaller than 68° and not greater than 72°. This configuration enables more effective switching between polarization modulation and no polarization modulation in a broad bandwidth.

When the extension direction 120A is at an azimuthal angle of 0°, the extension direction 220A is at an azimuthal angle of 160° (i.e., in a plan view, the angle α formed by the extension direction 120A and the extension direction 220A is) 20°, the twist angle A of the liquid crystal molecules 310 is 70°, and the liquid crystal layer 300 contains positive liquid crystal molecules 310 with no voltage applied to the first comb-teeth electrode 120 and with voltage applied to the second comb-teeth electrode 220 as shown in FIG. 3 to FIG. 5, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with voltage applied to the first comb-teeth electrode 120 and with no voltage applied to the second comb-teeth electrode 220, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

When the liquid crystal layer 300 contains negative liquid crystal molecules 310 with voltage applied to the first comb-teeth electrode 120 and with no voltage applied to the second comb-teeth electrode 220, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with no voltage applied to the first comb-teeth electrode 120 and with voltage applied to the second comb-teeth electrode 220, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

Figure 6:
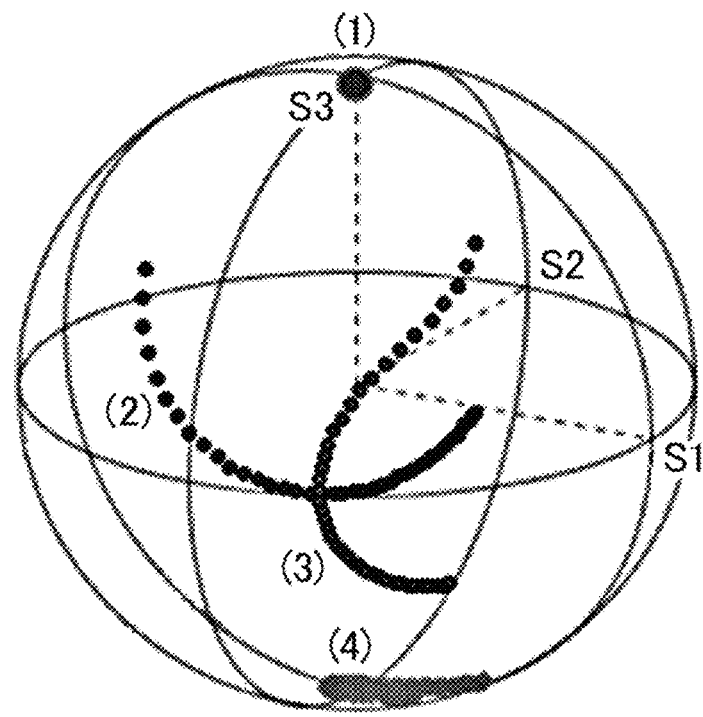
FIG. 6 shows a Poincaré sphere with Stokes parameters on which the polarization states of light converted by layers in the first state in the optical element of Embodiment 1 are plotted.

FIG. 6 shows a Poincaré sphere with Stokes parameters on which the polarization states of light converted by layers in the first state in the optical element of Embodiment 1 are plotted. FIG. 6 shows the polarization state of light when the light passes through each layer (i.e., the function of each layer) in the first state. The principle of the polarization modulation in the optical element 10 of Embodiment 1 is described in detail using the Poincaré sphere in FIG. 6.

As shown by the plotted point (1) in FIG. 6, right-handed circularly polarized light (S3=+1) is incident on the liquid crystal cell 11.

After passing through the liquid crystal cell 11 with 70°-twisted alignment, the right-handed circularly polarized light is once converted to the polarization state as shown by one of the plotted points (2) in FIG. 6. The plotted points indicate lights at different wavelengths of 380 nm to 780 nm. Lights at wavelengths of around 550 nm were plotted as linearly polarized lights (appeared on the equator of the Poincare sphere), whereas lights at the other wavelengths are plotted on the Northern hemisphere of the Poincare sphere as elliptically polarized lights.

The light then passes through the first quarter-wave film 12 (specifically, the quarter-wave film exhibiting reverse wavelength dispersion), plotted as one of the points (3) in FIG. 6.

The light then passes through the second quarter-wave film 13 (specifically, the quarter-wave film exhibiting flat wavelength dispersion). Lights at almost all the wavelengths are then emitted as left-handed circularly polarized lights (appeared on or near the south pole of the Poincare sphere) as shown by the plotted points (4) in FIG. 6. This means that right-handed circularly polarized light was modulated to left-handed circularly polarized light.

Similarly, in the second state (during no modulation), the right-handed circularly polarized light is once converted to linearly polarized light after passing through the liquid crystal cell 11 with 70°-twisted alignment. The linearly polarized light is different in angle by about 90° from the linearly polarized light in the first state (during modulation) since the entire alignment of the liquid crystal cell 11 is rotated by 90°. Thereafter, lights at all the wavelengths are converted to right-handed circularly polarized light after passing through the first quarter-wave film 12 and the second quarter-wave film 13. In other words, right-handed circularly polarized light can be emitted as right-handed circularly polarized light with no modulation.

As described above, the first state and the second state are the same in the 70°-twisted alignment of the liquid crystal molecules 310 and different in the entire system by 90°. The optical element 10 of the present embodiment enables reversible switching between the two states of the first state and the second state, achieving a thin switchable half wave plate (sHWP) element achieving both no polarization modulation and polarization modulation in a broad bandwidth.

Figure 7:
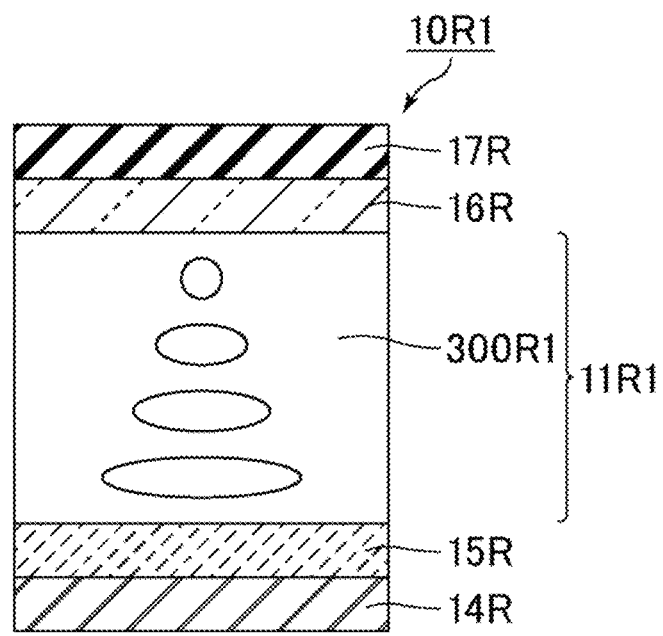
FIG. 7 is a schematic cross-sectional view of an optical element of Comparative Embodiment 1.

A possible configuration of a sHWP using one liquid crystal layer is, as shown in FIG. 7, the configuration of an optical element 10R1 of Comparative Embodiment 1 utilizing a liquid crystal cell 11R1 including a TN liquid crystal layer 300R1 with 90°-twisted alignment. Specifically, the optical element 10R1 of Comparative Embodiment 1 sequentially includes a quarter-wave film 14R whose slow axis is at an azimuthal angle of 75°, a half-wave film 15R whose slow axis is at an azimuthal angle of 15°, a liquid crystal cell 11R1, a half-wave film 16R whose slow axis is at an azimuthal angle of −75°, and a quarter-wave film 17R whose slow axis is at an azimuthal angle of −15°. FIG. 7 is a schematic cross-sectional view of an optical element of Comparative Embodiment 1.

Figure 8:
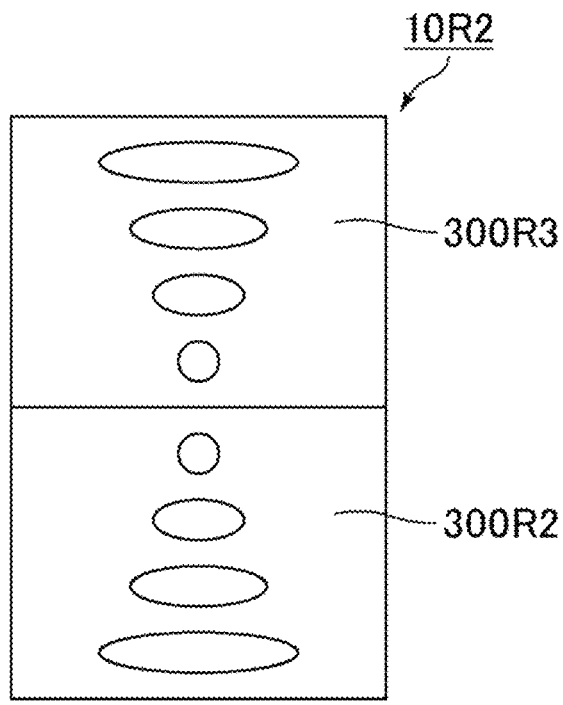
FIG. 8 is a schematic cross-sectional view of an optical element of Comparative Embodiment 2.

A possible configuration of a sHWP using two liquid crystal layers is, as shown in FIG. 8, the configuration of an optical element 10R2 of Comparative Embodiment 2 including a stack of a TN liquid crystal layer 300R2 with 70°-twisted alignment and a TN liquid crystal layer 300R3 with −70°-twisted alignment. FIG. 8 is a schematic cross-sectional view of an optical element of Comparative Embodiment 2.

Figure 9:
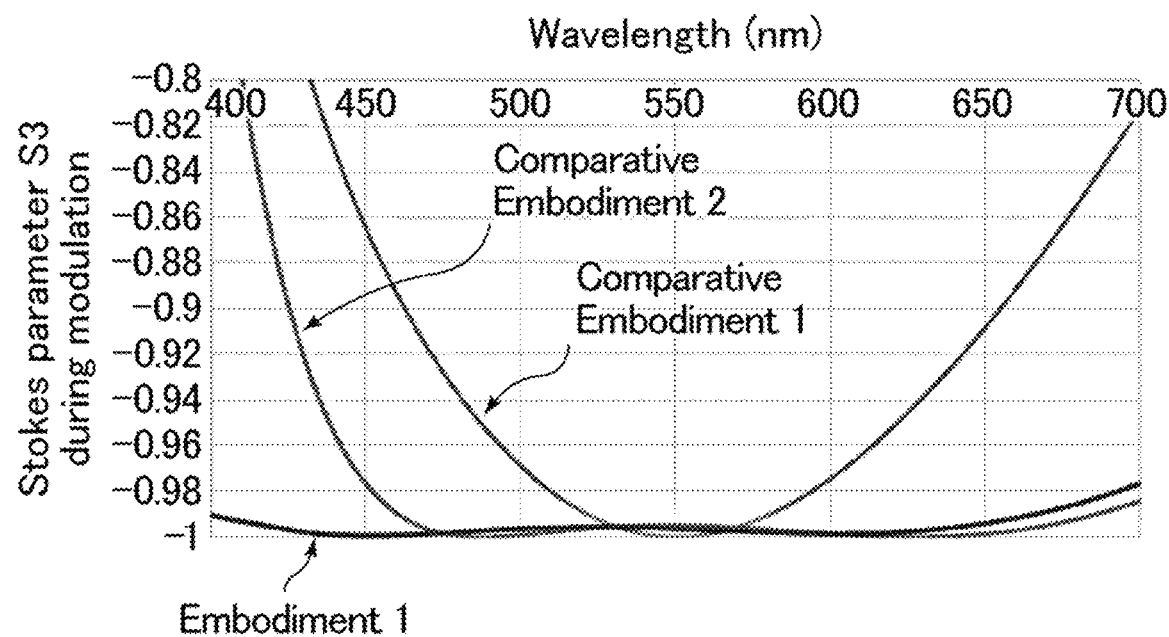
FIG. 9 is a graph showing examples of wavelength dispersion of Stokes parameter S3 during modulation in the optical elements of Embodiment 1, Comparative Embodiment 1, and Comparative Embodiment 2.

FIG. 9 is a graph showing examples of wavelength dispersion of Stokes parameter S3 during modulation in the optical elements of Embodiment 1, Comparative Embodiment 1, and Comparative Embodiment 2. FIG. 9 shows the wavelength dependence of the polarization state of the emission light derived from incident right-handed circularly polarized light (Stokes parameter S3=+1). A S3 value closer to −1 indicates more conversion to left-handed circularly polarized light. An optical element achieving a S3 value closer to −1 in a broader wavelength is considered to achieve modulation in a broader bandwidth.

The optical element 10R1 of Comparative Embodiment 1 is easy to design but has difficulty in achieving modulation in a broad bandwidth as shown in FIG. 9 due to the influences such as the wavelength dispersion of the TN liquid crystal layer 300R1 with 90°-twisted alignment, for example. The optical element 10R2 of Comparative Embodiment 2 can achieve modulation in a broad bandwidth but may not have a thin profile. In addition, although achieving polarization modulation (conversion of right-handed circularly polarized light to left-handed circularly polarized light) in a broad bandwidth, the optical element 10R2, driven by vertical electric fields, cannot vertically align all the liquid crystal molecules with voltage applied, thus failing to achieve no polarization modulation (emission of right-handed circularly polarized light remaining as right-handed circularly polarized light) in a broad bandwidth due to the influence of residual retardation. In contrast, the optical element 10 of the present embodiment can switch between left and right-handed circularly polarized lights in a broad bandwidth.

JP 2021-501361 T nowhere discloses polarization modulation properties. Although JP 2021-501361 T discloses the configuration of a single-layer TN liquid crystal layer, this configuration during polarization modulation (when deactivated or in voltage OFF states in JP 2021-501361 T) appropriately converts the polarization state at certain wavelengths, failing to convert the polarization state in a broad bandwidth. JP 2021-501361 T also discloses a configuration including a stack of a plurality of liquid crystal layers. This configuration, however, raises issues of complicated production of an optical element and increased thickness of the optical element.

Specifically, the single-layer configuration disclosed in JP 2021-501361 T twist-aligns liquid crystal molecules by 90° during polarization modulation while generating vertical electric fields to vertically align the liquid crystal molecules during no polarization modulation. Since the liquid crystal molecules are twist-aligned by 90° during polarization modulation, the polarization state depends on the wavelength, meaning that polarization modulation cannot be achieved in a broad bandwidth. Even when the twist angle of the liquid crystal molecules, the cell thickness of the liquid crystal layer, and other conditions are adjusted to achieve polarization modulation in a broad bandwidth, the configuration is under the influence of residual retardation introduced by the liquid crystal molecules near the substrate during no polarization modulation and thus fails to achieve no polarization modulation in a broad bandwidth. In other words, this configuration cannot achieve polarization modulation in a broad bandwidth and no polarization modulation in a broad bandwidth at the same time.

In contrast, the optical element 10 of the present embodiment retains the liquid crystal molecules 310 in the 70°-twisted state both during polarization modulation and during no polarization modulation, and the optical element 10 is driven under the same conditions in these two states except that the entire system is rotated by 90°. The optical element 10 thus can achieve both polarization modulation and no polarization modulation in a broad bandwidth.

U.S. Ser. No. 10/379,419 B1 discloses a varifocal element utilizing a plurality of sets (e.g., 6 sets) of a sHWP and a Pancharatnam-Berry (PB) lens to tune the vergence depth. An increase in thickness of the sHWP results in an increase in thickness of the whole varifocal element. When applied to a configuration including a sHWP with two liquid crystal layers as in Comparative Embodiment 2 (TN liquid crystal layer 300R2 with 70°-twisted alignment and TN liquid crystal layer 300R3 with −70°-twisted alignment), the varifocal element requires 12 liquid crystal layers in 6 sets, meaning that the varifocal element is difficult to reduce in thickness. Thus, the optical element, when it is a sHWP, is required to be thin and capable of achieving polarization modulation and no polarization modulation in a broad bandwidth.

The first substrate 100 includes a first support substrate 110 and the first comb-teeth electrode 120. The second substrate 200 includes a second support substrate 210 and the second comb-teeth electrode 220.

Examples of the first support substrate 110 and the second support substrate 210 include insulating substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The first comb-teeth electrode 120 is composed of a first pixel electrode, which is a comb-teeth electrode, and a first common electrode, which is a comb-teeth electrode. The second comb-teeth electrode 220 is composed of a second pixel electrode, which is a comb-teeth electrode, and a second common electrode, which is a comb-teeth electrode. The first pixel electrode and the second pixel electrode are hereinafter also simply referred to as pixel electrodes. The first common electrode and the second common electrode are hereinafter also simply referred to as common electrodes. The pixel electrodes and the common electrodes can be formed by forming a single- or multi-layered film of a transparent conductive material such as indium tin oxide (ITO), indium zinc oxide (IZO), zinc oxide (ZnO), or tin oxide (SnO), or an alloy of any of these materials by sputtering or any other method, followed by patterning of the film by photolithography or any other method.

The pitch of the first comb-teeth electrode 120 is preferably not smaller than 1 μm and not greater than 5 μm. This configuration enables efficient rotation of the liquid crystal molecules 311 near the first substrate 100, likely resulting in uniform twist alignment. Similarly, the pitch of the second comb-teeth electrode 220 is preferably not smaller than 1 μm and not greater than 5 μm. This configuration enables efficient rotation of the liquid crystal molecules 312 near the second substrate 200, likely resulting in uniform twist alignment. The comb-teeth electrodes each have a structure in which linear electrodes and slits alternate. The pitch of a comb-teeth electrode means the total width of a pair of a linear electrode and a slit.

Herein, a state with voltage not lower than the threshold voltage applied between a common electrode and a pixel electrode in a pair is also simply referred to as "with voltage applied" or "during voltage application". A state with no voltage applied between a common electrode and a pixel electrode in a pair (including application of voltage lower than the threshold voltage) is also simply referred to as "with no voltage applied" or "during no voltage application".

The liquid crystal layer 300 contains a liquid crystal material. The alignment of the liquid crystal molecules 310 in the liquid crystal material is varied according to the voltage applied to the liquid crystal layer 300, so that the polarization state of light passing through the liquid crystal layer 300 can be varied.

The liquid crystal molecules 310 may be positive liquid crystal molecules having a positive anisotropy of dielectric constant ($\Delta\varepsilon$) according to the following formula (L) or negative liquid crystal molecules having a negative anisotropy of dielectric constant ($\Delta\varepsilon$) according to the following formula (L). In the present embodiment, positive liquid crystal molecules are used for description. The long axis direction of the liquid crystal molecules corresponds to the direction of the slow axis. The liquid crystal molecules in a state where no voltage is applied (with no voltage applied) are homogeneously aligned. The long axis direction of the liquid crystal molecules with no voltage applied is also referred to as the initial alignment direction of the liquid crystal molecules.

$$\Delta\varepsilon = \text{(dielectric constant in long axis direction of liquid crystal molecules)} - \text{(dielectric constant in short axis direction of liquid crystal molecules)} \quad (L)$$

The retardation $\Delta nd$ introduced by the liquid crystal layer 300 at a wavelength of 550 nm with no voltage applied is preferably not less than 180 nm and not more than 280 nm, more preferably not less than 200 nm and not more than 260 nm, still more preferably not less than 220 nm and not more than 240 nm. This configuration enables switching between polarization modulation and no polarization modulation in a broader bandwidth.

The anisotropy of refractive index $\Delta n$ of the liquid crystal layer 300 is preferably not greater than 0.12, more preferably not greater than 0.1. This configuration enables reduction in wavelength dispersion exhibited by the liquid crystal layer 300 itself, thus enabling switching between polarization modulation and no polarization modulation in a broader bandwidth.

Preferably, the liquid crystal layer 300 has a thickness d of not smaller than 2 μm and not greater than 4.2 μm.

The following describes the first weak anchoring horizontal alignment film 411 and the second weak anchoring horizontal alignment film 421. A weak anchoring alignment film means an alignment film exerting a weak alignment regulating force to liquid crystal molecules. The key factor for the weak anchoring alignment film in the present embodiment is the viscoelasticity rather than simple anchoring energy (elasticity). The weak anchoring alignment film may be, for example, a lubrication interface. The lubrication interface as used herein means an interface induced by a lubrication interface induction area. The lubrication interface induction area is an area less ordered than the liquid crystalline phase.

The lubrication interface induction area may be a lubrication interface induction liquid area. The lubrication interface induction liquid area is an area in liquid phase in the lubrication interface induction area. The lubrication interface induction area is not limited to a lubrication interface induction liquid area (liquid phase) and may be an area where a gel layer is formed, an area where the order parameter (alignment order) is low, an area where the clearing point is lowered, an ordered area including partial disordered area, or an area including a high motility area.

The lubrication interface induction area preferably contains a lubrication interface inducer. The lubrication interface induction area may contain only a lubrication interface inducer or may contain a lubrication interface inducer and a liquid crystal component. The lubrication interface inducer may be contained in the liquid crystal layer 300, may be introduced separately from the liquid crystal layer 300, may be contained in a support substrate in advance, or may be chemically modified and bound to the support substrate in advance.

The lubrication interface inducer is preferably a compound having a polar group, a polymerizable compound, a polymer compound, or an ionic liquid. The polymer compound preferably has at least one of two or three or more alkyl groups with different chain lengths, mesogen groups, or photoisomerizable groups.

Preferably, the liquid crystal layer 300 and the lubrication interface inducer are phase-separated so that the liquid crystal layer 300 forms a liquid crystalline phase and the lubrication interface inducer forms a liquid phase in the lubrication interface induction area. The lubrication interface inducer may form a gel layer less ordered than a liquid crystalline phase in the lubrication interface induction area.

Preferably, the weak anchoring alignment film is, for example, a slippery interface in the interface between the liquid crystal layer 300 and the lubrication interface induction area.

The first weak anchoring horizontal alignment film 411 and the second weak anchoring horizontal alignment film 421 each are preferably a slippery interface (slippery film).

For example, dodecyl acrylate is mixed into the liquid crystal layer 300 such that the liquid phase (isotropic phase) of dodecyl acrylate forms lubrication interface induction areas, one between the liquid crystal layer 300 and the first substrate 100 and the other between the liquid crystal layer 300 and the second substrate 200, so that the interface between the liquid crystal layer 300 and each lubrication interface induction area defines a slippery film.

With these interfaces, the optical element 10 can utilize electric fields to set the alignment direction of the liquid crystal molecules in the desired direction and maintain the state. A slippery film with such an ability to keep the alignment is also sometimes called a slide film. After aligning the liquid crystal molecules in a certain directions, the optical element 10 can generate electric fields in a different direction to turn the alignment direction of the liquid crystal molecules to the different direction. In other words, electric fields can be used to create a plurality of stable states. The present embodiment can create the first state and the second state. Materials described in JP 2006-084536 A and WO 2017/034023, for example, can be used as well as the materials described above.

The weak anchoring alignment film may be, for example, an alignment film having an azimuthal anchoring energy of smaller than $1 \times 10^{-4}$ J/m². The azimuthal anchoring energy can be calculated by any of various known methods such as the torque balance method, the Neel wall method, a method of calculation from an electric field response threshold, or a method of calculation from a rotating magnetic field. The azimuthal anchoring energy herein is calculated by the method of calculation from an electric field response threshold. The lower limit of the azimuthal anchoring energy of the weak anchoring alignment film is not limited. The azimuthal anchoring energy of the weak anchoring alignment film is, for example, not smaller than $1 \times 10^{-10}$ J/m².

The azimuthal anchoring energy of the first weak anchoring horizontal alignment film 411 is preferably not smaller than $1 \times 10^{-10}$ J/m² and smaller than $1 \times 10^{-4}$ J/m², more preferably not smaller than $1 \times 10^{-10}$ J/m² and not greater than $1 \times 10^{-5}$ J/m², still more preferably not smaller than $1 \times 10^{-10}$ J/m² and not greater than $1 \times 10^{-6}$ J/m². This configuration enables effective switching between polarization modulation and no polarization modulation in a broad bandwidth.

The azimuthal anchoring energy of the second weak anchoring horizontal alignment film 421 is preferably not smaller than $1 \times 10^{-10}$ J/m² and smaller than $1 \times 10^{-4}$ J/m², more preferably not smaller than $1 \times 10^{-10}$ J/m² and not greater than $1 \times 10^{-5}$ J/m², still more preferably not smaller than $1 \times 10^{-10}$ J/m² and not greater than $1 \times 10^{-6}$ J/m². This configuration enables effective switching between polarization modulation and no polarization modulation in a broad bandwidth.

The weak anchoring alignment film can be formed by alignment treatment or without alignment treatment. Specifically, the weak anchoring alignment film may be a rubbed alignment film, a photo-alignment film, or an untreated alignment film having undergone no alignment treatment.

The rubbed alignment film can be obtained by, for example, forming on a substrate a film of an alignment film material containing a polymer for a rubbed alignment film, rotating a roller wrapped with cloth formed from a material such as rayon or cotton at a constant rotating speed while keeping a constant distance between the roller and the substrate, and rubbing the surface of the film containing the polymer for a rubbed alignment film in a predetermined direction (rubbing method). Changing the conditions of the rubbing treatment can adjust the azimuthal anchoring energy of the alignment film and thus can provide a weak anchoring alignment film.

An example of the polymer for a rubbed alignment film is polyimide. The polymer for a rubbed alignment film contained in the rubbed alignment film may be one kind or two kinds or more.

The photo-alignment film can be obtained by, for example, forming on a substrate a film of an alignment film material containing a photo-alignment polymer containing a photo-functional group, irradiating the film with polarized ultraviolet light so as to give anisotropy on the surface of the film containing the photo-alignment polymer (photo-alignment method). Changing the conditions of the photo-alignment treatment and the material structure and thereby adjusting the azimuthal anchoring energy of the alignment film can provide a weak anchoring alignment film.

Examples of the photo-alignment polymer include photo-alignment polymers containing at least one photo-functional group selected from the group consisting of cyclobutane, azobenzene, chalcone, cinnamate, coumarin, stilbene, phenol ester, and phenyl benzoate groups. The photo-alignment polymer contained in the photo-alignment film may be one kind or two kinds or more. The photo-functional group contained in the photo-alignment polymer may be located in the main chain, in a side chain, or in both of the main chain and a side chain of the polymer.

The photo-alignment polymer may cause any type of photo-reaction and preferred examples of the polymer include a photolysis polymer, a photo-rearranging polymer (preferably, a photo-Fries rearranging polymer), a photoisomerizable polymer, a photodimerizable polymer, and a photo-crosslinking polymer. Any of these may be used alone or in combination of two or more thereof. In terms of the alignment stability, particularly preferred among these are a photolysis polymer having a reaction wavelength (main sensitive wavelength) around 254 nm and a photo-rearranging polymer having a reaction wavelength (main sensitive wavelength) around 254 nm. Also preferred are a photoisomerizable polymer containing a photo-functional group in a side chain and a photodimerizable polymer containing a photo-functional group in a side chain.

The photo-alignment polymer may have any main chain structure, and suitable examples of the main chain structure include a polyamic acid structure, a polyimide structure, a poly(meth)acrylic acid structure, a polysiloxane structure, a polyethylene structure, a polystyrene structure, and a polyvinyl structure.

The untreated alignment film may be obtained by, for example, forming on a substrate a film of an alignment film material containing a polymer for an alignment film. Examples of the polymer for an alignment film include polyimide and polyhexyl methacrylate. The polymer for an alignment film contained in the untreated alignment film may be one kind or two kinds or more.

Examples of the polymer for an alignment film contained in the untreated alignment film include polymers described in WO 2017/034023 as well as polyimide and polyhexyl methacrylate. Particularly preferred are polyalkylene oxides such as polyethylene glycol and polypropylene glycol.

A horizontal alignment film has a function of aligning liquid crystal molecules in the liquid crystal layer horizontally to its surface during no voltage application. The expression that a horizontal alignment film aligns liquid crystal molecules horizontally to its surface means that the pre-tilt angle of the liquid crystal molecules is not smaller than 0° and not greater than 5°, preferably not smaller than 0° and not greater than 2°, more preferably not smaller than 0° and not greater than 1°, from the surface of the horizontal alignment film. The pre-tilt angle of liquid crystal molecules means the angle of inclination of the long axes of the liquid crystal molecules from the main surfaces of the alignment film during no voltage application to the liquid crystal layer.

Herein, an alignment film between the first substrate 100 and the liquid crystal layer 300 is also referred to as a first alignment film 410, and an alignment film between the second substrate 200 and the liquid crystal layer 300 is also referred to as a second alignment film 420.

The quarter-wave films (specifically, the first quarter-wave film 12 and the second quarter-wave film 13) may be any films introducing an in-plane phase difference of not less than 20 nm and not more than 240 nm to at least light having a wavelength of 550 nm.

The quarter-wave films are made of, for example, a photopolymerizable liquid crystal material. The photopolymerizable liquid crystal material has a skeletal molecular structure terminated with a photopolymerizable group such as an acrylate group or a methacrylate group, for example.

The quarter-wave films can each be formed by the following method, for example. First, a photopolymerizable liquid crystal material is dissolved in an organic solvent such as propylene glycol monomethyl ether acetate (PGMEA). Then, the obtained solution is applied to a surface of a base material (for example, polyethylene terephthalate (PET) film) to form a film of the solution. The film of the solution is successively pre-baked, irradiated with light (for example, ultraviolet light), and post-baked, so that a quarter-wave film is formed.

Also, the quarter-wave films may each be a liquid crystal polymer film formed by polymerizing a mixture of the photopolymerizable liquid crystal material and a chiral dopant in a 70°-twisted state.

The quarter-wave films also can each be a stretched polymer film, for example. The polymer film is made of, for example, a cycloolefin polymer, polycarbonate, polysulfone, polyethersulfone, polyethylene terephthalate, polyethylene, polyvinyl alcohol, norbornene, triacetyl cellulose, or diacetyl cellulose.

The first quarter-wave film 12 preferably exhibits reverse wavelength dispersion. This configuration enables switching between polarization modulation and no polarization modulation in a broader bandwidth. Herein, the "wavelength dispersion" of a phase difference film means the correlation between the absolute value of a phase difference introduced by the phase difference film and the wavelength of incident light. The phase difference dispersion where the absolute value of the phase difference introduced by a phase difference film is constant regardless of the wavelength of incident light in the visible spectrum is also referred to as "flat wavelength dispersion". The phase difference dispersion where the absolute value of the phase difference introduced by a phase difference film decreases as the wavelength of incident light becomes longer in the visible spectrum is also referred to as "positive wavelength dispersion". The phase difference dispersion where the absolute value of the phase difference introduced by a phase difference film increases as the wavelength of incident light becomes longer in the visible spectrum is also referred to as "reverse wavelength dispersion".

Preferably, the in-plane phase difference introduced by the first quarter-wave film 12 at a wavelength of 450 nm is not less than 0.7 times and not more than 1 times the in-plane phase difference introduced by the first quarter-wave film 12 at a wavelength of 550 nm. This configuration enables switching between polarization modulation and no polarization modulation in a broader bandwidth.

Preferably, the in-plane phase difference introduced by the first quarter-wave film 12 at a wavelength of 650 nm is not less than 1 times and not more than 1.3 times the in-plane phase difference introduced by the first quarter-wave film 12 at a wavelength of 550 nm. This configuration enables switching between polarization modulation and no polarization modulation in a broader bandwidth.

Preferably, the in-plane phase difference introduced by the first quarter-wave film 12 at a wavelength of 550 nm is not less than 30 nm and not more than 230 nm. This configuration enables switching between polarization modulation and no polarization modulation in a broader bandwidth.

When the azimuthal angle of the alignment direction 311A of the liquid crystal molecules 311 near the first substrate 100 in the first state is taken as 0°, preferably, the slow axis of the first quarter-wave film 12 or the second quarter-wave film 13, whichever is farther from the light emitting side (in the present embodiment, the slow axis 12A of the first quarter-wave film 12), is at an azimuthal angle of not smaller than 48° and not greater than 66°. This configuration enables switching between polarization modulation and no polarization modulation in a broader bandwidth.

Preferably, the second quarter-wave film 13 exhibits flat wavelength dispersion. This configuration enables switching between polarization modulation and no polarization modulation in a broader bandwidth.

Preferably, the in-plane phase difference introduced by the second quarter-wave film 13 at a wavelength of 550 nm is not less than 110 nm and not more than 175 nm. This configuration enables switching between polarization modulation and no polarization modulation in a broader bandwidth.

When the azimuthal angle of the alignment direction 311A of the liquid crystal molecules 311 near the first substrate 100 in the first state is taken as 0°, preferably, the slow axis of the first quarter-wave film 12 or the second quarter-wave film 13, whichever is closer to the light emitting side (in the present embodiment, the slow axis 13A of the second quarter-wave film 13), is at an azimuthal angle of not smaller than 3° and not greater than 22°. This configuration enables switching between polarization modulation and no polarization modulation in a broader bandwidth.

The angle formed by the slow axis 12A of the first quarter-wave film 12 and the slow axis 13A of the second quarter-wave film 13 is preferably not smaller than 40° and not greater than 50°, more preferably not smaller than 42° and not greater than 48°, still more preferably not smaller than 44° and not greater than 46°, particularly preferably 45°.

In the present embodiment where the liquid crystal layer 300 contains positive liquid crystal molecules 310, in a plan view, the alignment direction 311A of the liquid crystal molecules 311 near the first substrate 100 in the first state matches the extension direction 120A of the first comb-teeth electrode 120. Thus, when the azimuthal angle of the alignment direction 311A of the liquid crystal molecules 311 near the first substrate 100 in the first state is taken as 0°, for example, as shown in FIG. 5, the extension direction 120A can be set at an azimuthal angle of 0°, the extension direction 220A can be set at an azimuthal angle of 160°, the slow axis 12A of the first quarter-wave film 12 can be set at an azimuthal angle of 57.2°, and the slow axis 13A of the second quarter-wave film 13 can be set at an azimuthal angle of 12.2°.

Preferably, light incident on the optical element 10 is circularly polarized light. This configuration achieves an optical element 10 capable of switching the polarization states of circularly polarized light.

Embodiment 2

The features unique to the present embodiment are mainly described here, and description of the matters already described in Embodiment 1 is omitted. The present embodiment is substantially the same as Embodiment 1 except for the configuration of the liquid crystal cell 11.

Figure 10:
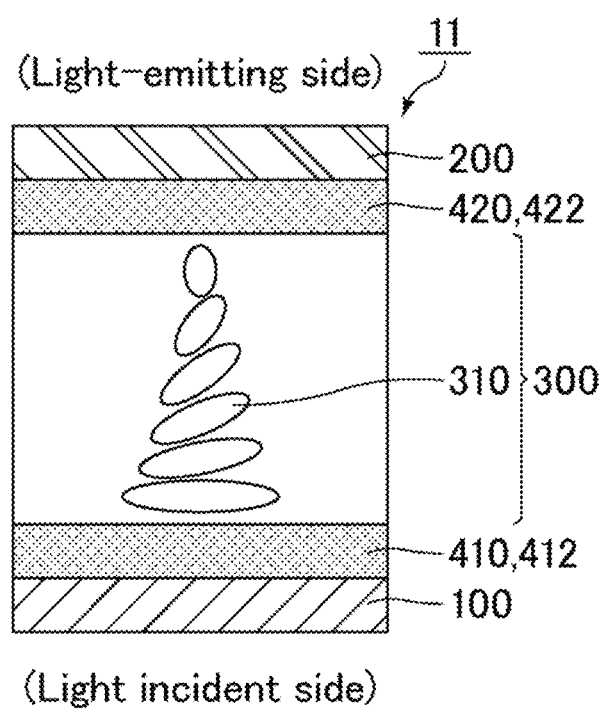
FIG. 10 is a schematic cross-sectional view of a liquid crystal cell in the optical element of Embodiment 2.
Figure 11:
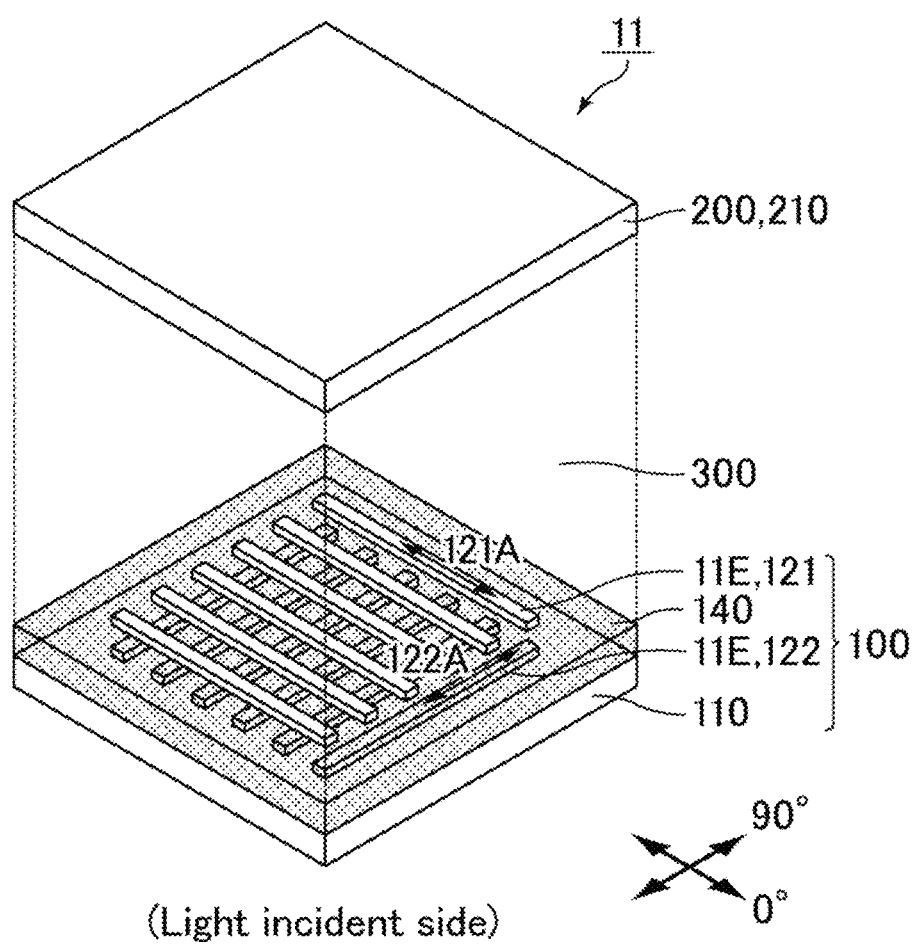
FIG. 11 is a schematic perspective view of the liquid crystal cell in the optical element of Embodiment 2.
Figure 12:
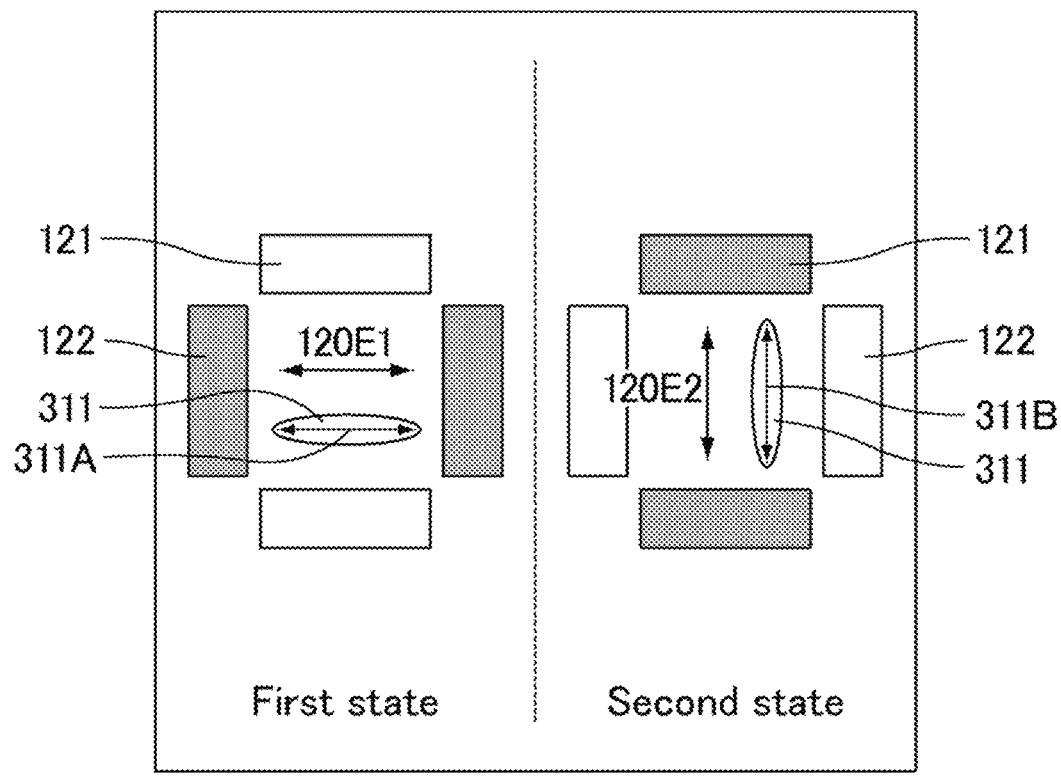
FIG. 12 is a schematic plan view showing the directions of electric fields generated in the optical element of Embodiment 2.
Figure 13:
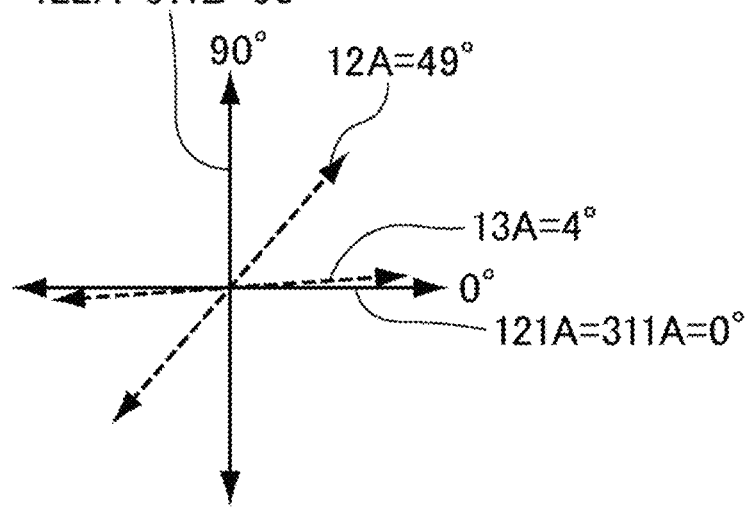
FIG. 13 shows examples of axis azimuths in the optical element of Embodiment 2.

FIG. 10 is a schematic cross-sectional view of a liquid crystal cell in the optical element of Embodiment 2. FIG. 11 is a schematic perspective view of the liquid crystal cell in the optical element of Embodiment 2. FIG. 12 is a schematic plan view showing the directions of electric fields generated in the optical element of Embodiment 2. FIG. 13 shows examples of axis azimuths in the optical element of Embodiment 2.

The liquid crystal cell 11 in the optical element 10 of the present embodiment, as shown in FIG. 10 and FIG. 11, further includes a weak anchoring horizontal alignment film 412 between the first substrate 100 and the liquid crystal layer 300; and a vertical alignment film 422 between the liquid crystal layer 300 and the second substrate 200. The electrodes 11E include, in the first substrate 100, a first comb-teeth electrode 121 composed of a comb-teeth-shaped pixel electrode and a comb-teeth-shaped common electrode with comb teeth of these electrodes fitting each other, and include a second comb-teeth electrode 122 overlapping the first comb-teeth electrode 121 via an insulating layer 140 and composed of a comb-teeth-shaped pixel electrode and a comb-teeth-shaped common electrode with comb teeth of these electrodes fitting each other. In a plan view, an extension direction 121A of the first comb-teeth electrode 121 is perpendicular to an extension direction 122A of the second comb-teeth electrode 122.

This configuration, with no voltage applied to the first comb-teeth electrode 121 and with voltage applied to the second comb-teeth electrode 122 as shown in FIG. 12 and FIG. 13, causes circularly polarized light (for example, right-handed circularly polarized light) incident on the liquid crystal cell 11 to be first linearly polarized light after passing through the liquid crystal cell 11. In other words, the first state can be achieved. In addition, the first linearly polarized light, after passing through the first quarter-wave film 12 and the second quarter-wave film 13, is converted in a broad bandwidth to circularly polarized light in a different polarization state (for example, left-handed circularly polarized light) from the circularly polarized light incident on the liquid crystal cell 11. In this manner, the first state achieves polarization modulation where circularly polarized light incident on the optical element 10 is emitted after being converted to circularly polarized light in a different polarization state (for example, right-handed circularly polarized light is converted to left-handed circularly polarized light) in a broad bandwidth.

The above configuration, with voltage applied to the first comb-teeth electrode 121 and with no voltage applied to the second comb-teeth electrode 122, causes circularly polarized light (for example, right-handed circularly polarized light) incident on the liquid crystal cell 11 to be second linearly polarized light whose polarization direction is perpendicular to the polarization direction of the first linearly polarized light in a plan view after passing through the liquid crystal cell 11. In other words, the second state can be achieved. In addition, the second linearly polarized light, after passing through the first quarter-wave film 12 and the second quarter-wave film 13, is emitted in a broad bandwidth as circularly polarized light in the same polarization state (for example, right-handed circularly polarized light) as the circularly polarized light incident on the liquid crystal cell 11. In this manner, the second state achieves no polarization modulation where circularly polarized light incident on the optical element 10 is emitted in the same polarization state (for example, while remaining as right-handed circularly polarized light) in a broad bandwidth.

As shown in FIG. 10, the liquid crystal cell 11 of the present embodiment is a twisted hybrid aligned nematic (HAN) cell and includes, sequentially from the light incident side toward the light emitting side, the first substrate 100; the weak anchoring horizontal alignment film 412 as a slippery film; the liquid crystal layer 300 containing a chiral dopant; the vertical alignment film 422; and the second substrate 200. The liquid crystal molecules 310 in the liquid crystal layer 300 may be negative liquid crystal molecules or positive liquid crystal molecules. The present embodiment is described with reference to a case where the liquid crystal layer 300 contains positive liquid crystal molecules 310.

As shown in FIG. 11, the first substrate 100 includes the first support substrate 110, the second comb-teeth electrode 122, the insulating layer 140, and the first comb-teeth electrode 121. The second substrate 200 includes the second support substrate 210.

The insulating layer 140 has a function of insulating between the first comb-teeth electrode 121 and the second comb-teeth electrode 122. The insulating layer 140 can be an inorganic insulating film, an organic insulating film, or a stack of the organic insulating film and the inorganic insulating film. The inorganic insulating film may be, for example, an inorganic film (relative dielectric constant $\varepsilon=5$ to 7) such as a silicon nitride ($SiN_x$) film or a silicon oxide ($SiO_2$) film, or a stack of any of these films. The organic insulating film may be, for example, an organic film with a low relative dielectric constant (relative dielectric constant $\varepsilon=2$ to 5) such as a photo-sensitive acrylic resin and a stack of such films. Specific examples include organic film such as an acrylic resin film, a polyimide resin film, or a novolac resin film, or a stack of any of these films.

The first comb-teeth electrode 121 is composed of a first pixel electrode, which is a comb-teeth electrode, and a first common electrode, which is a comb-teeth electrode. The second comb-teeth electrode 122 is composed of a second pixel electrode, which is a comb-teeth electrode, and a second common electrode, which is a comb-teeth electrode.

The pitch of the first comb-teeth electrode 121 is preferably not smaller than 1 μm and not greater than 5 μm. This configuration enables efficient rotation of the liquid crystal molecules 311 near the first substrate 100, likely resulting in uniform twist alignment. Similarly, the pitch of the second comb-teeth electrode 122 is preferably not smaller than 1 μm and not greater than 5 μm. This configuration enables efficient rotation of the liquid crystal molecules 311 near the first substrate 100, likely resulting in uniform twist alignment.

As shown in FIG. 12, when voltage is applied to the second comb-teeth electrode 122 and no voltage is applied to the first comb-teeth electrode 121, electric fields are generated in a first electric field direction 120E1 (first state). When no voltage is applied to the second comb-teeth electrode 122 and voltage is applied to the first comb-teeth electrode 121, electric fields are generated in a second electric field direction 120E2 (second state). In this manner, the optical element 10 of Embodiment 2 can utilize the electric fields to rotate the azimuthal angle of the alignment direction of the liquid crystal molecules 311 near the first substrate 100 by 90°.

The vertical alignment film 422 has a function of aligning liquid crystal molecules in the liquid crystal layer vertically to its surfaces during no voltage application. The expression that the vertical alignment film aligns liquid crystal molecules vertically to its surfaces means that the pre-tilt angle of the liquid crystal molecules is not smaller than 86° and not greater than 90°, preferably not smaller than 87° and not greater than 89°, more preferably not smaller than 87.5° and not greater than 89°, from the surfaces of the vertical alignment film.

The vertical alignment film 422 is preferably a strong anchoring vertical alignment film. The strong anchoring alignment film means an alignment film exerting a strong alignment regulating force to liquid crystal molecules, such as an alignment film having an azimuthal anchoring energy not smaller than $1 \times 10^{-4}$ J/m². The upper limit of the azimuthal anchoring energy of the strong anchoring alignment film is not limited. The azimuthal anchoring energy of the strong anchoring alignment film is, for example, not greater than $1 \times 10^{-1}$ J/m².

The azimuthal anchoring energy of the vertical alignment film 422 is preferably not smaller than $1 \times 10^{-4}$ J/m² and not greater than $1 \times 10^{-1}$ J/m². This configuration enables switching between polarization modulation and no polarization modulation in a broader bandwidth.

Preferably, the weak anchoring horizontal alignment film 412 is a slippery film. This configuration enables switching between polarization modulation and no polarization modulation in a broader bandwidth.

Since the alignment films on both sides are weak anchoring films in the Embodiment 1, there is room for improvement in terms of misalignment and response speed. The present embodiment employing vertical alignment (HAN structure) on one side utilizes the strong anchoring energy exerted by the vertical alignment film 422 on this side, thus likely stabilizing the alignment to achieve a highly reliable optical element 10. With the HAN structure, not only the azimuthal anchoring energy but also the polar anchoring energy of the weak anchoring horizontal alignment film 412 is important. The HAN alignment tends to deviate from the ideal HAN alignment under the influence of the strong anchoring alignment film (vertical alignment film 422) on the second substrate 200 when the polar anchoring energy of the weak anchoring horizontal alignment film 412 is small.

The polar anchoring energy of the weak anchoring horizontal alignment film 412 is thus preferably not smaller than $1 \times 10^{-5}$ J/m², more preferably not smaller than $1 \times 10^{-4}$ J/m², still more preferably not smaller than $1 \times 10^{-3}$ J/m². The upper limit of the polar anchoring energy of the weak anchoring horizontal alignment film 412 is not limited. The polar anchoring energy of the weak anchoring horizontal alignment film 412 is, for example, not greater than $1 \times 10^{-1}$ J/m². The polar anchoring energy can be determined by the same method as that for determining the azimuthal anchoring energy. The polar anchoring energy of the alignment film can be adjusted by the same method as that for adjusting the azimuthal anchoring energy.

The polar anchoring energy of the weak anchoring horizontal alignment film 412 is preferably not smaller than $1 \times 10^{-5}$ J/m² and not greater than $1 \times 10^{-1}$ J/m², more preferably not smaller than $1 \times 10^{-4}$ J/m² and not greater than $1 \times 10^{-1}$ J/m², still more preferably not smaller than $1 \times 10^{-3}$ J/m² and not greater than $1 \times 10^{-1}$ J/m². With this configuration, an ideal HAN alignment can be more easily achieved.

In the present embodiment where the liquid crystal layer 300 contains positive liquid crystal molecules 310, in a plan view, the alignment direction 311A of the liquid crystal molecules 311 near the first substrate 100 in the first state matches the extension direction 121A of the first comb-teeth electrode 121. Thus, when the azimuthal angle of the alignment direction 311A of the liquid crystal molecules 311 near the first substrate 100 in the first state is taken as 0°, for example, as shown in FIG. 13, the extension direction 121A can be set at an azimuthal angle of 0°, the extension direction 122A can be set at an azimuthal angle of 90°, the slow axis 13A of the second quarter-wave film 13 can be set at an azimuthal angle of 4°, and the slow axis 12A of the first quarter-wave film 12 can be set at an azimuthal angle of 49°.

Embodiment 3

The features unique to the present embodiment are mainly described here, and description of the matters already described in Embodiments 1 and 2 is omitted. The present embodiment is substantially the same as Embodiment 1 except for the configuration of the liquid crystal cell 11.

Figure 14:
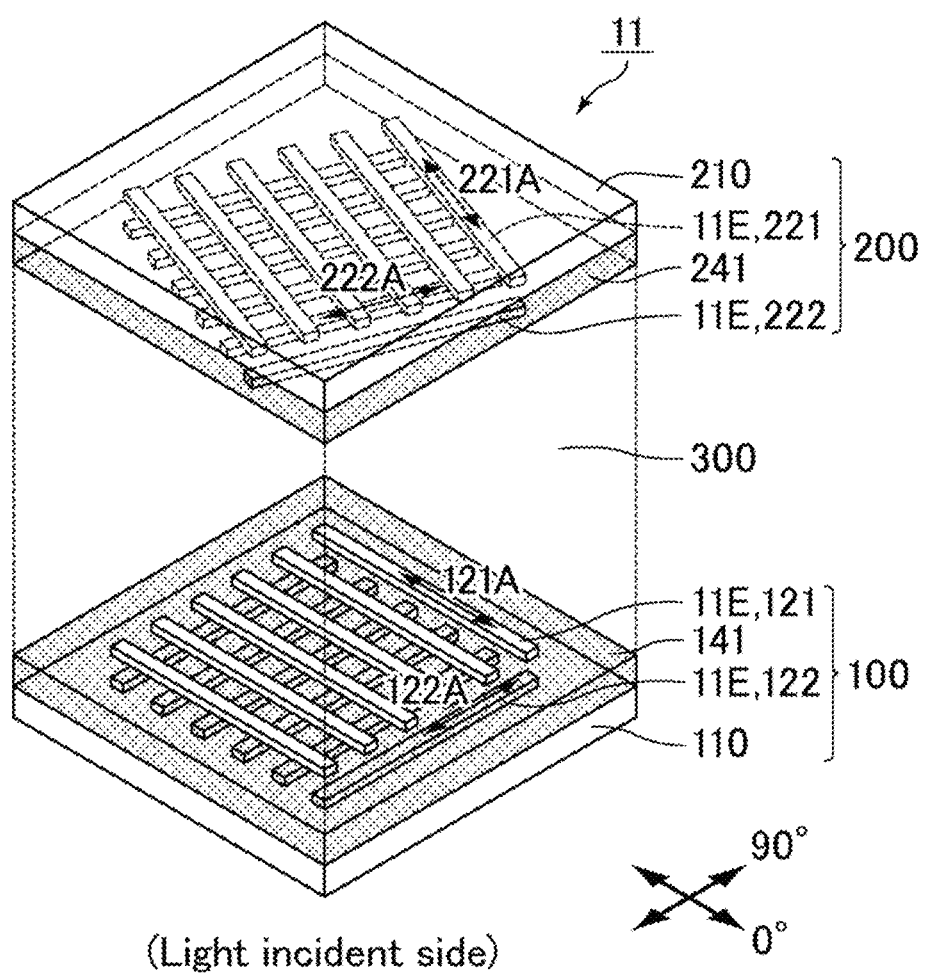
FIG. 14 is a schematic perspective view of a liquid crystal cell in an optical element of Embodiment 3.
Figure 15:
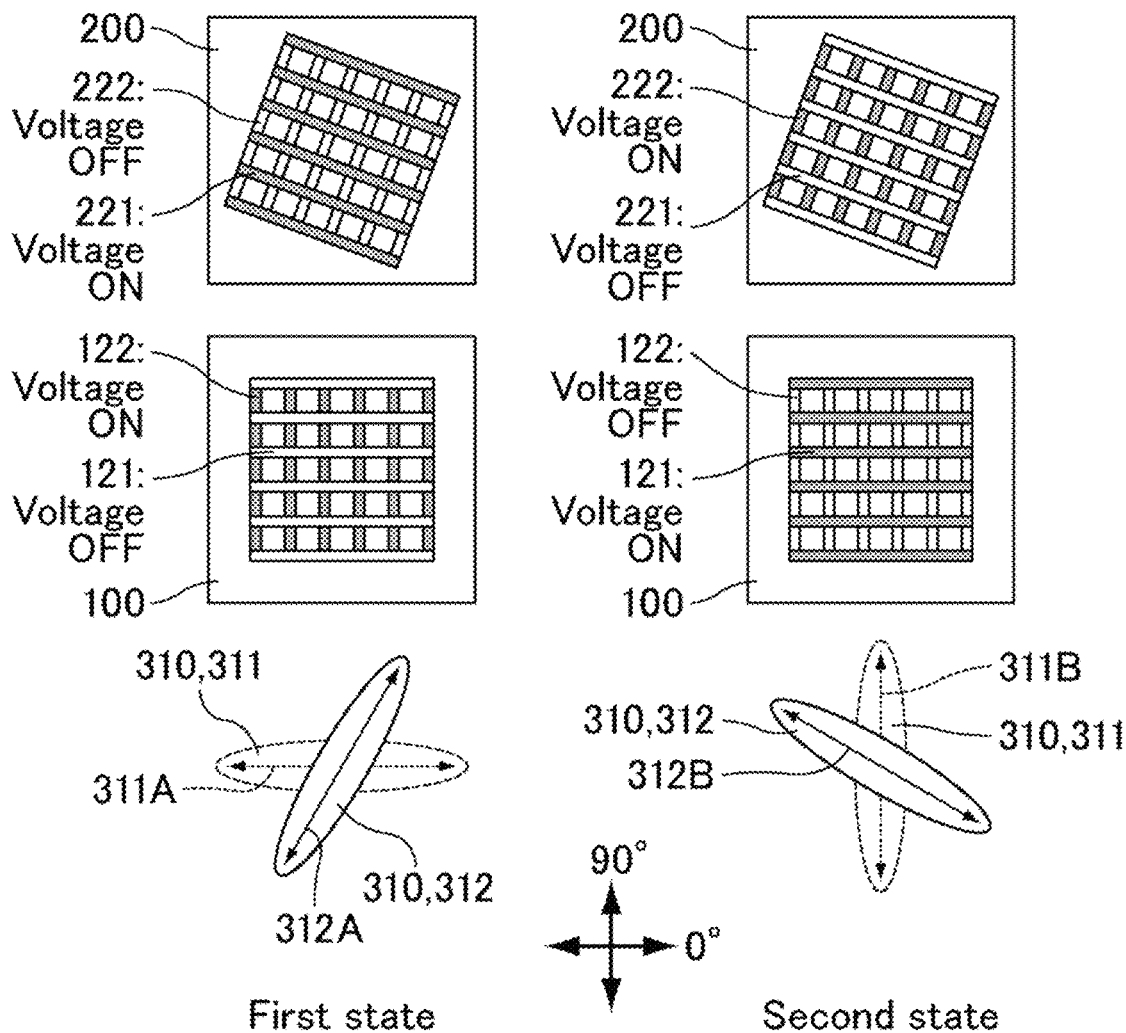
FIG. 15 includes schematic views showing the alignments of liquid crystal molecules in the first state and the second state in the optical element of Embodiment 3.

FIG. 14 is a schematic perspective view of a liquid crystal cell in an optical element of Embodiment 3. FIG. 15 includes schematic views showing the alignments of liquid crystal molecules in the first state and the second state in the optical element of Embodiment 3.

The electrodes 11E in the optical element 10 of the present embodiment include, in the first substrate 100 as shown in FIG. 14 and FIG. 15, the first comb-teeth electrode 121 composed of a comb-teeth-shaped pixel electrode and a comb-teeth-shaped common electrode with comb teeth of these electrodes fitting each other, and the second comb-teeth electrode 122 overlapping the first comb-teeth electrodes 121 via a first insulating layer 141 and composed of a comb-teeth-shaped pixel electrode and a comb-teeth-shaped common electrode with comb teeth of these electrodes fitting each other, and include, in the second substrate 200, a third comb-teeth electrode 221 composed of a comb-teeth-shaped pixel electrode and a comb-teeth-shaped common electrode with comb teeth of these electrodes fitting each other, and a fourth comb-teeth electrode 222 overlapping the third comb-teeth electrode 221 via a second insulating layer 241 and composed of a comb-teeth-shaped pixel electrode and a comb-teeth-shaped common electrode with comb teeth of these electrodes fitting each other. In a plan view, the extension direction 121A of the first comb-teeth electrode 121 is perpendicular to the extension direction 122A of the second comb-teeth electrode 122, the extension direction 221A of the third comb-teeth electrode 221 is perpendicular to the extension direction 222A of the fourth comb-teeth electrode 222, and the extension direction 121A of the first comb-teeth electrode 121 is oblique to the extension direction 221A of the third comb-teeth electrode 221.

This configuration, with no voltage applied to the first comb-teeth electrode 121 and with voltage applied to the second comb-teeth electrode 122, with voltage applied to the third comb-teeth electrode 221, and with no voltage applied to the fourth comb-teeth electrode 222 as shown in FIG. 15, causes circularly polarized light (for example, right-handed circularly polarized light) incident on the liquid crystal cell 11 to be first linearly polarized light after passing through the liquid crystal cell 11. In other words, the first state can be achieved. In addition, the first linearly polarized light, after passing through the first quarter-wave film 12 and the second quarter-wave film 13, is converted in a broad bandwidth to circularly polarized light in a different polarization state (for example, left-handed circularly polarized light) from the circularly polarized light incident on the liquid crystal cell 11. In this manner, the first state achieves polarization modulation where circularly polarized light incident on the optical element 10 is emitted after being converted to circularly polarized light in a different polarization state (for example, right-handed circularly polarized light is converted to left-handed circularly polarized light) in a broad bandwidth.

The above configuration, with voltage applied to the first comb-teeth electrode 121, with no voltage applied to the second comb-teeth electrode 122, with no voltage applied to the third comb-teeth electrode 221, and with voltage applied to the fourth comb-teeth electrode 222, causes circularly polarized light (for example, right-handed circularly polarized light) incident on the liquid crystal cell 11 to be second linearly polarized light whose polarization direction is perpendicular to the polarization direction of the first linearly polarized light in a plan view after passing through the liquid crystal cell 11. In other words, the second state can be achieved. In addition, the second linearly polarized light, after passing through the first quarter-wave film 12 and the second quarter-wave film 13, is emitted in a broad bandwidth as circularly polarized light in the same polarization state (for example, right-handed circularly polarized light) as the circularly polarized light incident on the liquid crystal cell 11. In this manner, the second state achieves no polarization modulation where circularly polarized light incident on the optical element 10 is emitted in the same polarization state (for example, while remaining as right-handed circularly polarized light) in a broad bandwidth.

As described above, the optical element 10 of the present embodiment can achieve the first state and the second state by applying voltage to both the first substrate 100 and the second substrate 200 and then lowering the voltage. The direction of the electric field generated in each substrate in the first state differs by 90° from that in the second state. The present embodiment can define both the alignment near the first substrate 100 and the alignment near the second substrate 200 using voltage, thus achieving a high response speed.

As shown in FIG. 14, the first substrate 100 sequentially includes the first support substrate 110, the second comb-teeth electrode 122, the first insulating layer 141, and the first comb-teeth electrode 121. The second substrate 200 sequentially includes the second support substrate 210, the third comb-teeth electrode 221, the second insulating layer 241, and the fourth comb-teeth electrode 222.

The first insulating layer 141 has a function of insulating between the first comb-teeth electrode 121 and the second comb-teeth electrode 122. The second insulating layer 241 has a function of insulating between the third comb-teeth electrode 221 and the fourth comb-teeth electrode 222. The first insulating layer 141 and the second insulating layer 241 can be the same as the insulating layer 140.

The first comb-teeth electrode 121 is composed of a first pixel electrode, which is a comb-teeth electrode, and a first common electrode, which is a comb-teeth electrode. The second comb-teeth electrode 122 is composed of a second pixel electrode, which is a comb-teeth electrode, and a second common electrode, which is a comb-teeth electrode. The third comb-teeth electrode 221 is composed of a third pixel electrode, which is a comb-teeth electrode, and a third common electrode, which is a comb-teeth electrode. The fourth comb-teeth electrode 222 is composed of a fourth pixel electrode, which is a comb-teeth electrode, and a fourth common electrode, which is a comb-teeth electrode.

The pitch of the first comb-teeth electrode 121 is preferably not smaller than 1 µm and not greater than 5 µm. This configuration enables efficient rotation of the liquid crystal molecules 311 near the first substrate 100, likely resulting in uniform twist alignment. Similarly, the pitch of the second comb-teeth electrode 122 is preferably not smaller than 1 µm and not greater than 5 µm. This configuration enables efficient rotation of the liquid crystal molecules 311 near the first substrate 100, likely resulting in uniform twist alignment.

The pitch of the third comb-teeth electrode 221 is preferably not smaller than 1 µm and not greater than 5 µm. This configuration enables efficient rotation of the liquid crystal molecules 312 near the second substrate 200, likely resulting in uniform twist alignment. Similarly, the pitch of the fourth comb-teeth electrode 222 is preferably not smaller than 1 µm and not greater than 5 µm. This configuration enables efficient rotation of the liquid crystal molecules 312 near the second substrate 200, likely resulting in uniform twist alignment.

In a plan view, the angle β formed by the extension direction 121A and the extension direction 221A (where β is a real number greater than 0° and smaller than 90°) and the twist angle B of the liquid crystal molecules 310 in the liquid crystal layer 300 in the first state and the second state preferably satisfy the following Formula BX1, more preferably the following Formula BX2, still more preferably the following Formula BX3. This configuration enables effective switching between polarization modulation and no polarization modulation in a broad bandwidth.

$$85°-B \le \beta \le 95°-B \quad \text{(Formula BX1)}$$

$$88°-B \le \beta \le 92°-B \quad \text{(Formula BX2)}$$

$$\beta = 90°-B \quad \text{(Formula BX3)}$$

The twist angle B is preferably not smaller than 60° and not greater than 80°, more preferably not smaller than 64° and not greater than 76°, still more preferably not smaller than 68° and not greater than 72°. This configuration enables more effective switching between polarization modulation and no polarization modulation in a broad bandwidth.

When the extension direction 121A is at an azimuthal angle of 0°, the extension direction 221A is at an azimuthal angle of 160° (i.e., in a plan view, the angle β formed by the extension direction 121A and the extension direction 221A is 20°), the twist angle B of the liquid crystal molecules 310 is 70°, and the liquid crystal layer 300 contains positive liquid crystal molecules 310 with no voltage applied to the first comb-teeth electrode 121, with voltage applied to the second comb-teeth electrode 220, with voltage applied to the third comb-teeth electrode 221, and with no voltage applied to the fourth comb-teeth electrode 222 as shown in FIG. 15, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with voltage applied to the first comb-teeth electrode 120, with no voltage applied to the second comb-teeth electrode 220, with no voltage applied to the third comb-teeth electrode 221, and with voltage applied to the fourth comb-teeth electrode 222, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

When the liquid crystal layer 300 contains negative liquid crystal molecules 310 with voltage applied to the first comb-teeth electrode 121, with no voltage applied to the second comb-teeth electrode 122, with no voltage applied to the third comb-teeth electrode 221, and with voltage applied to the fourth comb-teeth electrode 222, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with no voltage applied to the first comb-teeth electrode 121, with voltage applied to the second comb-teeth electrode 122, with voltage applied to the third comb-teeth electrode 221, and with no voltage applied to the fourth comb-teeth electrode 222, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

In the present embodiment where the liquid crystal layer 300 contains positive liquid crystal molecules 310, in a plan view, the alignment direction 311A of the liquid crystal molecules 311 near the first substrate 100 in the first state matches the extension direction 121A of the comb-teeth electrode of the first comb-teeth electrode 121. Thus, when the azimuthal angle of the alignment direction 311A of the liquid crystal molecules 311 near the first substrate 100 in the first state is taken as 0°, for example, the extension direction 121A can be set at an azimuthal angle of 0°, the extension direction 122A and the extension direction 222A can be set at an azimuthal angle of 90°, the extension direction 221A can be set at an azimuthal angle of 160°, the slow axis 12A of the first quarter-wave film 12 can be set at an azimuthal angle of 57.2°, and the slow axis 13A of the second quarter-wave film 13 can be set at an azimuthal angle of 12.2°.

As in Embodiment 1 and Embodiment 2, the optical element 10 of the present embodiment preferably includes a first weak anchoring horizontal alignment film between the first substrate 100 and the liquid crystal layer 300 and a second weak anchoring horizontal alignment film between the liquid crystal layer 300 and the second substrate 200. This configuration enables uniform alignment of the liquid crystal molecules near the interfaces while maintaining the horizontal alignment.

Embodiment 4

The features unique to the present embodiment are mainly described here, and description of the matters already described in Embodiments 1 to 3 is omitted. The present embodiment is substantially the same as Embodiment 1 except that a bistable alignment film is used instead of the first weak anchoring horizontal alignment film 411.

Figure 16:
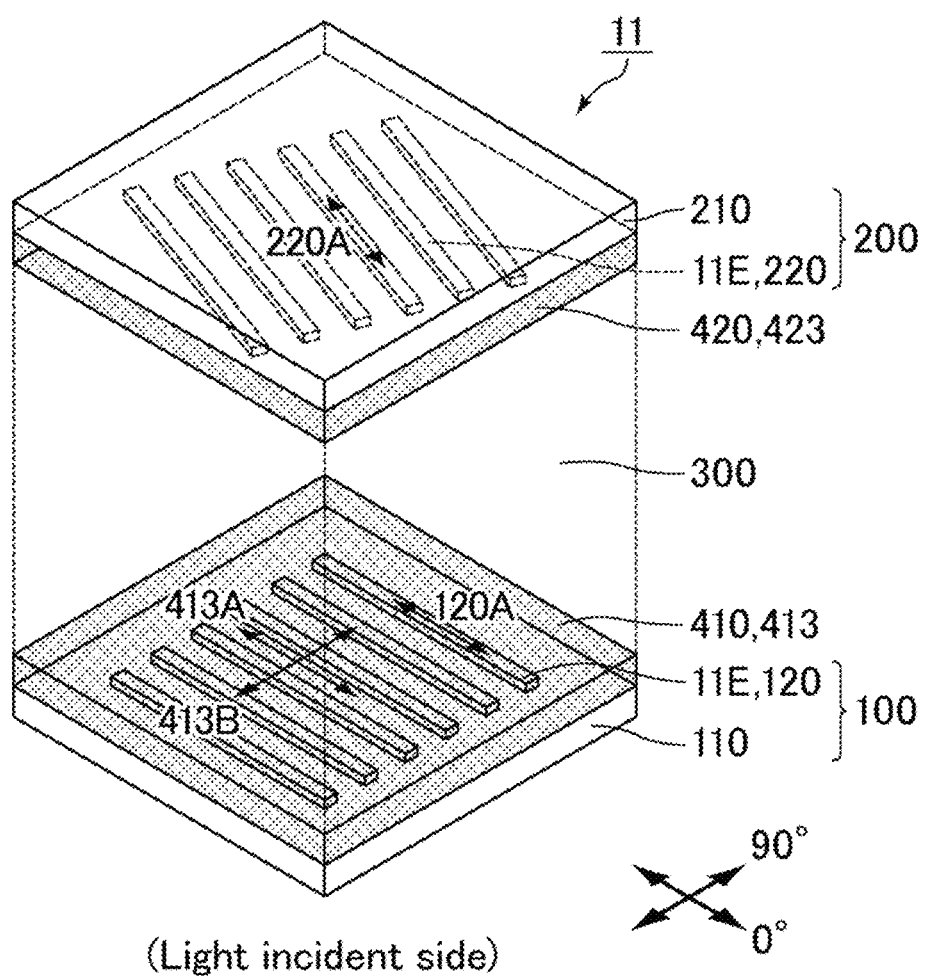
FIG. 16 is a schematic perspective view of a liquid crystal cell in an optical element of Embodiment 4.

FIG. 16 is a schematic perspective view of a liquid crystal cell in an optical element of Embodiment 4. The liquid crystal cell 11 in the optical element 10 of the present embodiment, as shown in FIG. 16, further includes a bistable alignment film 413 providing stable alignment in two directions, between the first substrate 100 and the liquid crystal layer 300. The electrodes 11E include, in the first substrate 100, the first comb-teeth electrode 120 composed of a comb-teeth-shaped pixel electrode and a comb-teeth-shaped common electrode with comb teeth of these electrodes fitting each other and include, in the second substrate 200, the second comb-teeth electrode 220 composed of a comb-teeth-shaped pixel electrode and a comb-teeth-shaped common electrode with comb teeth of these electrodes fitting each other. In a plan view, the extension direction 120A of the first comb-teeth electrode 120 is oblique to the extension direction 220A of the second comb-teeth electrode 220.

This configuration, with no voltage applied to the first comb-teeth electrode 120 and with voltage applied to the second comb-teeth electrode 220, causes circularly polarized light (for example, right-handed circularly polarized light) incident on the liquid crystal cell 11 to be first linearly polarized light after passing through the liquid crystal cell 11. In other words, the first state can be achieved. In addition, the first linearly polarized light, after passing through the first quarter-wave film 12 and the second quarter-wave film 13, is converted in a broad bandwidth to circularly polarized light in a different polarization state (for example, left-handed circularly polarized light) from the circularly polarized light incident on the liquid crystal cell 11. In this manner, the first state achieves polarization modulation where circularly polarized light incident on the optical element 10 is emitted after being converted to circularly polarized light in a different polarization state (for example, right-handed circularly polarized light is converted to left-handed circularly polarized light) in a broad bandwidth.

The above configuration, with voltage applied to the first comb-teeth electrode 121 and with no voltage applied to the second comb-teeth electrode 122, causes circularly polarized light (for example, right-handed circularly polarized light) incident on the liquid crystal cell 11 to be second linearly polarized light whose polarization direction is perpendicular to the polarization direction of the first linearly polarized light in a plan view after passing through the liquid crystal cell 11. In other words, the second state can be achieved. In addition, the second linearly polarized light, after passing through the first quarter-wave film 12 and the second quarter-wave film 13, is emitted in a broad bandwidth as circularly polarized light in the same polarization state (for example, right-handed circularly polarized light) as the circularly polarized light incident on the liquid crystal cell 11. In this manner, the second state achieves no polarization modulation where circularly polarized light incident on the optical element 10 is emitted in the same polarization state (for example, while remaining as right-handed circularly polarized light) in a broad bandwidth.

The bistable alignment film 413 provides stable alignment in two directions (first direction 413A and second direction 413B). In a plan view, preferably, the azimuth of the first direction 413A and the azimuth of the second direction 413B are perpendicular to each other and the first direction 413A is parallel to the alignment direction 311A of the liquid crystal molecules 311 near the first substrate 100 in the first state. The azimuthal angle of the alignment direction 311A of the liquid crystal molecules 311 near the first substrate 100 is 0° in the first state and 90° in the second state. Thus, when the azimuth of the first direction 413A and the azimuth of the second direction 413B are perpendicular to each other and the first direction 413A is parallel to the alignment direction 311A of the liquid crystal molecules 311 near the first substrate 100 in the first state in a plan view, the bistable alignment film 413 can stabilize, in terms of energy, the alignment direction of the liquid crystal molecules 311 near the first substrate 100 in the first state and the second state. The present embodiment therefore can achieve an optical element 10 with better alignment stability than Embodiment 1 where the alignment directions of the liquid crystal molecules 310 are defined only by voltage.

The bistable alignment film 413 can be formed by photoirradiation or by rubbing treatment on an uneven substrate.

The photoirradiation is performed to form the bistable alignment film 413 using, for example, a material obtained by mixing two polymers with different photo-functional wavelengths. A solution of two polymers with different photo-functional wavelengths is applied to a substrate and then, for example, the solution is irradiated with polarized ultraviolet light having a certain wavelength and polarized ultraviolet light having a different wavelength from a different direction, so that the bistable alignment film 413 can be formed which provides stable alignment in two directions, namely the first direction and the second direction.

The rubbing treatment on an uneven substrate is performed, for example, by forming a structure with grooves lying in a certain direction on a substrate using a polymer and performing the rubbing treatment in a different direction from the groove direction. The liquid crystal molecules are under the force of alignment in the groove direction and the force of alignment in the rubbing direction. Thus, the bistable alignment film 413 providing stable alignment in two directions can be formed.

The optical element 10 of the present embodiment may include the second alignment film 420 between the second substrate 200 and the liquid crystal layer 300. The second alignment film 420 is, for example, a weak anchoring horizontal alignment film 423. The weak anchoring horizontal alignment film 423 is preferably a slippery film. This configuration enables switching between polarization modulation and no polarization modulation in a broader bandwidth.

The second alignment film 420 may be, for example, a vertical alignment film. The vertical alignment film can be the same as the vertical alignment film 422.

Embodiment 5

The features unique to the present embodiment are mainly described here, and description of the matters already described in Embodiments 1 to 4 is omitted. The present embodiment is substantially the same as Embodiment 1 except for the configuration of the liquid crystal cell 11.

Figure 17:
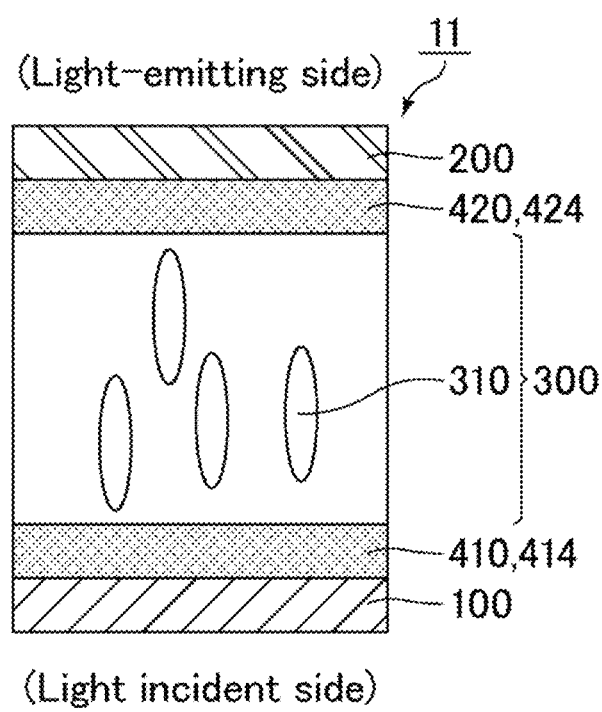
FIG. 17 is a schematic cross-sectional view of a liquid crystal cell in an optical element of Embodiment 5.
Figure 18:
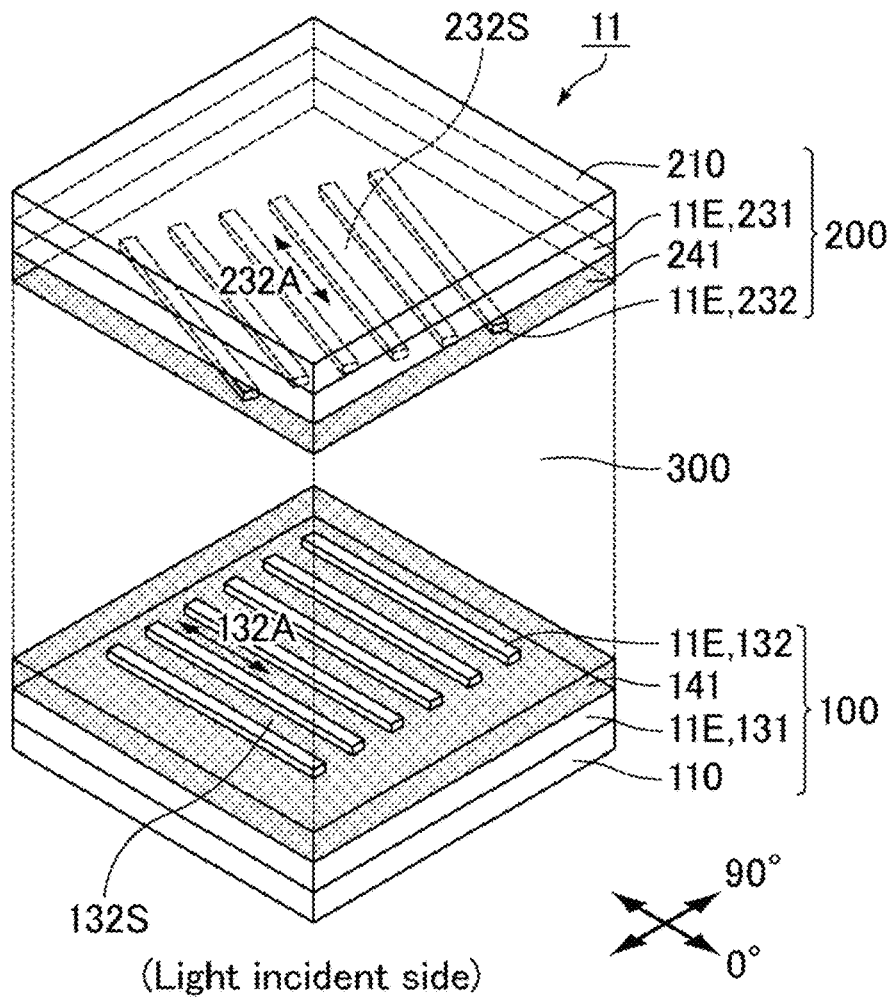
FIG. 18 is a schematic perspective view of the liquid crystal cell in the optical element of Embodiment 5.
Figure 19:
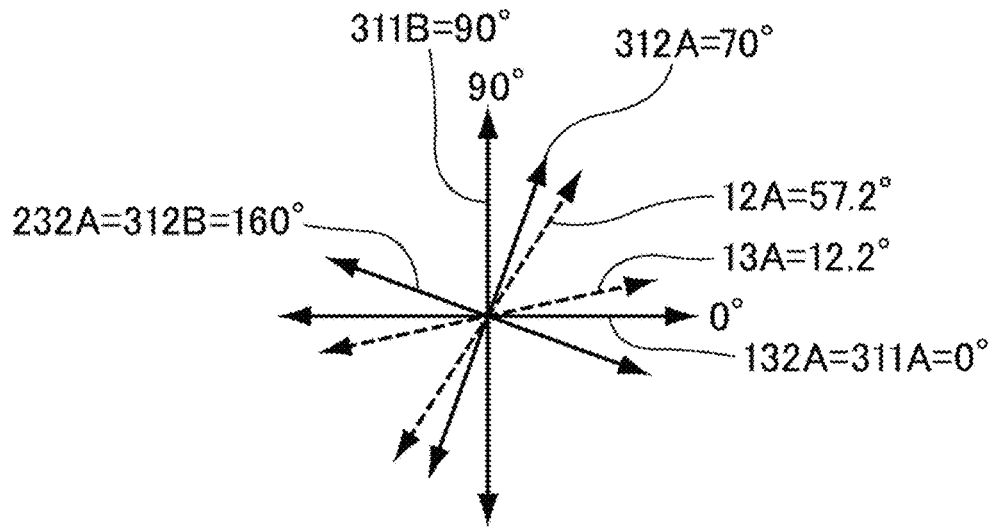
FIG. 19 shows examples of axis azimuths in the optical element of Embodiment 5.

FIG. 17 is a schematic cross-sectional view of a liquid crystal cell in an optical element of Embodiment 5. FIG. 18 is a schematic perspective view of the liquid crystal cell in the optical element of Embodiment 5. FIG. 19 shows examples of axis azimuths in the optical element of Embodiment 5. The azimuth of the alignment of liquid crystal molecules near the interface of a substrate cannot be defined as the alignment is vertical. The alignment azimuths of such liquid crystal molecules are defined by the electrode directions in FIG. 19.

As shown in FIG. 17 to FIG. 19, the liquid crystal cell 11 in the optical element 10 of the present embodiment further includes a first vertical alignment film 414 between the first substrate 100 and the liquid crystal layer 300 and a second vertical alignment film 424 between the liquid crystal layer 300 and the second substrate 200. The electrodes 11E include, in the first substrate 100, a planar first electrode 131 and a second electrode 132 overlapping the first electrode 131 via the first insulating layer 141 and provided with slits 132S and include, in the second substrate 200, a planar third electrode 231 and a fourth electrode 232 overlapping the third electrode 231 via the second insulating layer 241 and provided with slits 232S. In a plan view, the extension direction 132A of the slits 132S in the second electrode 132 is oblique to the extension direction 232A of the slits 232S in the fourth electrode 232.

This configuration, with voltage applied between the first electrode 131 and the second electrode 132 and with no voltage applied between the third electrode 231 and the fourth electrode 232, causes circularly polarized light (for example, right-handed circularly polarized light) incident on the liquid crystal cell 11 to be first linearly polarized light after passing through the liquid crystal cell 11. In other words, the first state can be achieved. In addition, the first linearly polarized light, after passing through the first quarter-wave film 12 and the second quarter-wave film 13, is converted in a broad bandwidth to circularly polarized light in a different polarization state (for example, left-handed circularly polarized light) from the circularly polarized light incident on the liquid crystal cell 11. In this manner, the first state achieves polarization modulation where circularly polarized light incident on the optical element 10 is emitted after being converted to circularly polarized light in a different polarization state (for example, right-handed circularly polarized light is converted to left-handed circularly polarized light) in a broad bandwidth.

The above configuration, with no voltage applied between the first electrode 131 and the second electrode 132 and with voltage applied between the third electrode 231 and the fourth electrode 232, causes circularly polarized light (for example, right-handed circularly polarized light) incident on the liquid crystal cell 11 to be second linearly polarized light whose polarization direction is perpendicular to the polarization direction of the first linearly polarized light in a plan view after passing through the liquid crystal cell 11. In other words, the second state can be achieved. In addition, the second linearly polarized light, after passing through the first quarter-wave film 12 and the second quarter-wave film 13, is emitted in a broad bandwidth as circularly polarized light in the same polarization state (for example, right-handed circularly polarized light) as the circularly polarized light incident on the liquid crystal cell 11. In this manner, the second state achieves no polarization modulation where circularly polarized light incident on the optical element 10 is emitted in the same polarization state (for example, while remaining as right-handed circularly polarized light) in a broad bandwidth.

One of the first electrode 131 and the second electrode 132 is a pixel electrode, and the other is a common electrode. One of the third electrode 231 and the fourth electrode 232 is a pixel electrode, and the other is a common electrode. FIG. 18 shows that the first substrate 100 and the second substrate 200 each include, sequentially toward the liquid crystal layer 300, a planar electrode and an electrode provided with slits. The arrangement of the planar electrode and the electrode provided with slits is not limited thereto. The electrode provided with slits and the planar electrode may be arranged sequentially toward the liquid crystal layer 300.

In a plan view, the angle $\gamma$ formed by the extension direction 132A and the extension direction 232A (where $\gamma$ is a real number greater than 0° and smaller than 90°) and the twist angle C of the liquid crystal molecules 310 in the liquid crystal layer 300 in the first state and the second state preferably satisfy the following Formula CX1, more preferably the following Formula CX2, still more preferably the following Formula CX3. This configuration enables effective switching between polarization modulation and no polarization modulation in a broad bandwidth.

$$85°-C \leq \gamma \leq 95°-C \qquad \text{(Formula CX1)}$$

$$88°-C \leq \gamma \leq 92°-C \qquad \text{(Formula CX2)}$$

$$\gamma = 90°-C \qquad \text{(Formula CX3)}$$

The twist angle C is preferably not smaller than 60° and not greater than 80°, more preferably not smaller than 64° and not greater than 76°, still more preferably not smaller than 68° and not greater than 72°. This configuration enables more effective switching between polarization modulation and no polarization modulation in a broad bandwidth.

When the extension direction 132A is at an azimuthal angle of 0°, the extension direction 232A is at an azimuthal angle of 160° (i.e., in a plan view, the angle γ formed by the extension direction 132A and the extension direction 232A is 20°), the twist angle C of the liquid crystal molecules 310 is 70°, and the liquid crystal layer 300 contains negative liquid crystal molecules 310 with voltage applied between the first electrode 131 and the second electrode 132 and with no voltage applied between the third electrode 231 and the fourth electrode 232, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with no voltage applied between the first electrode 131 and the second electrode 132 and with voltage applied between the third electrode 231 and the fourth electrode 232, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

When the liquid crystal layer 300 contains positive liquid crystal molecules 310 with no voltage applied between the first electrode 131 and the second electrode 132 and with voltage applied between the third electrode 231 and the fourth electrode 232, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with voltage applied between the first electrode 131 and the second electrode 132 and with no voltage applied between the third electrode 231 and the fourth electrode 232, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

The first substrate 100 sequentially includes the first support substrate 110, the planar first electrode 131, the first insulating layer 141, and the second electrode 132 provided with the slits 132S. The second substrate 200 sequentially includes the second support substrate 210, the planar third electrode 231, the second insulating layer 241, and the fourth electrode 232 provided with the slits 232S.

The pitch of the second electrode 132 provided with the slits 132S is preferably not smaller than 1 μm and not greater than 5 μm. This configuration enables efficient rotation of the liquid crystal molecules 311 near the first substrate 100, likely resulting in uniform twist alignment. Similarly, the pitch of the fourth electrode 232 provided with the slits 232S is preferably not smaller than 1 μm and not greater than 5 μm. This configuration enables efficient rotation of the liquid crystal molecules 312 near the second substrate 200, likely resulting in uniform twist alignment. The electrodes provided with slits each have a structure in which linear electrodes and slits alternate. The pitch of an electrode provided with slits means the total width of a pair of a linear electrode and a slit.

Preferably, the liquid crystal molecules 310 are negative liquid crystal molecules. This configuration can apply a high vertical voltage between the first substrate 100 and the second substrate 200 to tilt the negative liquid crystal molecules 310 and horizontally align them. In the first state and the second state, the voltage difference between the first electrode 131 and the third electrode 231 is preferably not smaller than 1 V, more preferably not smaller than 3 V, still more preferably not smaller than 5 V. This configuration enables more effective horizontal alignment of the liquid crystal molecules 310. There is no upper limit of the voltage difference between the first electrode 131 and the third electrode 231. Yet, the voltage difference between the first electrode 131 and the third electrode 231 is, for example, not greater than 20 V. The voltage difference between the first electrode 131 and the third electrode 231 is preferably not smaller than 1 V and not greater than 20 V, more preferably not smaller than 3 V and not greater than 20 V, still more preferably not smaller than 5 V and not greater than 20 V.

In addition, a low voltage can be applied between the pixel electrode and the common electrode, namely between the first electrode 131 and the second electrode 132 and between the third electrode 231 and the fourth electrode 232, to control the in-plane alignment azimuth of the liquid crystal molecules 310. The liquid crystal molecules 310, when they are negative liquid crystal molecules, are aligned in the extension direction of the slits 132S and 232S (the direction perpendicular to the electric fields) in the plane. Generation of strong horizontal electric fields under such conditions would distort the twisted alignment of liquid crystals provided by the chiral dopant. Thus, preferably, weak horizontal electric fields are generated.

For example, the voltage difference between the first electrode 131 and the second electrode 132 in the first state is preferably not greater than 3 V, more preferably not greater than 1 V, still more preferably not greater than 0.5 V. Also, the voltage difference between the third electrode 231 and the fourth electrode 232 in the second state is preferably not greater than 3 V, more preferably not greater than 1 V, still more preferably not greater than 0.5 V. There is no lower limit of the voltage difference between the first electrode 131 and the second electrode 132 in the first state. Yet, the voltage difference between the first electrode 131 and the second electrode 132 in the first state is, for example, not smaller than 0.01 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 0.01 V.

The voltage difference between the first electrode 131 and the second electrode 132 in the first state is preferably not smaller than 0.01 V and not greater than 3 V, more preferably not smaller than 0.05 V and not greater than 1 V. Also, the voltage difference between the third electrode 231 and the fourth electrode 232 in the second state is preferably not smaller than 0.01 V and not greater than 3 V, more preferably not smaller than 0.05 V and not greater than 1 V.

The first vertical alignment film 414 and the second vertical alignment film 424 can be the same as the vertical alignment film 422. The optical element 10 of the present embodiment includes a vertical alignment film on the substrate on each side, thus being more production-friendly than an optical element 10 including a horizontal alignment film.

The first vertical alignment film 414 and the second vertical alignment film 424 may each provide a minute tilt angle to liquid crystal molecules. Specifically, the first vertical alignment film 414 and the second vertical alignment film 424 may each provide a pre-tilt angle of not smaller than 85° and not greater than 90° to the liquid crystal molecules 310.

Figure 20:
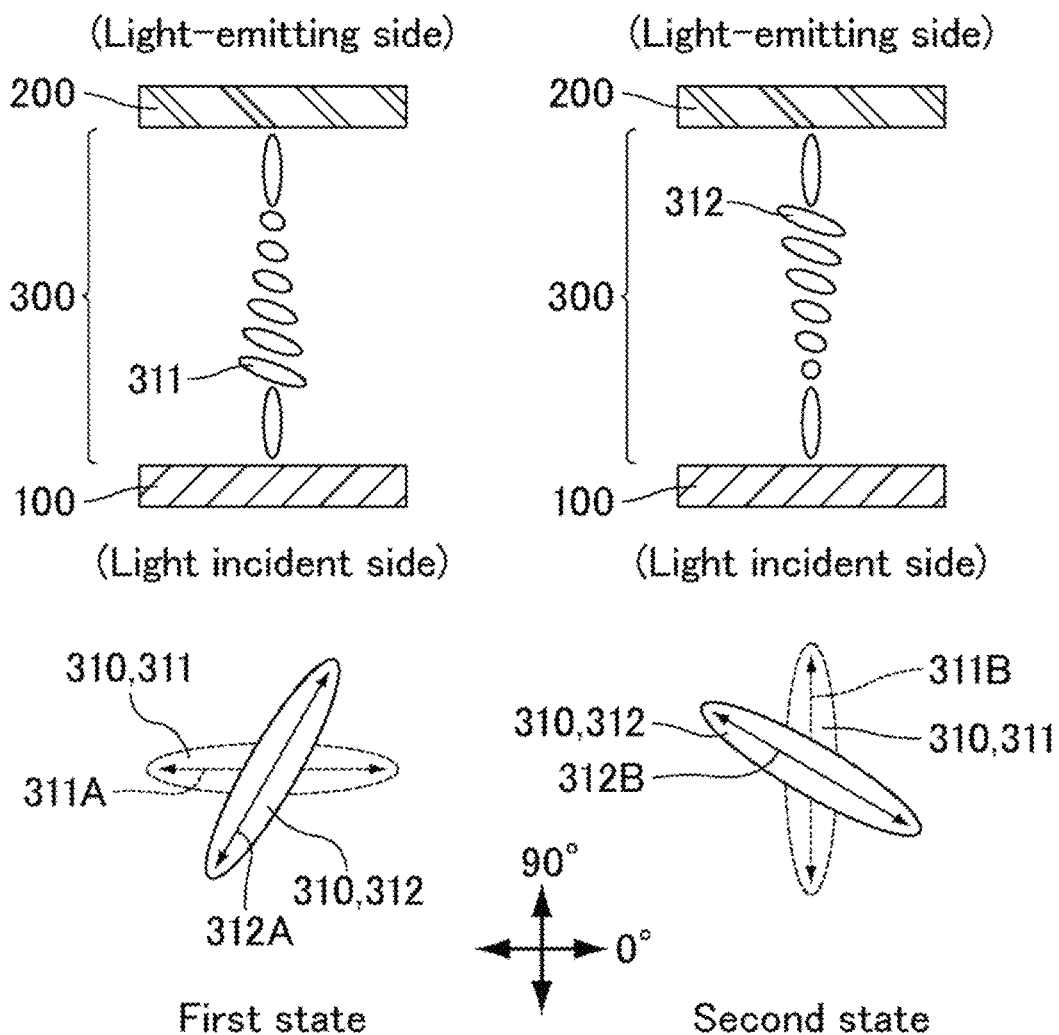
FIG. 20 includes schematic views showing the alignments of liquid crystal molecules in the first state and the second state in the optical element of Embodiment 5.

FIG. 20 includes schematic views showing the alignments of liquid crystal molecules in the first state and the second state in the optical element of Embodiment 5. As shown in FIG. 20, the liquid crystal molecules 310 are vertically aligned in the very vicinity of the first substrate 100 and the second substrate 200, while they are horizontally aligned with substantially 70°-twisted alignment in the liquid crystal layer 300.

In the present embodiment where the liquid crystal layer 300 contains negative liquid crystal molecules 310, in a plan view, the alignment direction 311A of the liquid crystal molecules 311 near the first substrate 100 in the first state matches the extension direction 132A of the slits 132S in the second electrode 132. Thus, when the azimuthal angle of the alignment direction 311A of the liquid crystal molecules 311 near the first substrate 100 in the first state is taken as 0°, for example, the extension direction 132A can be set at an azimuthal angle of 0°, the extension direction 232A can be set at an azimuthal angle of 160°, the slow axis 12A of the first quarter-wave film 12 can be set at an azimuthal angle of 57.2°, and the slow axis 13A of the second quarter-wave film 13 can be set at an azimuthal angle of 12.2°.

As in the other embodiments, the modulation property and the non-modulation property of the optical element 10 of the present embodiment are tunable by adjusting the designs of the retardation Δnd and the twist angle of the liquid crystal layer 300.

Embodiment 6

The features unique to the present embodiment are mainly described here, and description of the matters already described in Embodiments 1 to 5 is omitted. The present embodiment is substantially the same as Embodiment 1 except for lacking the second quarter-wave film 13.

Figure 21:
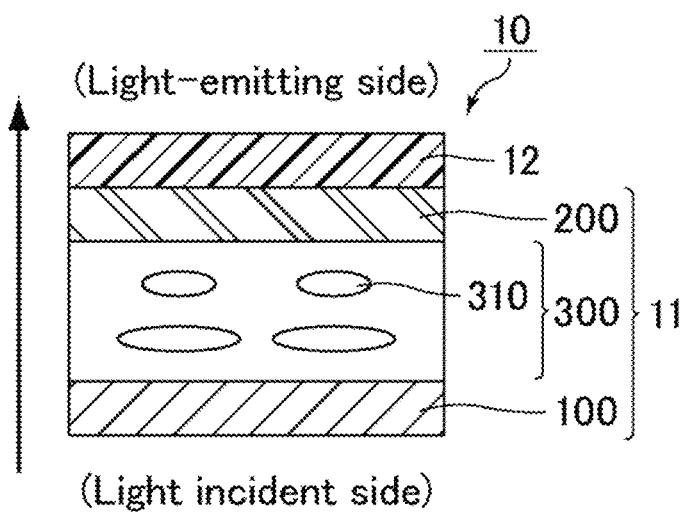
FIG. 21 is a schematic cross-sectional view of an optical element of Embodiment 6.
Figure 22:
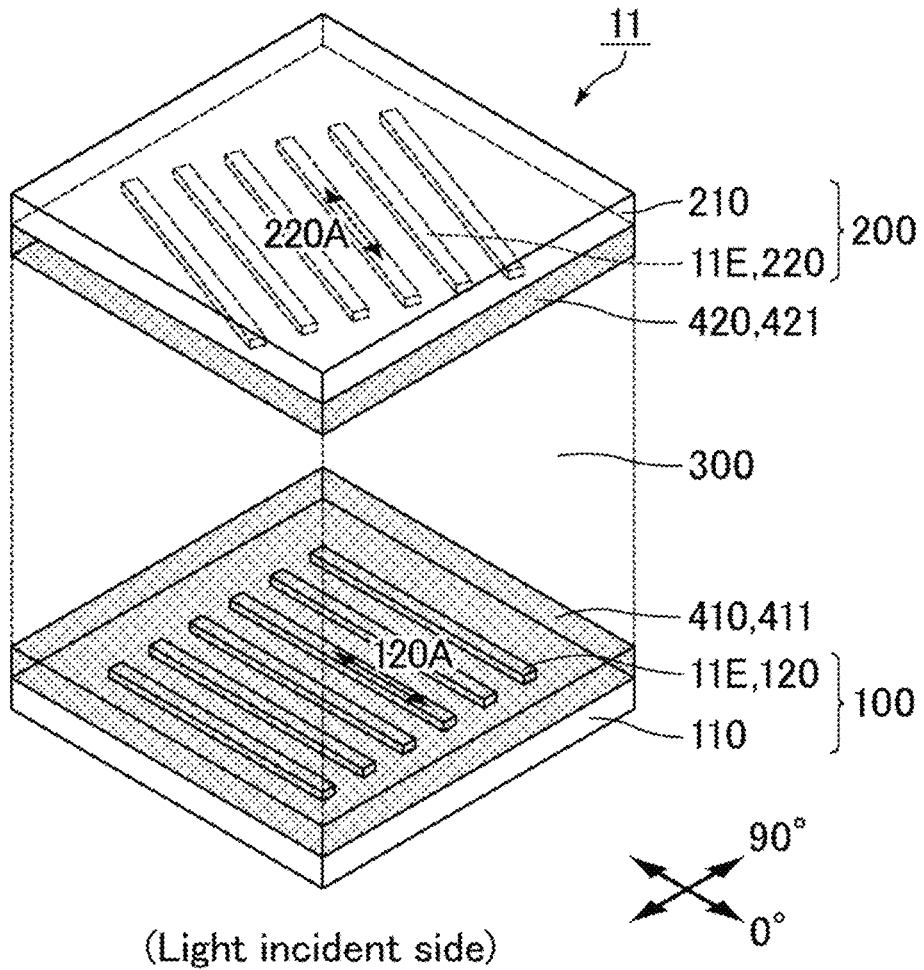
FIG. 22 is a schematic perspective view of the liquid crystal cell in the optical element of Embodiment 6.
Figure 23:
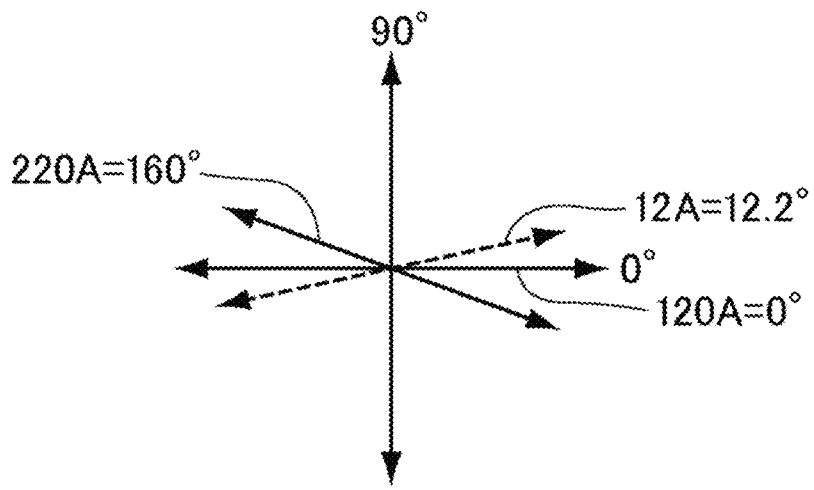
FIG. 23 shows examples of axis azimuths in the optical element of Embodiment 6.

FIG. 21 is a schematic cross-sectional view of an optical element of Embodiment 6. FIG. 22 is a schematic perspective view of the liquid crystal cell in the optical element of Embodiment 6. FIG. 23 shows examples of axis azimuths in the optical element of Embodiment 6.

As shown in FIG. 21 to FIG. 23, the optical element 10 of the present embodiment includes the same liquid crystal cell 11 as in Embodiment 1 and a quarter-wave film exhibiting reverse wavelength dispersion as the first quarter-wave film 12. This configuration also enables switching between the state where circularly polarized light incident on the optical element 10 is emitted without modulation and the state where circularly polarized light incident on the optical element 10 is emitted after modulation in a broad bandwidth while keeping the thickness of the optical element 10 thin. In other words, the present embodiment can achieve an optical element 10 that can switch between polarization modulation and no polarization modulation in a broad bandwidth and has a thin profile.

When the first quarter-wave film 12 is disposed on the light emitting side of the liquid crystal cell 11 as in the present embodiment, the slow axis 12A of the first quarter-wave film 12 is preferably at an azimuthal angle of not smaller than 3° and not greater than 22°. When the first quarter-wave film 12 is disposed on the light incident side of the liquid crystal cell 11, the slow axis 12A of the first quarter-wave film 12 is preferably at an azimuthal angle of not smaller than 48° and not greater than 67°. This configuration enables switching between polarization modulation and no polarization modulation in a broader bandwidth.

The cases where the liquid crystal molecules are positive liquid crystal molecules or negative liquid crystal molecules have been described. The liquid crystal molecules, however, may be dual frequency liquid crystal molecules. Dual frequency liquid crystal molecules behave as positive liquid crystal molecules having a positive ΔE at low frequency while behaving as negative liquid crystal molecules having a negative ΔE at high frequency. Dual frequency liquid crystal molecules, without comb-teeth electrodes at different angles in the upper and lower substrates (the first substrate 100 and the second substrate 200), can be aligned in the direction vertical to the electrode extension direction by low-frequency driving of one comb-teeth electrode and aligned in the electrode extension direction by high-frequency driving of one comb-teeth electrode. This simplifies the electrode structure.

Embodiment 7

Figure 24:
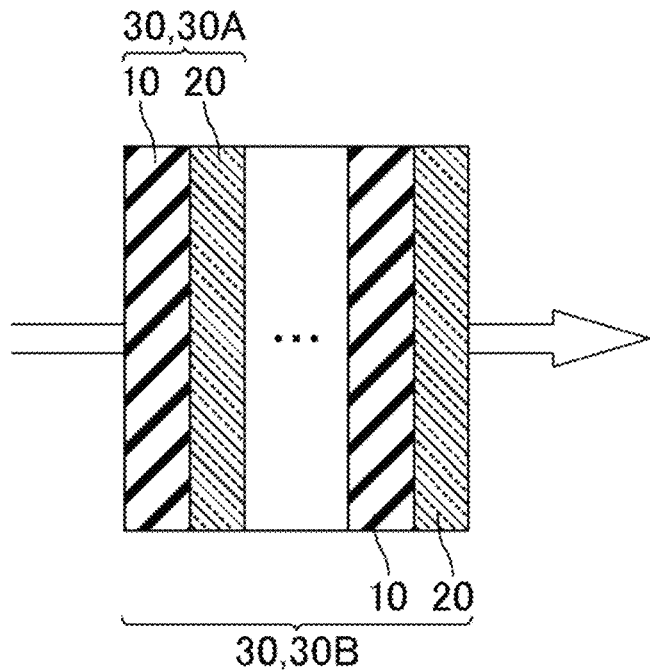
FIG. 24 is a schematic cross-sectional view of a varifocal element of Embodiment 7.

The features unique to the present embodiment are mainly described here, and description of the matters already described in Embodiments 1 to 6 is omitted. The present embodiment focuses on a varifocal element including the optical element (sHWP) of any one of Embodiments 1 to 6. FIG. 24 is a schematic cross-sectional view of a varifocal element of Embodiment 7. A varifocal element 30 of the present embodiment shown in FIG. 24 includes the optical element 10 and a Pancharatnam-Berry (PB) lens 20.

As described above, the optical elements 10 of Embodiments 1 to 6 each can modulate circularly polarized light. A PB lens 20 has different focal distances for right-handed circularly polarized light and left-handed circularly polarized light. Thus, any of the optical elements 10 and the PB lens 20 in combination can achieve the varifocal element 30.

The PB lens 20 has a function of causing light to converge and diverge. The PB lens 20 can be produced by a method disclosed in, for example, WO 2019/189818.

Figure 25:
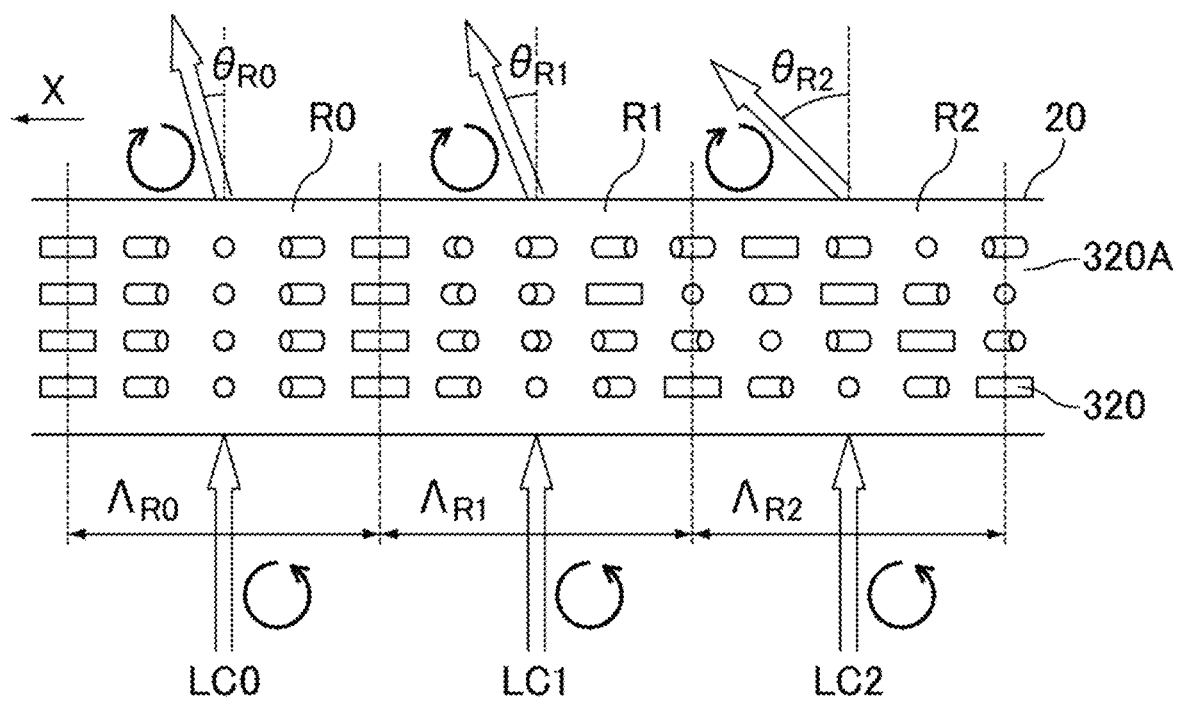
FIG. 25 is an example of a schematic cross-sectional view of a PB lens in the varifocal element of Embodiment 7.

FIG. 25 is an example of a schematic cross-sectional view of a PB lens in the varifocal element of Embodiment 7. The PB lens 20 includes, as shown in FIG. 25, an optically anisotropic layer 320A. The PB lens 20 transmits incident circularly polarized light by refracting the light in a predetermined direction, for example. The incident light in FIG. 25 is left-handed circularly polarized light.

The portion of the optically anisotropic layer 320A shown in FIG. 25 includes three regions R0, R1, and R2 from the left in FIG. 25, and the regions have different lengths A of one period. Specifically, the order of length A of one period is regions R0, R1, and R2, from longest to shortest. The regions R1 and R2 each have a structure in which the optic axis is twist-rotated in the thickness direction of the optically anisotropic layer (hereinafter, also referred to as a twisted structure). The twist angle of the region R1 in the thickness direction is smaller than the twist angle of the region R2 in the thickness direction. The region R0 has no twisted structure (i.e., the twist angle is 0°). The twist angle means the twist angle in the thickness direction of the whole optically anisotropic layer.

In the optical element 10, left-handed circularly polarized light LC1 incident on the in-plane region R1 of the optically anisotropic layer 320A is transmitted after being refracted at a predetermined angle in the direction of the arrow X, i.e., one direction in which the orientation of the optic axis of the liquid crystal molecules 320 varies while rotating continuously, from the incident direction. Similarly, left-handed circularly polarized light LC2 incident on the in-plane region R2 of the optically anisotropic layer 320A is transmitted after being refracted at a predetermined angle in the direction of the arrow X from the incident direction. Also, left-handed circularly polarized light LC0 incident on the in-plane region R0 of the optically anisotropic layer 320A is transmitted after being refracted at a predetermined angle in the direction of the arrow X from the incident direction.

The one period $\Lambda_{R2}$ of the liquid crystal alignment pattern of the region R2 is shorter than the one period $\Lambda_{R1}$ of the liquid crystal alignment pattern of the region R1. Thus, in the optically anisotropic layer 320A, as shown in FIG. 25, the angle of refraction $\theta_{R2}$ provided to light incident on and transmitted through the region R2 is larger than the angle of refraction $\theta_{R1}$ provided to light incident on and transmitted through the region R1. Also, the one period $\Lambda_{R0}$ of the liquid crystal alignment pattern of the region R0 is longer than the one period $\Lambda_{R1}$ of the liquid crystal alignment pattern of the region R1. Thus, as shown in FIG. 25, the angle of refraction $\theta_{R0}$ provided to light incident on and transmitted through the region R0 is smaller than the angle of refraction $\theta_{R1}$ provided to light incident on and transmitted through the region R1.

Here, diffraction of light by the optically anisotropic layer having a liquid crystal alignment pattern in which the orientation of the optic axis of the liquid crystal molecules varies while continuously rotating in a plane involves an issue that the diffraction efficiency decreases as the angle of diffraction increases, i.e., the intensity of the diffracted light decreases. This means that when the optically anisotropic layer has a structure including regions with different lengths of one period, in which the orientation of the optic axis of the liquid crystal molecules is rotated by 180°, the angle of diffraction differs depending on the position of incidence of light, resulting in a difference in quantity of diffracted light depending on the in-plane position of incidence of light. In other words, the structure produces a region where transmitted, diffracted light weakens at certain in-plane positions of incidence of light.

Meanwhile, the PB lens 20 of the present embodiment includes the regions where liquid crystal molecules are twist-rotated in the thickness direction in the optically anisotropic layer and the twist angle in the thickness direction differs from region to region. In the example in FIG. 25, the twist angle $\varphi_{R2}$ in the thickness direction of the region R2 is larger than the twist angle $\varphi_{R1}$ in the thickness direction of the region R1 in the optically anisotropic layer 320A. The region R0 has no twisted structure in the thickness direction. This can reduce or prevent a decrease in diffraction efficiency of refracted light.

In the example in FIG. 25, the regions R1 and R2 larger in angle of diffraction than the region R0 each have a twisted structure. This can reduce or prevent a decrease in quantity of light refracted by the regions R1 and R2. Also, the region R2 larger in angle of diffraction than the region R1 is also larger in twist angle of the twisted structure than the region R1. This can reduce or prevent a decrease in quantity of light refracted by the region R2. The configuration can equalize the quantities of transmitted lights regardless of the in-plane positions of incidence of light.

As described above, in an in-plane region where the optically anisotropic layer provides a large angle of refraction in the PB lens 20 of the present embodiment, incident light is refracted by passing through a layer with a large twist angle in the thickness direction. Meanwhile, in an in-plane region where the optically anisotropic layer provides a small angle of refraction, incident light is refracted by passing through a layer with a small twist angle in the thickness direction. In other words, the PB lens 20 can produce transmitted light brighter than incident light by setting the in-plane twist angle in the thickness direction according to the angle of refraction provided by the optically anisotropic layer. Thus, the PB lens 20 can reduce the refraction angle dependence of the quantity of transmitted light in the plane.

The angle of light refraction in the plane of the optically anisotropic layer 320A increases as the one period $\Lambda$ of the liquid crystal alignment pattern becomes shorter. Also, the twist angle in the thickness direction in the plane of the optically anisotropic layer 320A is larger in a region with a short one period $\Lambda$, in which the orientation of the optic axis rotates by 180° in the direction of the arrow X in the liquid crystal alignment pattern, than in a region with a long one period $\Lambda$. In the PB lens 20, for example, as shown in FIG. 25, the one period $\Lambda_{R2}$ of the liquid crystal alignment pattern in the region R2 of the optically anisotropic layer 320A is shorter than the one period $\Lambda_{R1}$ of the liquid crystal alignment pattern in the region R1, and the twist angle $\varphi_{R2}$ in the thickness direction is larger than the twist angle $\varphi_{R1}$. In other words, the region R2 in the optically anisotropic layer 320A on the light incident side more refracts light.

Thus, when the in-plane twist angle $\varphi$ in the thickness direction is set for the one period $\Lambda$ of the liquid crystal alignment pattern in question, the transmitted lights refracted at different angles in different in-plane regions can be suitably brighter.

In the PB lens 20, as described above, since the angle of refraction increases as the one period $\Lambda$ of the liquid crystal alignment pattern becomes shorter, a larger twist angle in the thickness direction is set for a region with a shorter one period $\Lambda$ of the liquid crystal alignment pattern, so that the transmitted light can be brighter. Thus, in the PB lens 20, preferably, the regions with different lengths of one period of the liquid crystal alignment pattern include regions where the order of length of one period and the order of twist angle in the thickness direction are different.

As described above, the PB lens 20 preferably includes the optically anisotropic layer 320A formed from a liquid crystal composition containing the liquid crystal molecules 320. The optically anisotropic layer 320A preferably includes regions each of which has a liquid crystal alignment pattern with the orientation of the optic axis of the liquid crystal molecules varying while continuously rotating in at least one in-plane direction, and in which the optic axis is preferably twist-rotated in the thickness direction of the optically anisotropic layer 320A. The twist angle in the thickness direction preferably differs from region to region.

Preferably, the PB lens 20 includes regions with different lengths of one period in the liquid crystal alignment pattern, where the one period is the length in which the orientation of the optic axis of the liquid crystal molecules 320 is rotated by 180° in the plane.

Preferably, the optically anisotropic layer 320A includes the regions with different lengths of one period in the liquid crystal alignment pattern arranged by length of one period, and the regions with different twist angles in the thickness direction arranged by twist angle in the thickness direction, wherein the direction of the arrangement by length of one period and the direction of the arrangement by twist angle in the thickness direction are different.

Preferably, the optically anisotropic layer 320A includes regions where the twist angle in the thickness direction is 10° to 360°.

Preferably, in the optically anisotropic layer 320A, the one period of the liquid crystal alignment pattern becomes shorter gradually in the one direction in which the orientation of the optic axis of the liquid crystal molecules 320 in the liquid crystal alignment pattern varies while continuously rotating.

Preferably, the liquid crystal alignment pattern of the optically anisotropic layer 320A is a concentric circular pattern where the one direction, in which the orientation of the optic axis of the liquid crystal molecules 320 varies while continuously rotating, lies from inside toward outside.

The PB lens 20 in FIG. 25 is a PB lens with the twist angle varying in the plane, and is an element having a high diffraction efficiency even when the angle of diffraction is large. Yet, the PB lens 20 may be a PB lens with the twist angle not varying in the plane. Specifically, the PB lens 20 may be a PB lens without a twist in the thickness direction or with a constant twist angle in the plane. For example, the polarization diffraction grating disclosed in JP 2008-532085 T can be used.

Preferably, the PB lens 20 is a PB lens including a plurality of optically anisotropic layers 320A, and the optically anisotropic layers 320A are different from one another in orientation of the twist angle in the thickness direction.

Preferably, the PB lens 20 is a PB lens including a plurality of optically anisotropic layers 320A, and the optically anisotropic layers 320A are different from one another in twist angle in the thickness direction.

Preferably, the PB lens 20 is a PB lens including a plurality of optically anisotropic layers 320A, and the optically anisotropic layers 320A have liquid crystal alignment patterns that are the same as one another in in-plane direction in which the orientation of the optic axis of the liquid crystal molecules 320 continuously rotates.

Preferably, the length of one period in the liquid crystal alignment pattern is not longer than 50 μm.

The varifocal element 30 may be a varifocal element 30A with two focal lengths including one stack of the optical element 10 and the PB lens 20, or a varifocal element 30B with multiple focal lengths including two or more stacks each consisting of the optical element 10 and the PB lens 20. In this manner, with a plurality of sets each consisting of the optical element 10 and the PB lens 20, the varifocal element 30B with tunable multiple focal lengths can be achieved.

The varifocal element 30 can be produced by, for example, attaching the PB lens 20 produced by the method disclosed in WO 2019/189818 to the optical element 10.

Modified Example 1 of Embodiment 7

Figure 26:
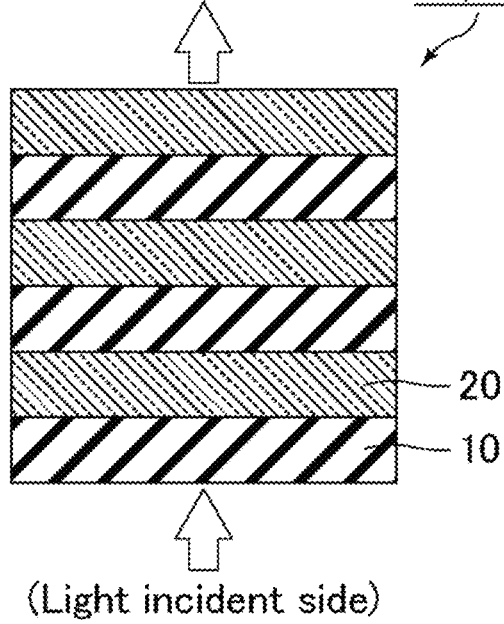
FIG. 26 is a schematic cross-sectional view of a varifocal element of Modified Example 1 of Embodiment 7.
Figure 27:
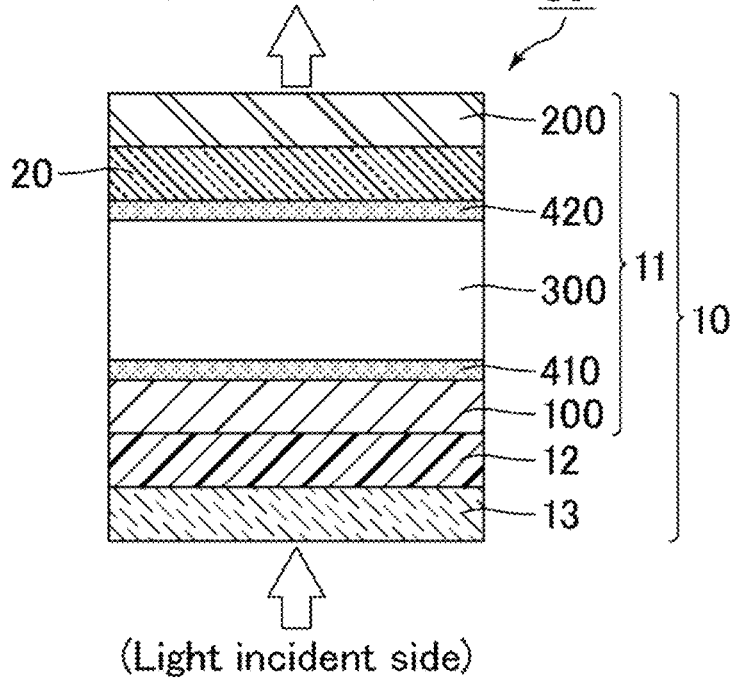
FIG. 27 is an enlarged schematic cross-sectional view of the varifocal element of Modified Example 1 of Embodiment 7.

In the present modified example, an in-cell varifocal element 30 is described in which the PB lens 20 in Embodiment 7 is disposed in the optical element 10. FIG. 26 is a schematic cross-sectional view of a varifocal element of Modified Example 1 of Embodiment 7. FIG. 27 is an enlarged schematic cross-sectional view of the varifocal element of Modified Example 1 of Embodiment 7.

The varifocal element 30 of the present modified example is, as shown in FIG. 26, a varifocal element 30B with multiple focal lengths including not less than 2 stacks each consisting of the optical element 10 and the PB lens 20.

The PB lens 20 in the varifocal element 30 of the present modified example is disposed in the optical element 10 as shown in FIG. 27. Such a structure including the PB lens 20 in the cell eliminates the need for externally providing the PB lens 20, thus enabling a significant reduction of the production cost. The structure also can reduce the thickness of the varifocal element 30. FIG. 26 shows, for convenience, the optical element 10 and the PB lens 20 separately.

The varifocal element 30 of the present modified example specifically includes, sequentially from the light incident side toward the light emitting side, the second quarter-wave film 13; the first quarter-wave film 12; the first substrate 100; the liquid crystal layer 300; the PB lens 20; and the second substrate 200. The varifocal element 30 may include the first alignment film 410 between the first substrate 100 and the liquid crystal layer 300. The varifocal element 30 may also include the second alignment film 420 between the second substrate 200 and the liquid crystal layer 300.

As in Embodiments 1 to 7, when the first quarter-wave film 12 and the second quarter-wave film 13 are stacked on the light emitting side of the liquid crystal cell 11, in the first state, circularly polarized light (for example, right-handed circularly polarized light) incident on the optical element 10 first enters the liquid crystal cell 11 to be converted to first linearly polarized light. The first linearly polarized light enters the first quarter-wave film 12 and the second quarter-wave film 13 to be converted to circularly polarized light (for example, left-handed circularly polarized light). In the second state, circularly polarized light (for example, right-handed circularly polarized light) incident on the optical element 10 first enters the liquid crystal cell 11 to be converted to second linearly polarized light. The second linearly polarized light enters the first quarter-wave film 12 and the second quarter-wave film 13 to be converted to circularly polarized light (for example, right-handed circularly polarized light).

Meanwhile, as in the present modified example, when the first quarter-wave film 12 and the second quarter-wave film 13 are stacked on the light incident side of the liquid crystal cell 11, in the first state, circularly polarized light (for example, right-handed circularly polarized light) incident on the optical element 10 first enters the first quarter-wave film 12 and the second quarter-wave film 13 to be converted to linearly polarized light. The linearly polarized light enters the liquid crystal cell 11 to be converted to first circularly polarized light (for example, left-handed circularly polarized light). In the second state, circularly polarized light (for example, right-handed circularly polarized light) incident on the optical element 10 enters the first quarter-wave film 12 and the second quarter-wave film 13 to be converted to linearly polarized light. The linearly polarized light enters the liquid crystal cell 11 to be converted to second circularly polarized light (for example, right-handed circularly polarized light).

When the alignment direction 311A of the liquid crystal molecules 311 near the first substrate 100 in the first state is at an azimuthal angle of 0°, the slow axis of the first quarter-wave film 12 or the second quarter-wave film 13, whichever is closer to the light emitting side (in the present modified example, the slow axis 12A of the first quarter-wave film 12), is preferably at an azimuthal angle of not smaller than 3° and not greater than 22°. This configuration enables switching between polarization modulation and no polarization modulation in a broader bandwidth.

When the alignment direction 311A of the liquid crystal molecules 311 near the first substrate 100 in the first state is at an azimuthal angle of 0°, the slow axis of the first quarter-wave film 12 or the second quarter-wave film 13, whichever is farther from the light emitting side (in the present modified example, the slow axis 13A of the second quarter-wave film 13), is preferably at an azimuthal angle of not smaller than 48° and not greater than 66°. This configuration enables switching between polarization modulation and no polarization modulation in a broader bandwidth.

The PB lens 20 (PB lens layer) disposed in the cell is, in other words, an in-cell retardation layer that is patterned such that its slow axis direction rotates in the plane.

The PB lens can be disposed in the cell by the following procedure, for example. The second substrate 200 is coated with a photosensitive material for forming an in-cell PB lens, the material containing a polymer represented by the following general formula (PB-1), so that a film for forming a PB lens is formed, followed by alignment treatment on the film for forming a PB lens. Thus, the PB lens 20 can be disposed in the cell.

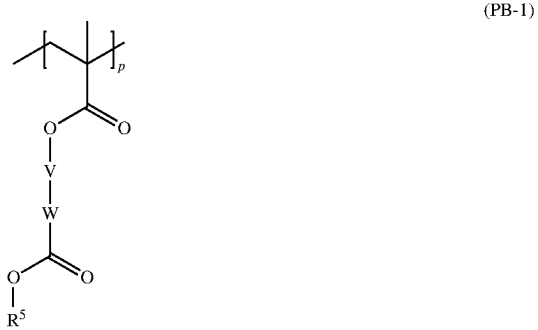

(PB-1)

In the formula, V represents a spacer group, W represents a divalent organic group having a photo-functional group, $R^5$ represents a monovalent group, and p represents an integer of not smaller than 1.

Preferably, V in the general formula (PB-1) represents a spacer group. V preferably has an alkylene group having a carbon number of not smaller than 2 represented by —$(CH_2)_n$— (where n is an integer of not smaller than 2). This configuration can provide a favorable phase difference. The alkylene group preferably has a linear structure.

W in the general formula (PB-1) represents a divalent organic group having a photo-functional group. Examples of the divalent organic group having a photo-functional group include divalent organic groups having a photo-functional group (photoreactive site) that can undergo a reaction such as photodimerization, photoisomerization, photo-Fries rearrangement, and photolysis. Examples of photo-functional groups that can undergo photodimerization and photoisomerization include cinnamate, chalcone, coumarin, and stilbene groups. Examples of photo-functional groups that can undergo photoisomerization include an azobenzene group. Examples of photo-functional groups that can undergo photo-Fries rearrangement include a phenolic ester group. Examples of photo-functional groups that can undergo photolysis include a cyclobutane ring.

$R^5$ in the general formula (PB-1) represents a monovalent group. $R^5$ is preferably a hydrogen atom or a monovalent hydrocarbon group, more preferably a hydrogen atom, a methyl group, or an ethyl group.

The alignment treatment on the film for forming a PB lens is performed by a plurality of alignment treatments, and the polarization directions of the alignment treatments are different from one another. The alignment treatment on the film for forming a PB lens includes, for example, first alignment treatment of performing alignment treatment on the film for forming a PB lens using light polarized at an azimuthal angle of 0°; second alignment treatment of performing alignment treatment on the film for forming a PB lens using light polarized at an azimuthal angle of 45°; third alignment treatment of performing alignment treatment on the film for forming a PB lens using light polarized at an azimuthal angle of 90°; and fourth alignment treatment of performing alignment treatment on the film for forming a PB lens using light polarized at an azimuthal angle of 135°.

Figure 28:
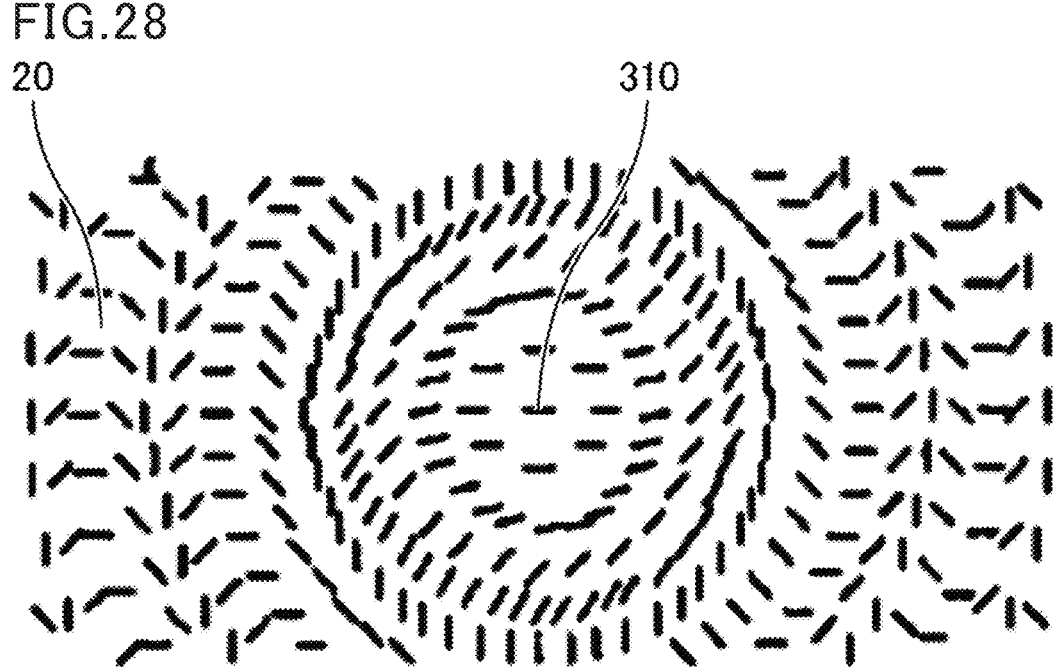
FIG. 28 is a schematic plan view of an alignment pattern of a PB lens in the varifocal element of Modified Example 1 of Embodiment 7.

FIG. 28 is a schematic plan view of an alignment pattern of a PB lens in the varifocal element of Modified Example 1 of Embodiment 7. As shown in FIG. 28, the alignment direction in the alignment pattern of the PB lens 20 continuously rotates from the center toward the periphery, for example. Also, in a plan view, the alignment directions of the liquid crystal molecules 310 at a position corresponding to a certain radius R are all the same. In other words, the alignment pattern has a predetermined angle distribution according to the distance from the center. The period $P_1$ and the angle of diffraction θ of the alignment pattern is represented by the expression $P_1 = 2 \times \lambda / \sin \theta$. A shorter period of the alignment pattern causes greater diffraction of light. This means that the lens focusing effect can be achieved by widening the pitch (reducing the angle of diffraction) at a position closer to the center of the optical element while narrowing the pitch (increasing the angle of diffraction) at a position closer to the periphery.

The later-described PB lenses 20 with different diopters D can be produced by varying the design of the alignment pattern period. The alignment pattern can also be designed based on the teachings from WO 2020/186123 and JP 2008-532085 T.

In the present embodiment, the alignment treatment is performed through four times of exposure to light. Yet, increasing the number of times of exposure to light produces a varifocal element 30 having higher diffraction efficiency. Production through multiple photo-alignment treatments utilizing a photo-alignment apparatus is compatible with the existing liquid crystal plants, and thus leads to a high productivity. Although production of the PB lens 20 by multiple photo-alignment treatments is described in the present embodiment, the alignment pattern may be formed by an existing technique such as optical interferometry or laser direct lithography.

The phase difference introduced by the PB lens 20 (PB lens layer) disposed in the cell is preferably not less than 100 nm and not more than 500 nm, more preferably not less than 200 nm and not more than 350 nm, particularly preferably λ/2 (i.e., 275 nm). The diffraction efficiency, represented by the following Formula 1, reaches the maximum when Δnd=λ/2.

$$\eta = \sin^2\left(\frac{\pi \Delta n d}{\lambda}\right) \quad \text{(Formula 1)}$$

The varifocal element 30 of the present modified example, i.e., the varifocal element 30 with multiple focal lengths including a combination of a plurality of stacks each consisting of the optical element 10 and the PB lens 20 disposed in the cell of the optical element 10, has the following features, for example.

Figure 29:
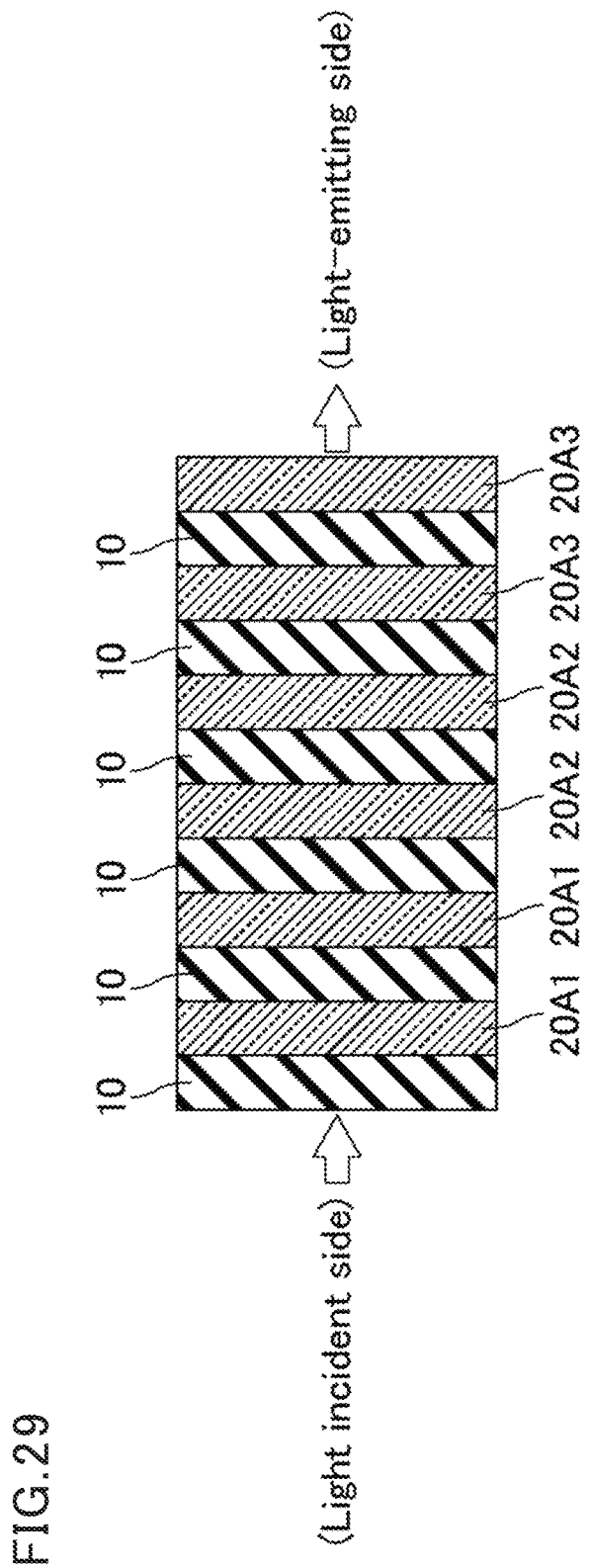
FIG. 29 is a schematic cross-sectional view showing the detailed structure of the varifocal element of Modified Example 1 of Embodiment 7.

FIG. 29 is a schematic cross-sectional view showing the detailed structure of the varifocal element of Modified Example 1 of Embodiment 7. As shown in FIG. 29, the varifocal element 30 includes, sequentially from the light incident side toward the light emitting side, an optical element 10, a first PB lens 20A1, an optical element 10, another first PB lens 20A1, another optical element 10, a second PB lens 20A2, another optical element 10, another second PB lens 20A2, another optical element 10, a third PB lens 20A3, another optical element 10, and another third PB lens 20A3.

The first PB lenses 20A1 each have a diopter D of ±0.25. The second PB lenses 20A2 each have a diopter D of ±0.5. The third PB lenses 20A3 each have a diopter D of ±1. Each lens causes incident right-handed circularly polarized light to converge (+) while causing incident left-handed circularly polarized light to diverge (−).

The following Table 1 shows the states of the optical elements 10 and the PB lenses 20A1, 20A2, and 20A3 in the varifocal element 30 of Modified Example 1 of Embodiment 7 in each mode.

TABLE 1

|  | F0 | F1 | F −2.5 |
|---|---|---|---|
| Optical element | Second state | Second state | First state |
| First PB lens | 0.25D | 0.25D | −0.25D |
| Optical element | Second state | Second state | First state |
| First PB lens | −0.25D | −0.25D | −0.25D |
| Optical element | Second state | Second state | Second state |
| Second PB lens | 0.5D | 0.5D | 0.5D |
| Optical element | Second state | First state | Second state |
| Second PB lens | −0.5D | 0.5D | −0.5D |
| Optical element | Second state | Second state | First state |
| Third PB lens | 1D | −1D | −1D |
| Optical element | Second state | Second state | First state |
| Third PB lens | −1D | 1D | −1D |
| Emission | 0D | 1D | −2.5D |

The F0 mode is described with reference to Table 1. This mode sets all the optical elements 10 in the second state (no modulation). Right-handed circularly polarized light entering the primary optical element 10 undergoes no modulation and enters the primary first PB lens 20A1 in the same state. The light here converges due to the lens power 0.25 D. The exiting light is converted to left-handed circularly polarized light. Causing such a change in direction of circularly polarized light passing through a PB lens 20 is the feature of the PB lens 20. Since the optical elements 10 provide no modulation, the left-handed circularly polarized light passes through the secondary optical element 10 as is. The light entering the secondary first PB lens 20A1 diverges due to the lens power −0.25 D. The incident light therefore passes through the primary four lenses from the light incident side (optical element 10, first PB lens 20A1, optical element 10, and first PB lens 20A1) as is. The light then passes through the subsequent second PB lenses 20A2 and third PB lenses 20A3 in the same manner and exits as emission light in the same state as the incident light, so that the varifocal element has power 0 D.

The F1 mode is described with reference to Table 1. In this mode, only the quaternary optical element 10 from the light incident side is set in the first state. In this mode, after passing through the primary second PB lens 20A2, the light is left-handed circularly polarized light due to the lens power 0.5 D as in the F0 mode. The light is then converted to right-handed circularly polarized light by the optical element in the first state. The light then passes through the secondary second PB lens 20A2 with power +0.5 D and thus emitted as left-handed circularly polarized light due to the total lens power 1 D. The light is emitted as the same left-handed circularly polarized light, so that the varifocal element has power 1 D. The light is converted to left-handed circularly polarized light by the secondary second PB lens 20A2, and thus the third PB lenses 20A3 have a power with the opposite sign from those in the F0 mode.

Figure 30:
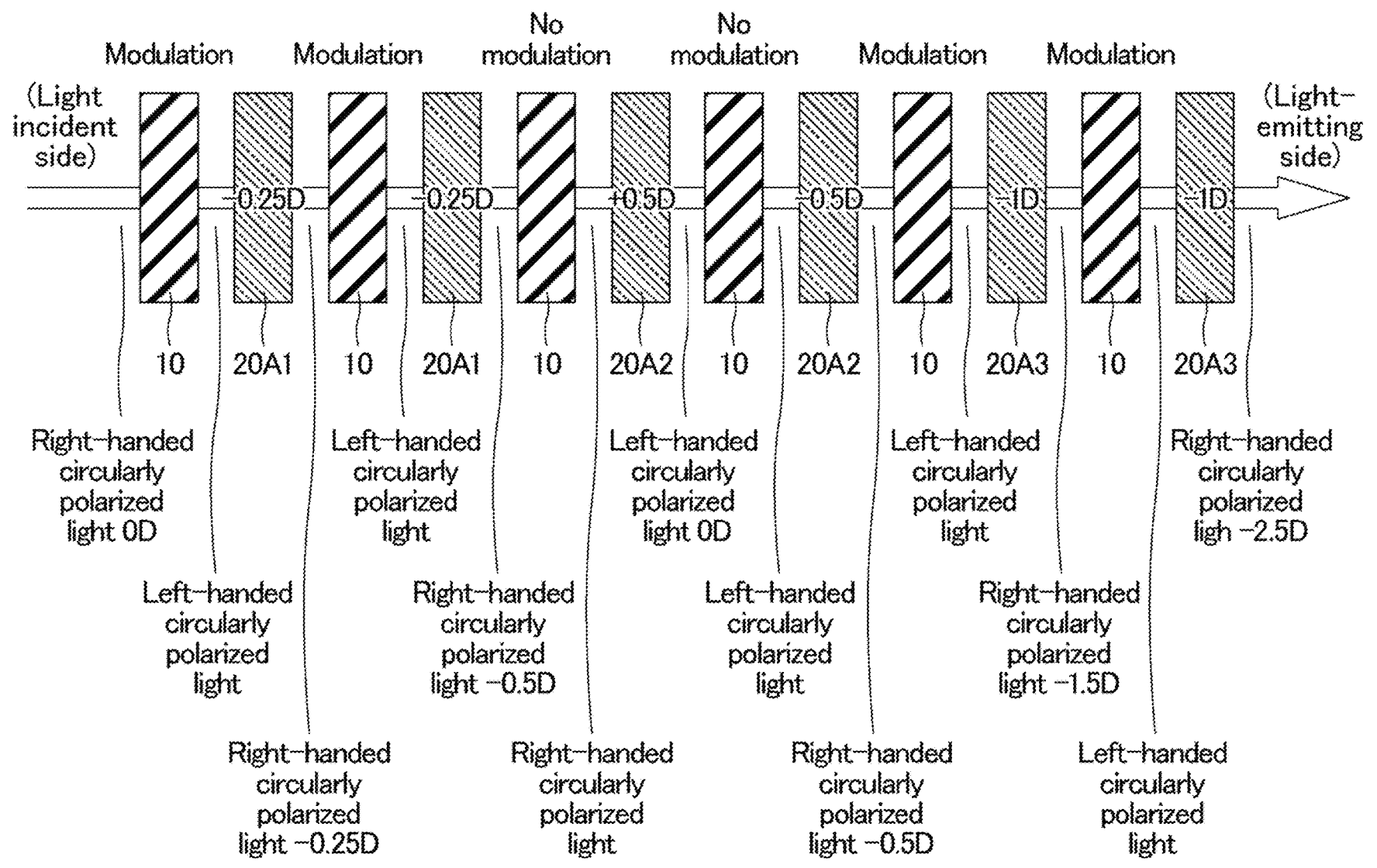

The F-2.5 mode is described with reference to Table 1 and FIG. 30. FIG. 30 shows the polarization states in the F-2.5 mode in the varifocal element of Modified Example 1 of Embodiment 7. As shown in Table 1 and FIG. 30, in the F-2.5 mode, the light is converted to right-handed circularly polarized light by the primary four lenses from the light incident side with power −0.5 D (optical element 10, first PB lens 20A1, optical element 10, and first PB lens 20A1). The light passes through the last four lenses on the light emitting side with power −2 D (optical element 10, third PB lens 20A3, optical element 10, and third PB lens 20A3), so that the light is emitted as right-handed circularly polarized light due to the total lens power −2.5 D.

In addition, based on the same principle, the optical element 10 to be in the modulation first state can be varied to achieve multiple focal distances. The present modified example selectively shows only the three conditions.

In Embodiment 7 and Modified Example 1 of Embodiment 7, PB lenses in the form of film (in-cell polymer lenses) are used. Yet, a PB lens itself may be formed using a liquid crystal layer. In the present modified example, a PB lens formed using a liquid crystal layer is described.

The polymer PB lenses as in Embodiment 7 and Modified Example 1 of Embodiment 7 are called passive PB lenses as the lenses themselves cannot be driven by voltage application. In contrast, a PB lens formed using a liquid crystal layer having fluidity is called active PB lens as it can be driven by voltage application.

An active PB lens can be produced by the following procedure. First, the alignment film on one of paired substrates is subjected to alignment treatment for PB lens pattern. The alignment film on the other substrate is made to function as a weak anchoring alignment film (slippery interface). Both substrates include a transparent electrode. When the paired substrates are attached to each other with a liquid crystal layer in between, the liquid crystal molecules are aligned along the pattern formed by the alignment treatment, so that the liquid crystal layer exhibits the PB lens pattern alignment. This achieves an active PB lens. More preferably, thereafter, polymer sustained alignment (PSA) is performed to stabilize the alignment of the liquid crystal molecules in the interfaces for achievement of an active PB lens with high alignment stability and high reliability.

The active PB lens in the voltage OFF state exhibits a PB lens pattern and thus causes incident light to converge or diverge according to the polarization state of the incident light. In the voltage ON state, the liquid crystal molecules are vertically aligned and thus the lens transmits the incident light as is without causing convergence or divergence.

A varifocal element utilizing a sHWP and a passive PB lens in combination as in Embodiment 7 switches between the two modes of convergence and divergence. Meanwhile, a varifocal element utilizing a sHWP and an active PB lens in combination as in the present modified example can switch among the three modes of convergence, divergence, and transmission. This allows smoother focal distance control or reduction in the number of stacks of voltage-driven elements used to achieve the same number of focal distances.

Embodiment 8

Figure 31:
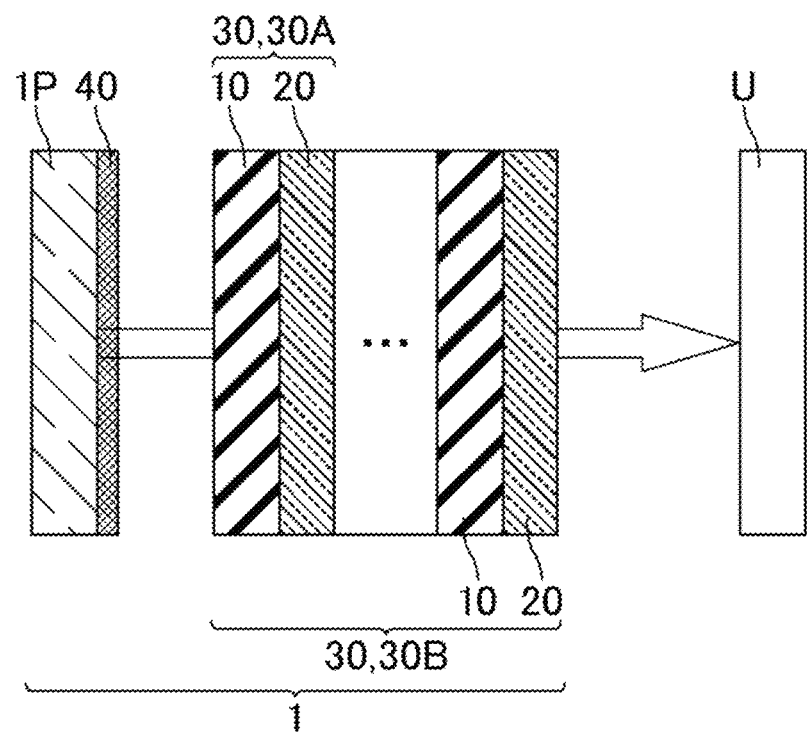
FIG. 31 is a schematic cross-sectional view of a head mounted display of Embodiment 8.
Figure 32:
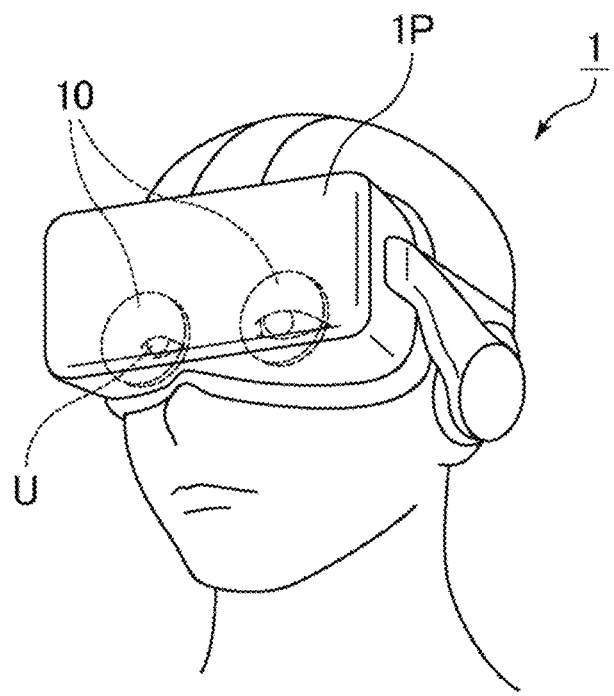
FIG. 32 is a schematic perspective view of an example of the appearance of the head mounted display of Embodiment 8.

The features unique to the present embodiment are mainly described here, and description of the matters already described in Embodiments 1 to 7 and the modified example thereof is omitted. In the present embodiment, a head mounted display including the varifocal element 30 is described. FIG. 31 is a schematic cross-sectional view of a head mounted display of Embodiment 8. FIG. 32 is a schematic perspective view of an example of the appearance of the head mounted display of Embodiment 8.

As shown in FIG. 31 and FIG. 32, a head mounted display 1 of the present embodiment includes a display panel 1P that displays images, a phase difference plate (retarder) 40, and the varifocal element 30. The head mounted display 1 causes light emitted from the display panel 1P, such as a liquid crystal display device or an organic electroluminescent display device, to be converted to circularly polarized light through the phase difference plate 40, to pass through the varifocal element 30, and to be perceived by a user U.

Embodiment 9

The features unique to the present embodiment are mainly described here, and description of the matters already described in Embodiments 1 to 8 and the modified example thereof is omitted. The present embodiment is substantially the same as Embodiment 5, except for the configuration of the liquid crystal cell 11.

Figure 65:
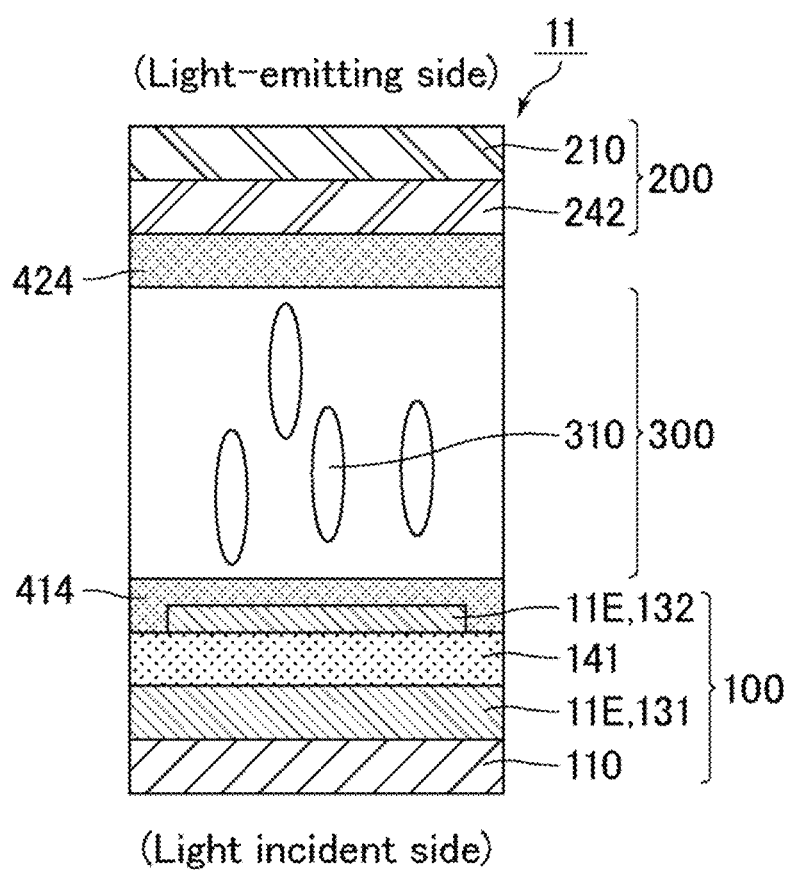
FIG. 65 is a schematic cross-sectional view of a liquid crystal cell in the optical element of Embodiment 9.
Figure 66:
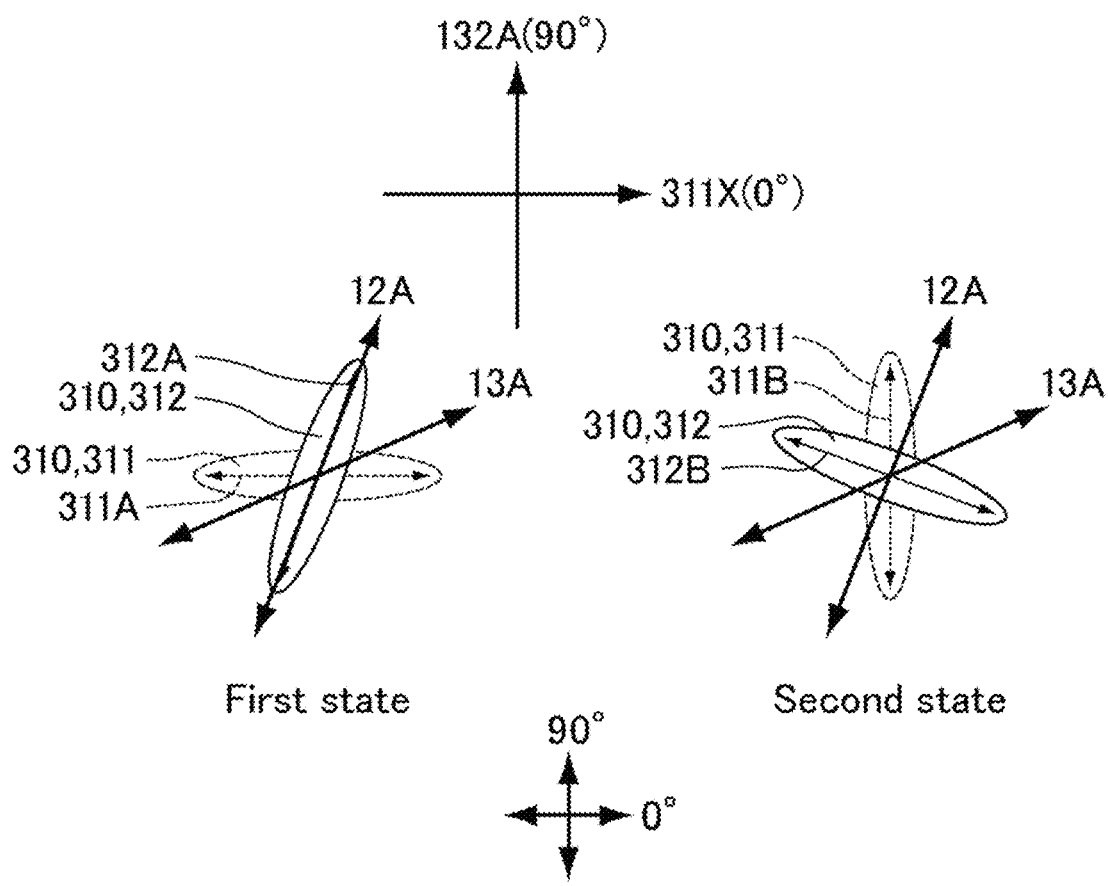
FIG. 66 includes schematic views showing the alignments of liquid crystal molecules in the first state and the second state in the optical element of Embodiment 9.

FIG. 64 is a schematic cross-sectional view of an optical element of Embodiment 9. FIG. 65 is a schematic cross-sectional view of a liquid crystal cell in the optical element of Embodiment 9. FIG. 66 includes schematic views showing the alignments of liquid crystal molecules in the first state and the second state in the optical element of Embodiment 9. The azimuth of the alignment of liquid crystal molecules near the interface of a substrate cannot be defined as the alignment is vertical. The alignment azimuths of such liquid crystal molecules are defined by the electrode directions FIG. 66.

In Embodiments 1 to 7, Modified Example 1 of Embodiment 7, Embodiment 8, and the present embodiment, the reference azimuth (0°) is set in the alignment direction 311A of the liquid crystal molecules 311 near the first substrate 100 in the first state projected onto the surface of the substrate closer to the light emitting side of the optical element 10. The alignment direction 311A of the liquid crystal molecules 311 near the first substrate 100 in the first state matches the horizontally right direction on the screen of the liquid crystal cell 11 with the optical element 10 viewed from its light emitting side.

The liquid crystal cell 11 in the optical element 10 of the present embodiment shown in FIG. 64 to FIG. 66 further includes the first vertical alignment film 414 between the first substrate 100 and the liquid crystal layer 300 and the second vertical alignment film 424 between the liquid crystal layer 300 and the second substrate 200. The liquid crystal layer 300 contains the liquid crystal molecules 310 having a negative anisotropy of dielectric constant. At least one of the first vertical alignment film 414 or the second vertical alignment film 424 controls the tilt direction of the liquid crystal molecules 310 with no voltage applied.

The electrodes 11E preferably include, in at least one of the first substrate 100 or the second substrate 200, a planar electrode and an electrode overlapping the planar electrode via an insulating layer and being provided with slits. The pair of electrodes, namely the planar electrode and the electrode overlapping the planar electrode via an insulating layer and being provided with slits, is also called an FFS electrode.

Specifically, the liquid crystal cell 11 in the optical element 10 of the present embodiment as shown in FIG. 64 to FIG. 66 further includes the first vertical alignment film 414 between the first substrate 100 and the liquid crystal layer 300 and the second vertical alignment film 424 between the liquid crystal layer 300 and the second substrate 200. The liquid crystal layer 300 contains the liquid crystal molecules 310 having a negative anisotropy of dielectric constant. The electrodes 11E include, in the first substrate 100, the planar first electrode 131 and the second electrode 132 overlapping the first electrode 131 via the first insulating layer 141 and being provided with the slits 132S and include, in the second substrate 200, a solid electrode 240. In a plan view, the extension direction 132A of the slits 132S in the second electrode 132 is perpendicular to the alignment direction 311X of the liquid crystal molecules 311 near the first substrate 100 with no voltage applied.

This configuration, with voltage lower than the threshold applied between the first electrode 131 and the second electrode 132 and voltage not lower than the threshold applied between at least one of the first electrode 131 or the second electrode 132 and the solid electrode 240 as shown in FIG. 66, causes circularly polarized light (for example, right-handed circularly polarized light) incident on the liquid crystal cell 11 to be converted to first linearly polarized light after passing through the liquid crystal cell 11. In other words, the first state can be achieved.

Also, the above configuration, with voltage not lower than the threshold applied between the first electrode 131 and the second electrode 132 and with voltage not lower than the threshold applied between at least one of the first electrode 131 or the second electrode 132 and the solid electrode 240 as shown in FIG. 66, causes circularly polarized light (for example, right-handed circularly polarized light) incident on the liquid crystal cell 11 to be converted to second linearly polarized light whose polarization direction is perpendicular to the polarization direction of the first linearly polarized light in a plan view after passing through the liquid crystal cell 11. In other words, the second state is achieved.

One of the first electrode 131 and the second electrode 132 is a pixel electrode and the other is a common electrode. FIG. 65 shows that the first substrate 100 includes, sequentially toward the liquid crystal layer 300, a planar electrode and an electrode provided with slits. The arrangement of the planar electrode and the electrode provided with slits is not limited thereto. The electrode provided with slits and the planar electrode may be arranged sequentially toward the liquid crystal layer 300.

In the present embodiment, the alignment film on the first substrate 100 and the alignment film on the second substrate 200 are vertical alignment films. Also, an FFS electrode is provided in at least one of the substrates (in the present embodiment, first substrate 100). The voltage difference between the substrate including the FFS electrode (FFS substrate) and the counter substrate (in the present embodiment, second substrate 200) facing the FFS substrate is used to drive the liquid crystal molecules 310. The liquid crystal molecules 310 used are negative liquid crystal molecules 310, and a chiral dopant is added to align the liquid crystal molecules 310 with a twist of about 70°. Here, adjusting the tilt direction for the alignment film and the voltage applied between the pixel electrode and the common electrode defining the FFS electrode enables achievement of the first state alignment and the second state alignment between which the alignment of the entire system is rotated by 90°.

The tilt direction as used herein is the azimuth of the alignment direction of liquid crystal molecules with no voltage applied and is also referred to as the tilt azimuth. The tilt angle is the same as the pre-tilt angle. Also, the expression "tilted" means that the tilt angle is smaller than 89.9° (specifically, not smaller than 0° and smaller than) 89.9°, while the expression "not tilted" means that the tilt angle is not smaller than 89.9° (specifically, not smaller than 89.9° and not greater than 90°).

Preferably, at least either the liquid crystal molecules 311 near the first substrate 100 or the liquid crystal molecules 312 near the second substrate 200 are tilted. For example, when the liquid crystal molecules 311 near the first substrate 100 are tilted, preferably, the tilt azimuth of the liquid crystal molecules 311 near the first substrate 100 is perpendicular to the azimuth of the extension direction of the FFS electrode. Specifically, with no voltage applied, the azimuth of the alignment direction 311X of the liquid crystal molecules 311 near the first substrate 100 is preferably perpendicular to the azimuth of the extension direction 132A of the slits 132S in the second electrode 132. Here, the tilt azimuth of the liquid crystal molecules 311 near the first substrate 100 is desirably substantially 0° (for example, not smaller than −10° and not greater than +10°), and the liquid crystal molecules 312 near the second substrate 200 are preferably not tilted.

When the liquid crystal molecules 312 near the second substrate 200 are tilted, the tilt azimuth of the liquid crystal molecules 312 near the second substrate 200 is desirably substantially 70° (for example, not smaller than 60° and not greater than 80°), and the liquid crystal molecules 311 near the first substrate 100 are preferably not tilted.

Both the liquid crystal molecules 311 near the first substrate 100 and the liquid crystal molecules 312 near the second substrate 200 may be tilted.

With the extension direction 132A being at an azimuthal angle of 90°, the alignment direction 311X of the liquid crystal molecules 311 near the first substrate 100 with no voltage applied being at an azimuthal angle of 0°, the twist angle of the liquid crystal molecules 310 being 70°, and the liquid crystal layer 300 containing negative liquid crystal molecules 310, as shown in FIG. 64 to FIG. 66, application of voltage lower than the threshold between the first electrode 131 and the second electrode 132 and application of voltage not lower than the threshold between the first electrode 131 and the second electrode 132 enable the first state where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, application of voltage not lower than the threshold between the first electrode 131 and the second electrode 132 and application of voltage not lower than the threshold between the solid electrode 240 and the electrodes including the first electrode 131 and the second electrode 132 enable the second state where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

The retardation Δnd introduced by the liquid crystal layer 300 at a wavelength of 550 nm with no voltage applied is preferably not less than 180 nm and not more than 280 nm. The anisotropy of refractive index Δn of the liquid crystal layer 300 is preferably not greater than 0.12, more preferably not greater than 0.1.

In the present embodiment, when the alignment direction 311A of the liquid crystal molecules 311 near the first substrate 100 is at an azimuthal angle of 0° in the first state, the slow axis of the first quarter-wave film 12 or the second quarter-wave film 13, whichever is farther from the light emitting side (in the present embodiment, the slow axis 12A of the first quarter-wave film 12), is preferably at an azimuthal angle of not smaller than 58° and not greater than 78°. This configuration enables switching between polarization modulation and no polarization modulation in a broader bandwidth.

In the present embodiment, when the alignment direction 311A of the liquid crystal molecules 311 near the first substrate 100 is at an azimuthal angle of 0° in the first state, the slow axis of the first quarter-wave film 12 or the second quarter-wave film 13, whichever is closer to the light emitting side (in the present embodiment, the slow axis 13A of the second quarter-wave film 13), is preferably at an azimuthal angle of not smaller than 13° and not greater than 33°. This configuration enables switching between polarization modulation and no polarization modulation in a broader bandwidth.

The angle formed by the slow axis 12A of the first quarter-wave film 12 and the slow axis 13A of the second quarter-wave film 13 is preferably not smaller than 40° and not greater than 50°, more preferably not smaller than 42° and not greater than 48°, still more preferably not smaller than 44° and not greater than 46°, particularly preferably 45°.

In the present embodiment, when the slow axis 12A of the first quarter-wave film 12 is set at an azimuthal angle of not smaller than 58° and not greater than 78° and the slow axis 13A of the second quarter-wave film 13 is set at an azimuthal angle of not smaller than 13° and not greater than 33°, in the first state, the first linearly polarized light passes through the first quarter-wave film 12 and the second quarter-wave film 13 and is converted in a broad bandwidth to circularly polarized light in a different polarization state (for example, left-handed circularly polarized light) from the circularly polarized light (for example, right-handed circularly polarized light) incident on the liquid crystal cell 11. In this manner, the first state achieves polarization modulation in a broad bandwidth where circularly polarized light incident on the optical element 10 is emitted after being converted to circularly polarized light in a different polarization state (for example, right-handed circularly polarized light to left-handed circularly polarized light). Also, the second linearly polarized light passes through the first quarter-wave film 12 and the second quarter-wave film 13 and is emitted in a broad bandwidth as circularly polarized light in the same polarization state (for example, right-handed circularly polarized light) as the circularly polarized light incident on the liquid crystal cell 11. In this manner, the second state achieves in a broad bandwidth no polarization modulation where circularly polarized light incident on the optical element 10 is emitted in the same polarization state (for example, while remaining as right-handed circularly polarized light).

Figure 67:
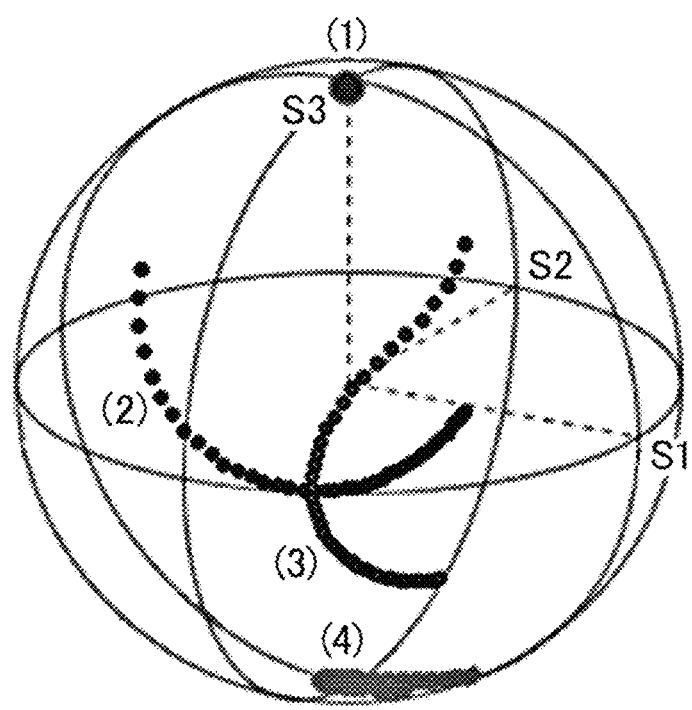
FIG. 67 shows a Poincaré sphere with Stokes parameters on which the polarization states of light converted by layers in the first state in the optical element of Embodiment 9 are plotted.
Figure 68:
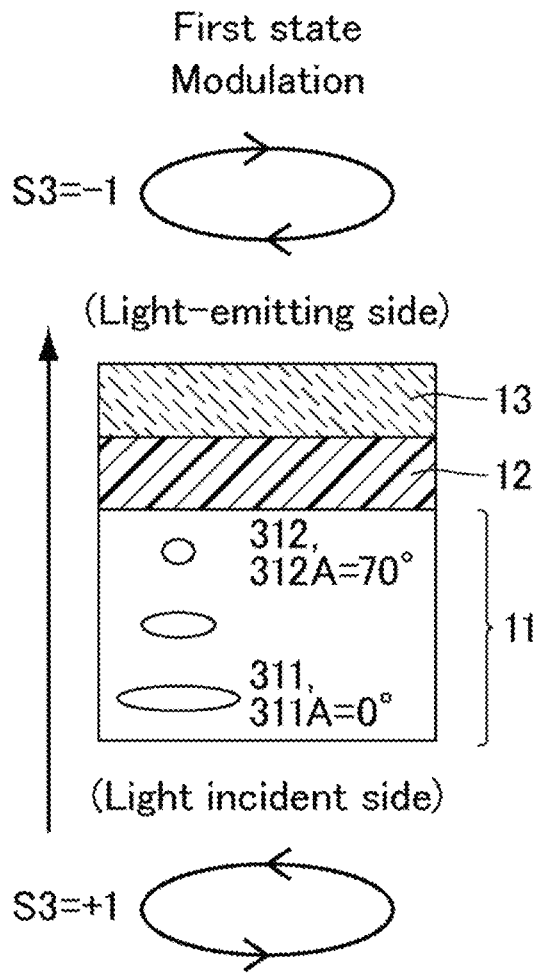
FIG. 68 is a schematic view showing the polarization states in the first state in the optical element of Embodiment 9.

FIG. 67 shows a Poincaré sphere with Stokes parameters on which the polarization states of light converted by layers in the first state in the optical element of Embodiment 9 are plotted. FIG. 68 is a schematic view showing the polarization states in the first state in the optical element of Embodiment 9. FIG. 67 shows the polarization state of light when the light passes through each layer (i.e., the function of each layer) in the first state. The principle of the polarization modulation in the optical element 10 of Embodiment 9 is described in detail using the Poincare sphere in FIG. 67 and FIG. 68.

As shown by the plotted points (1) in FIG. 67, right-handed circularly polarized light (S3=+1) is incident on the liquid crystal cell 11.

After passing through the liquid crystal cell 11 with 70°-twisted alignment, the right-handed circularly polarized light is once converted to the polarization state as shown by one of the plotted points (2) in FIG. 67. The plotted points indicate lights at different wavelengths of 380 nm to 780 nm. Lights at wavelengths of around 550 nm were plotted as linearly polarized lights (appeared on the equator of the Poincare sphere), whereas lights at the other wavelengths are plotted on the Northern hemisphere of the Poincare sphere as elliptically polarized lights.

The light then passes through the first quarter-wave film 12 (specifically, the quarter-wave film exhibiting reverse wavelength dispersion), plotted as one of the points (3) in FIG. 67.

The light then passes through the second quarter-wave film 13 (specifically, the quarter-wave film exhibiting flat wavelength dispersion). Lights at almost all the wavelengths are then emitted as left-handed circularly polarized lights (appeared on or near the south pole of the Poincaré sphere) as shown by the plotted points (4) in FIG. 67. This means that right-handed circularly polarized light was modulated to left-handed circularly polarized light as shown in FIG. 68.

Similarly, in the second state (during no modulation), the right-handed circularly polarized light is once converted to linearly polarized light after passing through the liquid crystal cell 11 with 70°-twisted alignment. The linearly polarized light is different in angle by about 90° from the linearly polarized light in the first state (during modulation) since the entire alignment of the liquid crystal cell 11 is rotated by 90°. Thereafter, lights at all the wavelengths are converted to right-handed circularly polarized light after passing through the first quarter-wave film 12 and the second quarter-wave film 13. In other words, right-handed circularly polarized light can be emitted as right-handed circularly polarized light with no modulation.

As described above, the first state and the second state are the same in the 70°-twisted alignment of the liquid crystal molecules 310 and different in the entire system by 90°. The optical element 10 of the present embodiment enables reversible switching between the two states of the first state and the second state, achieving a thin switchable half wave plate (sHWP) element achieving both no polarization modulation and polarization modulation in a broad bandwidth.

The second quarter-wave film 13 (specifically, quarter-wave film exhibiting flat wavelength dispersion) is, for example, a positive A plate or a negative A plate. The second quarter-wave film 13 (specifically, quarter-wave film exhibiting flat wavelength dispersion) is preferably a negative A plate. This configuration can improve the viewing angle characteristics during no modulation.

The pitch of the second electrode 132 provided with the slits 132S is preferably not smaller than 1 μm and not greater than 5 μm. Such a small pitch enables more uniform change in alignment of the liquid crystal molecules 310, enabling excellent modulation properties.

The solid electrode 240 is an electrode with no slit or no opening at least in a region overlapping an optical opening in a sub-pixel in a plan view. The solid electrode 240 can be formed by, for example, forming a single- or multi-layered film of a transparent conductive material such as indium tin oxide (ITO), indium zinc oxide (IZO), zinc oxide (ZnO), or tin oxide (SnO) or an alloy of any of these materials by sputtering or any other method, and patterning the film by photolithography or any other method.

The liquid crystal molecules 310 in the present embodiment are negative liquid crystal molecules 310. This configuration can apply a high vertical voltage between the first substrate 100 and the second substrate 200 to tilt the negative liquid crystal molecules 310 and horizontally align them. In the first state and the second state, the voltage difference between the solid electrode 240 and the electrodes including the first electrode 131 and the second electrode 132 is preferably not smaller than 1 V, more preferably not smaller than 3 V, still more preferably not smaller than 4 V. This configuration enables more effective horizontal alignment of the liquid crystal molecules 310. There is no upper limit of the voltage difference between the solid electrode 240 and the electrodes including the first electrode 131 and the second electrode 132. Yet, the voltage difference between the solid electrode 240 and the electrodes including the first electrode 131 and the second electrode 132 is, for example, not greater than 7 V. The voltage difference between the solid electrode 240 and the electrodes including the first electrode 131 and the second electrode 132 is preferably not smaller than 1 V and not greater than 7 V, more preferably not smaller than 3 V and not greater than 7 V, still more preferably not smaller than 4 V and not greater than 7 V.

In addition, a low voltage can be applied between the pixel electrode and the common electrode, namely between the first electrode 131 and the second electrode 132, to control the in-plane alignment azimuth of the liquid crystal molecules 310. The liquid crystal molecules 310, when they are negative liquid crystal molecules, are aligned in the extension direction of the slits 132S (the direction perpendicular to the electric fields) in the plane. Generation of strong horizontal electric fields under such conditions would distort the twisted alignment of liquid crystals provided by the chiral dopant. Thus, preferably, weak horizontal electric fields are generated.

When the voltage difference between the solid electrode 240 and the electrodes including the first electrode 131 and the second electrode 132 is not greater than 7 V, for example, the voltage difference between the first electrode 131 and the second electrode 132 in the first state is preferably not greater than 0.6 V. Also, the voltage difference between the first electrode 131 and the second electrode 132 in the second state is preferably not greater than 2 V. There is no lower limit of the voltage difference between the first electrode 131 and the second electrode 132 in the first state. Yet, the voltage difference between the first electrode 131 and the second electrode 132 in the first state is, for example, not smaller than 0.01 V. Also, there is no lower limit of the voltage difference between the first electrode 131 and the second electrode 132 in the second state. Yet, the voltage difference between the first electrode 131 and the second electrode 132 in the second state is, for example, not smaller than 0.6 V.

The voltage difference between the first electrode 131 and the second electrode 132 in the first state is preferably not smaller than 0.01 V and not greater than 0.6 V. Also, the voltage difference between the first electrode 131 and the second electrode 132 in the second state is preferably not smaller than 0.6 V and not greater than 2 V.

The first vertical alignment film 414 and the second vertical alignment film 424 can be the same as those in Embodiment 5. The optical element of the present embodiment includes a vertical alignment film on the substrate on each side, and thus is more production-friendly than an optical element including a horizontal alignment film.

At least one of the first vertical alignment film 414 or the second vertical alignment film 424 is preferably a weak anchoring vertical alignment film. This configuration enables switching between polarization modulation and no polarization modulation in a broader bandwidth and at a lower voltage. Here, the weak anchoring vertical alignment film only needs to exhibit weak anchoring at at least one of the polar angle or the azimuthal angle.

Light incident on the optical element 10 is preferably circularly polarized light. This configuration enables an optical element 10 capable of switching the polarization states of circularly polarized light.

Modified Example of Embodiment 9

In Embodiment 9, in the first state and the second state, the voltage difference between the solid electrode 240 and the electrodes including the first electrode 131 and the second electrode 132 is preferably not smaller than 8 V. This configuration enables more effective horizontal alignment of the liquid crystal molecules 310. There is no upper limit of the voltage difference between the solid electrode 240 and the electrodes including the first electrode 131 and the second electrode 132. Yet, the voltage difference between the solid electrode 240 and the electrodes including the first electrode 131 and the second electrode 132 is, for example, not greater than 20 V. Preferably, the voltage difference between the solid electrode 240 and the electrodes including the first electrode 131 and the second electrode 132 is not smaller than 8 V and not greater than 20 V.

When the voltage difference between the solid electrode 240 and the electrodes including the first electrode 131 and the second electrode 132 is not smaller than 8 V, for example, the voltage difference between the first electrode 131 and the second electrode 132 in the first state is preferably not greater than 2 V. Also, the voltage difference between the first electrode 131 and the second electrode 132 in the second state is preferably not greater than 3 V. There is no lower limit of the voltage difference between the first electrode 131 and the second electrode 132 in the first state. Yet, the voltage difference between the first electrode 131 and the second electrode 132 in the first state is, for example, not smaller than 0.01 V. Also, there is no lower limit of the voltage difference between the first electrode 131 and the second electrode 132 in the second state. Yet, the voltage difference between the first electrode 131 and the second electrode 132 in the second state is, for example, not smaller than 1.1 V.

The voltage difference between the first electrode 131 and the second electrode 132 in the first state is preferably not smaller than 0.01 V and not greater than 2 V. Also, the voltage difference between the first electrode 131 and the second electrode 132 in the second state is preferably not smaller than 1.1 V and not greater than 3 V.

Application of voltage as in the present modified example also tilts the liquid crystal molecules 310 near the interfaces, leading to a sHWP with a wide viewing angle range. At this time, the cell thickness, twist pitch, and angle of the phase difference film can be varied as appropriate.

Embodiment 10

The features unique to the present embodiment are mainly described here, and description of the matters already described in Embodiments 1 to 9 and the modified examples thereof is omitted. The present embodiment is substantially the same as Embodiment 9, except for the configuration of the liquid crystal cell 11 and the preferred voltages to be applied to the electrodes.

Figure 69:
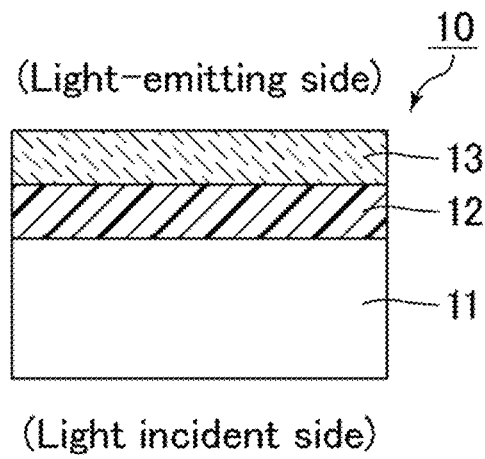
FIG. 69 is a schematic cross-sectional view of an optical element of Embodiment 10.
Figure 70:
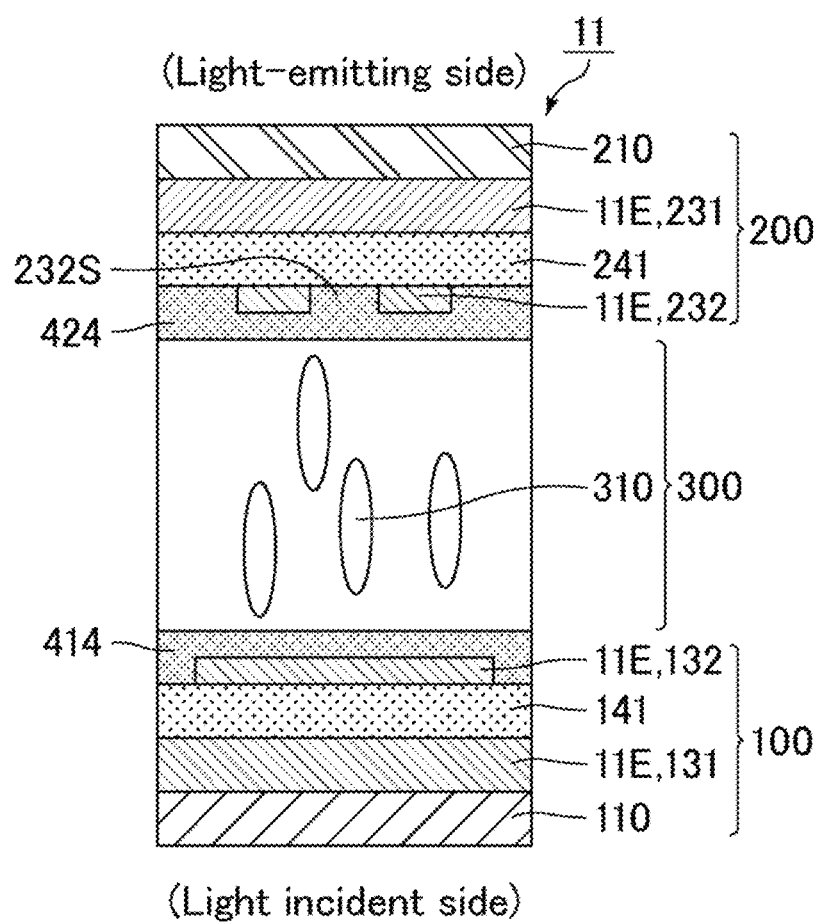
FIG. 70 is a schematic cross-sectional view of a liquid crystal cell in the optical element of Embodiment 10.
Figure 71:
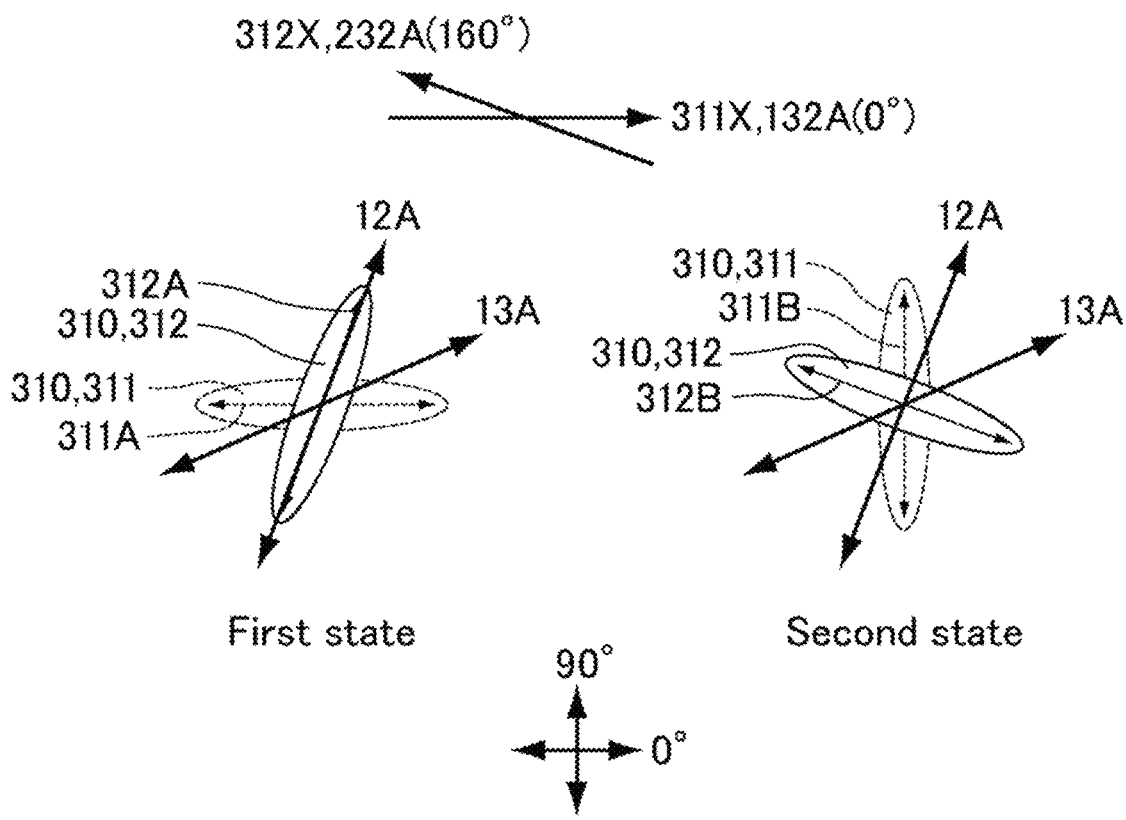
FIG. 71 includes schematic views showing the alignments of liquid crystal molecules in the first state and the second state in the optical element of Embodiment 10.

FIG. 69 is a schematic cross-sectional view of an optical element of Embodiment 10. FIG. 70 is a schematic cross-sectional view of a liquid crystal cell in the optical element of Embodiment 10. FIG. 71 includes schematic views showing the alignments of liquid crystal molecules in the first state and the second state in the optical element of Embodiment 10. The azimuth of the alignment of liquid crystal molecules near the interface of a substrate cannot be defined as the alignment is vertical. The alignment azimuths of such liquid crystal molecules are defined by the electrode directions in FIG. 71.

In the present embodiment, the reference azimuth (0°) is set in the alignment direction 311A of the liquid crystal molecules 311 near the first substrate 100 in the first state projected onto the surface of the substrate closer to the light emitting side of the optical element 10. The alignment direction 311A of the liquid crystal molecules 311 near the first substrate 100 in the first state matches the horizontally right direction on the screen of the liquid crystal cell 11 with the optical element 10 viewed from its light emitting side.

The liquid crystal cell 11 in the optical element 10 of the present embodiment shown in FIG. 69 to FIG. 71 further includes the first vertical alignment film 414 between the first substrate 100 and the liquid crystal layer 300 and the second vertical alignment film 424 between the liquid crystal layer 300 and the second substrate 200. The liquid crystal layer 300 contains the liquid crystal molecules 310 having a negative anisotropy of dielectric constant. The electrodes 11E include, in the first substrate 100, the planar first electrode 131 and the second electrode 132 overlapping the first electrode 131 via the first insulating layer 141 and being provided with the slits 132S and include, in the second substrate 200, the planar third electrode 231 and the fourth electrode 232 overlapping the third electrode 231 via the second insulating layer 241 and being provided with the slits 232S. In a plan view, the extension direction 132A of the slits 132S in the second electrode 132 is oblique to the extension direction 232A of the slits 232S in the fourth electrode 232 and parallel to the alignment direction 311X of the liquid crystal molecules 311 near the first substrate 100 with no voltage applied, and the extension direction 232A of the slits 232S in the fourth electrode 232 is parallel to the alignment direction 312X of the liquid crystal molecules 312 near the second substrate 200 with no voltage applied.

This configuration, with voltage applied between the first electrode 131 and the second electrode 132 and with no voltage applied between third electrode 231 and the fourth electrode 232 as shown in FIG. 71, causes circularly polarized light (for example, right-handed circularly polarized light) incident on the liquid crystal cell 11 to be converted to first linearly polarized light after passing through the liquid crystal cell 11. In other words, the first state can be achieved.

Also, the above configuration, with no voltage applied between the first electrode 131 and the second electrode 132 and with voltage applied between the third electrode 231 and the fourth electrode 232 as shown in FIG. 71, causes circularly polarized light (for example, right-handed circularly polarized light) incident on the liquid crystal cell 11 to be converted to second linearly polarized light whose polarization direction is perpendicular to the polarization direction of the first linearly polarized light in a plan view after passing through the liquid crystal cell 11. In other words, the second state is achieved.

One of the first electrode 131 and the second electrode 132 is a pixel electrode and the other is a common electrode. One of the third electrode 231 and the fourth electrode 232 is a pixel electrode and the other is a common electrode. FIG. 70 shows that the first substrate 100 and the second substrate 200 each include, sequentially toward the liquid crystal layer 300, a planar electrode and an electrode provided with slits. The arrangement of the planar electrode and the electrode provided with slits is not limited thereto. The electrode provided with slits and the planar electrode may be arranged sequentially toward the liquid crystal layer 300.

Preferably, at least either the liquid crystal molecules 311 near the first substrate 100 or the liquid crystal molecules 312 near the second substrate 200 are tilted. For example, when the liquid crystal molecules 311 near the first substrate 100 are tilted, preferably, the tilt azimuth of the liquid crystal molecules 311 near the first substrate 100 is parallel to the azimuth of the extension direction of the FFS electrode in the first substrate 100. Specifically, with no voltage applied, the azimuth of the alignment direction 311X of the liquid crystal molecules 311 near the first substrate 100 is preferably parallel to the azimuth of the extension direction 132A of the slits 132S in the second electrode 132. Here, the tilt azimuth of the liquid crystal molecules 311 near the first substrate 100 is desirably substantially 0° (for example, not smaller than −10° and not greater than +10°), and the liquid crystal molecules 312 near the second substrate 200 are preferably not tilted.

When the liquid crystal molecules 312 near the second substrate 200 are tilted, the tilt azimuth of the liquid crystal molecules 312 near the second substrate 200 is preferably parallel to the azimuth of the extension direction of the FFS electrode in the second substrate 200.

Specifically, the azimuth of the alignment direction 312X of the liquid crystal molecules 312 near the second substrate 200 with no voltage applied is preferably parallel to the azimuth of the extension direction 232A of the slits 232S in the fourth electrode 232. Here, the tilt azimuth of the liquid crystal molecules 312 near the second substrate 200 is desirably substantially 160° (for example, not smaller than 150° and not greater than 170°), and the liquid crystal molecules 311 near the first substrate 100 are preferably not tilted.

Both the liquid crystal molecules 311 near the first substrate 100 and the liquid crystal molecules 312 near the second substrate 200 may be tilted.

In a plan view, the angle γ formed by the extension direction 132A and the extension direction 232A (where γ is a real number greater than 0° and smaller than 90°) and the twist angle C of the liquid crystal molecules 310 in the liquid crystal layer 300 in the first state and the second state preferably satisfy the Formula CX1, more preferably the Formula CX2, still more preferably the Formula CX3. This configuration enables effective switching between polarization modulation and no polarization modulation in a broad bandwidth.

The twist angle C is preferably not smaller than 60° and not greater than 80°, more preferably not smaller than 64° and not greater than 76°, still more preferably not smaller than 68° and not greater than 72°. This configuration enables more effective switching between polarization modulation and no polarization modulation in a broad bandwidth.

When the extension direction 132A is at an azimuthal angle of 0°, the alignment direction 311X of the liquid crystal molecules 311 near the first substrate 100 with no voltage applied is at an azimuthal angle of 0°, the extension direction 232A is at an azimuthal angle of 160°, the alignment direction 312X of the liquid crystal molecules 312 near the second substrate 200 with no voltage applied is at an azimuthal angle of 160°, the twist angle of the liquid crystal molecules 310 is 70°, and the liquid crystal layer 300 contains negative liquid crystal molecules 310 with voltage applied between the first electrode 131 and the second electrode 132 and with no voltage applied between the third electrode 231 and the fourth electrode 232 as shown in FIG. 69 to FIG. 71, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with no voltage applied between the first electrode 131 and the second electrode 132 and with voltage applied between the third electrode 231 and the fourth electrode 232, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

The pitch of the second electrode 132 provided with the slits 132S is preferably not smaller than 1 μm and not greater than 5 μm. Such a small pitch enables more uniform change in alignment of the liquid crystal molecules 310, enabling excellent modulation properties. Also, the pitch of the fourth electrode 232 provided with the slits 232S is preferably not smaller than 1 μm and not greater than 5 μm. This configuration enables more uniform change in alignment of the liquid crystal molecules 310, enabling excellent modulation properties.

The liquid crystal molecules 310 in the present embodiment are negative liquid crystal molecules 310. This configuration can apply a high vertical voltage between the first substrate 100 and the second substrate 200 to tilt the negative liquid crystal molecules 310 and horizontally align them. In the first state and the second state, the voltage difference between the electrodes including the first electrode 131 and the second electrode 132 and the electrodes including the third electrode 231 and the fourth electrode 232 is preferably not smaller than 1 V, more preferably not smaller than 3 V, still more preferably not smaller than 4 V. This configuration enables more effective horizontal alignment of the liquid crystal molecules 310. There is no upper limit of the voltage difference between the electrodes including the first electrode 131 and the second electrode 132 and the electrodes including the third electrode 231 and the fourth electrode 232. Yet, the voltage difference between the electrodes including the first electrode 131 and the second electrode 132 and the electrodes including the third electrode 231 and the fourth electrode 232 is, for example, not greater than 7 V. The voltage difference between the electrodes including the first electrode 131 and the second electrode 132 and the electrodes including the third electrode 231 and the fourth electrode 232 is preferably not smaller than 1 V and not greater than 7 V, more preferably not smaller than 3 V and not greater than 7 V, still more preferably not smaller than 4 V and not greater than 7 V.

In addition, a low voltage can be applied between the pixel electrode and the common electrode, namely between the first electrode 131 and the second electrode 132 and between the third electrode 231 and the fourth electrode 232, to control the in-plane alignment azimuth of the liquid crystal molecules 310. The liquid crystal molecules 310, when they are negative liquid crystal molecules, are aligned in the extension direction of the slits 132S and 232S (the direction perpendicular to the electric fields) in the plane. Generation of strong horizontal electric fields under such conditions would distort the twisted alignment of liquid crystals provided by the chiral dopant. Thus, preferably, weak horizontal electric fields are generated.

When the voltage difference between the electrodes including the first electrode 131 and the second electrode 132 and the electrodes including the third electrode 231 and the fourth electrode 232 is not greater than 7 V, for example, the voltage difference between the first electrode 131 and the second electrode 132 in the first state is preferably not greater than 2 V. Also, the voltage difference between the third electrode 231 and the fourth electrode 232 in the first state is preferably not greater than 0.6 V. There is no lower limit of the voltage difference between the first electrode 131 and the second electrode 132 in the first state. Yet, the voltage difference between the first electrode 131 and the second electrode 132 in the first state is, for example, not smaller than 0.7 V. Also, there is no lower limit of the voltage difference between the third electrode 231 and the fourth electrode 232 in the first state. Yet, the voltage difference between the third electrode 231 and the fourth electrode 232 in the first state is, for example, not smaller than 0.01 V.

The voltage difference between the first electrode 131 and the second electrode 132 in the first state is preferably not smaller than 0.7 V and not greater than 2 V. The voltage difference between the third electrode 231 and the fourth electrode 232 in the first state is preferably not smaller than 0.01 V and not greater than 0.6 V.

The voltage difference between the first electrode 131 and the second electrode 132 in the second state is preferably not greater than 0.6 V. The voltage difference between the third electrode 231 and the fourth electrode 232 in the second state is preferably not greater than 2 V. There is no lower limit of the voltage difference between the first electrode 131 and the second electrode 132 in the second state. Yet, the voltage difference between the first electrode 131 and the second electrode 132 in the second state is, for example, not smaller than 0.01 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 0.7 V.

The voltage difference between the first electrode 131 and the second electrode 132 in the second state is preferably not smaller than 0.01 V and not greater than 0.6 V. The voltage difference between the third electrode 231 and the fourth electrode 232 in the second state is preferably not smaller than 0.7 V and not greater than 2 V.

The first vertical alignment film 414 and the second vertical alignment film 424 can be the same as those in Embodiment 5. The optical element of the present embodiment includes a vertical alignment film on the substrate on each side, and thus is more production-friendly than an optical element including a horizontal alignment film.

At least one of the first vertical alignment film 414 or the second vertical alignment film 424 is preferably a weak anchoring vertical alignment film. This configuration enables switching between polarization modulation and no polarization modulation in a broader bandwidth and at a lower voltage. Here, the weak anchoring vertical alignment film only needs to exhibit weak anchoring at at least one of the polar angle or the azimuthal angle.

Modified Example of Embodiment 10

In Embodiment 10, in the first state and the second state, the voltage difference between the electrodes including the first electrode 131 and the second electrode 132 and the electrodes including the third electrode 231 and the fourth electrode 232 is preferably not smaller than 8 V. This configuration enables more effective horizontal alignment of the liquid crystal molecules 310. There is no upper limit of the voltage difference between the electrodes including the first electrode 131 and the second electrode 132 and the electrodes including the third electrode 231 and the fourth electrode 232. Yet, the voltage difference between the electrodes including the first electrode 131 and the second electrode 132 and the electrodes including the third electrode 231 and the fourth electrode 232 is, for example, not greater than 20 V. Preferably, the voltage difference between the electrodes including the first electrode 131 and the second electrode 132 and the electrodes including the third electrode 231 and the fourth electrode 232 is not smaller than 8 V and not greater than 20 V.

When the voltage difference between the electrodes including the first electrode 131 and the second electrode 132 and the electrodes including the third electrode 231 and the fourth electrode 232 is not smaller than 8 V, for example, the voltage difference between the first electrode 131 and the second electrode 132 in the first state is preferably not greater than 3 V. Also, the voltage difference between the third electrode 231 and the fourth electrode 232 in the first state is preferably not greater than 2 V. There is no lower limit of the voltage difference between the first electrode 131 and the second electrode 132 in the first state. Yet, the voltage difference between the first electrode 131 and the second electrode 132 in the first state is, for example, not smaller than 1.1 V. Also, there is no lower limit of the voltage difference between the third electrode 231 and the fourth electrode 232 in the first state. Yet, the voltage difference between the third electrode 231 and the fourth electrode 232 in the first state is, for example, not smaller than 0.01 V.

The voltage difference between the first electrode 131 and the second electrode 132 in the first state is preferably not smaller than 1.1 V and not greater than 3 V. The voltage difference between the third electrode 231 and the fourth electrode 232 in the first state is preferably not smaller than 0.01 V and not greater than 2 V.

The voltage difference between the first electrode 131 and the second electrode 132 in the second state is preferably not greater than 2 V. Also, the voltage difference between the third electrode 231 and the fourth electrode 232 in the second state is preferably not greater than 3 V. There is no lower limit of the voltage difference between the first electrode 131 and the second electrode 132 in the second state. Yet, the voltage difference between the first electrode 131 and the second electrode 132 in the second state is, for example, not smaller than 0.01 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 1.1 V.

The voltage difference between the first electrode 131 and the second electrode 132 in the second state is preferably not smaller than 0.01 V and not greater than 2 V. The voltage difference between the third electrode 231 and the fourth electrode 232 in the second state is preferably not smaller than 1.1 V and not greater than 3 V.

Application of voltage as in the present modified example also tilts the liquid crystal molecules 310 near the interfaces, leading to a sHWP with a wide viewing angle range. At this time, the cell thickness, twist pitch, and angle of the phase difference film can be varied as appropriate.

Embodiment 11

The features unique to the present embodiment are mainly described here, and description of the matters already described in Embodiments 1 to 10 and the modified examples thereof is omitted. The present embodiment is substantially the same as Embodiment 9, except for the configuration of the liquid crystal cell 11, the preferred azimuthal angles of the slow axis 12A of the first quarter-wave film 12 and the slow axis 13A of the second quarter-wave film 13, and the preferred voltages to be applied to the electrodes.

Figure 72:
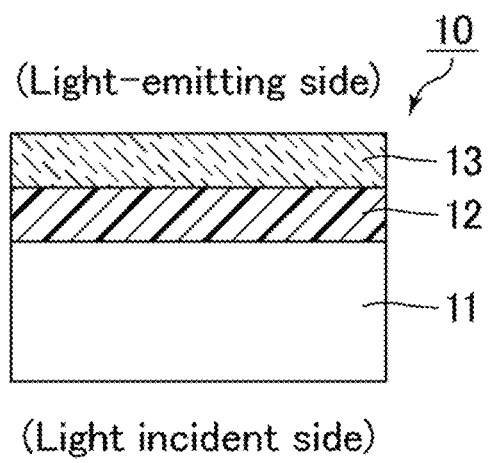
FIG. 72 is a schematic cross-sectional view of an optical element of Embodiment 11.
Figure 73:
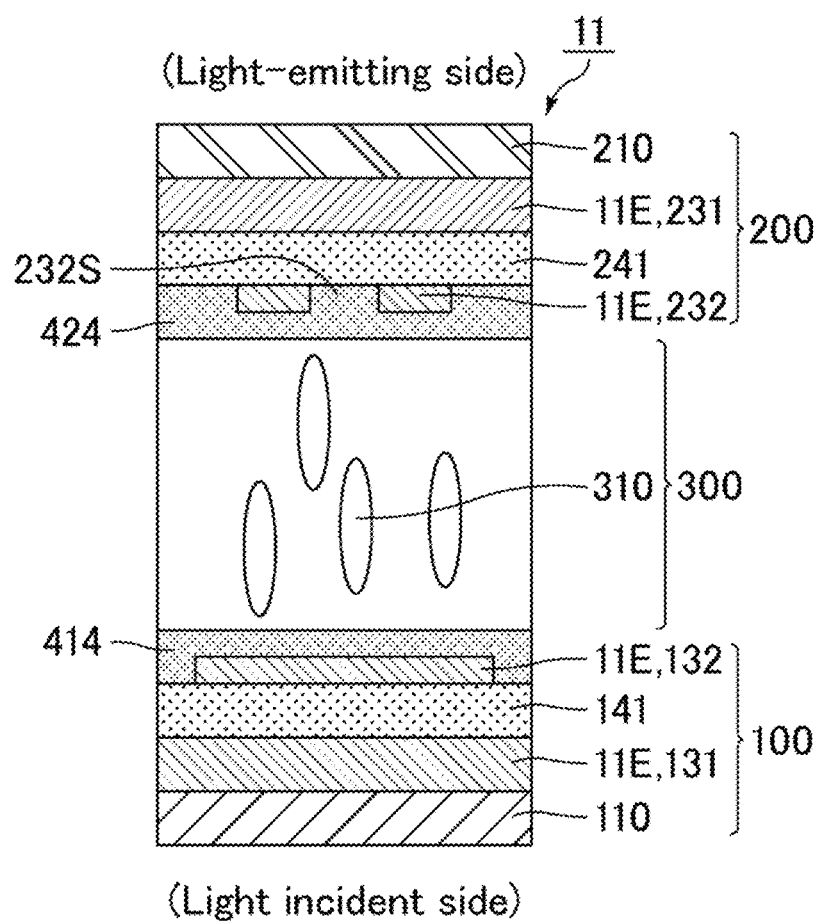
FIG. 73 is a schematic cross-sectional view of a liquid crystal cell in the optical element of Embodiment 11.
Figure 74:
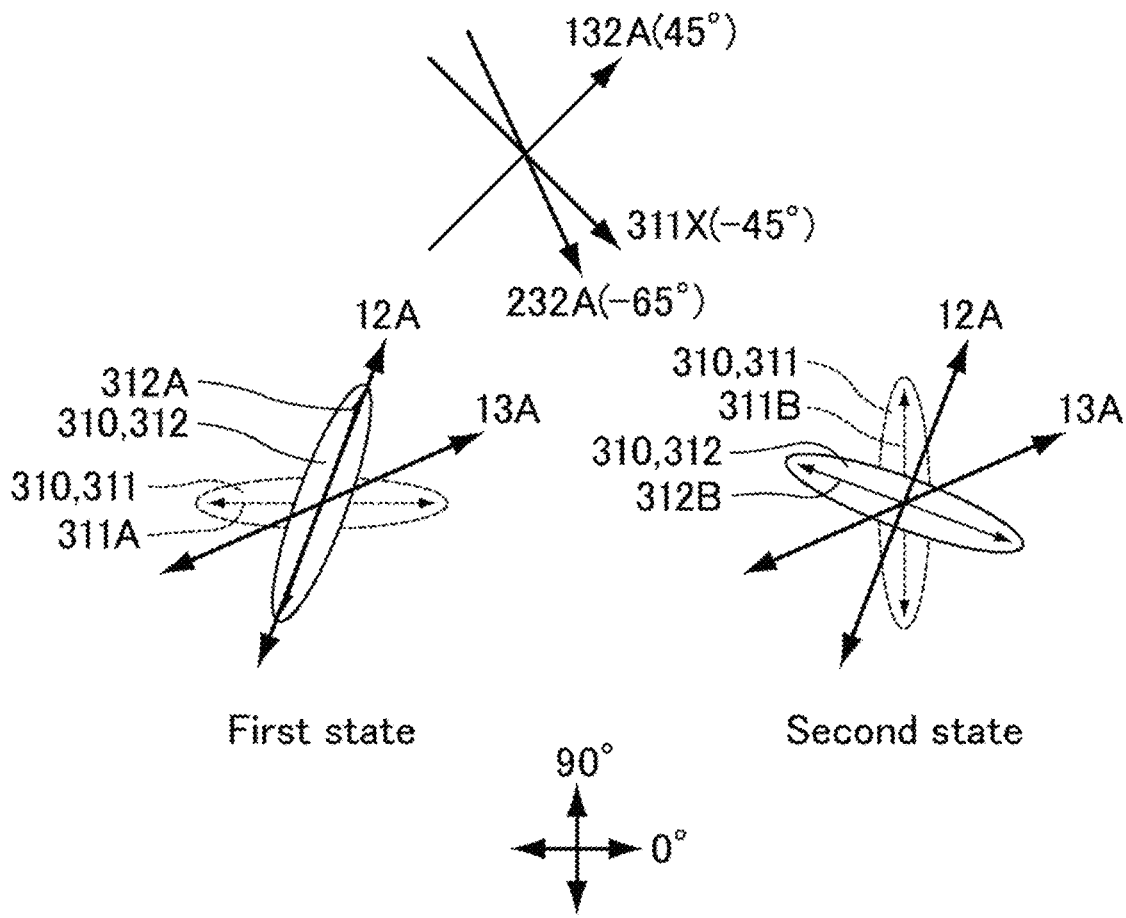
FIG. 74 includes schematic views showing the alignments of liquid crystal molecules in the first state and the second state in the optical element of Embodiment 11.

FIG. 72 is a schematic cross-sectional view of an optical element of Embodiment 11. FIG. 73 is a schematic cross-sectional view of a liquid crystal cell in the optical element of Embodiment 11. FIG. 74 includes schematic views showing the alignments of liquid crystal molecules in the first state and the second state in the optical element of Embodiment 11. The azimuth of the alignment of liquid crystal molecules near the interface of a substrate cannot be defined as the alignment is vertical. The alignment azimuths of such liquid crystal molecules are defined by the electrode directions in FIG. 74.

In the present embodiment, the reference azimuth (0°) is set in the alignment direction 311A of the liquid crystal molecules 311 near the first substrate 100 in the first state projected onto the surface of the substrate closer to the light emitting side of the optical element 10. The alignment direction 311A of the liquid crystal molecules 311 near the first substrate 100 in the first state matches the horizontally right direction on the screen of the liquid crystal cell 11 with the optical element 10 viewed from its light emitting side.

The liquid crystal cell 11 in the optical element 10 of the present embodiment shown in FIG. 72 to FIG. 74 further includes the first vertical alignment film 414 between the first substrate 100 and the liquid crystal layer 300 and the second vertical alignment film 424 between the liquid crystal layer 300 and the second substrate 200. The liquid crystal layer 300 contains the liquid crystal molecules 310 having a negative anisotropy of dielectric constant. The electrodes 11E include, in the first substrate 100, the planar first electrode 131 and the second electrode 132 overlapping the first electrode 131 via the first insulating layer 141 and being provided with the slits 132S and include, in the second substrate 200, the planar third electrode 231 and the fourth electrode 232 overlapping the third electrode 231 via the second insulating layer 241 and being provided with the slits 232S. In a plan view, the alignment direction 311X of the liquid crystal molecules 311 near the first substrate 100 with no voltage applied lies between the extension direction 132A of the slits 132S in the second electrode 132 and the extension direction 232A of the slits 232S in the fourth electrode 232 and is perpendicular to the extension direction 132A of the slits 132S in the second electrode 132 and oblique to the extension direction 232A of the slits 232S in the fourth electrode 232.

This configuration, with voltage applied between the first electrode 131 and the second electrode 132 and with no voltage applied between third electrode 231 and the fourth electrode 232 as shown in FIG. 74, causes circularly polarized light (for example, right-handed circularly polarized light) incident on the liquid crystal cell 11 to be converted to first linearly polarized light after passing through the liquid crystal cell 11. In other words, the first state can be achieved.

Also, the above configuration, with no voltage applied between the first electrode 131 and the second electrode 132 and with voltage applied between the third electrode 231 and the fourth electrode 232 as shown in FIG. 74, causes circularly polarized light (for example, right-handed circularly polarized light) incident on the liquid crystal cell 11 to be converted to second linearly polarized light whose polarization direction is perpendicular to the polarization direction of the first linearly polarized light in a plan view after passing through the liquid crystal cell 11. In other words, the second state is achieved.

One of the first electrode 131 and the second electrode 132 is a pixel electrode and the other is a common electrode. One of the third electrode 231 and the fourth electrode 232 is a pixel electrode and the other is a common electrode. FIG. 73 shows that the first substrate 100 and the second substrate 200 each include, sequentially toward the liquid crystal layer 300, a planar electrode and an electrode provided with slits. The arrangement of the planar electrode and the electrode provided with slits is not limited thereto. The electrode provided with slits and the planar electrode may be arranged sequentially toward the liquid crystal layer 300.

Preferably, at least either the liquid crystal molecules 311 near the first substrate 100 or the liquid crystal molecules 312 near the second substrate 200 are tilted. For example, when the liquid crystal molecules 311 near the first substrate 100 are tilted, preferably, the tilt azimuth of the liquid crystal molecules 311 near the first substrate 100 is perpendicular to the azimuth of the extension direction of the FFS electrode in the first substrate 100. Specifically, with no voltage applied, the azimuth of the alignment direction 311X of the liquid crystal molecules 311 near the first substrate 100 is preferably perpendicular to the azimuth of the extension direction 132A of the slits 132S in the second electrode 132. Here, the tilt azimuth of the liquid crystal molecules 311 near the first substrate 100 is desirably substantially −45° (for example, not smaller than −55° and not greater than −35°), and the liquid crystal molecules 312 near the second substrate 200 are preferably not tilted. The liquid crystal molecules 312 near the second substrate 200 may be tilted while the liquid crystal molecules 311 near the first substrate 100 may not be tilted. Also, both the liquid crystal molecules 311 near the first substrate 100 and the liquid crystal molecules 312 near the second substrate 200 may be tilted.

In a plan view, the angle δ formed by the alignment direction 311X and the extension direction 232A (where δ is a real number greater than 0° and smaller than 90°) and the twist angle D1 of the liquid crystal molecules 310 in the liquid crystal layer 300 in the first state and the second state preferably satisfy the following Formula DX1. This configuration enables effective switching between polarization modulation and no polarization modulation in a broad bandwidth.

$$80°-D1 \leq \delta \leq 100°-D1 \qquad \text{(Formula DX1)}$$

The twist angle D1 is preferably not smaller than 60° and not greater than 80°, more preferably not smaller than 64° and not greater than 76°, still more preferably not smaller than 68° and not greater than 72°. This configuration enables more effective switching between polarization modulation and no polarization modulation in a broad bandwidth.

When the extension direction 132A is at an azimuthal angle of 90°, the alignment direction 311X of the liquid crystal molecules 311 near the first substrate 100 with no voltage applied is at an azimuthal angle of 0°, the extension direction 232A is at an azimuthal angle of 160°, the twist angle of the liquid crystal molecules 310 is 70°, and the liquid crystal layer 300 contains negative liquid crystal molecules 310 with voltage applied between the first electrode 131 and the second electrode 132 and with no voltage applied between the third electrode 231 and the fourth electrode 232 as shown in FIG. 72 to FIG. 74, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with no voltage applied between the first electrode 131 and the second electrode 132 and with voltage applied between the third electrode 231 and the fourth electrode 232, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

When the alignment direction 311A of the liquid crystal molecules 311 near the first substrate 100 is at an azimuthal angle of 0° in the first state, the slow axis of the first quarter-wave film 12 or the second quarter-wave film 13, whichever is farther from the light emitting side (in the present embodiment, the slow axis 12A of the first quarter-wave film 12), is preferably at an azimuthal angle of not smaller than 58° and not greater than 78°. This configuration enables switching between polarization modulation and no polarization modulation in a broader bandwidth.

When the alignment direction 311A of the liquid crystal molecules 311 near the first substrate 100 is at an azimuthal angle of 0° in the first state, the slow axis of the first quarter-wave film 12 or the second quarter-wave film 13, whichever is closer to the light emitting side (in the present embodiment, the slow axis 13A of the second quarter-wave film 13) is preferably at an azimuthal angle of not smaller than 13° and not greater than 33°. This configuration enables switching between polarization modulation and no polarization modulation in a broader bandwidth.

The angle formed by the slow axis 12A of the first quarter-wave film 12 and the slow axis 13A of the second quarter-wave film 13 is preferably not smaller than 40° and not greater than 50°, more preferably not smaller than 42° and not greater than 48°, still more preferably not smaller than 44° and not greater than 46°, particularly preferably 45°.

In the present embodiment, when the alignment direction 311A of the liquid crystal molecules 311 near the first substrate 100 in the first state is set at an azimuthal angle of 0°, the slow axis 12A of the first quarter-wave film 12 is set at an azimuthal angle of not smaller than 58° and not greater than 78°, and the slow axis 13A of the second quarter-wave film 13 is set at an azimuthal angle of not smaller than 13° and not greater than 33°, in the first state, the first linearly polarized light passes through the first quarter-wave film 12 and the second quarter-wave film 13 and is converted in a broad bandwidth to circularly polarized light in a different polarization state (for example, left-handed circularly polarized light) from the circularly polarized light (for example, right-handed circularly polarized light) incident on the liquid crystal cell 11. In this manner, the first state achieves polarization modulation in a broad bandwidth where circularly polarized light incident on the optical element 10 is emitted after being converted to circularly polarized light in a different polarization state (for example, right-handed circularly polarized light to left-handed circularly polarized light). Also, the second linearly polarized light passes through the first quarter-wave film 12 and the second quarter-wave film 13 and is emitted in a broad bandwidth as circularly polarized light in the same polarization state (for example, right-handed circularly polarized light) as the circularly polarized light incident on the liquid crystal cell 11. In this manner, the second state achieves in a broad bandwidth no polarization modulation where circularly polarized light incident on the optical element 10 is emitted in the same polarization state (for example, while remaining as right-handed circularly polarized light).

The pitch of the second electrode 132 provided with the slits 132S is preferably not smaller than 1 μm and not greater than 5 μm. Such a small pitch enables more uniform change in alignment of the liquid crystal molecules 310, enabling excellent modulation properties. Also, the pitch of the fourth electrode 232 provided with the slits 232S is preferably not smaller than 1 μm and not greater than 5 μm. This configuration enables more uniform change in alignment of the liquid crystal molecules 310, enabling excellent modulation properties.

The liquid crystal molecules 310 in the present embodiment are negative liquid crystal molecules 310. This configuration can apply a high vertical voltage between the first substrate 100 and the second substrate 200 to tilt the negative liquid crystal molecules 310 and horizontally align them. In the first state and the second state, the voltage difference between the electrodes including the first electrode 131 and the second electrode 132 and the electrodes including the third electrode 231 and the fourth electrode 232 is preferably not smaller than 1 V, more preferably not smaller than 3 V, still more preferably not smaller than 4 V. This configuration enables more effective horizontal alignment of the liquid crystal molecules 310. There is no upper limit of the voltage difference between the electrodes including the first electrode 131 and the second electrode 132 and the electrodes including the third electrode 231 and the fourth electrode 232. Yet, the voltage difference between the electrodes including the first electrode 131 and the second electrode 132 and the electrodes including the third electrode 231 and the fourth electrode 232 is, for example, not greater than 7 V. The voltage difference between the electrodes including the first electrode 131 and the second electrode 132 and the electrodes including the third electrode 231 and the fourth electrode 232 is preferably not smaller than 1 V and not greater than 7 V, more preferably not smaller than 3 V and not greater than 7 V, still more preferably not smaller than 4 V and not greater than 7 V.

In addition, a low voltage can be applied between the pixel electrode and the common electrode, namely between the first electrode 131 and the second electrode 132 and between the third electrode 231 and the fourth electrode 232, to control the in-plane alignment azimuth of the liquid crystal molecules 310. The liquid crystal molecules 310, when they are negative liquid crystal molecules, are aligned in the extension direction of the slits 132S and 232S (the direction perpendicular to the electric fields) in the plane.

Generation of strong horizontal electric fields under such conditions would distort the twisted alignment of liquid crystals provided by the chiral dopant. Thus, preferably, weak horizontal electric fields are generated.

When the voltage difference between the electrodes including the first electrode 131 and the second electrode 132 and the electrodes including the third electrode 231 and the fourth electrode 232 is not greater than 7 V, for example, the voltage difference between the first electrode 131 and the second electrode 132 in the first state is preferably not greater than 2 V. Also, the voltage difference between the third electrode 231 and the fourth electrode 232 in the first state is preferably not greater than 0.6 V. There is no lower limit of the voltage difference between the first electrode 131 and the second electrode 132 in the first state. Yet, the voltage difference between the first electrode 131 and the second electrode 132 in the first state is, for example, not smaller than 0.7 V. Also, there is no lower limit of the voltage difference between the third electrode 231 and the fourth electrode 232 in the first state. Yet, the voltage difference between the third electrode 231 and the fourth electrode 232 in the first state is, for example, not smaller than 0.01 V.

The voltage difference between the first electrode 131 and the second electrode 132 in the first state is preferably not smaller than 0.7 V and not greater than 2 V. The voltage difference between the third electrode 231 and the fourth electrode 232 in the first state is preferably not smaller than 0.01 V and not greater than 0.6 V.

The voltage difference between the first electrode 131 and the second electrode 132 in the second state is preferably not greater than 0.6 V. The voltage difference between the third electrode 231 and the fourth electrode 232 in the second state is preferably not greater than 2 V. There is no lower limit of the voltage difference between the first electrode 131 and the second electrode 132 in the second state. Yet, the voltage difference between the first electrode 131 and the second electrode 132 in the second state is, for example, not smaller than 0.01 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 0.7 V.

The voltage difference between the first electrode 131 and the second electrode 132 in the second state is preferably not smaller than 0.01 V and not greater than 0.6 V. The voltage difference between the third electrode 231 and the fourth electrode 232 in the second state is preferably not smaller than 0.7 V and not greater than 2 V.

The first vertical alignment film 414 and the second vertical alignment film 424 can be the same as those in Embodiment 5. The optical element of the present embodiment includes a vertical alignment film on the substrate on each side, and thus is more production-friendly than an optical element including a horizontal alignment film.

At least one of the first vertical alignment film 414 or the second vertical alignment film 424 is preferably a weak anchoring vertical alignment film. This configuration enables switching between polarization modulation and no polarization modulation in a broader bandwidth and at a lower voltage. Here, the weak anchoring vertical alignment film only needs to exhibit weak anchoring at at least one of the polar angle or the azimuthal angle.

Modified Example of Embodiment 11

In Embodiment 11, in the first state and the second state, the voltage difference between the electrodes including the first electrode 131 and the second electrode 132 and the electrodes including the third electrode 231 and the fourth electrode 232 is preferably not smaller than 8 V. This configuration enables more effective horizontal alignment of the liquid crystal molecules 310. There is no upper limit of the voltage difference between the electrodes including the first electrode 131 and the second electrode 132 and the electrodes including the third electrode 231 and the fourth electrode 232. Yet, the voltage difference between the electrodes including the first electrode 131 and the second electrode 132 and the electrodes including the third electrode 231 and the fourth electrode 232 is, for example, not greater than 20 V. Preferably, the voltage difference between the electrodes including the first electrode 131 and the second electrode 132 and the electrodes including the third electrode 231 and the fourth electrode 232 is not smaller than 8 V and not greater than 20 V.

When the voltage difference between the electrodes including the first electrode 131 and the second electrode 132 and the electrodes including the third electrode 231 and the fourth electrode 232 is not smaller than 8 V, for example, the voltage difference between the first electrode 131 and the second electrode 132 in the first state is preferably not greater than 3 V. Also, the voltage difference between the third electrode 231 and the fourth electrode 232 in the first state is preferably not greater than 2 V. There is no lower limit of the voltage difference between the first electrode 131 and the second electrode 132 in the first state. Yet, the voltage difference between the first electrode 131 and the second electrode 132 in the first state is, for example, not smaller than 1.1 V. Also, there is no lower limit of the voltage difference between the third electrode 231 and the fourth electrode 232 in the first state. Yet, the voltage difference between the third electrode 231 and the fourth electrode 232 in the first state is, for example, not smaller than 0.01 V.

The voltage difference between the first electrode 131 and the second electrode 132 in the first state is preferably not smaller than 1.1 V and not greater than 3 V. The voltage difference between the third electrode 231 and the fourth electrode 232 in the first state is preferably not smaller than 0.01 V and not greater than 2 V.

The voltage difference between the first electrode 131 and the second electrode 132 in the second state is preferably not greater than 2 V. Also, the voltage difference between the third electrode 231 and the fourth electrode 232 in the second state is preferably not greater than 3 V. There is no lower limit of the voltage difference between the first electrode 131 and the second electrode 132 in the second state. Yet, the voltage difference between the first electrode 131 and the second electrode 132 in the second state is, for example, not smaller than 0.01 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 1.1 V.

The voltage difference between the first electrode 131 and the second electrode 132 in the second state is preferably not smaller than 0.01 V and not greater than 2 V. The voltage difference between the third electrode 231 and the fourth electrode 232 in the second state is preferably not smaller than 1.1 V and not greater than 3 V.

Application of voltage as in the present modified example also tilts the liquid crystal molecules 310 near the interfaces, leading to a sHWP with a wide viewing angle range. At this time, the cell thickness, twist pitch, and angle of the phase difference film can be varied as appropriate.

Embodiment 12

The features unique to the present embodiment are mainly described here, and description of the matters already described in Embodiments 1 to 11 and the modified examples thereof is omitted. The present embodiment is substantially the same as Embodiment 9 except for the configuration of the liquid crystal cell 11 and the preferred voltages to be applied to the electrodes.

Figure 75:
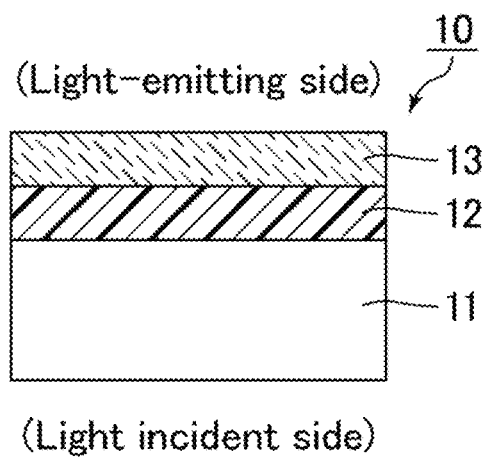
FIG. 75 is a schematic cross-sectional view of an optical element of Embodiment 12.
Figure 76:
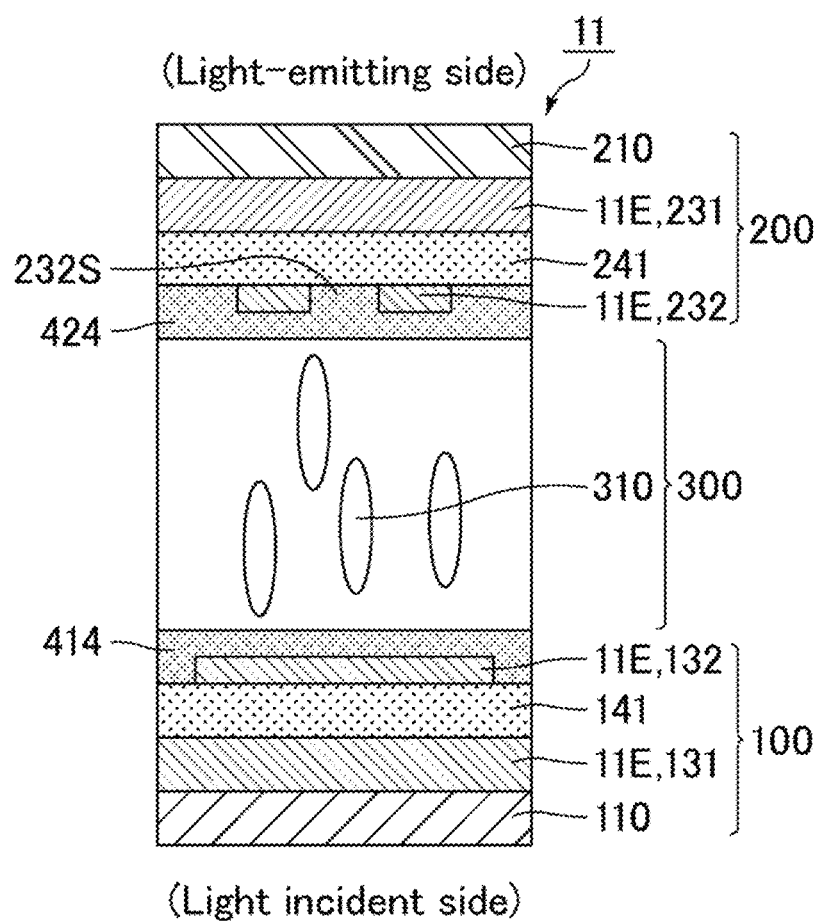
FIG. 76 is a schematic cross-sectional view of a liquid crystal cell in the optical element of Embodiment 12.
Figure 77:
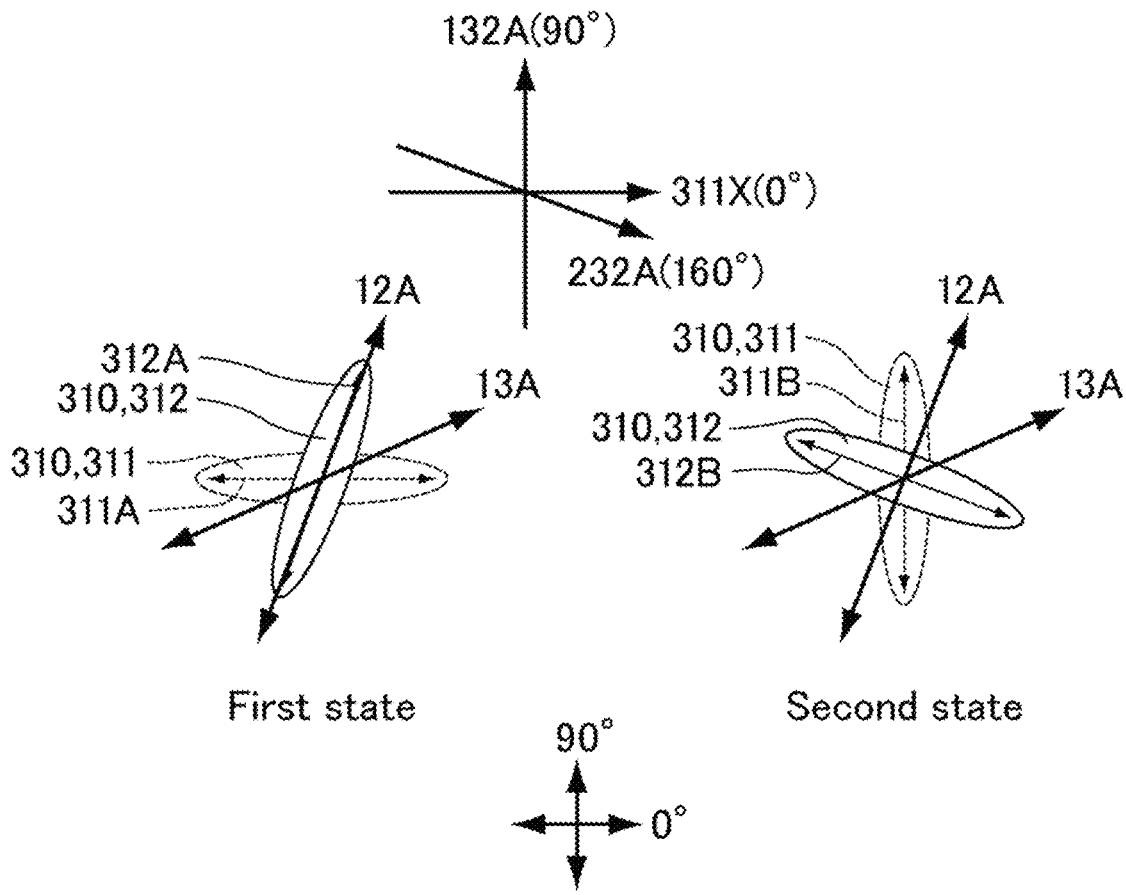
FIG. 77 includes schematic views showing the alignments of liquid crystal molecules in the first state and the second state in the optical element of Embodiment 12.

FIG. 75 is a schematic cross-sectional view of an optical element of Embodiment 12. FIG. 76 is a schematic cross-sectional view of a liquid crystal cell in the optical element of Embodiment 12. FIG. 77 includes schematic views showing the alignments of liquid crystal molecules in the first state and the second state in the optical element of Embodiment 12. The azimuth of the alignment of liquid crystal molecules near the interface of a substrate cannot be defined as the alignment is vertical. The alignment azimuths of such liquid crystal molecules are defined by the electrode directions in FIG. 77.

In the present embodiment, the reference azimuth (0°) is set in the alignment direction 311A of the liquid crystal molecules 311 near the first substrate 100 in the first state projected onto the surface of the substrate closer to the light emitting side of the optical element 10. The alignment direction 311A of the liquid crystal molecules 311 near the first substrate 100 in the first state matches the horizontally right direction on the screen of the liquid crystal cell 11 with the optical element 10 viewed from its light emitting side.

The liquid crystal cell 11 in the optical element 10 of the present embodiment shown in FIG. 75 to FIG. 77 further includes the first vertical alignment film 414 between the first substrate 100 and the liquid crystal layer 300 and the second vertical alignment film 424 between the liquid crystal layer 300 and the second substrate 200. The liquid crystal layer 300 contains the liquid crystal molecules 310 having a negative anisotropy of dielectric constant. The electrodes 11E include, in the first substrate 100, the planar first electrode 131 and the second electrode 132 overlapping the first electrode 131 via the first insulating layer 141 and being provided with the slits 132S and include, in the second substrate 200, the planar third electrode 231 and the fourth electrode 232 overlapping the third electrode 231 via the second insulating layer 241 and being provided with the slits 232S. In a plan view, the alignment direction 311X of the liquid crystal molecules 311 near the first substrate 100 with no voltage applied lies between the extension direction 132A of the slits 132S in the second electrode 132 and the extension direction 232A of the slits 232S in the fourth electrode 232 and is perpendicular to the extension direction 132A of the slits 132S in the second electrode 132 and oblique to the extension direction 232A of the slits 232S in the fourth electrode 232.

This configuration, with voltage applied between the first electrode 131 and the second electrode 132 and with no voltage applied between third electrode 231 and the fourth electrode 232 as shown in FIG. 77, causes circularly polarized light (for example, right-handed circularly polarized light) incident on the liquid crystal cell 11 to be converted to first linearly polarized light after passing through the liquid crystal cell 11. In other words, the first state can be achieved.

Also, the above configuration, with no voltage applied between the first electrode 131 and the second electrode 132 and with voltage applied between the third electrode 231 and the fourth electrode 232 as shown in FIG. 77, causes circularly polarized light (for example, right-handed circularly polarized light) incident on the liquid crystal cell 11 to be converted to second linearly polarized light whose polarization direction is perpendicular to the polarization direction of the first linearly polarized light in a plan view after passing through the liquid crystal cell 11. In other words, the second state is achieved.

One of the first electrode 131 and the second electrode 132 is a pixel electrode and the other is a common electrode. One of the third electrode 231 and the fourth electrode 232 is a pixel electrode and the other is a common electrode. FIG. 77 shows that the first substrate 100 and the second substrate 200 each include, sequentially toward the liquid crystal layer 300, a planar electrode and an electrode provided with slits. The arrangement of the planar electrode and the electrode provided with slits is not limited thereto. The electrode provided with slits and the planar electrode may be arranged sequentially toward the liquid crystal layer 300.

Preferably, at least either the liquid crystal molecules 311 near the first substrate 100 or the liquid crystal molecules 312 near the second substrate 200 are tilted. For example, when the liquid crystal molecules 311 near the first substrate 100 are tilted, preferably, the tilt azimuth of the liquid crystal molecules 311 near the first substrate 100 is perpendicular to the azimuth of the extension direction of the FFS electrode in the first substrate 100, more preferably at an angle of 90°. Specifically, with no voltage applied, the azimuth of the alignment direction 311X of the liquid crystal molecules 311 near the first substrate 100 is preferably perpendicular to the azimuth of the extension direction 132A of the slits 132S in the second electrode 132, more preferably at an angle of 90°. Here, the tilt azimuth of the liquid crystal molecules 311 near the first substrate 100 is desirably substantially 0° (for example, not smaller than −10° and not greater than +10°), and the liquid crystal molecules 312 near the second substrate 200 are preferably not tilted. The liquid crystal molecules 312 near the second substrate 200 may be tilted while the liquid crystal molecules 311 near the first substrate 100 may not be tilted. Also, both the liquid crystal molecules 311 near the first substrate 100 and the liquid crystal molecules 312 near the second substrate 200 may be tilted.

In a plan view, the angle δ formed by the alignment direction 311X and the extension direction 232A (where δ is a real number greater than 0° and smaller than 90°) and the twist angle D1 of the liquid crystal molecules 310 in the liquid crystal layer 300 in the first state and the second state preferably satisfy the Formula DX1. This configuration enables effective switching between polarization modulation and no polarization modulation in a broad bandwidth.

The twist angle D1 is preferably not smaller than 60° and not greater than 80°, more preferably not smaller than 64° and not greater than 76°, still more preferably not smaller than 68° and not greater than 72°. This configuration enables more effective switching between polarization modulation and no polarization modulation in a broad bandwidth.

When the extension direction 132A is at an azimuthal angle of 90°, the alignment direction 311X of the liquid crystal molecules 311 near the first substrate 100 with no voltage applied is at an azimuthal angle of 0°, the extension direction 232A is at an azimuthal angle of 160°, the twist angle of the liquid crystal molecules 310 is 70°, and the liquid crystal layer 300 contains negative liquid crystal molecules 310 with no voltage applied between the first electrode 131 and the second electrode 132 and with no voltage applied between the third electrode 231 and the fourth electrode 232 as shown in FIG. 75 to FIG. 77, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with voltage applied between the first electrode 131 and the second electrode 132 and with voltage applied between the third electrode 231 and the fourth electrode 232, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

The pitch of the second electrode 132 provided with the slits 132S is preferably not smaller than 1 μm and not greater than 5 μm. Such a small pitch enables more uniform change in alignment of the liquid crystal molecules 310, enabling excellent modulation properties. Also, the pitch of the fourth electrode 232 provided with the slits 232S is preferably not smaller than 1 μm and not greater than 5 μm. This configuration enables more uniform change in alignment of the liquid crystal molecules 310, enabling excellent modulation properties.

The liquid crystal molecules 310 in the present embodiment are negative liquid crystal molecules 310. This configuration can apply a high vertical voltage between the first substrate 100 and the second substrate 200 to tilt the negative liquid crystal molecules 310 and horizontally align them. In the first state and the second state, the voltage difference between the electrodes including the first electrode 131 and the second electrode 132 and the electrodes including the third electrode 231 and the fourth electrode 232 is preferably not smaller than 1 V, more preferably not smaller than 3 V, still more preferably not smaller than 4 V. This configuration enables more effective horizontal alignment of the liquid crystal molecules 310. There is no upper limit of the voltage difference between the electrodes including the first electrode 131 and the second electrode 132 and the electrodes including the third electrode 231 and the fourth electrode 232. Yet, the voltage difference between the electrodes including the first electrode 131 and the second electrode 132 and the electrodes including the third electrode 231 and the fourth electrode 232 is, for example, not greater than 7 V. The voltage difference between the electrodes including the first electrode 131 and the second electrode 132 and the electrodes including the third electrode 231 and the fourth electrode 232 is preferably not smaller than 1 V and not greater than 7 V, more preferably not smaller than 3 V and not greater than 7 V, still more preferably not smaller than 4 V and not greater than 7 V.

In addition, a low voltage can be applied between the pixel electrode and the common electrode, namely between the first electrode 131 and the second electrode 132 and between the third electrode 231 and the fourth electrode 232, to control the in-plane alignment azimuth of the liquid crystal molecules 310. The liquid crystal molecules 310, when they are negative liquid crystal molecules, are aligned in the extension direction of the slits 132S and 232S (the direction perpendicular to the electric fields) in the plane. Generation of strong horizontal electric fields under such conditions would distort the twisted alignment of liquid crystals provided by the chiral dopant. Thus, preferably, weak horizontal electric fields are generated.

When the voltage difference between the electrodes including the first electrode 131 and the second electrode 132 and the electrodes including the third electrode 231 and the fourth electrode 232 is not greater than 7 V, for example, the voltage difference between the first electrode 131 and the second electrode 132 in the first state is preferably not greater than 0.6 V. Also, the voltage difference between the third electrode 231 and the fourth electrode 232 in the first state is preferably not greater than 0.6 V. There is no lower limit of the voltage difference between the first electrode 131 and the second electrode 132 in the first state. Yet, the voltage difference between the first electrode 131 and the second electrode 132 in the first state is, for example, not smaller than 0.01 V. Also, there is no lower limit of the voltage difference between the third electrode 231 and the fourth electrode 232 in the first state. Yet, the voltage difference between the third electrode 231 and the fourth electrode 232 in the first state is, for example, not smaller than 0.01 V.

The voltage difference between the first electrode 131 and the second electrode 132 in the first state is preferably not smaller than 0.01 V and not greater than 0.6 V. The voltage difference between the third electrode 231 and the fourth electrode 232 in the first state is preferably not smaller than 0.01 V and not greater than 0.6 V.

The voltage difference between the first electrode 131 and the second electrode 132 in the second state is preferably not greater than 2 V. The voltage difference between the third electrode 231 and the fourth electrode 232 in the second state is preferably not greater than 2 V. There is no lower limit of the voltage difference between the first electrode 131 and the second electrode 132 in the second state. Yet, the voltage difference between the first electrode 131 and the second electrode 132 in the second state is, for example, not smaller than 0.7 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 0.7 V.

The voltage difference between the first electrode 131 and the second electrode 132 in the second state is preferably not smaller than 0.7 V and not greater than 2 V. The voltage difference between the third electrode 231 and the fourth electrode 232 in the second state is preferably not smaller than 0.7 V and not greater than 2 V.

The first vertical alignment film 414 and the second vertical alignment film 424 can be the same as those in Embodiment 5. The optical element of the present embodiment includes a vertical alignment film on the substrate on each side, and thus is more production-friendly than an optical element including a horizontal alignment film.

Modified Example of Embodiment 12

In Embodiment 12, in the first state and the second state, the voltage difference between the electrodes including the first electrode 131 and the second electrode 132 and the electrodes including the third electrode 231 and the fourth electrode 232 is preferably not smaller than 8 V. This configuration enables more effective horizontal alignment of the liquid crystal molecules 310. There is no upper limit of the voltage difference between the electrodes including the first electrode 131 and the second electrode 132 and the electrodes including the third electrode 231 and the fourth electrode 232. Yet, the voltage difference between the electrodes including the first electrode 131 and the second electrode 132 and the electrodes including the third electrode 231 and the fourth electrode 232 is, for example, not greater than 20 V. Preferably, the voltage difference between the electrodes including the first electrode 131 and the second electrode 132 and the electrodes including the third electrode 231 and the fourth electrode 232 is not smaller than 8 V and not greater than 20 V.

When the voltage difference between the electrodes including the first electrode 131 and the second electrode 132 and the electrodes including the third electrode 231 and the fourth electrode 232 is not smaller than 8 V, for example, the voltage difference between the first electrode 131 and the second electrode 132 in the first state is preferably not greater than 2 V. Also, the voltage difference between the third electrode 231 and the fourth electrode 232 in the first state is preferably not greater than 2 V. There is no lower limit of the voltage difference between the first electrode 131 and the second electrode 132 in the first state. Yet, the voltage difference between the first electrode 131 and the second electrode 132 in the first state is, for example, not smaller than 0.01 V. Also, there is no lower limit of the voltage difference between the third electrode 231 and the fourth electrode 232 in the first state. Yet, the voltage difference between the third electrode 231 and the fourth electrode 232 in the first state is, for example, not smaller than 0.01 V.

The voltage difference between the first electrode 131 and the second electrode 132 in the first state is preferably not smaller than 0.01 V and not greater than 2 V. The voltage difference between the third electrode 231 and the fourth electrode 232 in the first state is preferably not smaller than 0.01 V and not greater than 2 V.

The voltage difference between the first electrode 131 and the second electrode 132 in the second state is preferably not greater than 3 V. Also, the voltage difference between the third electrode 231 and the fourth electrode 232 in the second state is preferably not greater than 3 V. There is no lower limit of the voltage difference between the first electrode 131 and the second electrode 132 in the second state. Yet, the voltage difference between the first electrode 131 and the second electrode 132 in the second state is, for example, not smaller than 1.1 V. Also, there is no lower limit of the voltage difference between the third electrode 231 and the fourth electrode 232 in the second state. Yet, the voltage difference between the third electrode 231 and the fourth electrode 232 in the second state is, for example, not smaller than 1.1 V.

The voltage difference between the first electrode 131 and the second electrode 132 in the second state is preferably not smaller than 1.1 V and not greater than 3 V. The voltage difference between the third electrode 231 and the fourth electrode 232 in the second state is preferably not smaller than 1.1 V and not greater than 3 V.

Application of voltage as in the present modified example also tilts the liquid crystal molecules 310 near the interfaces, leading to a sHWP with a wide viewing angle range. At this time, the cell thickness, twist pitch, and angle of the phase difference film can be varied as appropriate.

Embodiment 13

The features unique to the present embodiment are mainly described here, and description of the matters already described in Embodiments 1 to 12 and the modified examples thereof is omitted. In the present embodiment, a varifocal element including the optical element (sHWP) of any of Embodiments 9 to 12 and the modified examples thereof is described.

As in Embodiment 7, the optical element (sHWP) of any of Embodiments 9 to 12 and the modified examples thereof in combination with the PB lens 20 can define a varifocal element 30.

Modified Example of Embodiment 13

As in Modified Example 1 of Embodiment 7, an in-cell varifocal element 30 is described in which the PB lens 20 in Embodiment 13 is disposed in the optical element 10. In the present modified example, description of the matters already described in Modified Example 1 of Embodiment 7 is omitted.

Figure 78:
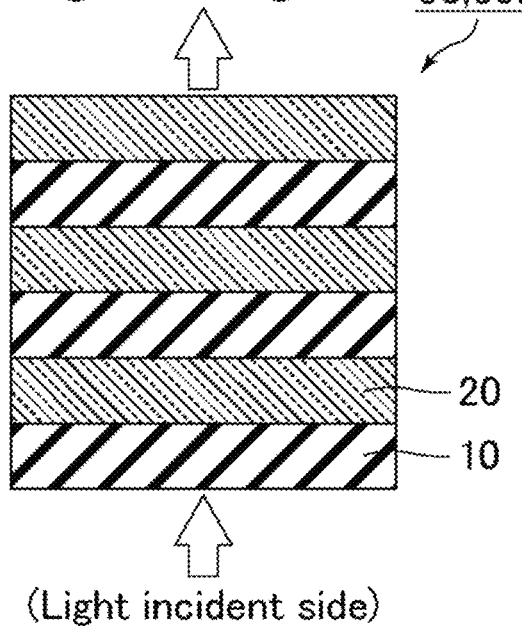
FIG. 78 is a schematic cross-sectional view of a varifocal element of a modified example of Embodiment 13.
Figure 79:
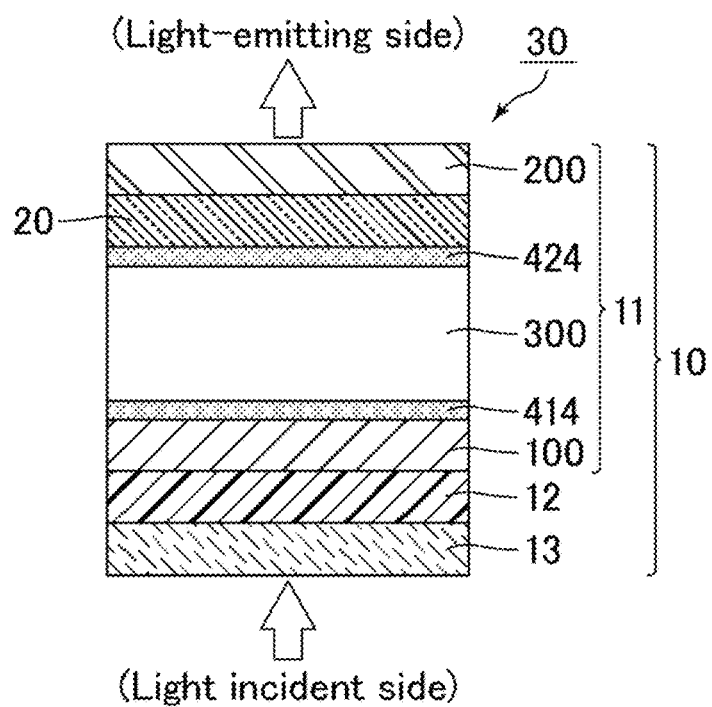
FIG. 79 is an enlarged schematic cross-sectional view of the varifocal element of the modified example of Embodiment 13.
Figure 80:
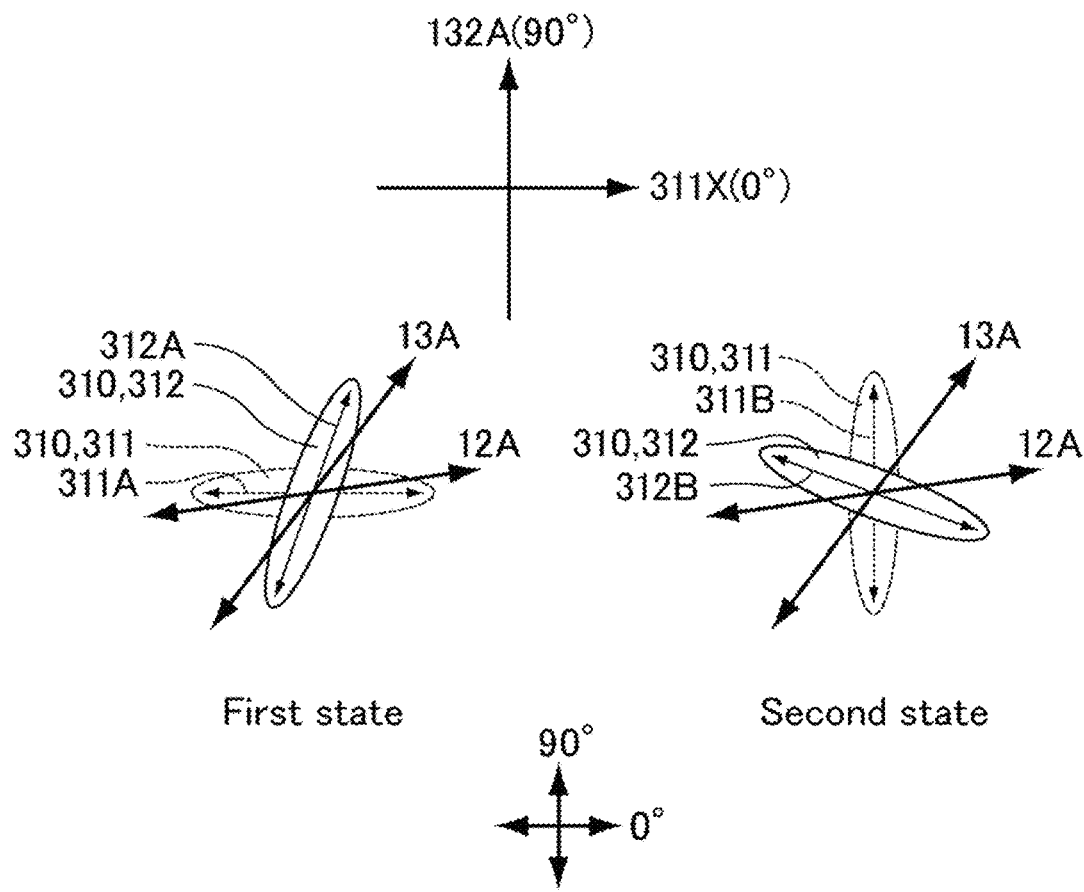
FIG. 80 includes schematic views showing the alignments of liquid crystal molecules in the first state and the second state in the optical element of the modified example of Embodiment 13.

FIG. 78 is a schematic cross-sectional view of a varifocal element of a modified example of Embodiment 13. FIG. 79 is an enlarged schematic cross-sectional view of the varifocal element of the modified example of Embodiment 13. FIG. 80 includes schematic views showing the alignments of liquid crystal molecules in the first state and the second state in the optical element of the modified example of Embodiment 13. The azimuth of the alignment of liquid crystal molecules near the interface of a substrate cannot be defined as the alignment is vertical. The alignment azimuths of such liquid crystal molecules are defined by the electrode directions in FIG. 80.

In the present embodiment, the reference azimuth (0°) is set in the alignment direction 311A of the liquid crystal molecules 311 near the first substrate 100 in the first state projected onto the surface of the substrate closer to the light emitting side of the optical element 10. The alignment direction 311A of the liquid crystal molecules 311 near the first substrate 100 in the first state matches the horizontally right direction on the screen of the liquid crystal cell 11 with the optical element 10 viewed from its light emitting side.

The varifocal element 30 of the present modified example is, as shown in FIG. 78, a varifocal element 30B with multiple focal lengths including not less than 2 stacks each consisting of the optical element 10 and the PB lens 20.

The PB lens 20 in the varifocal element 30 of the present modified example is disposed in the optical element 10 as shown in FIG. 79. Such a structure including the PB lens 20 in the cell eliminates the need for externally providing the PB lens 20, thus enabling a significant reduction of the production cost. The structure also can reduce the thickness of the varifocal element 30. FIG. 78 shows, for convenience, the optical element 10 and the PB lens 20 separately.

The varifocal element 30 of the present modified example specifically includes, sequentially from the light incident side toward the light emitting side, the second quarter-wave film 13; the first quarter-wave film 12; the first substrate 100; the liquid crystal layer 300; the PB lens 20; and the second substrate 200. The varifocal element 30 may include the first vertical alignment film 414 between the first substrate 100 and the liquid crystal layer 300. The varifocal element 30 may also include the second vertical alignment film 424 between the second substrate 200 and the liquid crystal layer 300.

As in Embodiments 9 to 12 and the modified examples thereof, when the first quarter-wave film 12 and the second quarter-wave film 13 are stacked on the light emitting side of the liquid crystal cell 11, in the first state, circularly polarized light (for example, right-handed circularly polarized light) incident on the optical element 10 first enters the liquid crystal cell 11 to be converted to first linearly polarized light. The first linearly polarized light enters the first quarter-wave film 12 and the second quarter-wave film 13 to be converted to circularly polarized light (for example, left-handed circularly polarized light). In the second state, circularly polarized light (for example, right-handed circularly polarized light) incident on the optical element 10 first enters the liquid crystal cell 11 to be converted to second linearly polarized light. The second linearly polarized light enters the first quarter-wave film 12 and the second quarter-wave film 13 to be converted to circularly polarized light (for example, right-handed circularly polarized light).

Meanwhile, as in the present modified example, when the first quarter-wave film 12 and the second quarter-wave film 13 are stacked on the light incident side of the liquid crystal cell 11, in the first state, circularly polarized light (for example, right-handed circularly polarized light) incident on the optical element 10 first enters the first quarter-wave film 12 and the second quarter-wave film 13 to be converted to linearly polarized light. The linearly polarized light enters the liquid crystal cell 11 to be converted to first circularly polarized light (for example, left-handed circularly polarized light). In the second state, circularly polarized light (for example, right-handed circularly polarized light) incident on the optical element 10 enters the first quarter-wave film 12 and the second quarter-wave film 13 to be converted to linearly polarized light. The linearly polarized light enters the liquid crystal cell 11 to be converted to second circularly polarized light (for example, right-handed circularly polarized light).

The present modified example is described based on an exemplary case where the optical element 10 used is the optical element of Embodiment 9. When the extension direction 132A is at an azimuthal angle of 90°, the alignment direction 311X of the liquid crystal molecules 311 near the first substrate 100 with no voltage applied is at an azimuthal angle of 0°, the twist angle of the liquid crystal molecules 310 is 70°, and the liquid crystal layer 300 contains negative liquid crystal molecules 310 with voltage lower than the threshold applied between the first electrode 131 and the second electrode 132 and with voltage not lower than the threshold applied between the solid electrode 240 and the electrodes including the first electrode 131 and the second electrode 132 as shown in FIG. 78 to FIG. 80, the first state can be achieved where the alignment direction 311A of the liquid crystal molecules 311 near the first substrate 100 is at an azimuthal angle of 0° and the alignment direction 312A of the liquid crystal molecules 312 near the second substrate 200 is at an azimuthal angle of 70°. Also, with voltage not lower than the threshold applied between the first electrode 131 and the second electrode 132 and with voltage not lower than the threshold applied between the solid electrode 240 and the electrodes including the first electrode 131 and the second electrode 132, the second state can be achieved where the alignment direction 311B of the liquid crystal molecules 311 near the first substrate 100 is at an azimuthal angle of 90° and the alignment direction 312B of the liquid crystal molecules 312 near the second substrate 200 is at an azimuthal angle of 160°.

As shown in FIG. 80, when the alignment direction 311A of the liquid crystal molecules 311 near the first substrate 100 in the first state is at an azimuthal angle of 0°, the slow axis of the first quarter-wave film 12 or the second quarter-wave film 13, whichever is closer to the light emitting side (in the present modified example, the slow axis 12A of the first quarter-wave film 12), is preferably at an azimuthal angle of not smaller than −2° and not greater than 18°. This configuration enables switching between polarization modulation and no polarization modulation in a broader bandwidth.

As shown in FIG. 80, when the alignment direction 311A of the liquid crystal molecules 311 near the first substrate 100 in the first state is at an azimuthal angle of 0°, the slow axis of the first quarter-wave film 12 or the second quarter-wave film 13, whichever is farther from the light emitting side (in the present modified example, the slow axis 13A of the second quarter-wave film 13), is preferably at an azimuthal angle of not smaller than 38° and not greater than 58°. This configuration enables switching between polarization modulation and no polarization modulation in a broader bandwidth.

Figure 81:
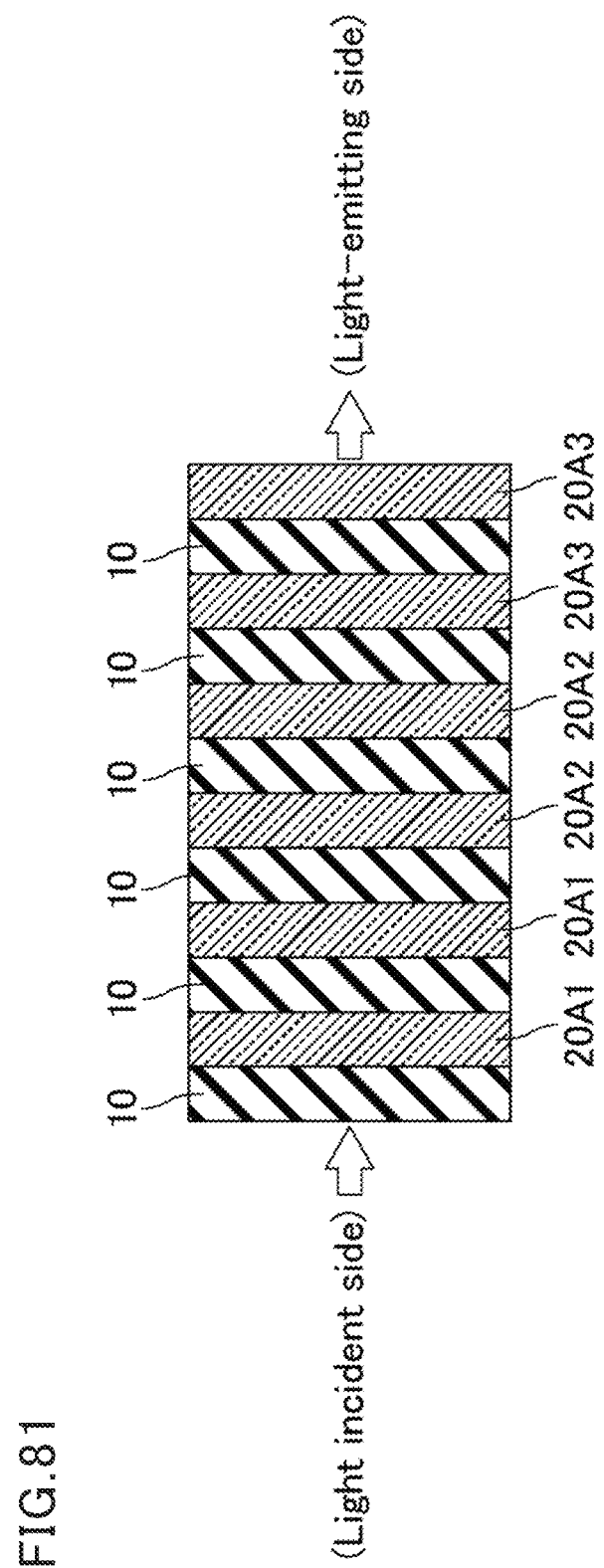
FIG. 81 is a schematic cross-sectional view showing the detailed structure of the varifocal element of the modified example of Embodiment 13.

FIG. 81 is a schematic cross-sectional view showing the detailed structure of the varifocal element of the modified example of Embodiment 13. As shown in FIG. 81, the varifocal element 30 includes, sequentially from the light incident side toward the light emitting side, an optical element 10, a first PB lens 20A1, an optical element 10, another first PB lens 20A1, another optical element 10, a second PB lens 20A2, another optical element 10, another second PB lens 20A2, another optical element 10, a third PB lens 20A3, another optical element 10, and another third PB lens 20A3.

The first PB lenses 20A1 each have a diopter D of ±0.25. The second PB lenses 20A2 each have a diopter D of ±0.5. The third PB lenses 20A3 each have a diopter D of ±1. Each lens causes incident right-handed circularly polarized light to converge (+) while causing incident left-handed circularly polarized light to diverge (−).

The following Table 2 shows the states of the optical elements 10 and the PB lenses 20A1, 20A2, and 20A3 in the varifocal element 30 of the modified example of Embodiment 13 in each mode.

TABLE 2

|  | F0 | F1 | F −2.5 |
| --- | --- | --- | --- |
| Optical element | Second state | Second state | First state |
| First PB lens | 0.25D | 0.25D | −0.25D |
| Optical element | Second state | Second state | First state |
| First PB lens | −0.25D | −0.25D | −0.25D |
| Optical element | Second state | Second state | Second state |
| Second PB lens | 0.5D | 0.5D | 0.5D |
| Optical element | Second state | First state | Second state |
| Second PB lens | −0.5D | 0.5D | −0.5D |
| Optical element | Second state | Second state | First state |
| Third PB lens | 1D | −1D | −1D |
| Optical element | Second state | Second state | First state |
| Third PB lens | −1D | 1D | −1D |
| Emission | 0D | 1D | −2.5D |

The F0 mode is described with reference to Table 2. This mode sets all the optical elements 10 in the second state (no modulation). Right-handed circularly polarized light entering the primary optical element 10 undergoes no modulation and enters the primary first PB lens 20A1 in the same state. The light here converges due to the lens power 0.25 D. The exiting light is converted to left-handed circularly polarized light. Causing such a change in direction of circularly polarized light passing through a PB lens 20 is the feature of the PB lens 20. Since the optical elements 10 provide no modulation, the left-handed circularly polarized light passes through the secondary optical element 10 as is. The light entering the secondary first PB lens 20A1 diverges due to the lens power −0.25 D. The incident light therefore passes through the primary four lenses from the light incident side (optical element 10, first PB lens 20A1, optical element 10, and first PB lens 20A1) as is. The light then passes through the subsequent second PB lenses 20A2 and third PB lenses 20A3 in the same manner and exists as emission light in the same state as the incident light, so that the varifocal element has power 0 D.

The F1 mode is described with reference to Table 2. In this mode, only the quaternary optical element 10 from the light incident side is set in the first state. In this mode, after passing through the primary second PB lens 20A2, the light is left-handed circularly polarized light due to the lens power 0.5 D as in the F0 mode. The light is then converted to right-handed circularly polarized light by the optical element in the first state. The light then passes through the secondary second PB lens 20A2 with power +0.5 D and thus emitted as left-handed circularly polarized light due to the total lens power 1 D. The light is emitted as the same left-handed circularly polarized light, so that the varifocal element has power 1 D. The light is converted to left-handed circularly polarized light by the secondary second PB lens 20A2, and thus the third PB lenses 20A3 have a power with the opposite sign from those in the F0 mode.

Figure 82:
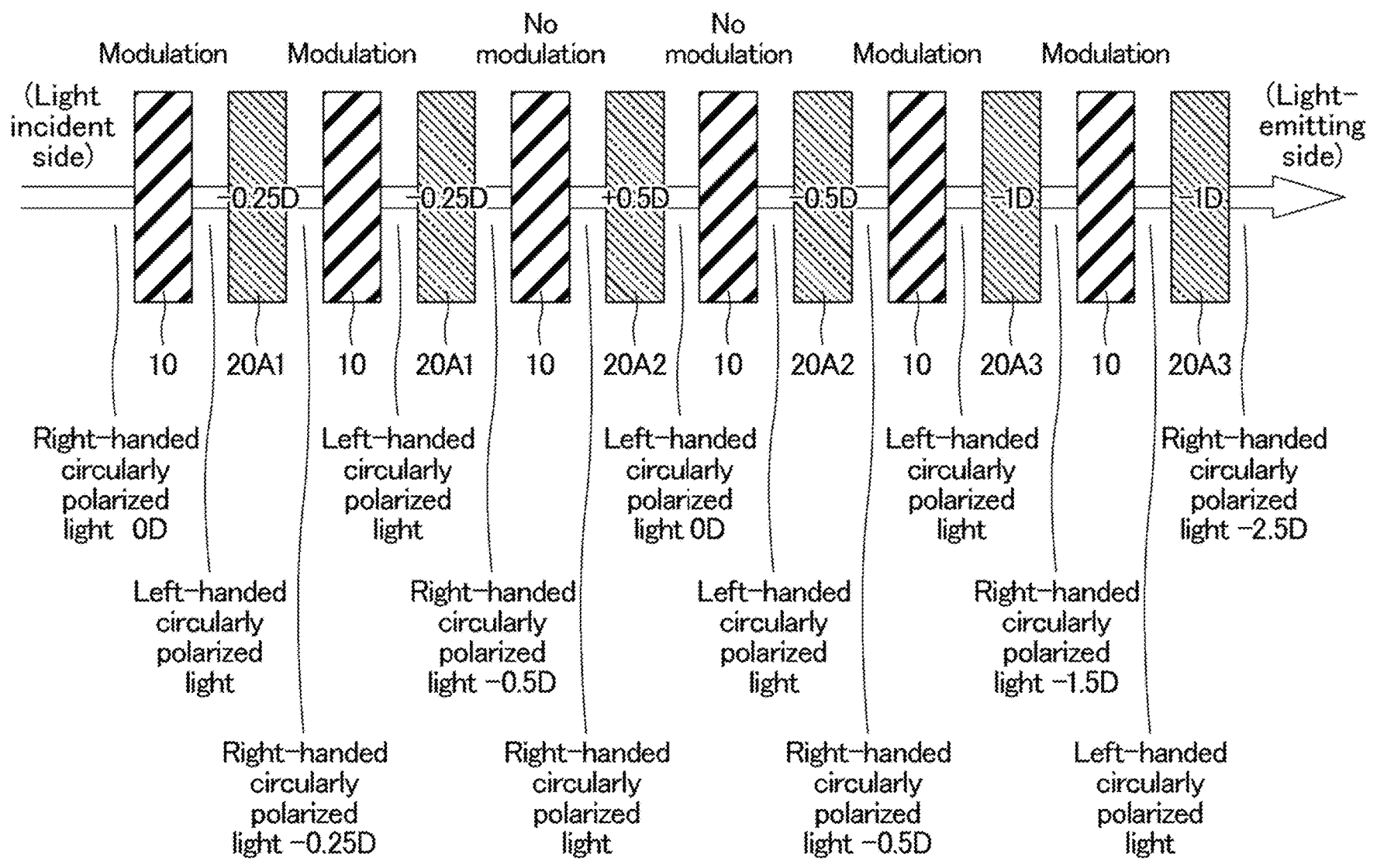

The F-2.5 mode is described with reference to Table 2 and FIG. 82. FIG. 82 shows the polarization states in the F-2.5 mode in the varifocal element of the modified example of Embodiment 13. As shown in Table 2 and FIG. 82, in the F-2.5 mode, the light is converted to right-handed circularly polarized light by the primary four lenses from the light incident side with power −0.5 D (optical element 10, first PB lens 20A1, optical element 10, and first PB lens 20A1). The light passes through the last four lenses on the light emitting side with power −2D (optical element 10, third PB lens 20A3, optical element 10, and third PB lens 20A3), so that the light is emitted as right-handed circularly polarized light due to the total lens power −2.5 D.

In addition, based on the same principle, the optical element 10 to be in the modulation first state can be varied to achieve multiple focal distances. The present modified example selectively shows only the three conditions.

In Embodiment 13 and the present modified example, PB lenses in the form of film (in-cell polymer lenses) are used. Yet, a PB lens itself may be formed using a liquid crystal layer as in Modified Example 1 of Embodiment 7.

Embodiment 14

The features unique to the present embodiment are mainly described here, and description of the matters already described in Embodiments 1 to 13 and the modified examples thereof is omitted. In the present embodiment, a head mounted display including the varifocal element 30 of Embodiment 13 or the modified example thereof is described.

As in Embodiment 8, a head mounted display 1 of the present embodiment includes the display panel 1P that displays images, the phase difference plate 40, and the varifocal element 30. The head mounted display 1 causes light emitted from the display panel 1P, such as a liquid crystal display device or an organic electroluminescent display device, to be converted to circularly polarized light through the phase difference plate 40, to pass through the varifocal element 30, and to be perceived by the user U.

EXAMPLES

The effects of the present invention are described below with reference to examples and comparative examples. The present invention is not limited to these examples.

Example 1

An optical element 10 of Example 1 having the same configuration as in Embodiment 1 was produced. The optical element 10 of Example 1 included, sequentially from the light incident side toward the light emitting side, the liquid crystal cell 11, a quarter-wave film exhibiting reverse wavelength dispersion as the first quarter-wave film 12, and a quarter-wave film exhibiting flat wavelength dispersion as the second quarter-wave film 13. The slow axis of the quarter-wave film exhibiting reverse wavelength dispersion (slow axis 12A of the first quarter-wave film 12) was at an azimuthal angle of 57.2°. The slow axis of the quarter-wave film exhibiting flat wavelength dispersion (slow axis 13A of the second quarter-wave film 13) was at an azimuthal angle of 12.2°. The optical element 10 of Example 1 was specifically produced by the following procedure.

The first substrate 100 including the first comb-teeth electrode 120 and the second substrate 200 including the second comb-teeth electrode 220 were prepared. The electrode direction of the first substrate 100 (extension direction 120A of the first comb-teeth electrode 120) and the electrode direction of the second substrate 200 (extension direction 220A of the second comb-teeth electrode 220) formed the angle shown in FIG. 5 when the substrates were attached to each other. Photo-spacers of 3.6 μm in height were arranged near the second substrate 200.

Polymethyl methacrylate (PMMA) films were then formed, one on the first substrate 100 including the first comb-teeth electrode 120 and the other on the second substrate 200 including the second comb-teeth electrode 220. A sealing material was drawn on the second substrate 200. The first substrate 100 and the second substrate 200 were attached to each other with a liquid crystal material in between, so that the liquid crystal cell 11 was produced.

The liquid crystal material used was a mixture of liquid crystal molecules having a positive anisotropy of dielectric constant ($\Delta n=0.066$), 5 wt % dodecyl acrylate (C12A), and a chiral dopant S-811. The concentration of the chiral dopant was set such that the twist angle between the upper and lower substrates in the liquid crystal cell would be 70°.

The liquid crystal cell 11 was heated to the isotropic phase and then cooled to room temperature while voltage was applied to the first substrate 100 to produce the uniform horizontal alignment liquid crystal cell 11 including the first weak anchoring horizontal alignment film 411 and the second weak anchoring horizontal alignment film 421. To the liquid crystal cell 11 obtained above were attached the quarter-wave film exhibiting reverse wavelength dispersion (first quarter-wave film 12) and the quarter-wave film exhibiting flat wavelength dispersion (second quarter-wave film 13). Thus, the optical element (sHWP element) 10 of Example 1 was produced.

Figure 33:
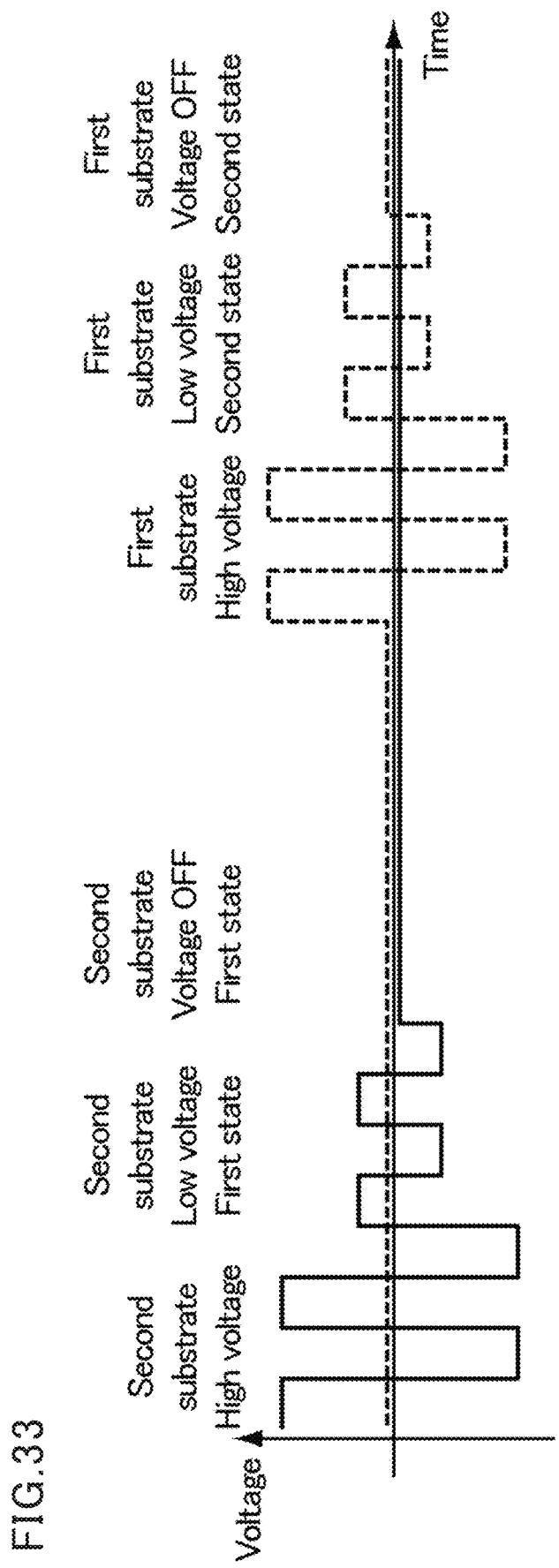
FIG. 33 is a graph of voltage applied to an optical element of Example 1.

FIG. 33 is a graph of voltage applied to an optical element of Example 1. When voltage was applied to the second substrate 200 in the optical element 10 of Example 1 as shown in FIG. 33, the horizontal electric fields near the second substrate 200 aligned the liquid crystal molecules 312 near the second substrate 200 in the 70° direction as shown in FIG. 3 and FIG. 4. Lowering the voltage applied to the second substrate 200 (not to zero) allowed the twisting force of the chiral dopant added to the liquid crystal material to slide the liquid crystal molecules 311 near the first substrate 100 and thus align the molecules in the 0° direction, while keeping the liquid crystal molecules 312 near the second substrate 200 aligned in the 70° direction along the electric fields. This state was the first state. The molecules remained in the alignment state in the first state when the voltage was turned off.

Conversely, when voltage was applied to the first substrate 100 and then the voltage was lowered, as shown in FIG. 3 and FIG. 4, the liquid crystal molecules 311 near the first substrate 100 were aligned in the 90° direction (azimuthal angle of 90°) while the liquid crystal molecules 312 near the second substrate 200 were aligned in the 160° direction (azimuthal angle of 160°) under the force of the chiral dopant. This state was the second state. As described above, the optical element 10 of Example 1 successfully switched between the second state and the first state by applying voltage to the first substrate 100 or by applying voltage to the second substrate 200.

As shown in FIG. 5, the first state and the second state were the same in that the alignment was twisted by 70° between the liquid crystal molecules 311 near the first substrate 100 and the liquid crystal molecules 312 near the second substrate 200, but the entire system was rotated by 90° between these states.

For consideration of suitable designs of the liquid crystal cell, the LCD-MASTER 1D available from Shintech, Inc. was used to perform optical calculations for the optical element 10 of Example 1. Hereinafter, based on the simulation results, the range in which 90% or higher modulation (including during no modulation) was achieved at 450 nm to 630 nm was regarded as the preferred range. The graphs mentioned below only show wavelengths of 450 nm and 630 nm for simplification.

Figure 34:
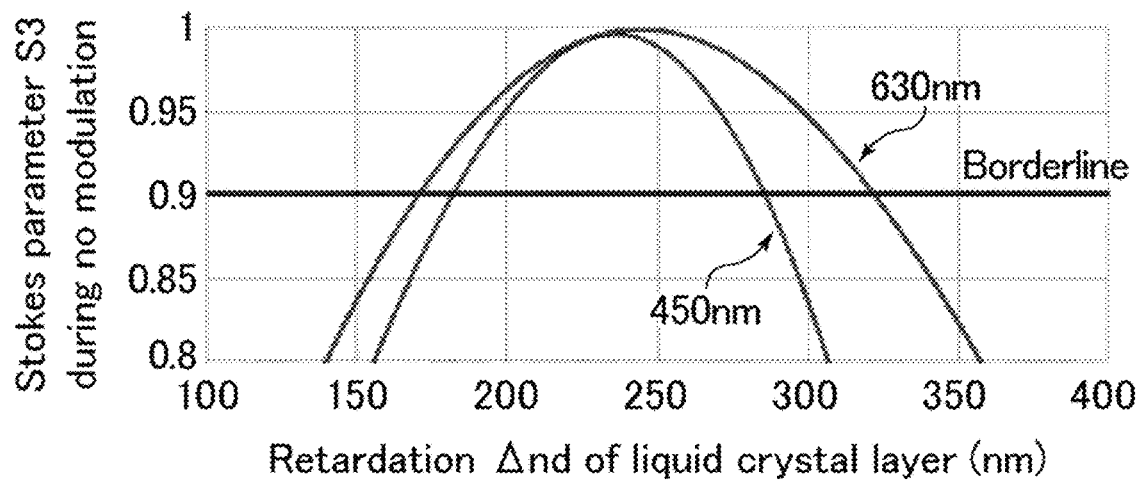
FIG. 34 is a graph of Stokes parameter S3 during no modulation versus retardation introduced by the liquid crystal layer in the optical element of Example 1.
Figure 35:
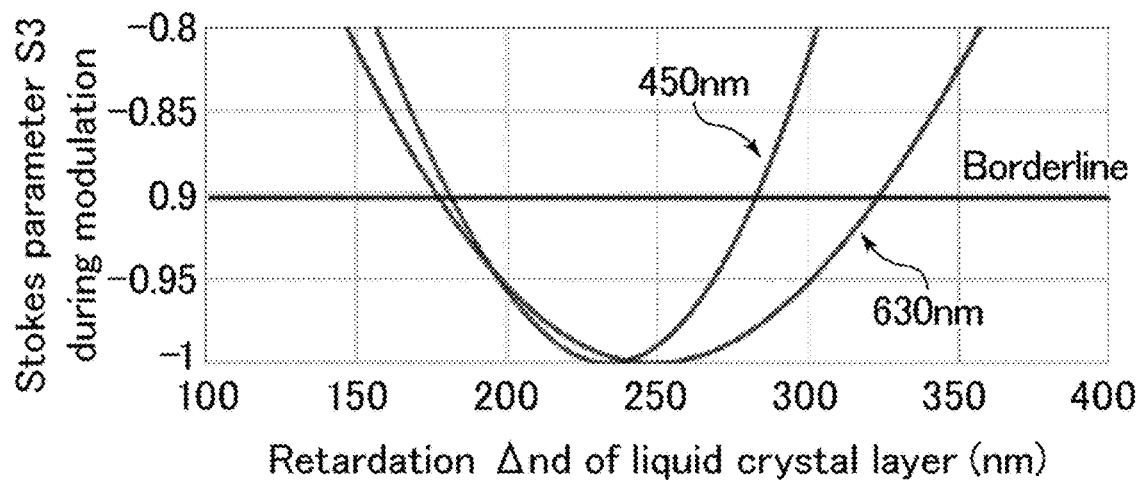
FIG. 35 is a graph of Stokes parameter S3 during modulation versus retardation introduced by the liquid crystal layer in the optical element of Example 1.

First, for determination of the preferred range of the retardation Δnd introduced by the liquid crystal layer 300 at a wavelength of 550 nm with no voltage applied, the wavelength dispersions of Stokes parameter S3 during no modulation and during modulation versus retardation introduced by the liquid crystal layer 300 in the optical element 10 of Example 1 with no voltage applied were simulated. FIG. 34 is a graph of Stokes parameter S3 during no modulation versus retardation introduced by the liquid crystal layer in the optical element of Example 1. FIG. 35 is a graph of Stokes parameter S3 during modulation versus retardation introduced by the liquid crystal layer in the optical element of Example 1.

As shown in FIG. 34 and FIG. 35, the suitable retardation Δnd introduced by the liquid crystal layer 300 at a wavelength of 550 nm with no voltage applied was not less than 180 nm and not more than 280 nm.

Figure 36:
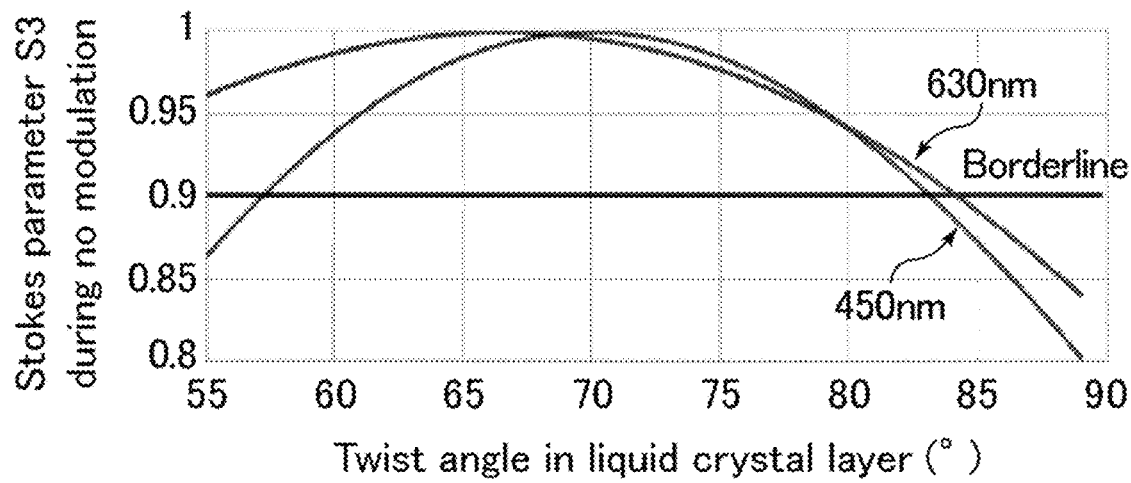
FIG. 36 is a graph of Stokes parameter S3 during no modulation versus twist angle in the liquid crystal layer in the optical element of Example 1.
Figure 37:
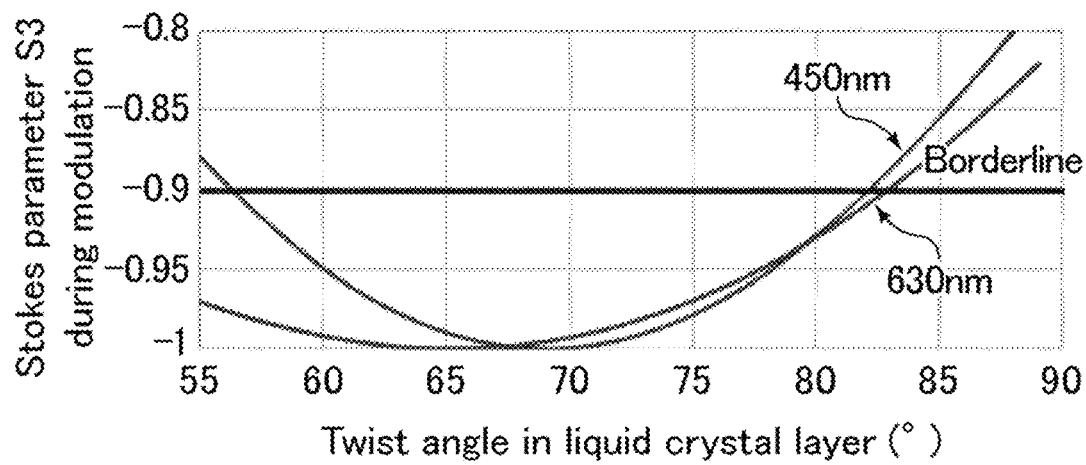
FIG. 37 is a graph of Stokes parameter S3 during modulation versus twist angle in the liquid crystal layer in the optical element of Example 1.

For determination of the preferred range of the twist angle in the liquid crystal layer 300, the wavelength dispersions of Stokes parameter S3 during no modulation and during modulation versus twist angle in the liquid crystal layer 300 in the optical element 10 of Example 1 were simulated. FIG. 36 is a graph of Stokes parameter S3 during no modulation versus twist angle in the liquid crystal layer in the optical element of Example 1. FIG. 37 is a graph of Stokes parameter S3 during modulation versus twist angle in the liquid crystal layer in the optical element of Example 1. As shown in FIG. 36 and FIG. 37, in both the first state and the second state, the suitable twist angle in the liquid crystal layer 300 was not smaller than 57° and not greater than 82°.

Figure 38:
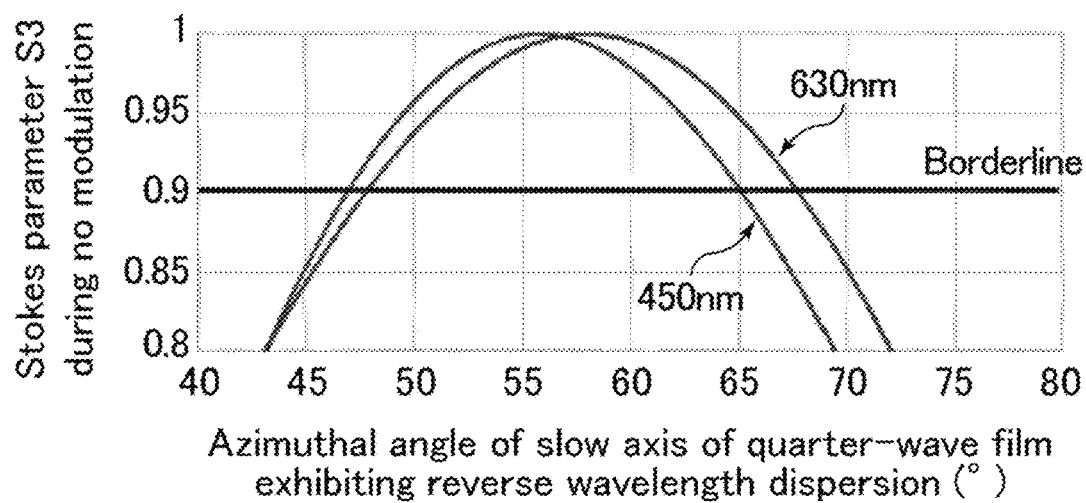
FIG. 38 is a graph of Stokes parameter S3 during no modulation versus azimuthal angle of the slow axis of a quarter-wave film exhibiting reverse wavelength dispersion in the optical element of Example 1.
Figure 39:
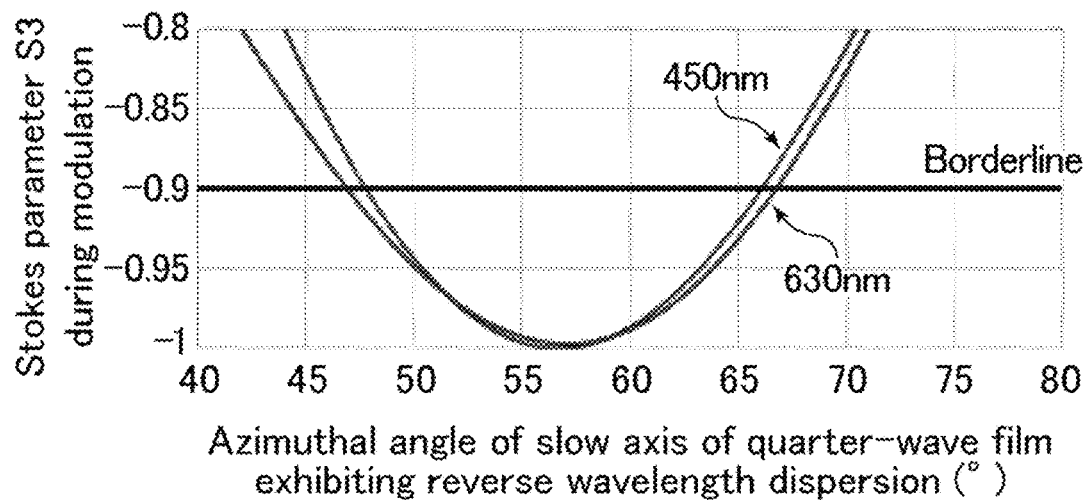
FIG. 39 is a graph of Stokes parameter S3 during modulation versus azimuthal angle of the slow axis of the quarter-wave film exhibiting reverse wavelength dispersion in the optical element of Example 1.

For determination of the preferred range of the azimuthal angle of the slow axis of the quarter-wave film exhibiting reverse wavelength dispersion, the wavelength dispersions of Stokes parameter S3 during no modulation and during modulation versus azimuthal angle of the slow axis of the quarter-wave film exhibiting reverse wavelength dispersion in the optical element 10 of Example 1 were simulated. FIG. 38 is a graph of Stokes parameter S3 during no modulation versus azimuthal angle of the slow axis of a quarter-wave film exhibiting reverse wavelength dispersion in the optical element of Example 1. FIG. 39 is a graph of Stokes parameter S3 during modulation versus azimuthal angle of the slow axis of the quarter-wave film exhibiting reverse wavelength dispersion in the optical element of Example 1. As shown in FIG. 38 and FIG. 39, the preferred azimuthal angle of the slow axis of the quarter-wave film exhibiting reverse wavelength dispersion, which served as the first quarter-wave film 12, was not smaller than 48° and not greater than 66°.

Figure 40:
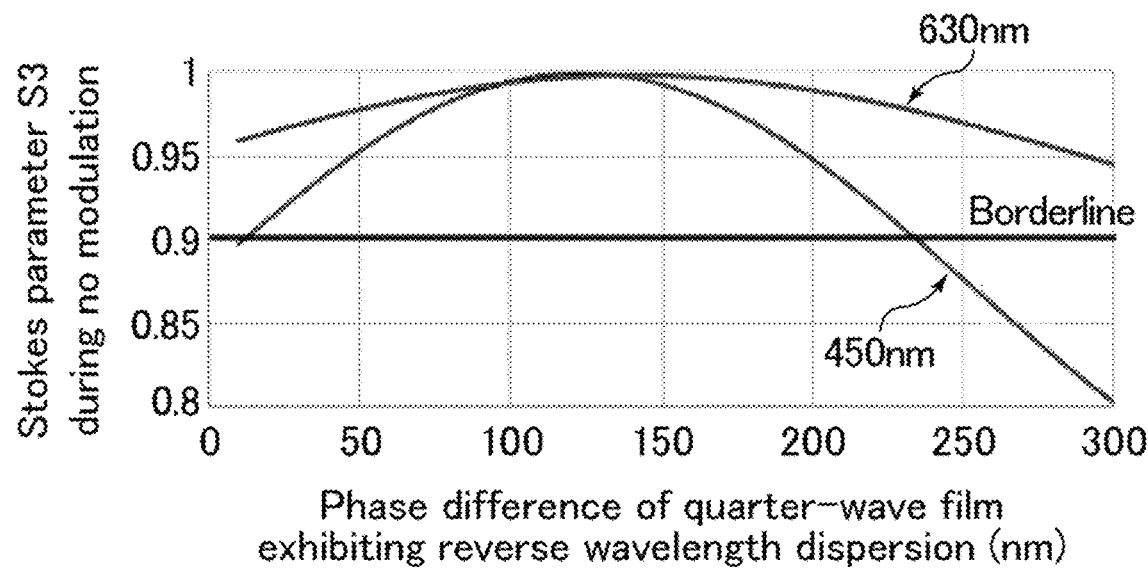
FIG. 40 is a graph of Stokes parameter S3 during no modulation versus phase difference introduced by the quarter-wave film exhibiting reverse wavelength dispersion in the optical element of Example 1.
Figure 41:
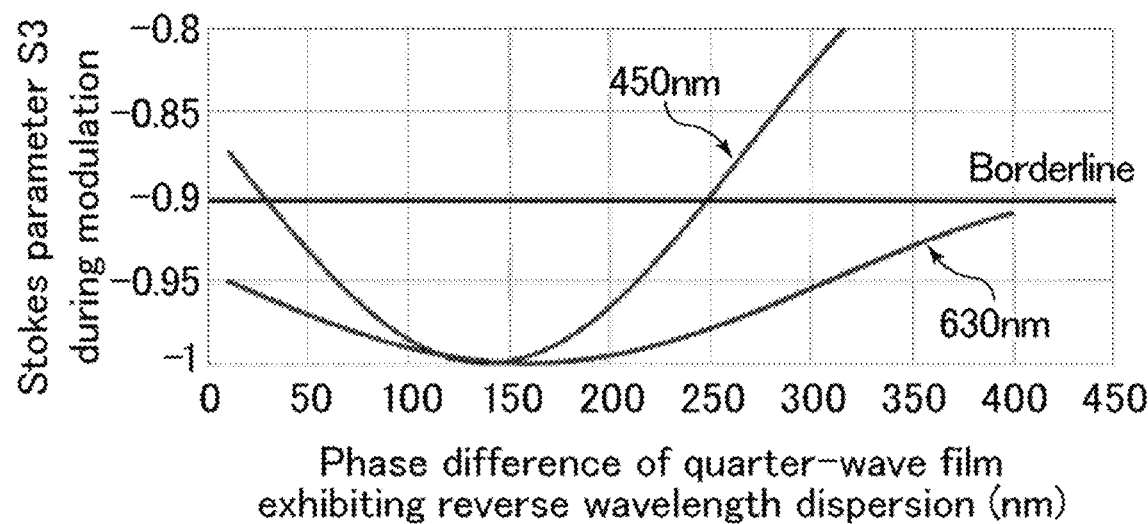
FIG. 41 is a graph of Stokes parameter S3 during modulation versus phase difference introduced by the quarter-wave film exhibiting reverse wavelength dispersion in the optical element of Example 1.

For determination of the preferred range of the phase difference introduced by the quarter-wave film exhibiting reverse wavelength dispersion, the wavelength dispersions of Stokes parameter S3 during no modulation and during modulation versus phase difference introduced by the quarter-wave film exhibiting reverse wavelength dispersion in the optical element of Example 1 were simulated. FIG. 40 is a graph of Stokes parameter S3 during no modulation versus phase difference introduced by the quarter-wave film exhibiting reverse wavelength dispersion in the optical element of Example 1. FIG. 41 is a graph of Stokes parameter S3 during modulation versus phase difference introduced by the quarter-wave film exhibiting reverse wavelength dispersion in the optical element of Example 1. As shown in FIG. 40 and FIG. 41, the preferred phase difference introduced by the quarter-wave film exhibiting reverse wavelength dispersion, which served as the first quarter-wave film 12, was not less than 30 nm and not more than 230 nm.

Figure 42:
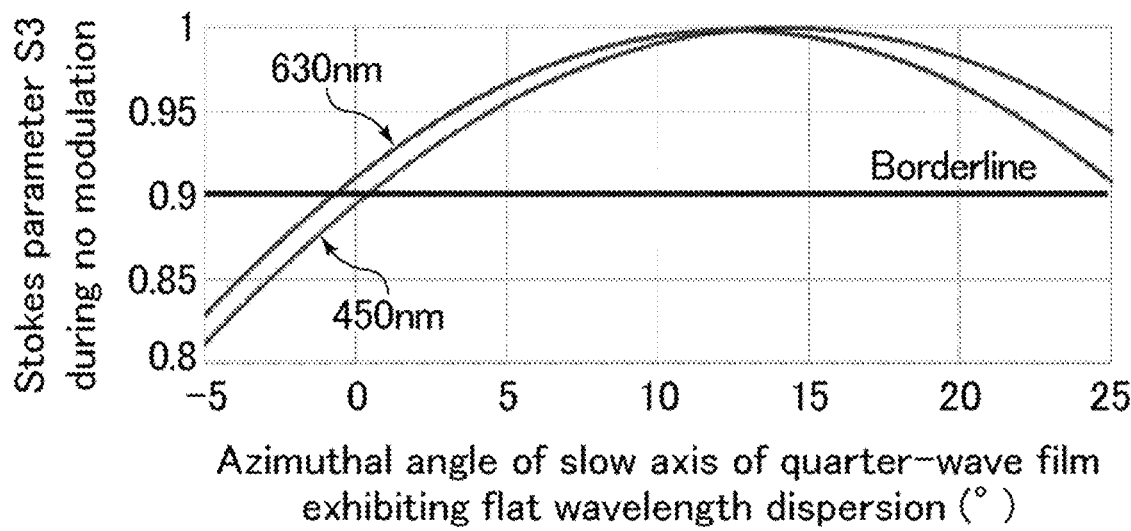
FIG. 42 is a graph of Stokes parameter S3 during no modulation versus azimuthal angle of the slow axis of a quarter-wave film exhibiting flat wavelength dispersion in the optical element of Example 1.
Figure 43:
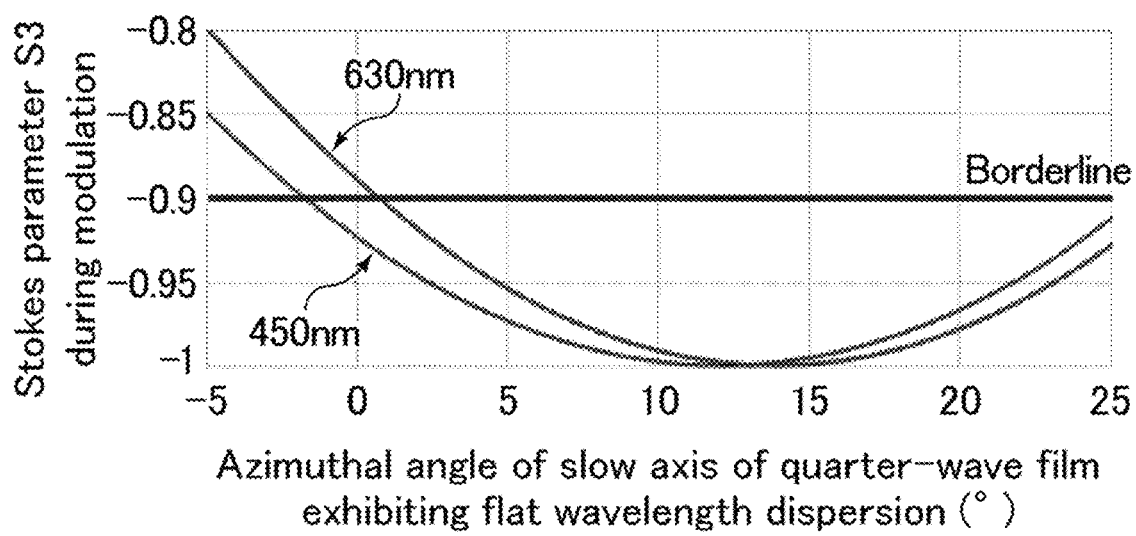
FIG. 43 is a graph of Stokes parameter S3 during modulation versus azimuthal angle of the slow axis of the quarter-wave film exhibiting flat wavelength dispersion in the optical element of Example 1.

For determination of the preferred range of the azimuthal angle of the slow axis of the quarter-wave film exhibiting flat wavelength dispersion, the wavelength dispersions of Stokes parameter S3 during no modulation and during modulation versus azimuthal angle of the slow axis of the quarter-wave film exhibiting flat wavelength dispersion in the optical element 10 of Example 1 were simulated. FIG. 42 is a graph of Stokes parameter S3 during no modulation versus azimuthal angle of the slow axis of a quarter-wave film exhibiting flat wavelength dispersion in the optical element of Example 1. FIG. 43 is a graph of Stokes parameter S3 during modulation versus azimuthal angle of the slow axis of the quarter-wave film exhibiting flat wavelength dispersion in the optical element of Example 1. As shown in FIG. 42 and FIG. 43, the preferred azimuthal angle of the slow axis of the quarter-wave film exhibiting flat wavelength dispersion, which served as the second quarter-wave film 13, was not smaller than 3° and not greater than 22°.

Figure 44:
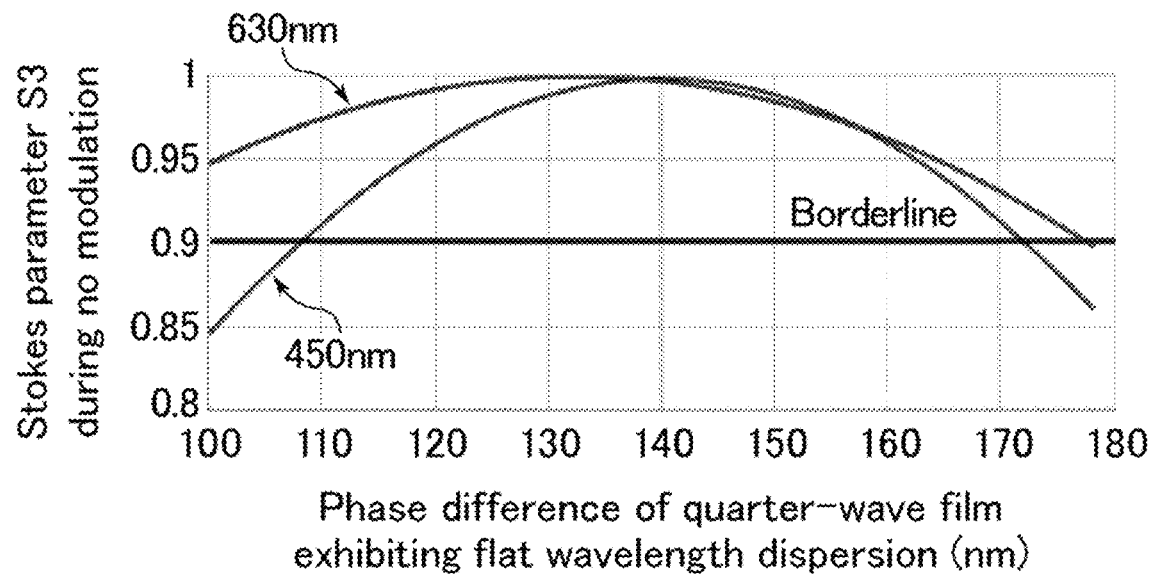
FIG. 44 is a graph of Stokes parameter S3 during no modulation versus phase difference introduced by the quarter-wave film exhibiting flat wavelength dispersion in the optical element of Example 1.
Figure 45:
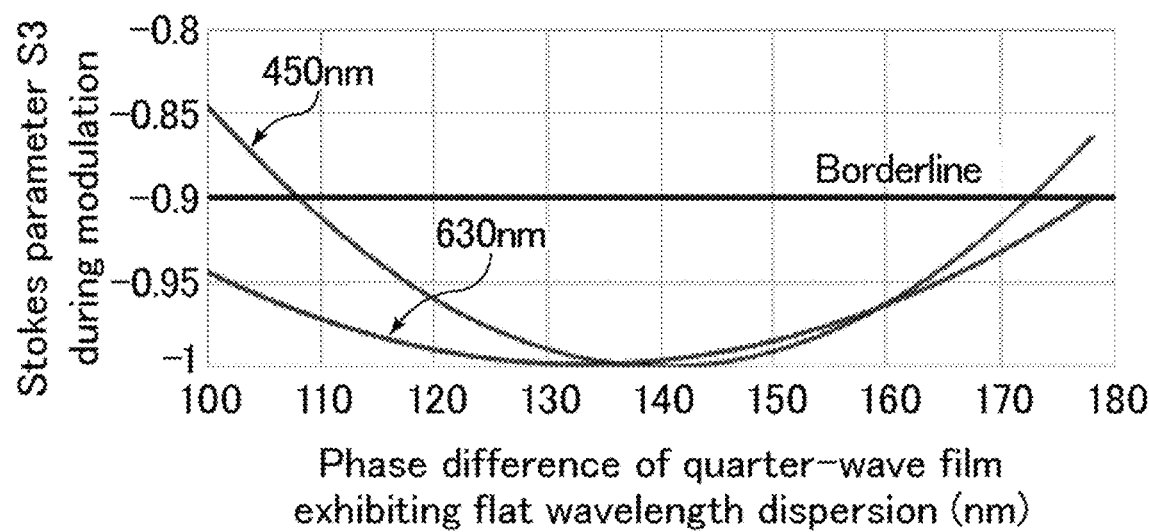
FIG. 45 is a graph of Stokes parameter S3 during modulation versus phase difference introduced by the quarter-wave film exhibiting flat wavelength dispersion in the optical element of Example 1.

For determination of the preferred range of the phase difference introduced by the quarter-wave film exhibiting flat wavelength dispersion, the wavelength dispersions of Stokes parameter S3 during no modulation and during modulation versus phase difference introduced by the quarter-wave film exhibiting flat wavelength dispersion in the optical element 10 of Example 1 were simulated. FIG. 44 is a graph of Stokes parameter S3 during no modulation versus phase difference introduced by the quarter-wave film exhibiting flat wavelength dispersion in the optical element of Example 1. FIG. 45 is a graph of Stokes parameter S3 during modulation versus phase difference introduced by the quarter-wave film exhibiting flat wavelength dispersion in the optical element of Example 1. As shown in FIG. 44 and FIG. 45, the preferred phase difference introduced by the quarter-wave film exhibiting flat wavelength dispersion, which served as the second quarter-wave film 13, was not less than 110 nm and not more than 175 nm.

Comparative Example 1

Figure 46:
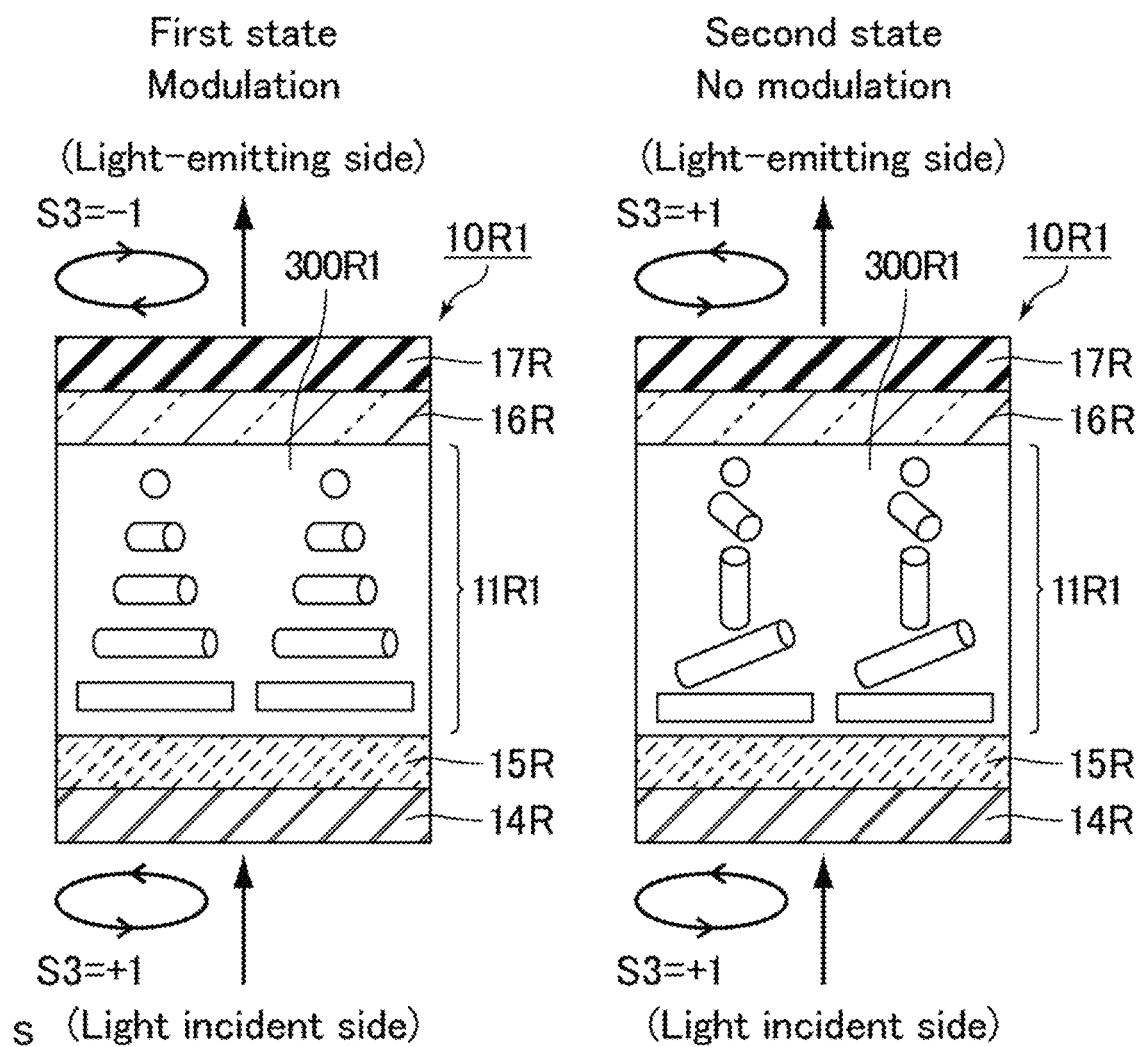
FIG. 46 shows schematic cross-sectional views of an optical element of Comparative Example 1.

FIG. 46 shows schematic cross-sectional views of an optical element of Comparative Example 1. An optical element 10R1 of Comparative Example 1 shown in FIG. 46 was produced. The optical element 10R1 of Comparative Example 1 corresponds to the optical element of Comparative Embodiment 1. The optical element 10R1 of Comparative Example 1 included, sequentially from the light incident side toward the light emitting side, the quarter-wave film 14R whose slow axis was at an azimuthal angle of 75°, the half-wave film 15R whose slow axis was at an azimuthal angle of 15°, the liquid crystal cell 11R1 including a TN liquid crystal layer 300R1 with 90°-twisted alignment, the half-wave film 16R whose slow axis was at an azimuthal angle of −75°, and the quarter-wave film 17R whose slow axis was at an azimuthal angle of −15°.

Comparative Example 2

Figure 47:
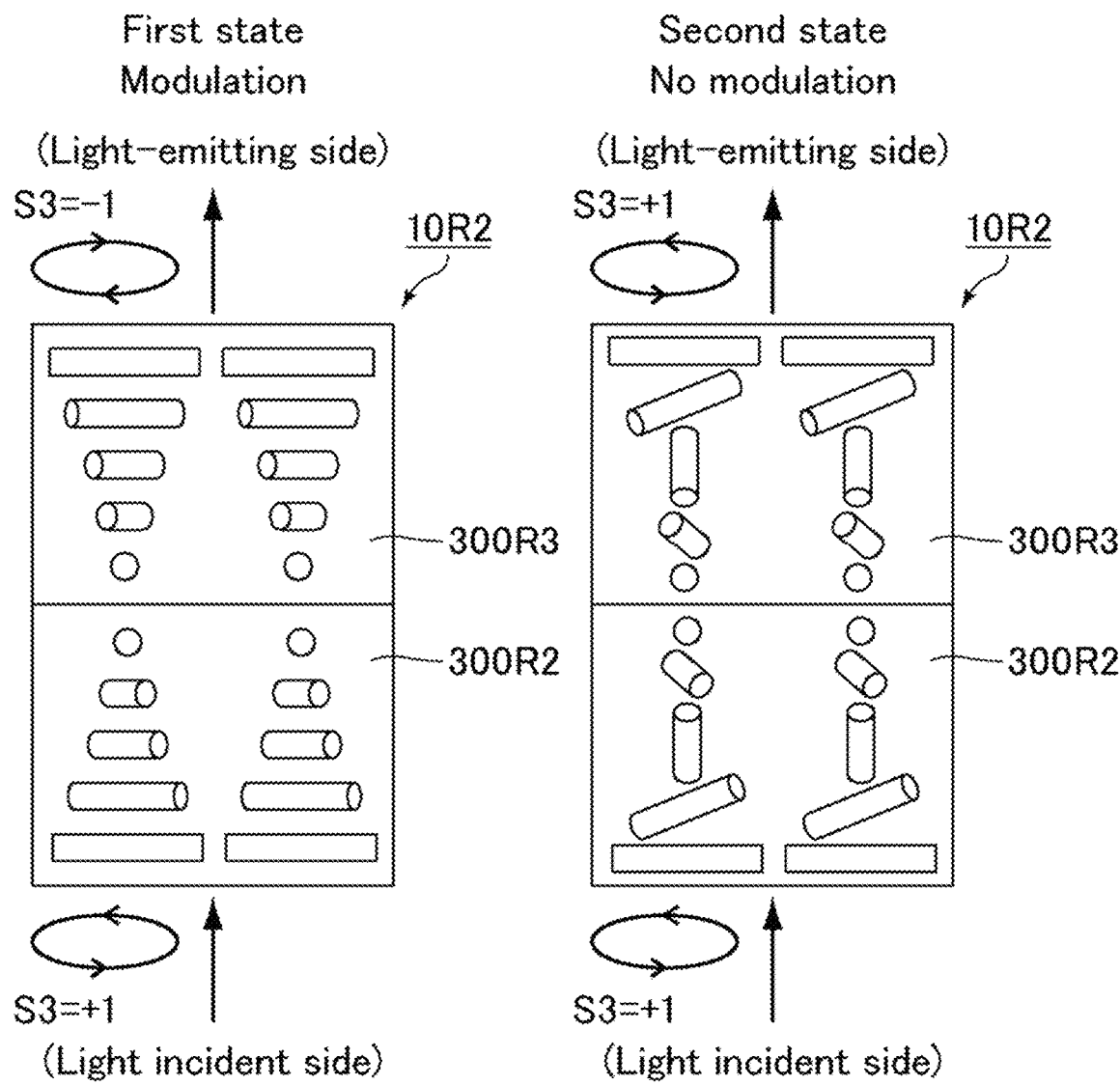
FIG. 47 shows schematic cross-sectional views of an optical element of Comparative Example 2.

FIG. 47 shows schematic cross-sectional views of an optical element of Comparative Example 2. An optical element 10R2 of Comparative Example 2 shown in FIG. 47 was produced. The optical element 10R2 of Comparative Example 2 corresponds to the optical element of Comparative Embodiment 2. The optical element 10R2 of Comparative Example 2 included a stack including, sequentially from the light incident side toward the light emitting side, the TN liquid crystal layer 300R2 with 70°-twisted alignment and the TN liquid crystal layer 300R3 with −70°-twisted alignment.

Evaluation of Example 1, Comparative Example 1, and Comparative Example 2

Figure 48:
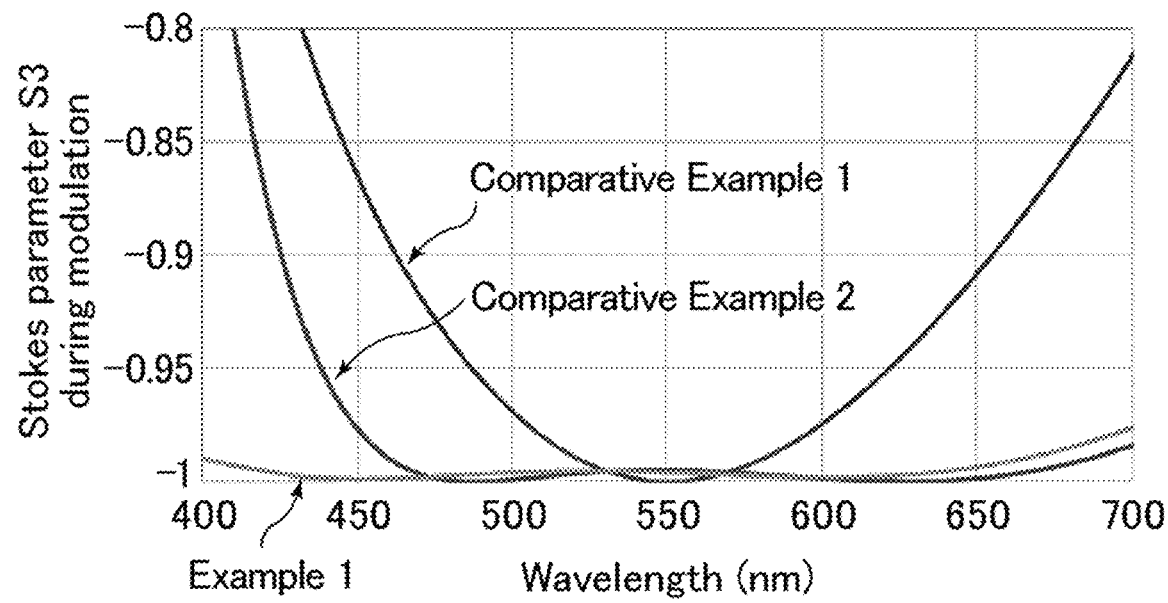
FIG. 48 is a graph showing wavelength dispersion of Stokes parameter S3 during modulation in the optical elements of Example 1, Comparative Example 1, and Comparative Example 2.
Figure 49:
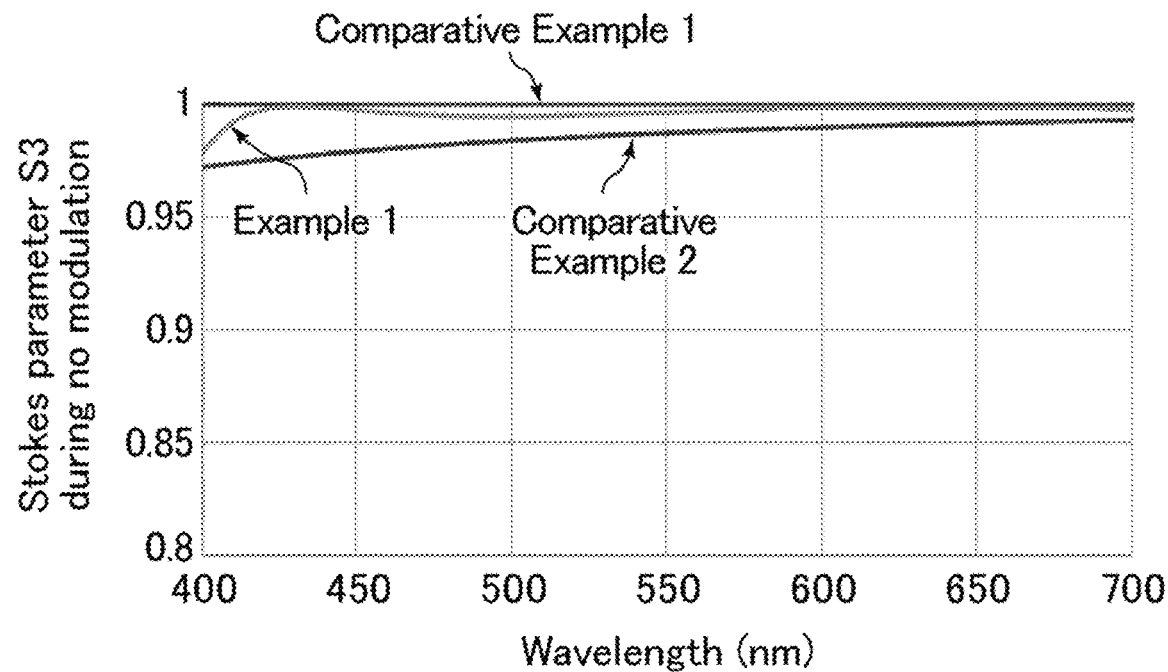
FIG. 49 is a graph showing wavelength dispersion of Stokes parameter S3 during no modulation in the optical elements of Example 1, Comparative Example 1, and Comparative Example 2.

The wavelength dispersion of Stokes parameter S3 of the emission light resulting from right-handed circularly polarized light (S3=+1) incident on each of the optical elements (sHWPs) of Example 1, Comparative Example 1, and Comparative Example 2 is shown in FIG. 48 and FIG. 49. FIG. 48 is a graph showing wavelength dispersion of Stokes parameter S3 during modulation in the optical elements of Example 1, Comparative Example 1, and Comparative Example 2. FIG. 49 is a graph showing wavelength dispersion of Stokes parameter S3 during no modulation in the optical elements of Example 1, Comparative Example 1, and Comparative Example 2.

As shown in FIG. 48, during modulation (during the first state) in Example 1, the emission light exhibited a state with nearly S3=−1 in a broad bandwidth. In other words, light with S3=+1 was successfully modulated to light with S3=−1 (in other words, right-handed circularly polarized light was converted to left-handed circularly polarized light).

Also, as shown in FIG. 49, during no modulation (during second state) in Example 1, the emission light exhibited a state with nearly S3=+1 in a broad bandwidth. In other words, light with S3=+1 was successfully emitted as light with S3=+1 with no modulation (in other words, right-handed circularly polarized light remained as right-handed circularly polarized light).

In contrast, in Comparative Example 1 (one TN layer), the optical element demonstrated excellent performance during no modulation but had a great wavelength dependence during modulation, thus adequately modulated light only in a very narrow bandwidth. In Comparative Example 2 (two TN layers), modulation succeeded in a broader bandwidth but the performance was conversely worse during no modulation than in Comparative Example 1.

Example 2

An optical element 10 of Example 2 having the same configuration as in Embodiment 2 was produced. Specifically, the optical element 10 of Example 2 was produced as in Example 1, except for the configuration of the liquid crystal cell 11. The optical element 10 of Example 2 was specifically produced by the following procedure.

The first substrate 100 used was a substrate capable of generating horizontal electric fields in two different directions. Specifically, the first substrate 100 including the first comb-teeth electrode 121 and the second comb-teeth electrode 122 was prepared. The extension direction 121A of the first comb-teeth electrode 121 was perpendicular to the extension direction 122A of the second comb-teeth electrode 122. Photo-spacers of 7.6 μm in height were arranged near the first substrate 100.

A polyhexyl methacrylate (PHMA) film as the weak anchoring horizontal alignment film 412 was formed on the first substrate 100. The vertical alignment film 422 was formed on the second substrate 200. A sealing material was drawn on the second substrate 200. The first substrate 100 and the second substrate 200 were attached to each other with a liquid crystal material in between, so that the liquid crystal cell 11 was produced.

The liquid crystal material used was a mixture of liquid crystal molecules having a positive anisotropy of dielectric constant (Δn=0.066) and a chiral dopant S-811. The concentration of the chiral dopant was set such that the twist angle between the upper and lower substrates in the liquid crystal cell would be 106°.

The liquid crystal cell 11 was heated to the isotropic phase and then cooled to room temperature while voltage was applied to the first substrate 100 in the first electric field direction to produce the uniform horizontal alignment liquid crystal cell 11. To the liquid crystal cell 11 obtained above were attached the quarter-wave film exhibiting reverse wavelength dispersion as the first quarter-wave film 12 and the quarter-wave film exhibiting flat wavelength dispersion as the second quarter-wave film 13, with the axis azimuths set to the azimuths shown in FIG. 13. Thus, the optical element (sHWP element) 10 of Example 2 was produced. Application of voltage in the first electric field direction achieved the first state (modulation state) and application of voltage in the second electric field direction achieved the second state (no modulation state).

Evaluation of Example 1, Example 2, and Comparative Example 1

Figure 50:
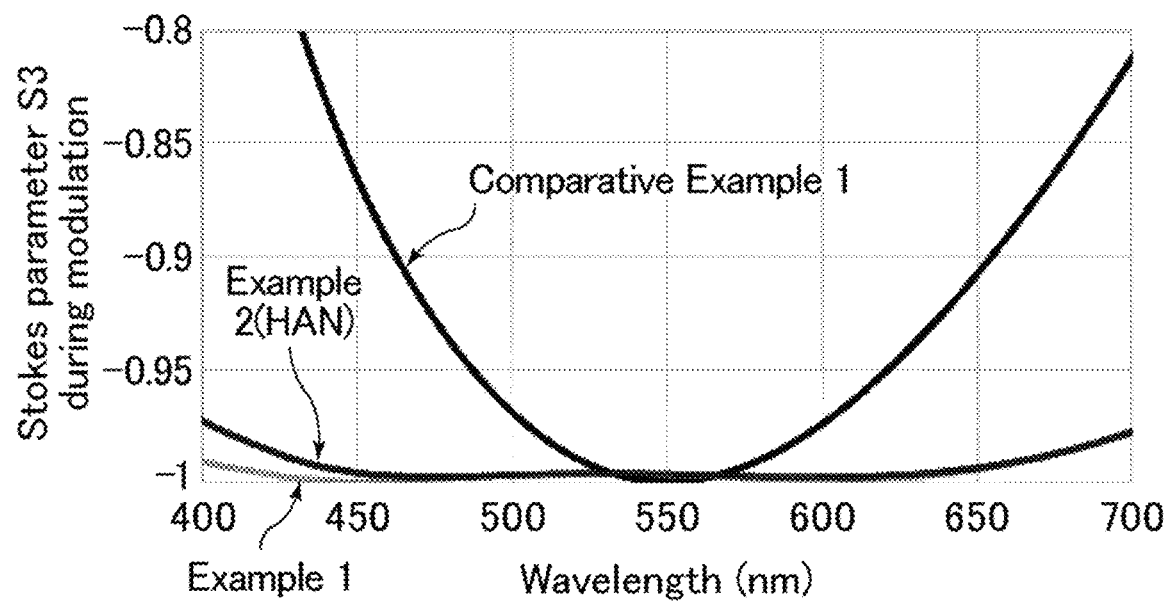
FIG. 50 is a graph showing wavelength dispersion of Stokes parameter S3 during modulation in the optical elements of Example 1, Example 2, and Comparative Example 1.
Figure 51:
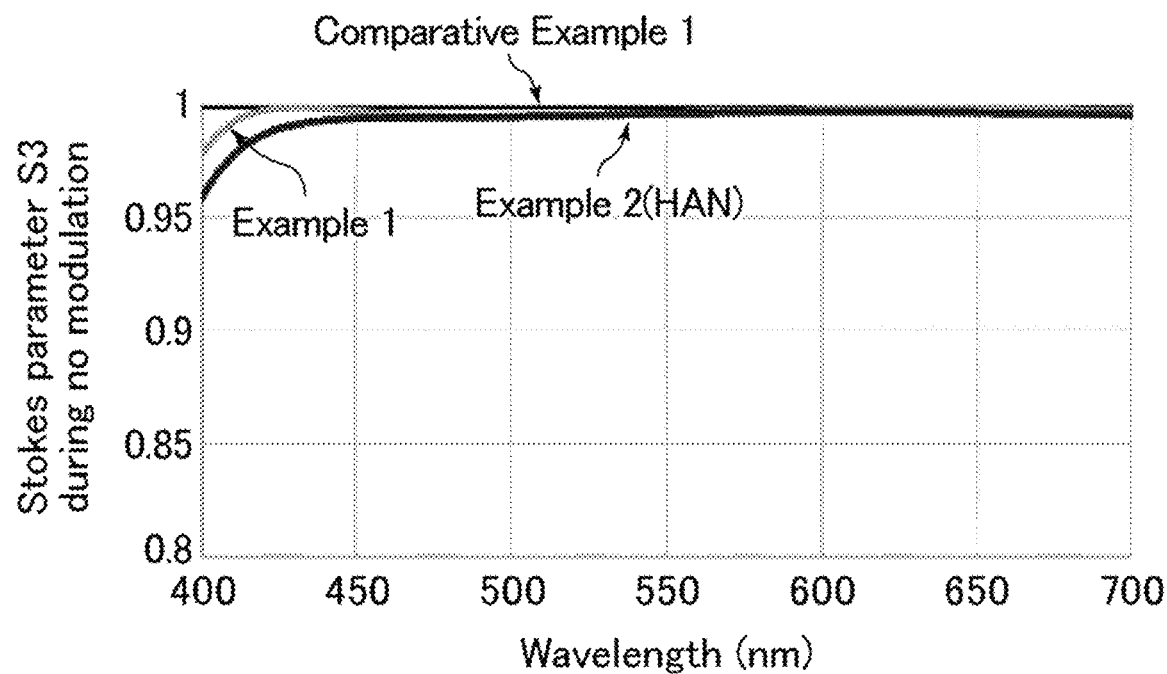
FIG. 51 is a graph showing wavelength dispersion of Stokes parameter S3 during no modulation in the optical elements of Example 1, Example 2, and Comparative Example 1.

The wavelength dispersion of Stokes parameter S3 of the emission light resulting from right-handed circularly polarized light (S3=+1) incident on each of the optical elements (sHWPs) of Example 1, Example 2, and Comparative Example 1 is shown in FIG. 50 and FIG. 51. FIG. 50 is a graph showing wavelength dispersion of Stokes parameter S3 during modulation in the optical elements of Example 1, Example 2, and Comparative Example 1. FIG. 51 is a graph showing wavelength dispersion of Stokes parameter S3 during no modulation in the optical elements of Example 1, Example 2, and Comparative Example 1.

As shown in FIG. 50, during modulation (during the first state) in Example 2, the emission light exhibited a state with nearly S3=−1 in a broad bandwidth as in Example 1. In other words, light with S3=+1 was successfully modulated to light with S3=−1 (in other words, right-handed circularly polarized light was converted to left-handed circularly polarized light).

Also, as shown in FIG. 51, during no modulation (during second state) in Example 2, the emission light exhibited a state with nearly S3=+1 in a broad bandwidth as in Example 1. In other words, light with S3=+1 was successfully emitted as light with S3=+1 with no modulation (in other words, right-handed circularly polarized light remained as right-handed circularly polarized light).

Example 3

An optical element 10 of Example 3 corresponding to Embodiment 3 was produced. Specifically, the optical element of Example 3 was produced as in Example 1, except that the first substrate 100 including the first comb-teeth electrode 121 and the second comb-teeth electrode 122 and the second substrate 200 including the third comb-teeth electrode 221 and the fourth comb-teeth electrode 222 were used.

The optical element of Example 3 during modulation (during first state) successfully modulated light with S3=+1 to light with S3=−1 (in other words, right-handed circularly polarized light was converted to left-handed circularly polarized light) as in Example 1. The optical element during no modulation (during second state) successfully emitted light with S3=+1 as light with S3=+1 with no modulation (in other words, right-handed circularly polarized light remained as right-handed circularly polarized light) as in Example 1.

The optical element 10 of Example 3 produced the two states by applying on-voltage to both the first substrate 100 and the second substrate 200 and then lowering the voltage. In Example 3, the alignments of both the first substrate 100 and the second substrate 200 can be defined by voltage, so that the response speed was successfully increased.

Example 4-1 and Example 4-2

Figure 52:
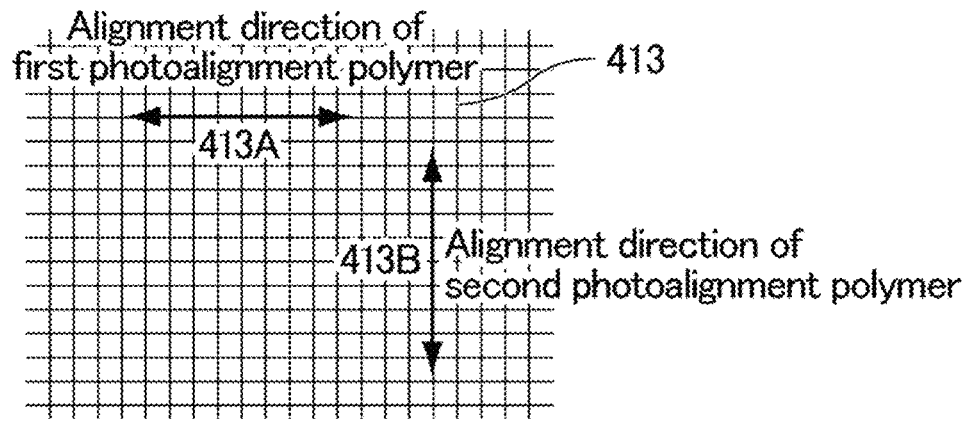
FIG. 52 shows the alignment directions of a bistable alignment film in an optical element of Example 4-1.
Figure 53:
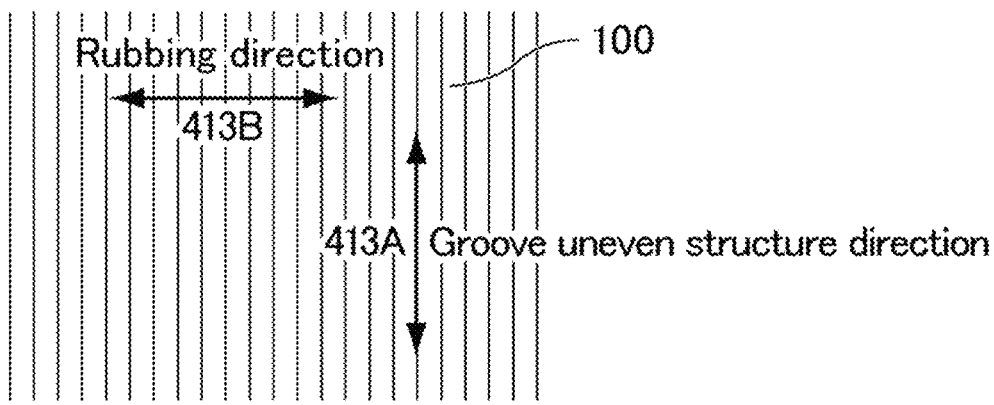
FIG. 53 shows the alignment directions of a bistable alignment film in an optical element of Example 4-2.

Optical elements 10 of Example 4-1 and Example 4-2 corresponding to Embodiment 4 were produced. Specifically, the optical elements 10 of Example 4-1 and Example 4-2 were produced as in Example 1, except for the configuration of the first alignment film 410 between the first substrate 100 and the liquid crystal layer 300 and the configuration of the second alignment film 420 between the second substrate 200 and the liquid crystal layer 300. FIG. 52 shows the alignment directions of a bistable alignment film in an optical element of Example 4-1. FIG. 53 shows the alignment directions of a bistable alignment film in an optical element of Example 4-2. The optical elements 10 of Example 4-1 and Example 4-2 each included the weak anchoring horizontal alignment film (also referred to as a slippery film) 423 as the second alignment film 420 on the second substrate 200, and the bistable alignment film 413 as the first alignment film 410 on the first substrate 100.

The weak anchoring horizontal alignment film (slippery film) 423 in each of the optical elements 10 of Example 4-1 and Example 4-2 was a PEG film. The PEG film was formed by the following procedure. A mixture of 5 wt % methoxy-polyethylene glycol monoacrylate, 5 wt % polyethylene glycol diacrylate, Irgacure 2959 (0.1 wt %), and cyclopentane (89.9 wt %) was prepared. This mixture was applied to the second substrate 200, irradiated with ultraviolet light having a wavelength of 254 nm at 2 J/cm$^2$, and baked at 130° C. for 90 minutes. This produced the weak anchoring horizontal alignment film 423.

The bistable alignment film 413 in the optical element 10 of Example 4-1 was obtained through photo-alignment. Specifically, as shown in FIG. 52, a mixture of two polymers with different photo-functional wavelengths (first photo-alignment polymer and second photo-alignment polymer) was used to form the bistable alignment film 413. The solution obtained by mixing the two polymers with different photo-functional wavelengths was applied to the substrate, irradiated with first polarized ultraviolet light having a certain wavelength and with second polarized ultraviolet light different in wavelength and direction from the first polarized ultraviolet light. Thus, the bistable alignment film 413 was formed which provided stable alignment in two directions, namely the first direction 413A in which the first photo-alignment polymer controlled the alignment and the second direction 413B in which the second photo-alignment polymer controlled the alignment.

The bistable alignment film 413 in the optical element 10 of Example 4-2 was obtained through rubbing treatment on an uneven substrate. Specifically, as shown in FIG. 53, a structure with grooves in a certain direction (first direction 413A) was formed from a polymer on the first substrate 100, and rubbing treatment was performed in a direction different from the groove direction (second direction 413B). The liquid crystal molecules 310 were thus under the force of alignment in the groove direction and the force of alignment in the rubbing direction. Thereby, the bistable alignment film 413 providing stable alignment in two directions was formed.

The optical elements of Examples 4-1 and 4-2 during modulation (during first state) successfully modulated light with S3=+1 to light with S3=−1 (in other words, right-handed circularly polarized light was converted to left-handed circularly polarized light) as in Example 1. The optical elements during no modulation (during second state) successfully emitted light with S3=+1 as light with S3=+1 with no modulation (in other words, right-handed circularly polarized light remained as right-handed circularly polarized light) as in Example 1.

Example 5

An optical element 10 of Example 5 corresponding to Embodiment 5 was produced. Specifically, the optical element 10 of Example 5 was produced as in Example 1, except for the configuration of the liquid crystal cell 11. The liquid crystal cell 11 in the optical element 10 of Example 5 sequentially included the first substrate 100 including the first electrode 131 and the second electrode 132, the first vertical alignment film 414, the liquid crystal layer 300 containing the liquid crystal molecules 310, the second vertical alignment film 424, and the second substrate 200 including the third electrode 231 and the fourth electrode 232. As shown in FIG. 19, the extension direction 132A of the slits 132S in the second electrode 132 was at an azimuthal angle of 0° and the extension direction 232A of the slits 232S in the fourth electrode 232 was at an azimuthal angle of 160°.

Figure 54:
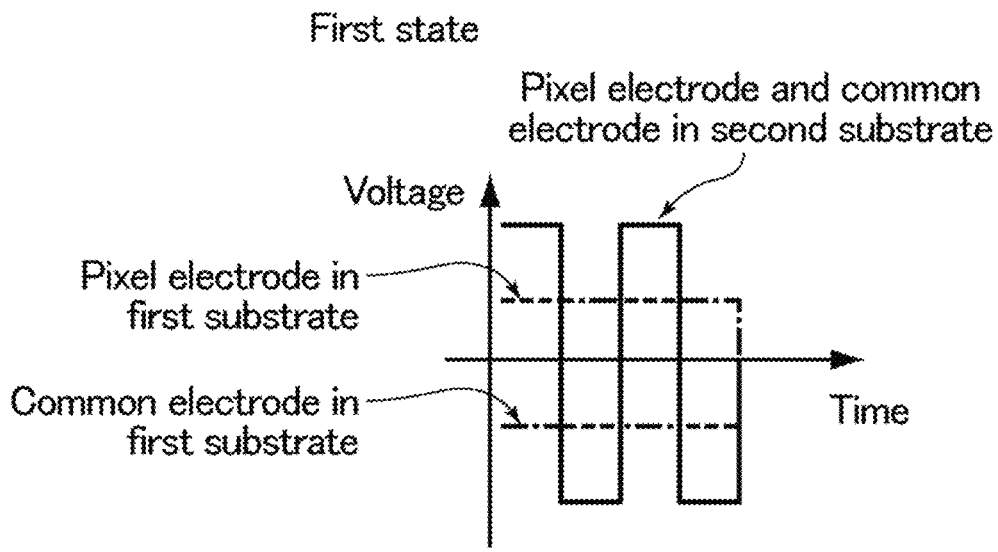
FIG. 54 is a graph showing the applied voltages in the first state in an optical element of Example 5.

FIG. 54 is a graph showing the applied voltages in the first state in the optical element of Example 5. As shown in FIG. 54, in the optical element 10 of Example 5, a voltage of +/−1 V was applied to the first electrode 131 or the second electrode 132 in the first substrate 100, whichever was serving as a common electrode, a voltage of −/+1 V was applied to the other serving as a pixel electrode, and a voltage of +/−5 V was applied to both the third electrode 231 and the fourth electrode 232 in the second substrate 200, so that the first state was achieved. Also, in the optical element 10 of Example 5, a voltage of +/−1 V was applied to the third electrode 231 or the fourth electrode 232 in the second substrate 200, whichever was serving as a common electrode, a voltage of −/+1 V was applied to the other serving as a pixel electrode, and a voltage of +/−5 V was applied to both the first electrode 131 and the second electrode 132 in the first substrate 100, so that the second state was achieved.

Figure 55:
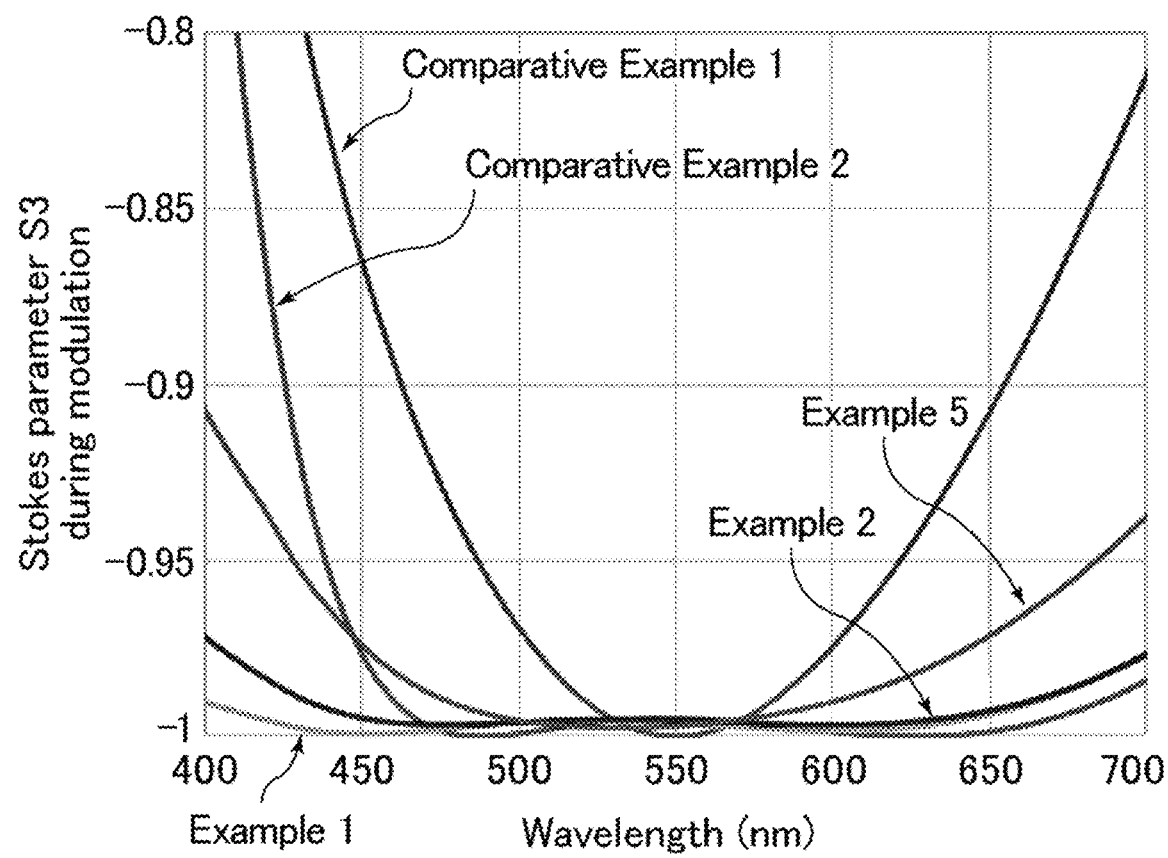
FIG. 55 is a graph showing wavelength dispersion of Stokes parameter S3 during modulation in the optical elements of Example 1, Example 2, Example 5, Comparative Example 1, and Comparative Example 2.
Figure 56:
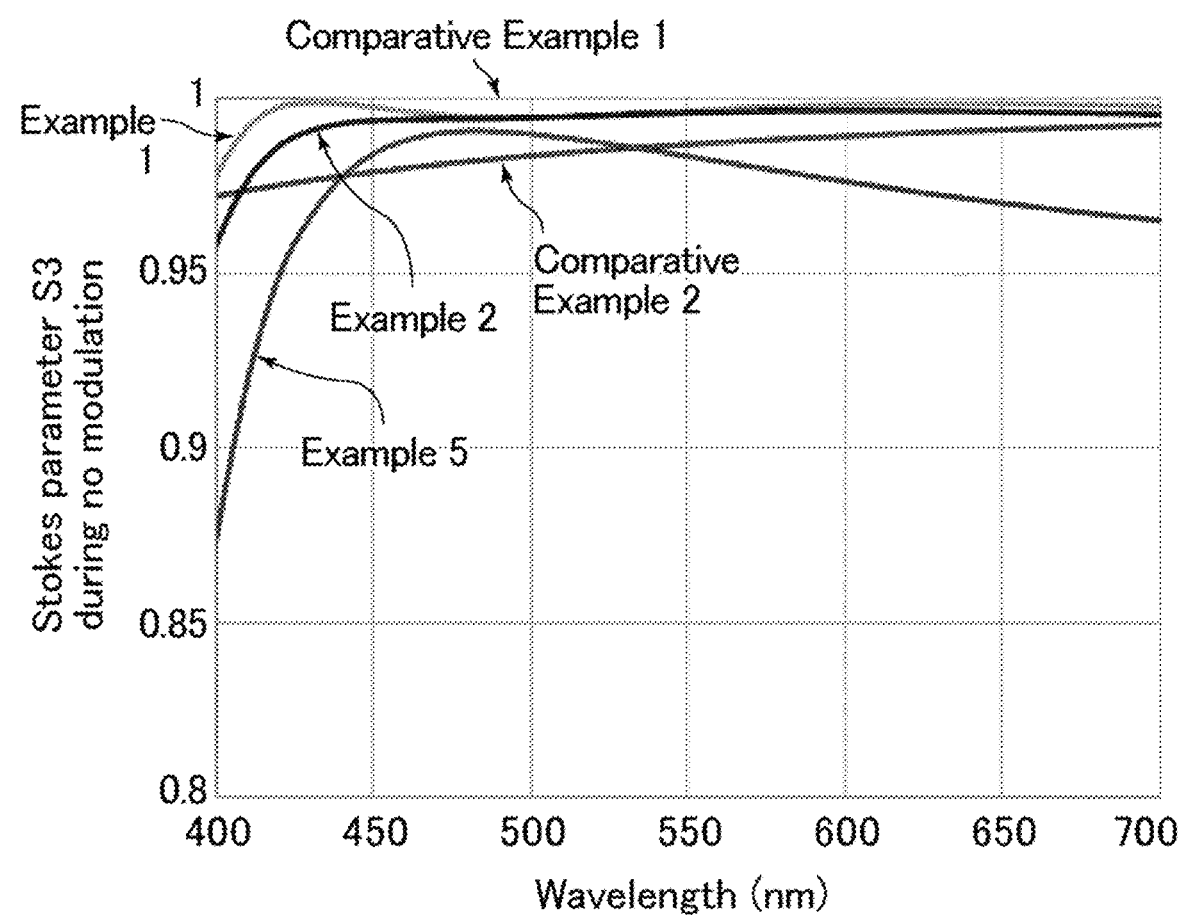
FIG. 56 is a graph showing wavelength dispersion of Stokes parameter S3 during no modulation in the optical elements of Example 1, Example 2, Example 5, Comparative Example 1, and Comparative Example 2.

FIG. 55 is a graph showing wavelength dispersion of Stokes parameter S3 during modulation in the optical elements of Example 1, Example 2, Example 5, Comparative Example 1, and Comparative Example 2. FIG. 56 is a graph showing wavelength dispersion of Stokes parameter S3 during no modulation in the optical elements of Example 1, Example 2, Example 5, Comparative Example 1, and Comparative Example 2. The wavelength dispersion of Stokes parameter S3 of the emission light resulting from right-handed circularly polarized light (S3=+1) incident on the optical element 10 of Example 5 is shown in FIG. 55 and FIG. 56.

Example 5 achieved a state with |S3|>0.9 at wavelengths of 450 nm to 650 nm, achieving favorable properties. This means that, as shown in FIG. 55, during modulation (during first state) in Example 5, the emission light exhibited a state with nearly S3=−1 in a broad bandwidth. In other words, light with S3=+1 was successfully modulated to light with S3=−1 (in other words, right-handed circularly polarized light was converted to left-handed circularly polarized light). Also, as shown in FIG. 56, during no modulation (during second state) in Example 5, the emission light exhibited a state with nearly S3=+1 in a broad bandwidth. In other words, light with S3=+1 was successfully emitted as light with S3=+1 with no modulation (in other words, right-handed circularly polarized light remained as right-handed circularly polarized light).

As in the other examples, the present example also enables tuning of modulation/non modulation properties as appropriate by varying the designs of Δnd and the twist angle of the liquid crystal layer.

Example 6

An optical element 10 of Example 6 corresponding to Embodiment 6 was produced. Specifically, the optical element 10 of Example 6 included, sequentially from the light incident side toward the light emitting side, the liquid crystal cell 11 and a quarter-wave film exhibiting reverse wavelength dispersion as the first quarter-wave film 12. The slow axis of the quarter-wave film exhibiting reverse wavelength dispersion (slow axis 12A of the first quarter-wave film 12) was at an azimuthal angle of 12.2°, the extension direction 120A of the first comb-teeth electrode 120 was at an azimuthal angle of 0°, and the extension direction 220A of the second comb-teeth electrode 220 was at an azimuthal angle of 220°. The optical element 10 of Example 6 was specifically produced by the following procedure.

The first substrate 100 including the first comb-teeth electrode 120 and the second substrate 200 including the second comb-teeth electrode 220 were prepared. The electrode direction of the first substrate 100 (extension direction 120A of the first comb-teeth electrode 120) and the electrode direction of the second substrate 200 (extension direction 220A of the second comb-teeth electrode 220) formed the angle shown in FIG. 23 when the substrates were attached to each other. Photo-spacers of 3.4 μm in height were arranged near the second substrate 200.

Polymethyl methacrylate (PMMA) films were then formed, one on the first substrate 100 and the other on the second substrate 200. A sealing material was drawn on the second substrate 200. The first substrate 100 and the second substrate 200 were attached to each other with a liquid crystal material in between, so that the liquid crystal cell 11 was produced.

The liquid crystal material used was a mixture of liquid crystal molecules having a positive anisotropy of dielectric constant (Δn=0.066), 5 wt % dodecyl acrylate (C12A), and a chiral dopant S-811. The concentration of the chiral dopant was set such that the twist angle between the upper and lower substrates in the liquid crystal cell would be 64°.

The liquid crystal cell 11 was heated to the isotropic phase and then cooled to room temperature while voltage was applied to the first substrate 100 to produce the uniform horizontal alignment liquid crystal cell 11 including the first weak anchoring horizontal alignment film 411 and the second weak anchoring horizontal alignment film 421. To the liquid crystal cell 11 obtained above were attached a quarter-wave film exhibiting reverse wavelength dispersion (first quarter-wave film 12). Thus, the optical element (sHWP element) 10 of Example 6 was produced.

Figure 57:
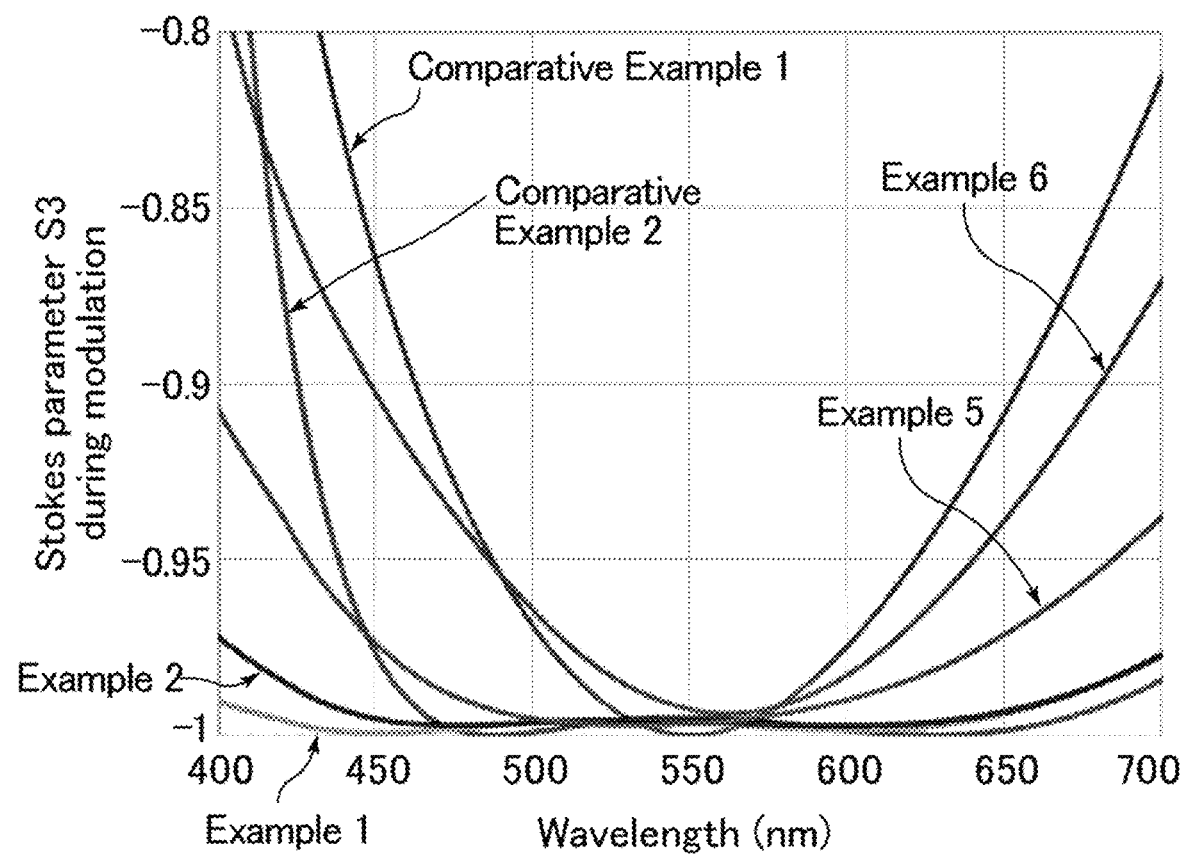
FIG. 57 is a graph showing wavelength dispersion of Stokes parameter S3 during modulation in the optical elements of Example 1, Example 2, Example 5, Example 6, Comparative Example 1, and Comparative Example 2.
Figure 58:
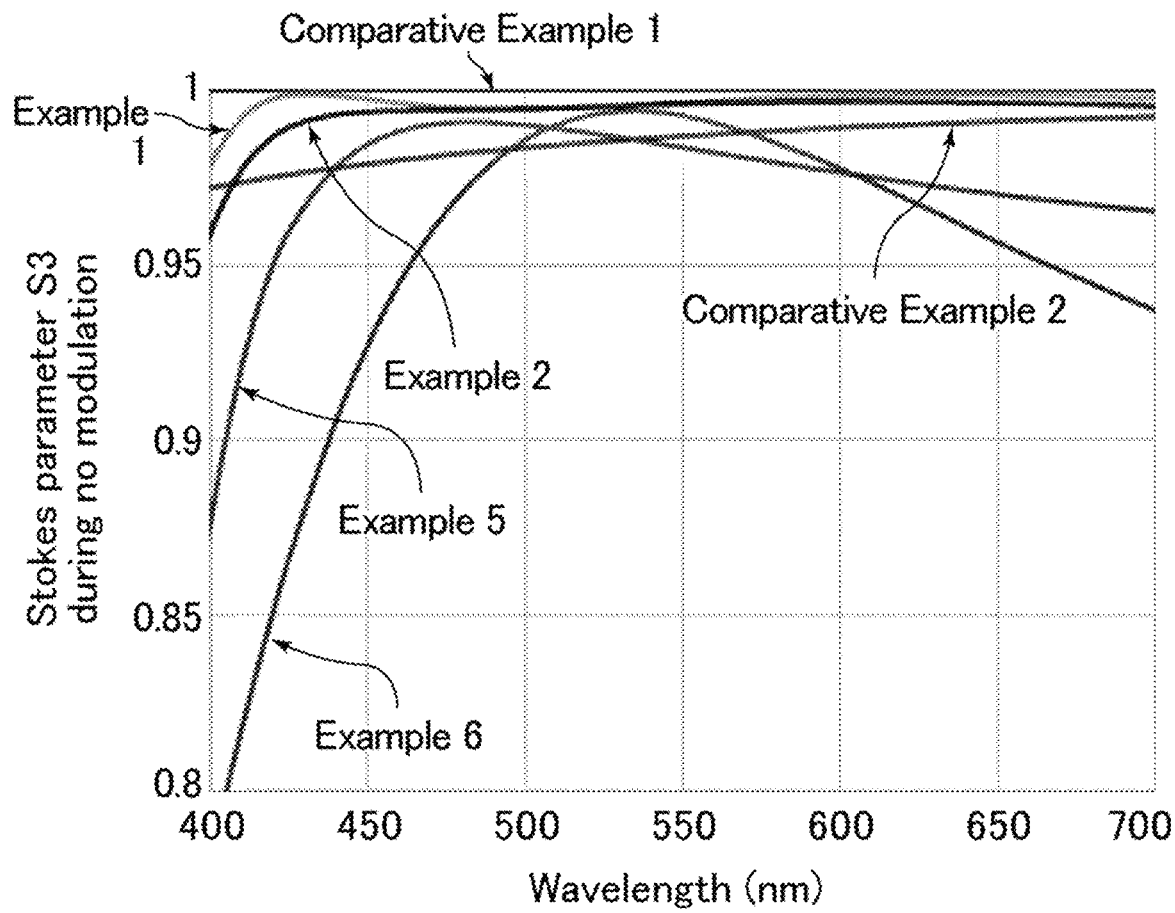
FIG. 58 is a graph showing wavelength dispersion of Stokes parameter S3 during no modulation in the optical elements of Example 1, Example 2, Example 5, Example 6, Comparative Example 1, and Comparative Example 2.

FIG. 57 is a graph showing wavelength dispersion of Stokes parameter S3 during modulation in the optical elements of Example 1, Example 2, Example 5, Example 6, Comparative Example 1, and Comparative Example 2. FIG. 58 is a graph showing wavelength dispersion of Stokes parameter S3 during no modulation in the optical elements of Example 1, Example 2, Example 5, Example 6, Comparative Example 1, and Comparative Example 2. The wavelength dispersion of Stokes parameter S3 of the emission light resulting from right-handed circularly polarized light (S3=+1) incident on the optical element 10 of Example 6 is shown in FIG. 57 and FIG. 58.

Example 6 also achieved a state with |S3|>0.9 at wavelengths of 450 nm to 650 nm, achieving favorable properties. In other words, as shown in FIG. 57, during modulation (during first state) in Example 5, the emission light exhibited a state with nearly S3=−1 in a broad bandwidth. In other words, light with S3=+1 was successfully modulated to light with S3=−1 (in other words, right-handed circularly polarized light was converted to left-handed circularly polarized light). Also, as shown in FIG. 58, during no modulation (during second state) in Example 5, the emission light exhibited a state with nearly S3=+1 in a broad bandwidth. In other words, light with S3=+1 was successfully emitted as light with S3=+1 with no modulation (in other words, right-handed circularly polarized light remained as right-handed circularly polarized light).

As in the other examples, the present example also enables tuning of modulation/non modulation properties as appropriate by varying the designs of Δnd and the twist angle of the liquid crystal layer.

Example 7

Figure 59:
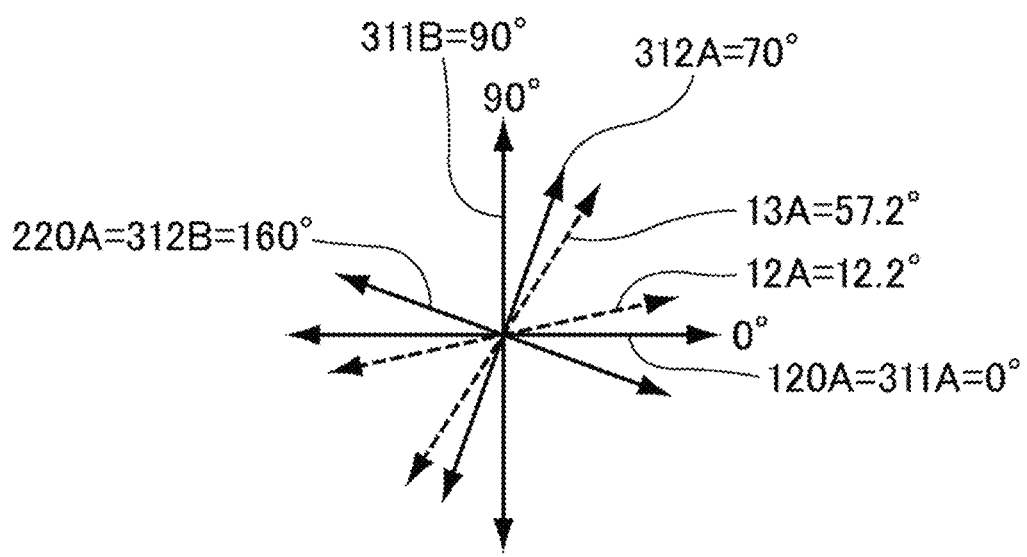
FIG. 59 shows the axis azimuths of an optical element in a varifocal element of Example 7.

FIG. 59 shows the axis azimuths of an optical element in a varifocal element of Example 7. A varifocal element 30 of Example 7 corresponding to Modified Example 1 of Embodiment 7 was produced. The varifocal element 30 of Example 7 included, sequentially from the light incident side toward the light emitting side, a quarter-wave film exhibiting flat wavelength dispersion as the second quarter-wave film 13, a quarter-wave film exhibiting reverse wavelength dispersion as the first quarter-wave film 12, the first substrate 100, the first alignment film 410, the liquid crystal layer 300, the second alignment film 420, the PB lens 20, and the second substrate 200. The first substrate 100, the first alignment film 410 (specifically, first weak anchoring horizontal alignment film 411), the liquid crystal layer 300, the second alignment film 420 (specifically, second weak anchoring horizontal alignment film 421), and the second substrate 200, which defined the liquid crystal cell 11, had the same configuration as in Example 1.

As shown in FIG. 59, the slow axis of the quarter-wave film exhibiting reverse wavelength dispersion (slow axis 12A of the first quarter-wave film 12) was at an azimuthal angle of 12.2°, and the slow axis of the quarter-wave film exhibiting flat wavelength dispersion (slow axis 13A of the second quarter-wave film 13) was at an azimuthal angle of 57.2°. The alignment direction 311A of the liquid crystal molecules 311 near the first substrate 100 in the first state was at an azimuthal angle of 0°, and the alignment direction 311B of the liquid crystal molecules 311 near the first substrate 100 in the second state was at an azimuthal angle of 90°. The alignment direction 312A of the liquid crystal molecules 312 near the second substrate 200 in the first state was at an azimuthal angle of 70°, and the alignment direction 312B of the liquid crystal molecules 312 near the second substrate 200 in the second state was at an azimuthal angle of 160°.

The varifocal element 30 of Example 7 was specifically produced by the following procedure. An in-cell PB lens-forming photosensitive material containing a polymer represented by the general formula (PB-1) was applied to the second substrate 200 to form a PB lens-forming film.

FIG. 60 is a schematic view showing the first alignment treatment in production of the varifocal element of Example 7. FIG. 61 is a schematic view showing the second alignment treatment in the production of the varifocal element of Example 7. FIG. 62 is a schematic view showing the third alignment treatment in the production of the varifocal element of Example 7. FIG. 63 is a schematic view showing the fourth alignment treatment in the production of the varifocal element of Example 7.

Alignment treatment was performed on the PB lens-forming film on the second substrate 200. Specifically, as shown in FIG. 60, a first photomask 510 was used to perform alignment treatment on a PB lens-forming film 600 with light polarized at an azimuthal angle of 0°. Then, as shown in FIG. 61, a second photomask 520 was used to perform alignment treatment on the PB lens-forming film 600 with light polarized at an azimuthal angle of 45°. Subsequently, as shown in FIG. 62, a third photomask 530 was used to perform alignment treatment on the PB lens-forming film 600 with light polarized at an azimuthal angle of 90°. Lastly, as shown in FIG. 63, a fourth photomask 540 was used to perform alignment treatment on the PB lens-forming film 600 with light polarized at an azimuthal angle of 135°. Annealing was then performed to form the PB lens 20 on the second substrate 200.

The stack of the second substrate 200 and the PB lens 20 was used to produce the liquid crystal cell 11 as in Example 1. To the horizontal alignment liquid crystal cell 11 obtained were attached a quarter-wave film exhibiting reverse wavelength dispersion as the first quarter-wave film 12 and a quarter-wave film exhibiting flat wavelength dispersion as the second quarter-wave film 13, whereby the varifocal element 30 of Example 7 was obtained.

The present example is designed to cause incident light to enter the second quarter-wave film 13, the first quarter-wave film 12, and the liquid crystal layer 300, through which right-handed circularly polarized light and left-handed circularly polarized light are switched, before the PB lens 20, so that the light converges or diverges through the PB lens 20 depending on its polarization state. Thus, the second quarter-wave film 13 and the first quarter-wave film 12 were arranged closer to the light incident side than the liquid crystal layer 300 was. The arrangement and axis azimuths of the second quarter-wave film 13 and the first quarter-wave film 12 were thus different from those in Example 1.

The varifocal element 30 of Example 7 was capable of switching between polarization modulation and no polarization modulation in a broad bandwidth and had a thin profile.

Example 8

An optical element 10 of Example 8 having the same configuration as in Embodiment 9 was produced. Specifically, the optical element 10 of Example 8 was produced as in Example 5, except for the configuration of the liquid crystal cell 11, the azimuthal angle of the slow axis of the quarter-wave film exhibiting reverse wavelength dispersion (slow axis 12A of the first quarter-wave film 12), and the azimuthal angle of the slow axis of the quarter-wave film exhibiting flat wavelength dispersion (slow axis 13A of the second quarter-wave film 13).

As shown in FIG. 66, the liquid crystal cell 11 in the optical element 10 of Example 8 sequentially included the first substrate 100 (FFS substrate) including the first electrode 131 and the second electrode 132, the weak anchoring first vertical alignment film 414, the liquid crystal layer 300 containing the liquid crystal molecules 310, the second vertical alignment film 424, and the second substrate 200 including the solid electrode 240. The liquid crystal layer 300 contained negative liquid crystal molecules 310 and a chiral dopant, and had an anisotropy of refractive index $\Delta n$ of 0.104. The chiral pitch of the liquid crystal layer 300 was 11 μm and the thickness (cell thickness) d of the liquid crystal layer 300 was 2.75 μm.

The extension direction 132A of the slits 132S in the second electrode 132 was at an azimuthal angle of 90° and the alignment direction 311X of the liquid crystal molecules 311 near the first substrate 100 with no voltage applied was at an azimuthal angle of 0°. The slow axis of the quarter-wave film exhibiting reverse wavelength dispersion (slow axis 12A of the first quarter-wave film 12) was at an azimuthal angle of 68.7°, and the slow axis of the quarter-wave film exhibiting flat wavelength dispersion (slow axis 13A of the second quarter-wave film 13) was at an azimuthal angle of 23.7°. The quarter-wave film exhibiting flat wavelength dispersion (second quarter-wave film 13) was a positive A plate.

Figure 83:
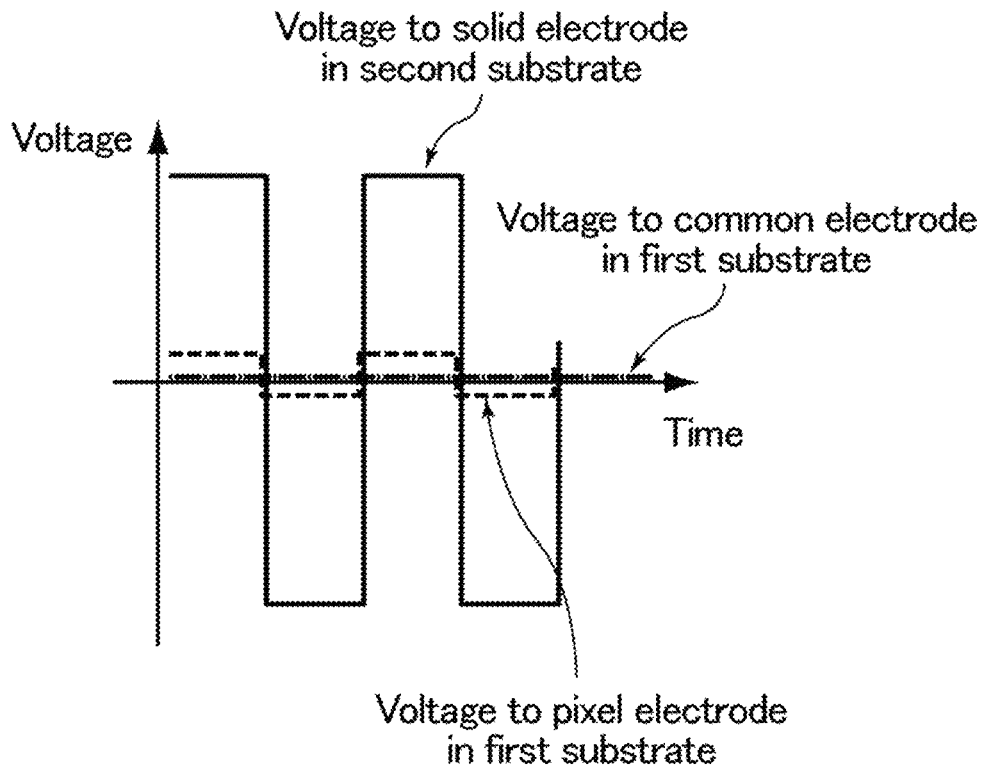
FIG. 83 is a graph showing the applied voltages in the first state in an optical element of Example 8.
Figure 84:
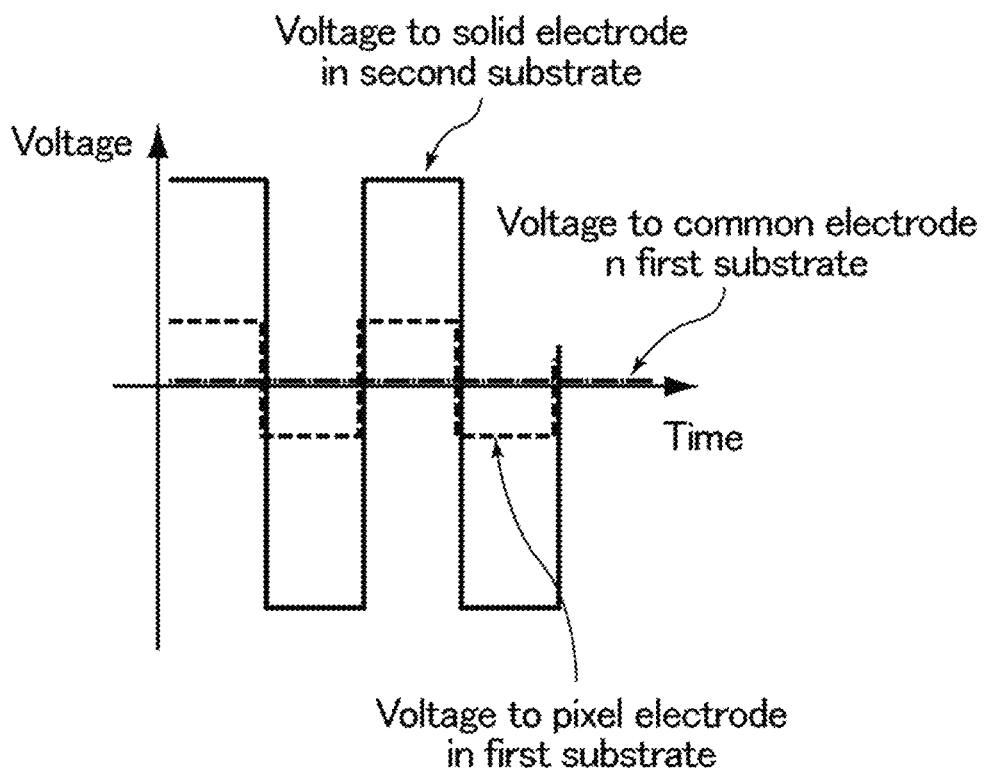
FIG. 84 is a graph showing the applied voltages in the second state in the optical element of Example 8.

FIG. 83 is a graph showing the applied voltages in the first state in an optical element of Example 8. FIG. 84 is a graph showing the applied voltages in the second state in the optical element of Example 8. As shown in FIG. 83, in the optical element 10 of Example 8, a voltage of +/−5 V was applied to the solid electrode 240 in the second substrate 200, a voltage of 0 V was applied to the first electrode 131 or the second electrode 132 in the first substrate 100, whichever was serving as a common electrode, and a voltage of +/−0.4 V to the other serving as a pixel electrode, so that the first state was achieved. Also, as shown in FIG. 84, in the optical element 10 of Example 8, a voltage of +/−5 V was applied to the solid electrode 240 in the second substrate 200, a voltage of 0 V was applied to the first electrode 131 or the second electrode 132 in the first substrate 100, whichever was serving as a common electrode, and a voltage of +/−1 V was applied to the other serving as a pixel electrode, so that the second state was achieved.

In the present example, strong vertical electric fields were generated to tilt the negative liquid crystal molecules 310 and horizontally align them, and a low voltage was applied between the first electrode 131 and the second electrode 132 (common electrode-pixel electrode in the FFS substrate) to determine the in-plane alignment direction of the liquid crystal molecules 310. The liquid crystal molecules 310 in the liquid crystal layer 300 were negative liquid crystal molecules 310, so that the liquid crystal molecules 310 were aligned in the slit extension direction (direction perpendicular to the electric field direction) in the plane. Importantly, a low voltage was applied in the horizontal direction as generation of strong horizontal electric fields may disturb the twisted alignment of the liquid crystal molecules 310 under the force of the chiral dopant. While the vertical alignment films vertically aligned the molecules very near the substrates, the horizontal alignment twisted by substantially 70 degrees was achieved in the bulk of the liquid crystal layer 300. The twist angle here is a rotational angle when the tilt angle of the liquid crystal molecules 310 is not greater than 45°.

Comparative Example 3

Figure 85:
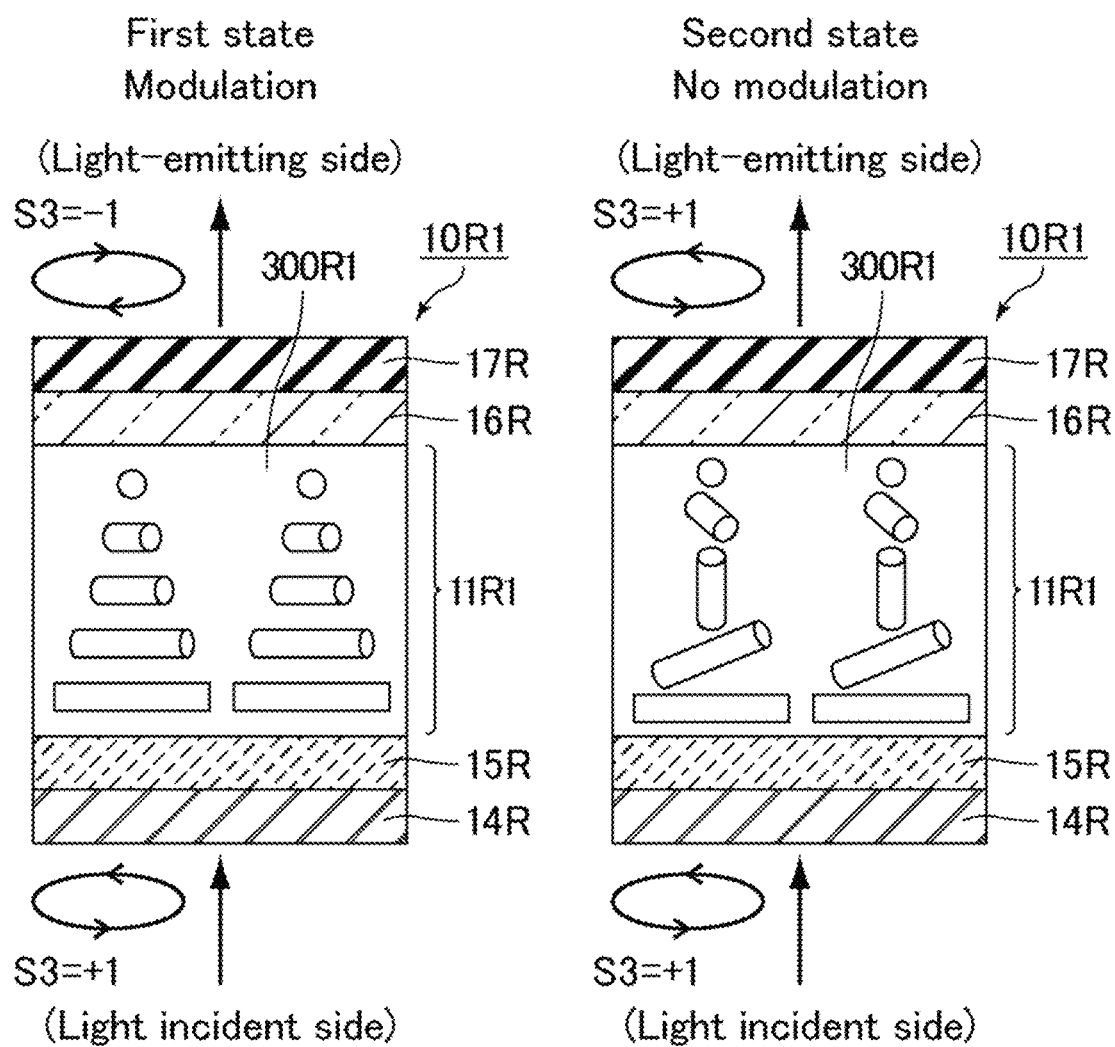
FIG. 85 shows schematic cross-sectional views of an optical element of Comparative Example 3.

FIG. 85 shows schematic cross-sectional views of an optical element of Comparative Example 3. An optical element 10R1 of Comparative Example 3 shown in FIG. 85 was produced.

Comparative Example 4

Figure 86:
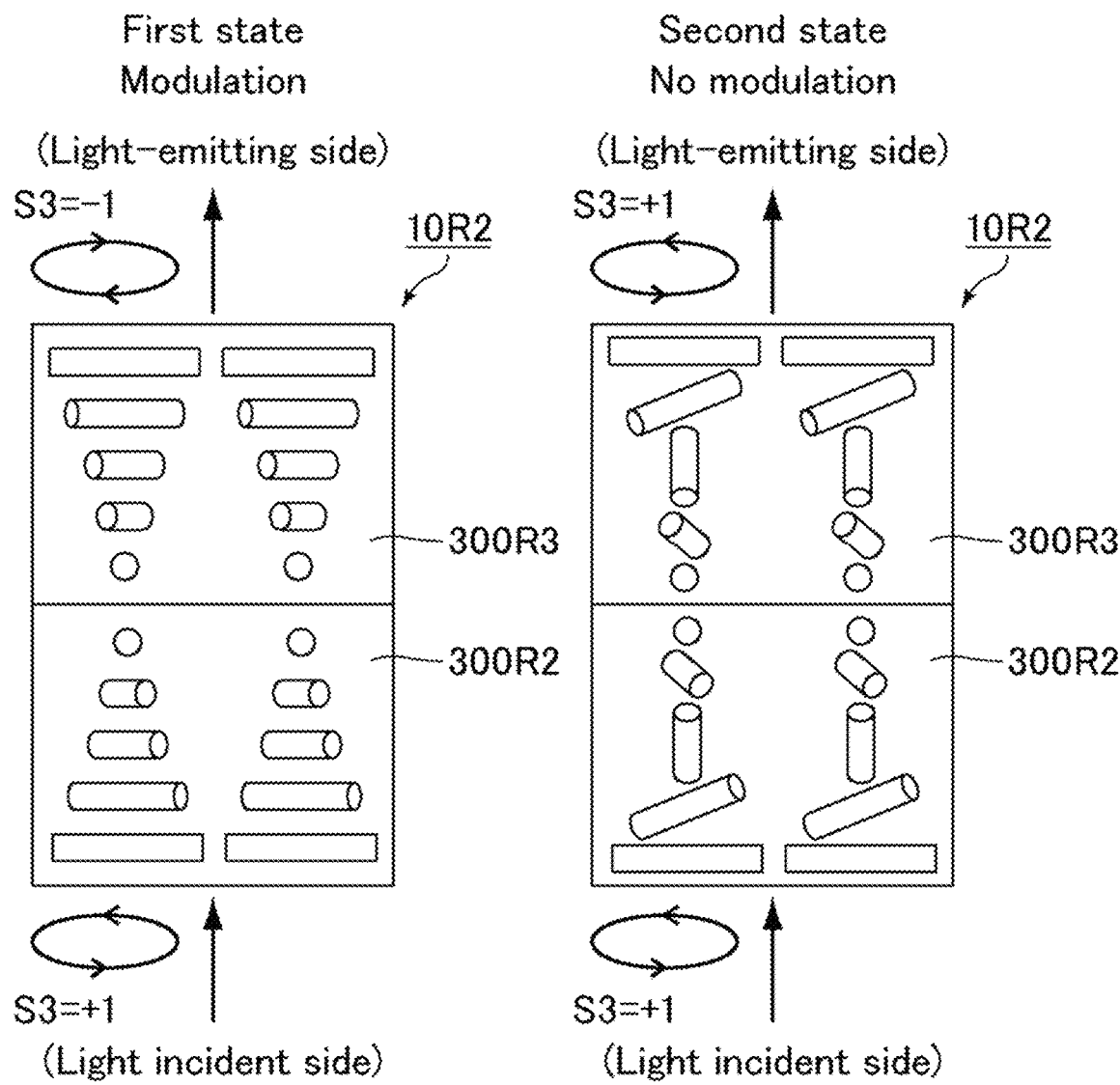
FIG. 86 shows schematic cross-sectional views of an optical element of Comparative Example 4.

FIG. 86 shows schematic cross-sectional views of an optical element of Comparative Example 4. An optical element 10R1 of Comparative Example 4 shown in FIG. 86 was produced.

Figure 87:
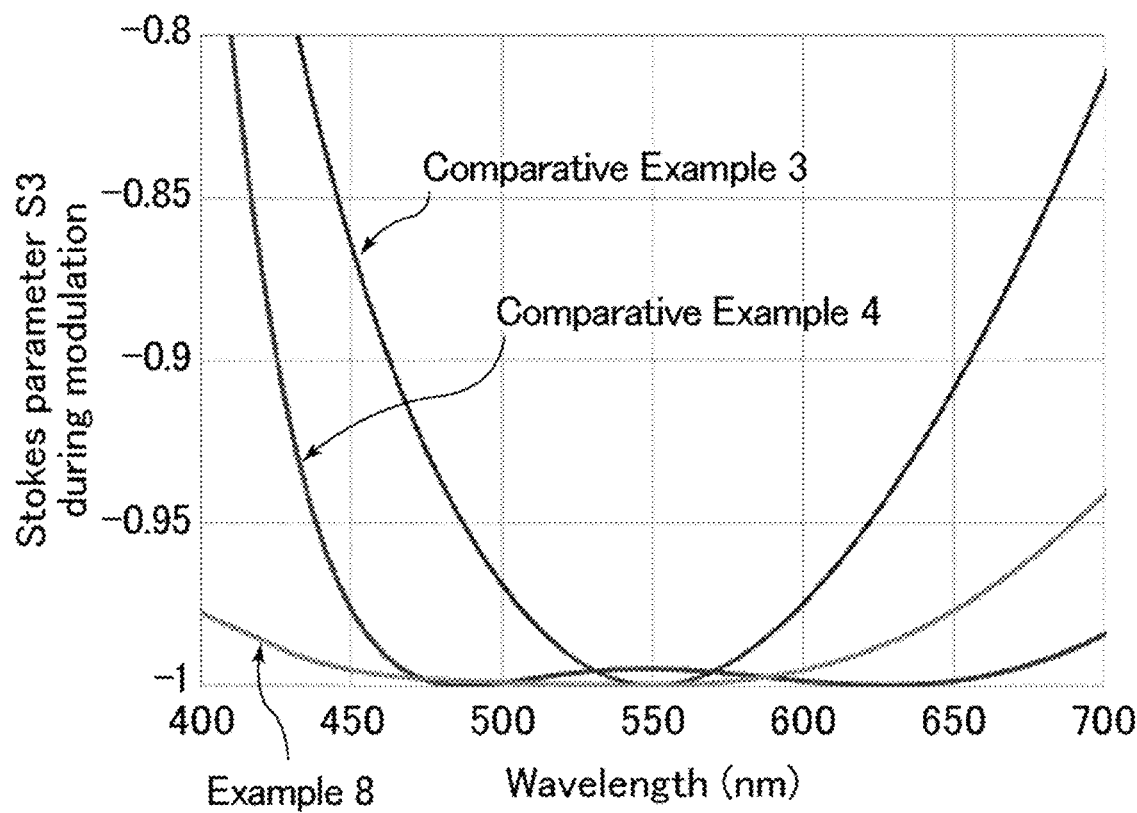
FIG. 87 is a graph showing wavelength dispersion of Stokes parameter S3 during modulation in the optical elements of Example 8, Comparative Example 3, and Comparative Example 4.
Figure 88:
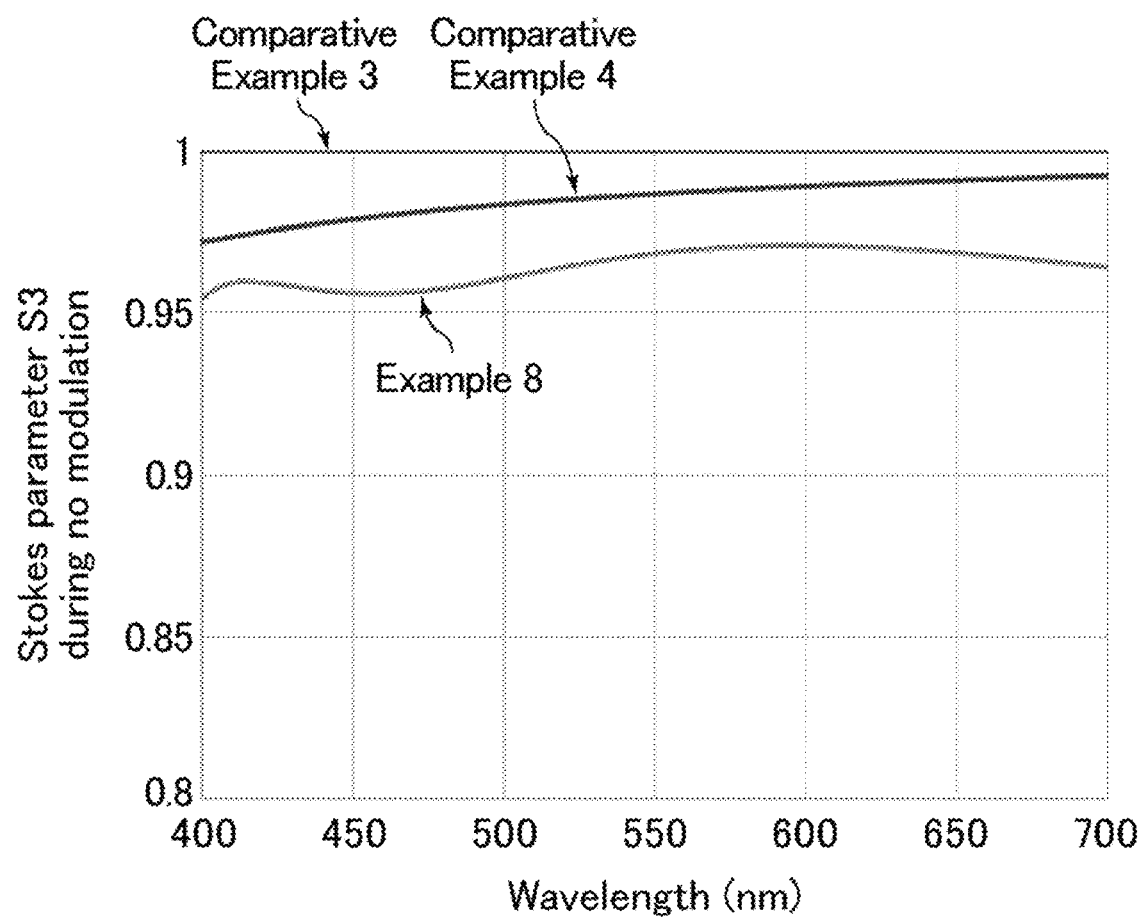
FIG. 88 is a graph showing wavelength dispersion of Stokes parameter S3 during no modulation in the optical elements of Example 8, Comparative Example 3, and Comparative Example 4.

FIG. 87 is a graph showing wavelength dispersion of Stokes parameter S3 during modulation in the optical elements of Example 8, Comparative Example 3, and Comparative Example 4. FIG. 88 is a graph showing wavelength dispersion of Stokes parameter S3 during no modulation in the optical elements of Example 8, Comparative Example 3, and Comparative Example 4. The wavelength dispersion of Stokes parameter S3 of the emission light resulting from right-handed circularly polarized light (S3=+1) incident on each of the optical elements of Example 8, Comparative Example 3, and Comparative Example 4 is shown in FIG. 87 and FIG. 88.

As shown in FIG. 87, during modulation (first state) in Example 8, the emission light exhibited a state with nearly S3=−1 in a broad bandwidth. In other words, light with S3=+1 was successfully modulated to light with S3=−1 (in other words, right-handed circularly polarized light was converted to left-handed circularly polarized light). Also, as shown in FIG. 88, during no modulation (second state), the emission light exhibited a state with nearly S3=+1 in a broad bandwidth. In other words, light with S3=+1 was successfully emitted as light with S3=+1 with no modulation (in other words, right-handed circularly polarized light remained as right-handed circularly polarized light).

In contrast, in Comparative Example 3 (one TN liquid crystal layer1 layer), the optical element demonstrated excellent performance during no modulation but had a great wavelength dependence during modulation, thus adequately modulated light only in a very narrow bandwidth. In Comparative Example 4 (two TN liquid crystal layers), modulation succeeded in a broader bandwidth but the performance was conversely worse during no modulation than in Comparative Example 1.

Example 9

An optical element 10 of Example 9 having the same configuration as in Embodiment 10 was produced. Specifically, the optical element 10 of Example 9 was produced as in Example 8, except for the configuration of the liquid crystal cell 11.

As shown in FIG. 71, the liquid crystal cell 11 in the optical element 10 of Example 9 sequentially included the first substrate 100 (FFS substrate) including the first electrode 131 and the second electrode 132, the first vertical alignment film 414, the liquid crystal layer 300 containing the liquid crystal molecules 310, the second vertical alignment film 424, and the second substrate 200 (FFS substrate) including the third electrode 231 and the fourth electrode 232. The liquid crystal layer 300 contained negative liquid crystal molecules 310 and a chiral dopant, and had an anisotropy of refractive index Δn of 0.104. The chiral pitch of the liquid crystal layer 300 was 11 µm and the thickness (cell thickness) d of the liquid crystal layer 300 was 3 µm.

The extension direction 132A of the slits 132S in the second electrode 132 was at an azimuthal angle of 0°, the alignment direction 311X of the liquid crystal molecules 311 near the first substrate 100 with no voltage applied was at an azimuthal angle of 0°, the extension direction 232A of the slits 232S in the fourth electrode 232 was at an azimuthal angle of 160°, and the alignment direction 312A of the liquid crystal molecules 312 near the second substrate 200 with no voltage applied was at an azimuthal angle of 160°. The slow axis of the quarter-wave film exhibiting reverse wavelength dispersion (slow axis 12A of the first quarter-wave film 12) was at an azimuthal angle of 68.7°, and the slow axis of the quarter-wave film exhibiting flat wavelength dispersion (slow axis 13A of the second quarter-wave film 13) was at an azimuthal angle of 23.7°. The quarter-wave film exhibiting flat wavelength dispersion (second quarter-wave film 13) was a positive A plate. The alignment direction 311A of the liquid crystal molecules 311 near the first substrate 100 in the first state was at an azimuthal angle of 0°, and the alignment direction 311B of the liquid crystal molecules 311 near the first substrate 100 in the second state was at an azimuthal angle of 90°. The alignment direction 312A of the liquid crystal molecules 312 near the second substrate 200 in the first state was at an azimuthal angle of 70°, and the alignment direction 312B of the liquid crystal molecules 312 near the second substrate 200 in the second state was at an azimuthal angle of 160°.

Figure 89:
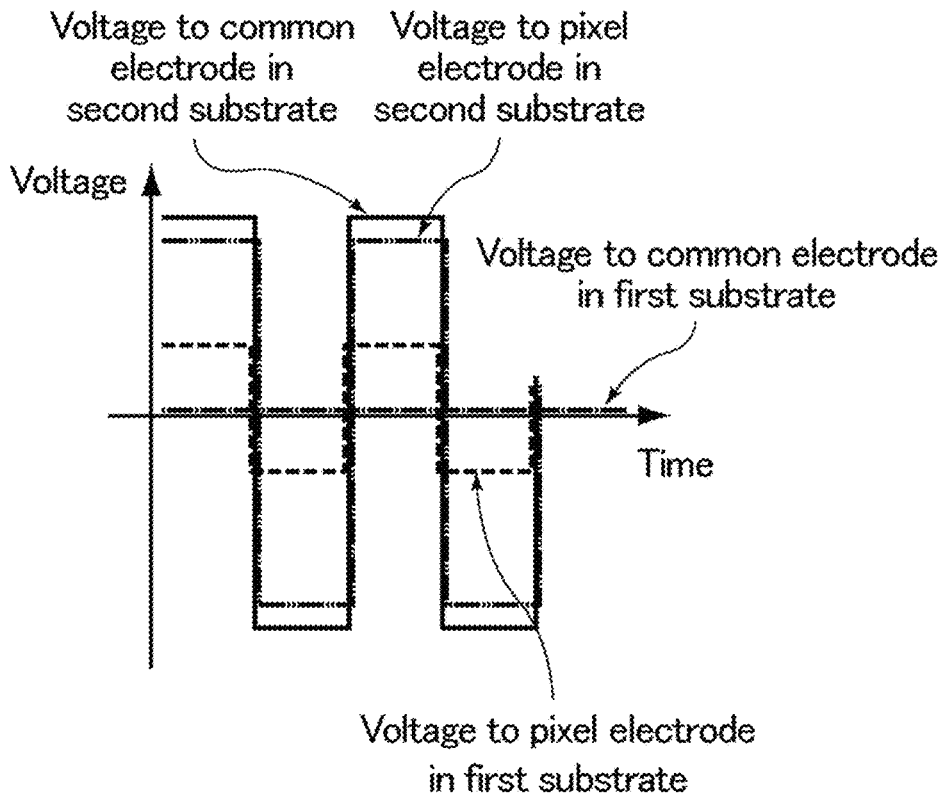
FIG. 89 is a graph showing the applied voltages in the first state in an optical element of Example 9.
Figure 90:
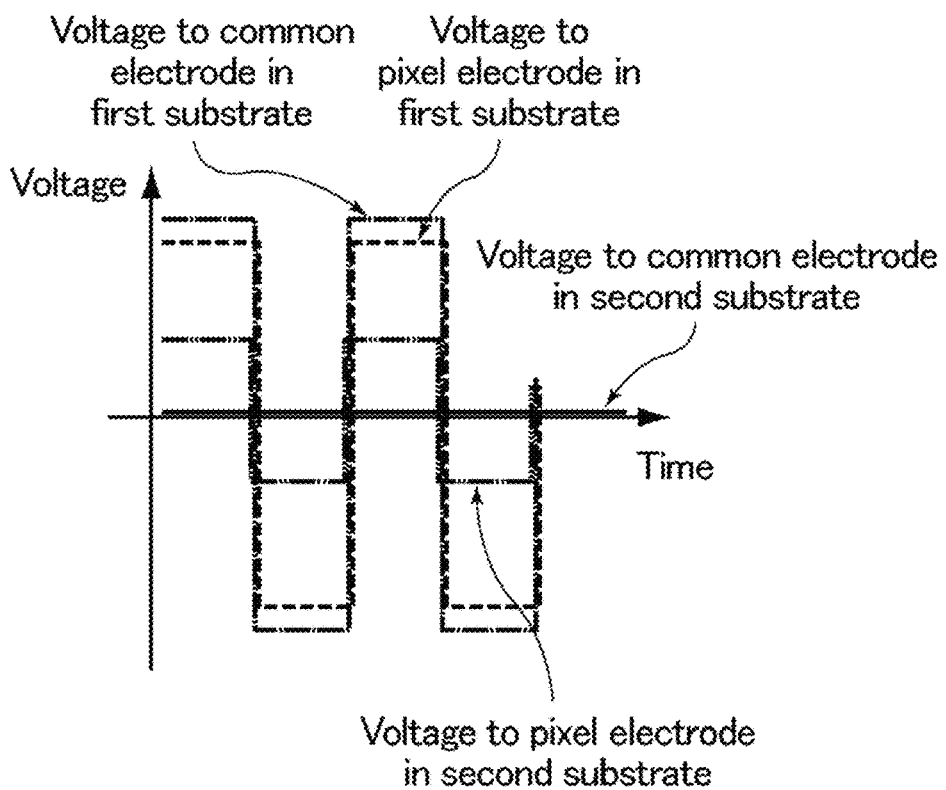
FIG. 90 is a graph showing the applied voltages in the second state in the optical element of Example 9.

FIG. 89 is a graph showing the applied voltages in the first state in an optical element of Example 9. FIG. 90 is a graph showing the applied voltages in the second state in the optical element of Example 9. As shown in FIG. 89, in the optical element 10 of Example 9, a voltage of +/−5.4 V was applied to the third electrode 231 or the fourth electrode 232 in the second substrate 200, whichever was serving as a common electrode, a voltage of +/−5 V was applied to the other serving as a pixel electrode, a voltage of 0 V was applied to the first electrode 131 or the second electrode 132 in the first substrate 100, whichever was serving as a common electrode, and a voltage of +/−1 V was applied to the other serving as a pixel electrode, so that the first state was achieved. Also, as shown in FIG. 90, in the optical element 10 of Example 9, a voltage of 0 V was applied to the third electrode 231 or the fourth electrode 232 in the second substrate 200, whichever was serving as a common electrode, a voltage of +/−1 V was applied to the other serving as a pixel electrode, a voltage of +/−5.4 V was applied to the first electrode 131 or the second electrode 132 in the first substrate 100, whichever was serving as a common electrode, and a voltage of +/−5 V was applied to the other serving as a pixel electrode, so that the second state was achieved.

Figure 91:
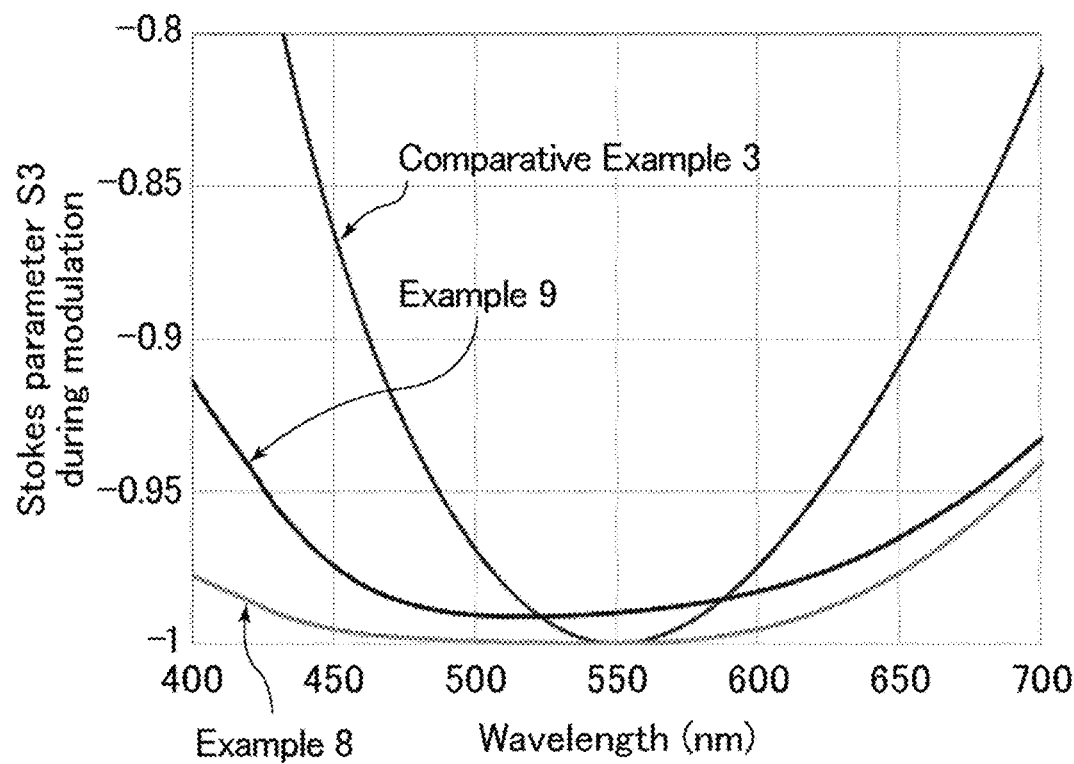
FIG. 91 is a graph showing wavelength dispersion of Stokes parameter S3 during modulation in the optical elements of Example 8, Example 9, and Comparative Example 3.
Figure 92:
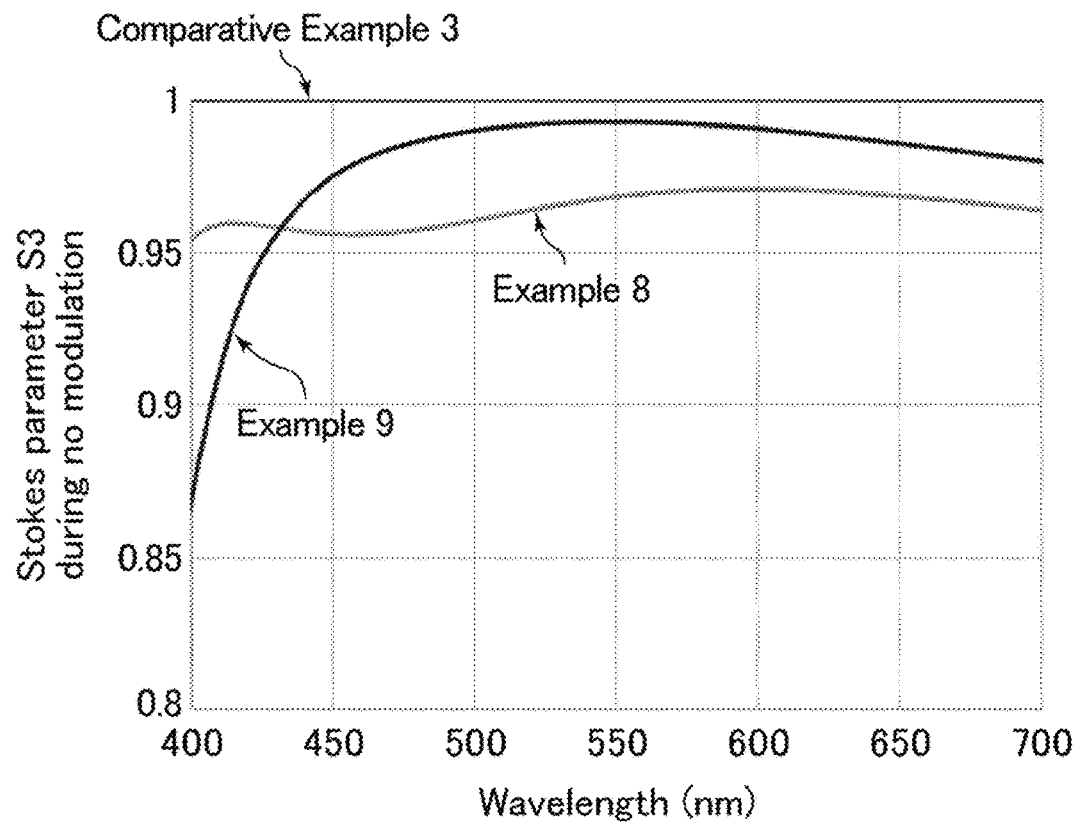
FIG. 92 is a graph showing wavelength dispersion of Stokes parameter S3 during no modulation in the optical elements of Example 8, Example 9, and Comparative Example 3.

FIG. 91 is a graph showing wavelength dispersion of Stokes parameter S3 during modulation in the optical elements of Example 8, Example 9, and Comparative Example 3. FIG. 92 is a graph showing wavelength dispersion of Stokes parameter S3 during no modulation in the optical elements of Example 8, Example 9, and Comparative Example 3. The wavelength dispersion of Stokes parameter S3 of the emission light resulting from right-handed circularly polarized light (S3=+1) incident on each of the optical elements of Example 8, Example 9, and Comparative Example 3 is shown in FIG. 91 and FIG. 92.

As shown in FIG. 91, also in Example 9 during modulation (first state), the emission light exhibited a state with nearly S3=−1 in a broad bandwidth as in Example 8. In other words, light with S3=+1 was successfully modulated to light with S3=−1 (in other words, right-handed circularly polarized light was converted to left-handed circularly polarized light). Also, as shown in FIG. 92, also in Example 9 during no modulation (second state), the emission light exhibited a state with nearly S3=+1 in a broad bandwidth as in Example 8. In other words, light with S3=+1 was successfully emitted as light with S3=+1 with no modulation (in other words, right-handed circularly polarized light remained as right-handed circularly polarized light).

Example 9 employed a strong anchoring vertical alignment film on each side, and was thus more advantageous in response speed, reliability, and mass-production friendliness than Example 8. However, Example 9 was more disadvantageous in optical properties than Example 8 since Example 9 requires a slightly higher voltage for driving than Example 8. Example 9 still demonstrated better performance during modulation than Comparative Example 3.

Example 10

An optical element 10 of Example 10 having the same configuration as in Embodiment 11 was produced. Specifically, the optical element 10 of Example 10 was produced as in Example 8, except for the configuration of the liquid crystal cell 11, the slow axis 12A of the first quarter-wave film 12, and the slow axis 13A of the second quarter-wave film 13.

As shown in FIG. 74, the liquid crystal cell 11 in the optical element 10 of Example 10 sequentially included the first substrate 100 (FFS substrate) including the first electrode 131 and the second electrode 132, the first vertical alignment film 414, the liquid crystal layer 300 containing the liquid crystal molecules 310, the second vertical alignment film 424, and the second substrate 200 (FFS substrate) including the third electrode 231 and the fourth electrode 232. The liquid crystal layer 300 contained negative liquid crystal molecules 310 and a chiral dopant, and had an anisotropy of refractive index Δn of 0.104. The chiral pitch of the liquid crystal layer 300 was 11 μm and the thickness (cell thickness) d of the liquid crystal layer 300 was 3 μm.

The extension direction 132A of the slits 132S in the second electrode 132 was at an azimuthal angle of 45°, the alignment direction 311X of the liquid crystal molecules 311 near the first substrate 100 with no voltage applied was at an azimuthal angle of −45°, and the extension direction 232A of the slits 232S in the fourth electrode 232 was at an azimuthal angle of −65°. The slow axis of the quarter-wave film exhibiting reverse wavelength dispersion (slow axis 12A of the first quarter-wave film 12) was at an azimuthal angle of 68.7°, and the slow axis of the quarter-wave film exhibiting flat wavelength dispersion (slow axis 13A of the second quarter-wave film 13) was at an azimuthal angle of 23.7°. The quarter-wave film exhibiting flat wavelength dispersion (second quarter-wave film 13) was a positive A plate.

Figure 93:
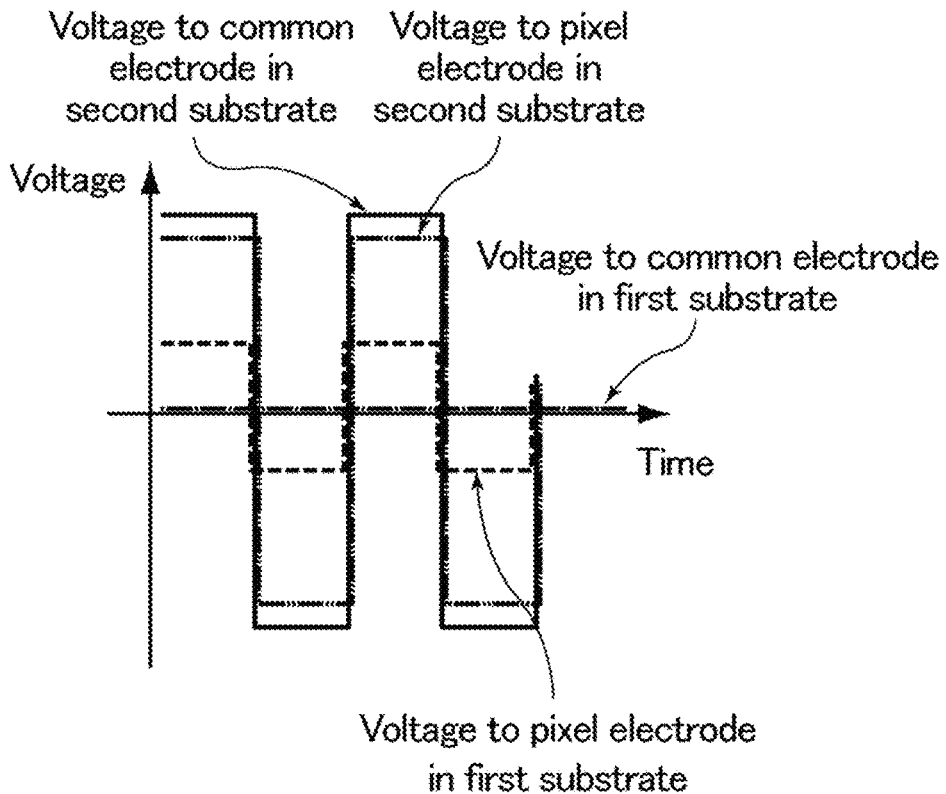
FIG. 93 is a graph showing the applied voltages in the first state in an optical element of Example 10.
Figure 94:
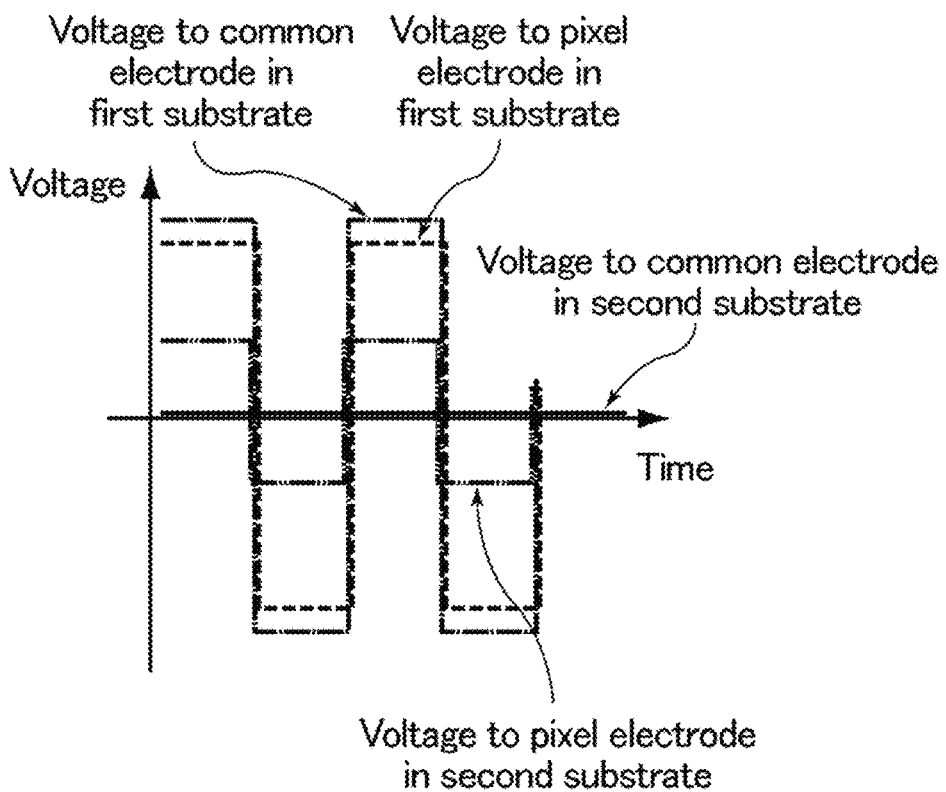
FIG. 94 is a graph showing the applied voltages in the second state in the optical element of Example 10.

FIG. 93 is a graph showing the applied voltages in the first state in an optical element of Example 10. FIG. 94 is a graph showing the applied voltages in the second state in the optical element of Example 10. As shown in FIG. 93, in the optical element 10 of Example 10, a voltage of +/−5.4 V was applied to the third electrode 231 or the fourth electrode 232 in the second substrate 200, whichever was serving as a common electrode, a voltage of +/−5 V was applied to the other serving as a pixel electrode, a voltage of 0 V was applied to the first electrode 131 or the second electrode 132 in the first substrate 100, whichever was serving as a common electrode, and a voltage of +/−1 V was applied to the other serving as a pixel electrode, so that the first state was achieved. Also, as shown in FIG. 94, in the optical element 10 of Example 10, a voltage of 0 V was applied to the third electrode 231 or the fourth electrode 232 in the second substrate 200, whichever was serving as a common electrode, a voltage of +/−1 V was applied to the other serving as a pixel electrode, a voltage of +/−5.4 V was applied to the first electrode 131 or the second electrode 132 in the first substrate 100, whichever was serving as a common electrode, and a voltage of +/−5 V was applied to the other serving as a pixel electrode, so that the second state was achieved.

Figure 95:
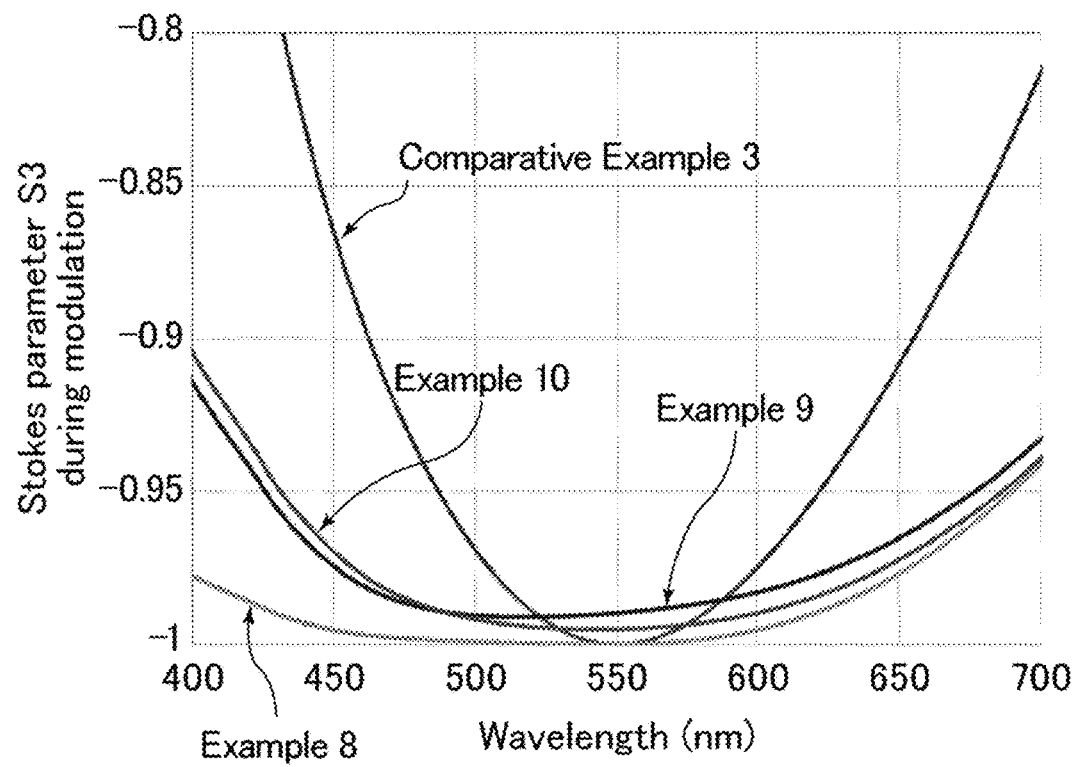
FIG. 95 is a graph showing wavelength dispersion of Stokes parameter S3 during modulation in the optical elements of Example 8 to Example 10 and Comparative Example 3.
Figure 96:
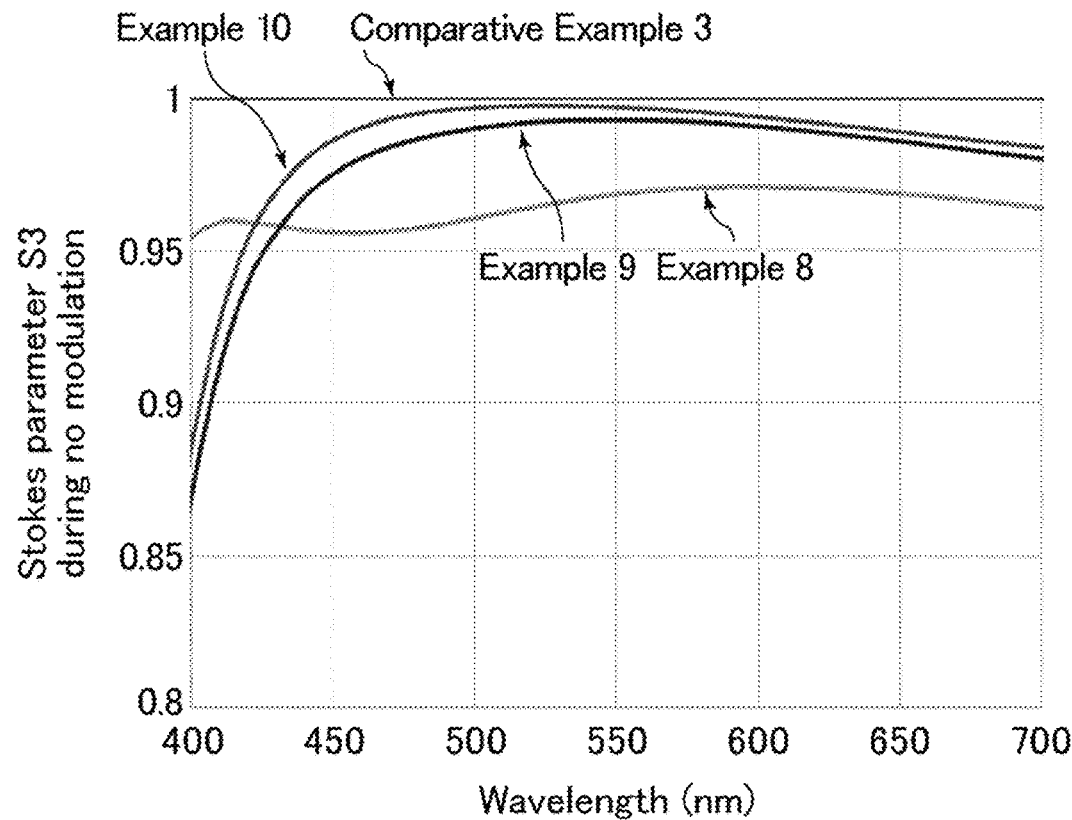
FIG. 96 is a graph showing wavelength dispersion of Stokes parameter S3 during no modulation in the optical elements of Example 8 to Example 10 and Comparative Example 3.

FIG. 95 is a graph showing wavelength dispersion of Stokes parameter S3 during modulation in the optical elements of Example 8 to Example 10 and Comparative Example 3. FIG. 96 is a graph showing wavelength dispersion of Stokes parameter S3 during no modulation in the optical elements of Example 8 to Example 10 and Comparative Example 3. The wavelength dispersion of Stokes parameter S3 of the emission light resulting from right-handed circularly polarized light (S3=+1) incident on each of the optical elements of Example 8 to Example 10, Comparative Example 3, and Comparative Example 4 is shown in FIG. 95 and FIG. 96.

As shown in FIG. 95, also in Example 10 during modulation (first state), the emission light exhibited a state with nearly S3=−1 in a broad bandwidth as in Example 8 and Example 9. In other words, light with S3=+1 was successfully modulated to light with S3=−1 (in other words, right-handed circularly polarized light was converted to left-handed circularly polarized light). Also, as shown in FIG. 96, also in Example 10 during no modulation (second state), the emission light exhibited a state with nearly S3=+1 in a broad bandwidth as in Example 8 and Example 9. In other words, light with S3=+1 was successfully emitted as light with S3=+1 with no modulation (in other words, right-handed circularly polarized light remained as right-handed circularly polarized light). In other words, as in Example 8 and Example 9, the optical element in Example 10 also achieved |S3|≥0.9 at wavelengths of 450 nm to 650 nm.

Example 11

An optical element 10 of Example 11 having the same configuration as in Embodiment 12 was produced. Specifically, the optical element 10 of Example 11 was produced as in Example 8, except for the configuration of the liquid crystal cell 11.

As shown in FIG. 77, the liquid crystal cell 11 in the optical element 10 of Example 11 sequentially included the first substrate 100 (FFS substrate) including the first electrode 131 and the second electrode 132, the first vertical alignment film 414, the liquid crystal layer 300 containing the liquid crystal molecules 310, the second vertical alignment film 424, and the second substrate 200 (FFS substrate) including the third electrode 231 and the fourth electrode 232. The liquid crystal layer 300 contained negative liquid crystal molecules 310 and a chiral dopant, and had an anisotropy of refractive index Δn of 0.104. The chiral pitch of the liquid crystal layer 300 was 11 μm and the thickness (cell thickness) d of the liquid crystal layer 300 was 3 μm.

The extension direction 132A of the slits 132S in the second electrode 132 was at an azimuthal angle of 90°, the alignment direction 311X of the liquid crystal molecules 311 near the first substrate 100 with no voltage applied was at an azimuthal angle of 0°, and the extension direction 232A of the slits 232S in the fourth electrode 232 was at an azimuthal angle of 160°. The slow axis of the quarter-wave film exhibiting reverse wavelength dispersion (slow axis 12A of the first quarter-wave film 12) was at an azimuthal angle of 68.7°, and the slow axis of the quarter-wave film exhibiting flat wavelength dispersion (slow axis 13A of the second quarter-wave film 13) was at an azimuthal angle of 23.7°. The quarter-wave film exhibiting flat wavelength dispersion (second quarter-wave film 13) was a positive A plate.

Figure 97:
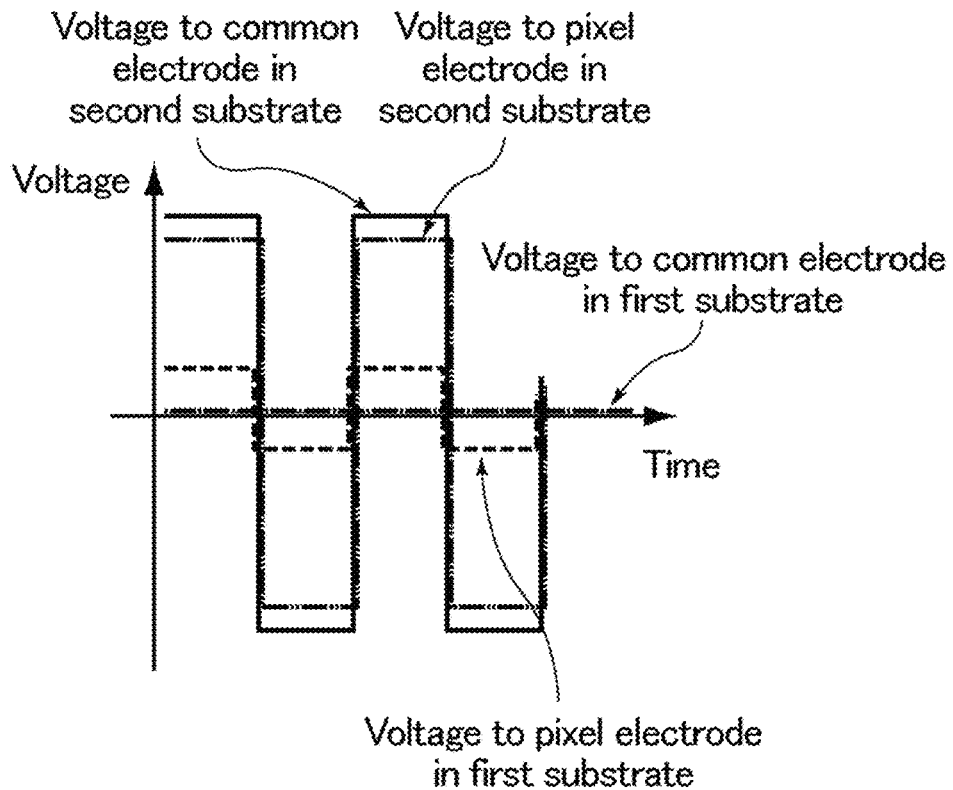
FIG. 97 is a graph showing the applied voltages in the first state in an optical element of Example 11.
Figure 98:
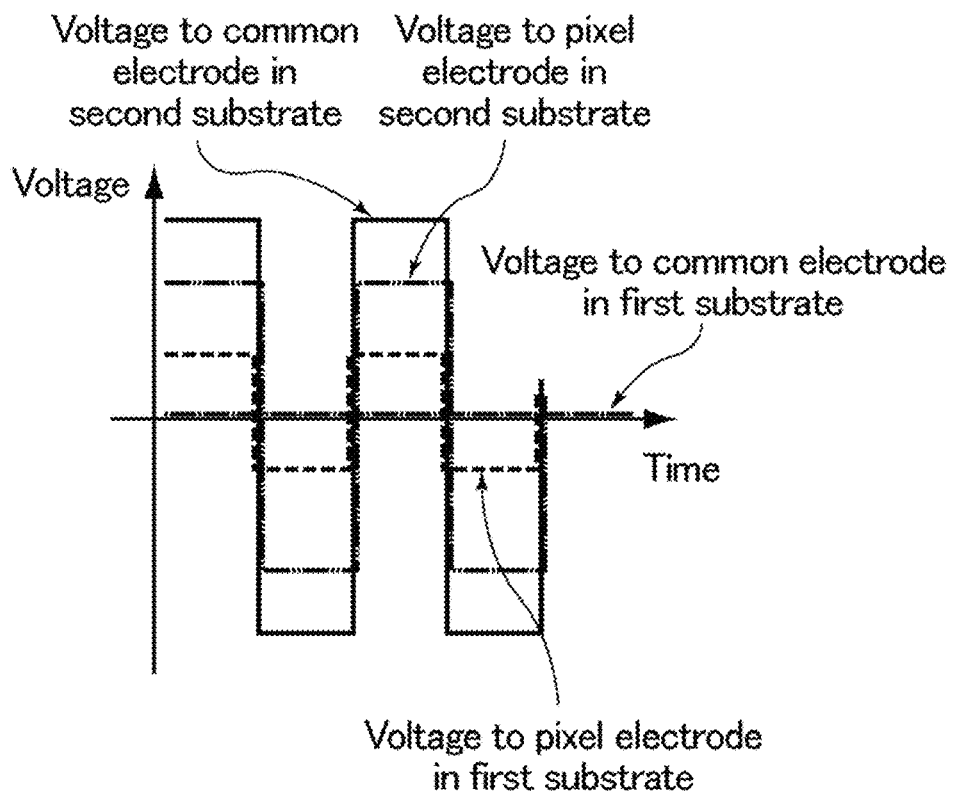
FIG. 98 is a graph showing the applied voltages in the second state in the optical element of Example 11.

FIG. 97 is a graph showing the applied voltages in the first state in an optical element of Example 11. FIG. 98 is a graph showing the applied voltages in the second state in the optical element of Example 11. As shown in FIG. 97, in the optical element 10 of Example 11, a voltage of +/−5.4 V was applied to the third electrode 231 or the fourth electrode 232 in the second substrate 200, whichever was serving as a common electrode, a voltage of +/−5 V to the other serving as a pixel electrode, a voltage of 0 V was applied to the first electrode 131 or the second electrode 132 in the first substrate 100, whichever was serving as a common electrode, and a voltage of +/−0.4 V was applied to the other serving as a pixel electrode, so that the first state was achieved. Also, as shown in FIG. 98, in the optical element 10 of Example 11, a voltage of +/−6 V was applied to the third electrode 231 or the fourth electrode 232 in the second substrate 200, whichever was serving as a common electrode, a voltage of +/−5 V was applied to the other serving as a pixel electrode, a voltage of 0 V was applied to the first electrode 131 or the second electrode 132 in the first substrate 100, whichever was serving as a common electrode, and a voltage of +/−1 V was applied to the other serving as a pixel electrode, so that the second state was achieved.

The liquid crystal cell 11 in the present example had the same configuration as the liquid crystal cell in Example 10, but was different in voltage application from Example 10. The liquid crystal cell in the present example also demonstrated the same performance as in Example 10. Specifically, also in Example 11 during modulation (first state), the emission light exhibited a state with nearly S3=−1 in a broad bandwidth as in Example 10. In other words, light with S3=+1 was successfully modulated to light with S3=−1 (in other words, right-handed circularly polarized light was converted to left-handed circularly polarized light). Also, in Example 11 during no modulation (second state), the emission light exhibited a state with nearly S3=+1 in a broad bandwidth as in Example 10. In other words, light with S3=+1 was successfully emitted as light with S3=+1 with no modulation (in other words, right-handed circularly polarized light remained as right-handed circularly polarized light).

Example 12

Higher voltages than in Example 9 were applied to an optical element 10 having the same configuration as in Example 9. Specifically, voltages corresponding to those in Modified Example 1 of Embodiment 10 were applied.

Figure 99:
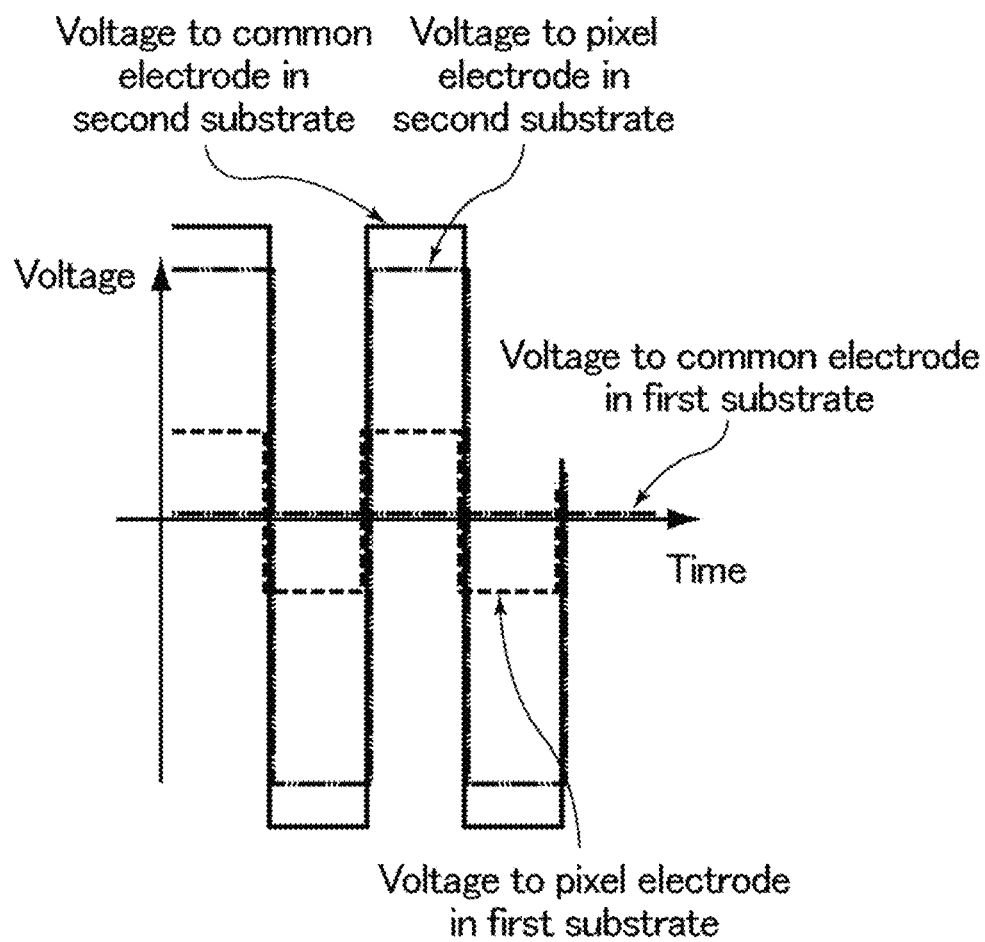
FIG. 99 is a graph showing the applied voltages in the first state in an optical element of Example 12.
Figure 100:
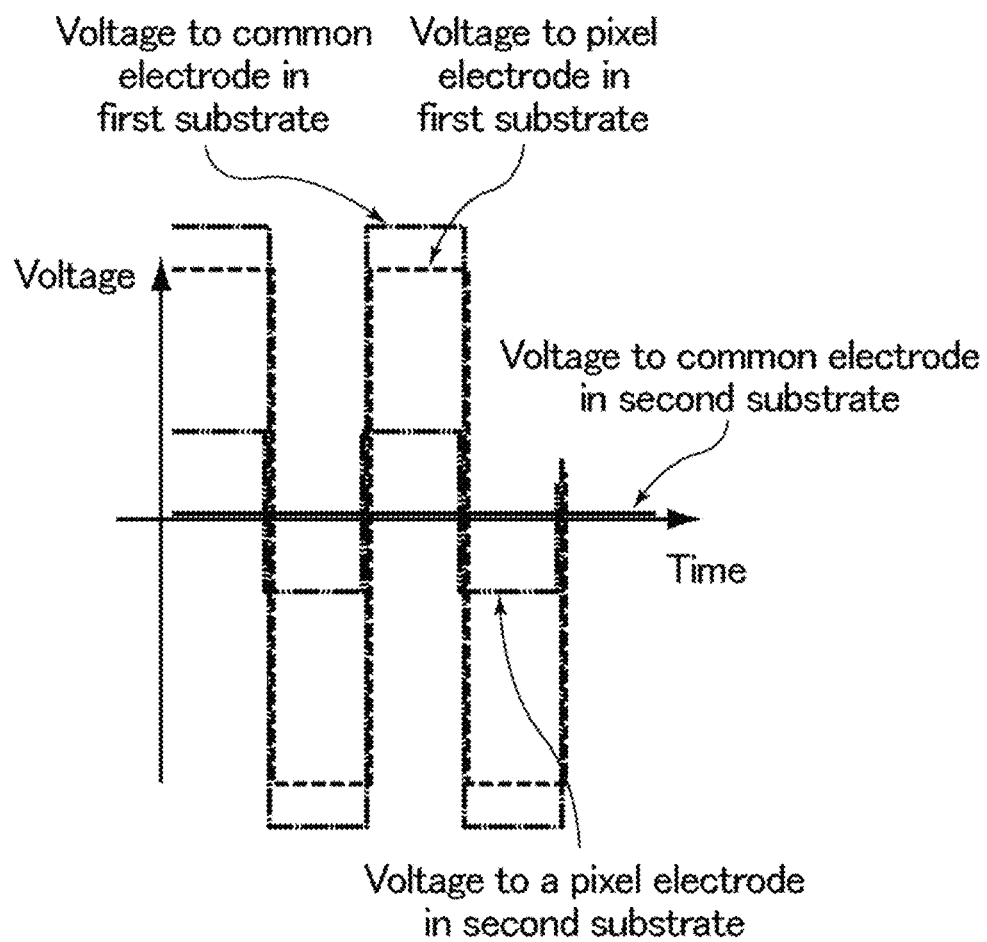
FIG. 100 is a graph showing the applied voltages in the second state in the optical element of Example 12.

FIG. 99 is a graph showing the applied voltages in the first state in an optical element of Example 12. FIG. 100 is a graph showing the applied voltages in the second state in the optical element of Example 12. As shown in FIG. 99, in the optical element 10 of Example 12, a voltage of +/−11 V was applied to the third electrode 231 or the fourth electrode 232 in the second substrate 200, whichever was serving as a common electrode, a voltage of +/−10 V was applied to the other serving as a pixel electrode, a voltage of 0 V was applied to the first electrode 131 or the second electrode 132 in the first substrate 100, whichever was serving as a common electrode, and a voltage of +/−1.1 V was applied to the other serving as a pixel electrode, so that the first state was achieved. Also, as shown in FIG. 100, in the optical element 10 of Example 12, a voltage of 0 V was applied to the third electrode 231 or the fourth electrode 232 in the second substrate 200, whichever was serving as a common electrode, a voltage of +/−1.1 V was applied to the other serving as a pixel electrode, a voltage of +/−11 V was applied to the first electrode 131 or the second electrode 132 in the first substrate 100 serving as a common electrode, and a voltage of +/−10 V was applied to the other serving as a pixel electrode, so that the second state was achieved.

The liquid crystal cell 11 in the present example had the same configuration as the liquid crystal cell in Example 9, but was different in voltage application from Example 9. The liquid crystal cell in the present example also demonstrated the same performance as in Example 9. Specifically, also in Example 12 during modulation (first state), the emission light exhibited a state with nearly S3=−1 in a broad bandwidth as in Example 9. In other words, light with S3=+1 was successfully modulated to light with S3=−1 (in other words, right-handed circularly polarized light was converted to left-handed circularly polarized light). Also, in Example 12 during no modulation (second state), the emission light exhibited a state with nearly S3=+1 in a broad bandwidth as in Example 9. In other words, light with S3=+1 was successfully emitted as light with S3=+1 with no modulation (in other words, right-handed circularly polarized light remained as right-handed circularly polarized light).

Evaluation of Viewing Angle Characteristics in Example 9, Example 12, and Comparative Example 3

Figure 101:
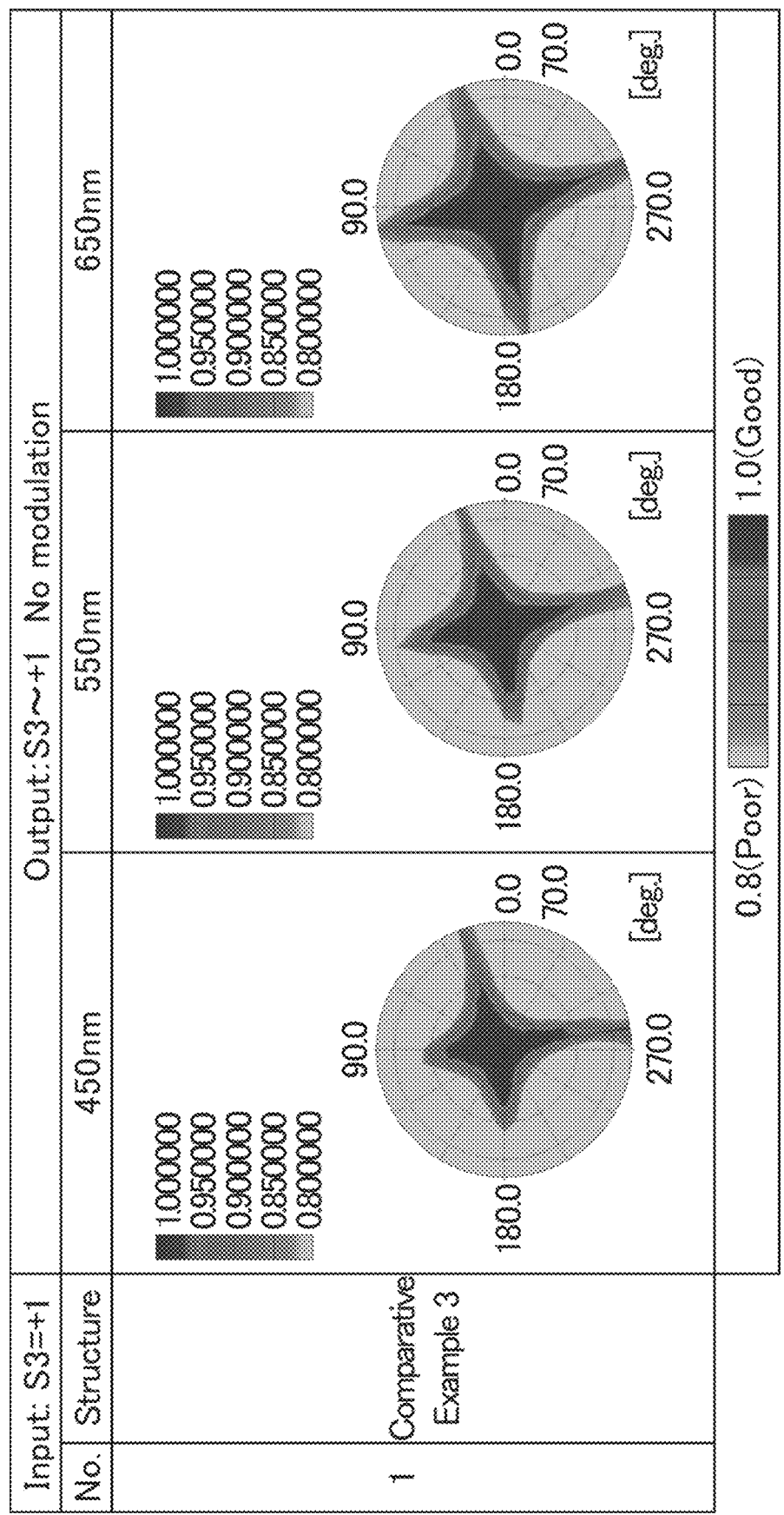
FIG. 101 shows the simulation results of viewing angle characteristics during no modulation of the optical element of Comparative Example 3.
Figure 102:
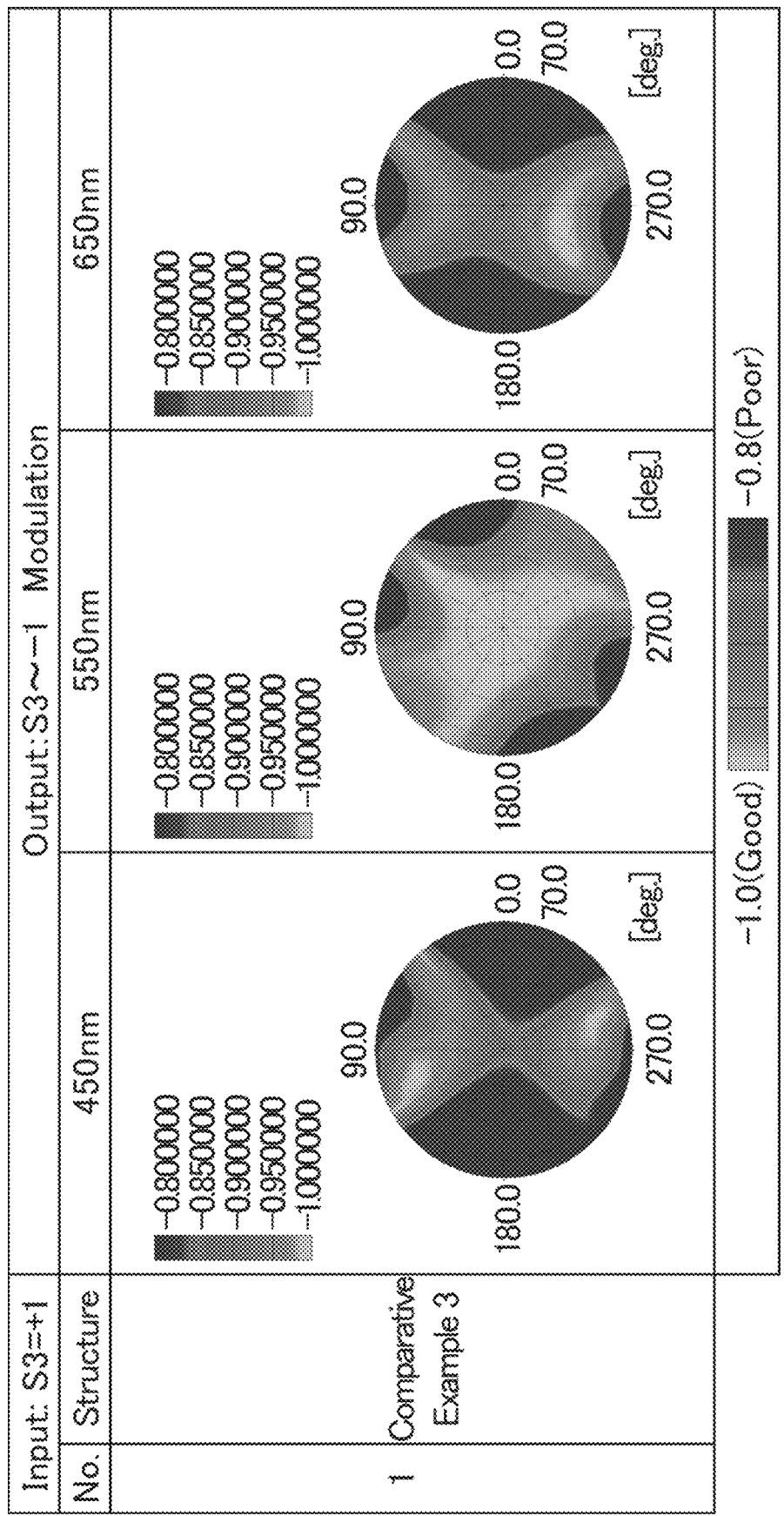
FIG. 102 shows the simulation results of viewing angle characteristics during modulation of the optical element of Comparative Example 3.
Figure 103:
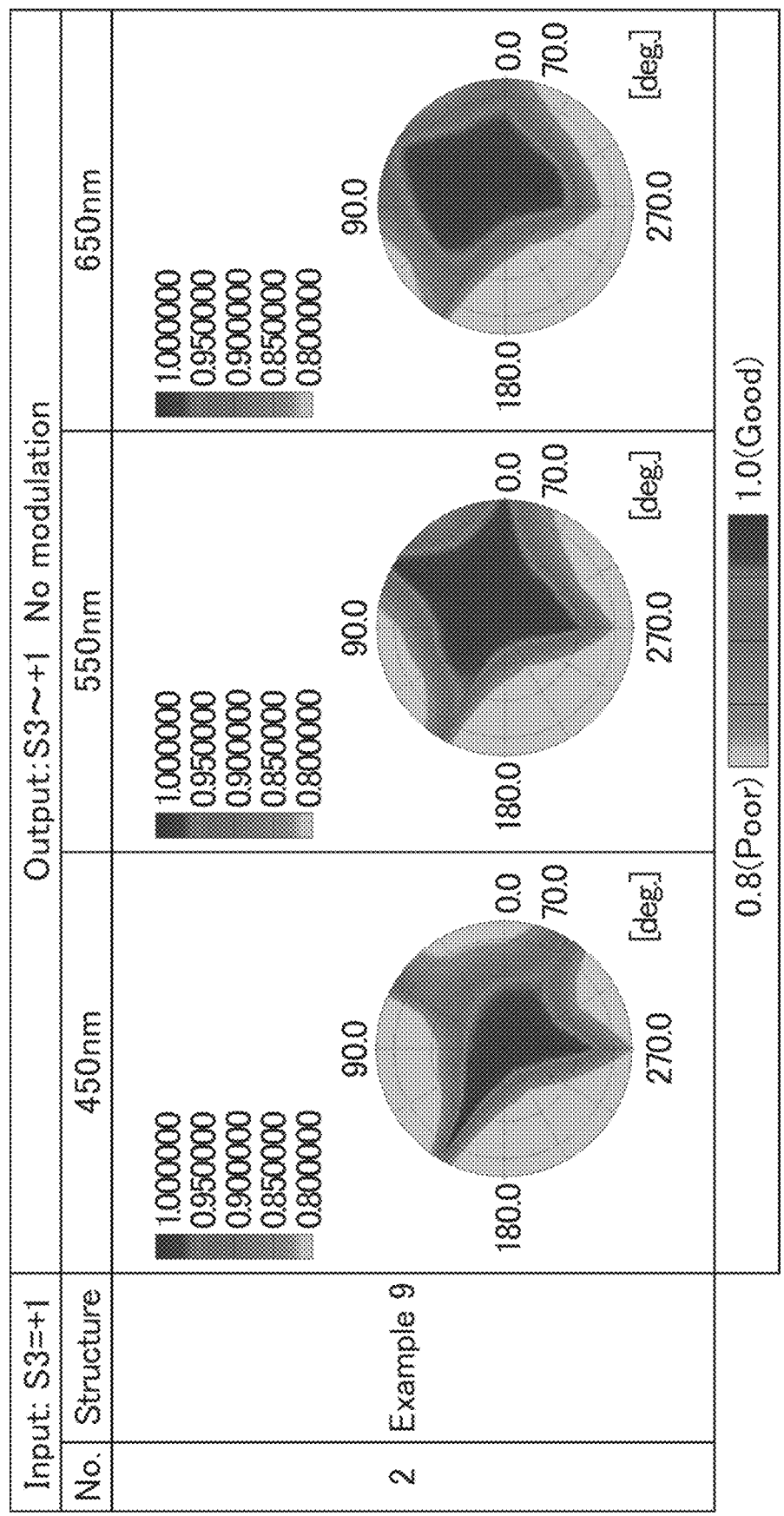
FIG. 103 shows the simulation results of viewing angle characteristics during no modulation of the optical element of Example 9.
Figure 104:
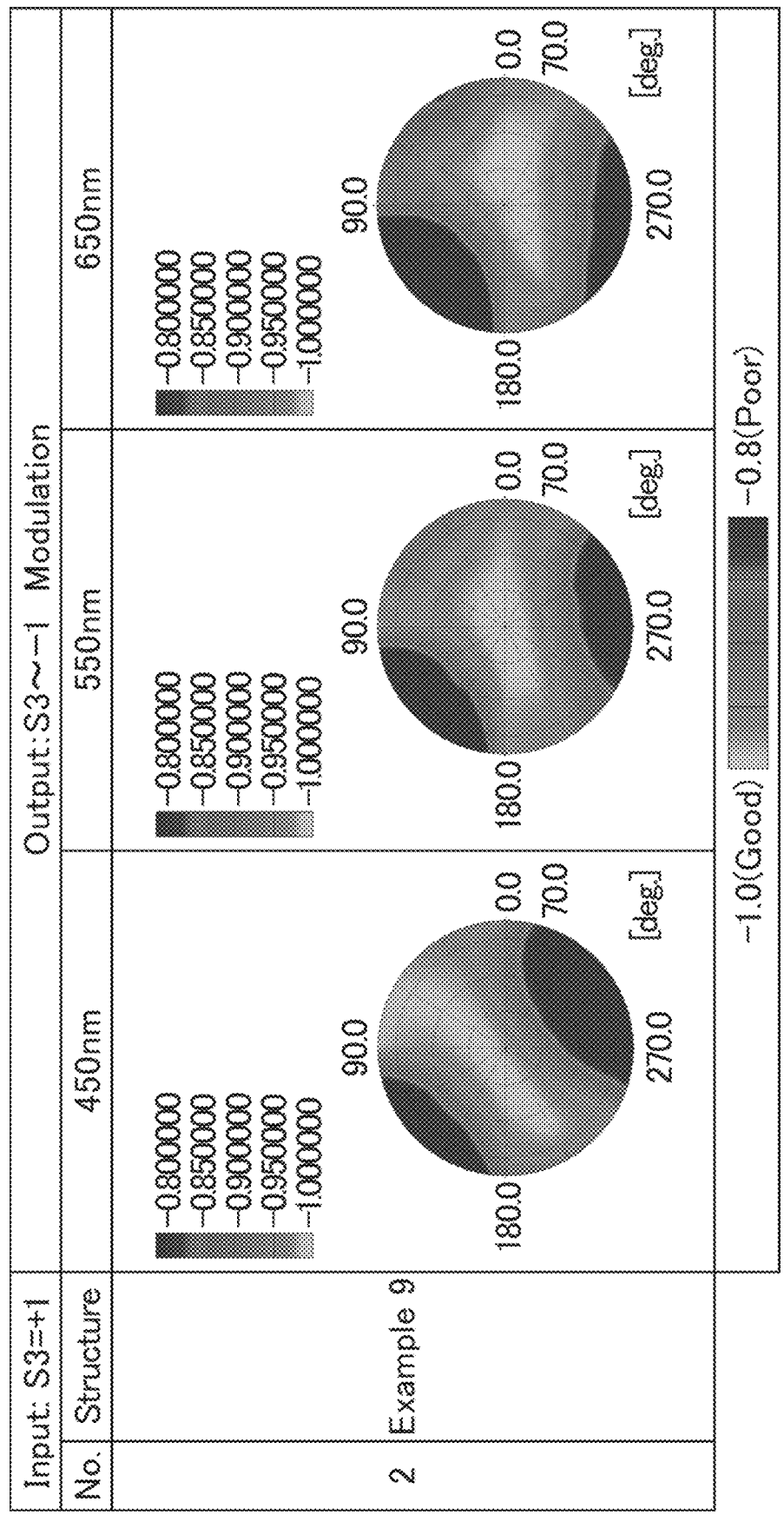
FIG. 104 shows the simulation results of viewing angle characteristics during modulation of the optical element of Example 9.
Figure 105:
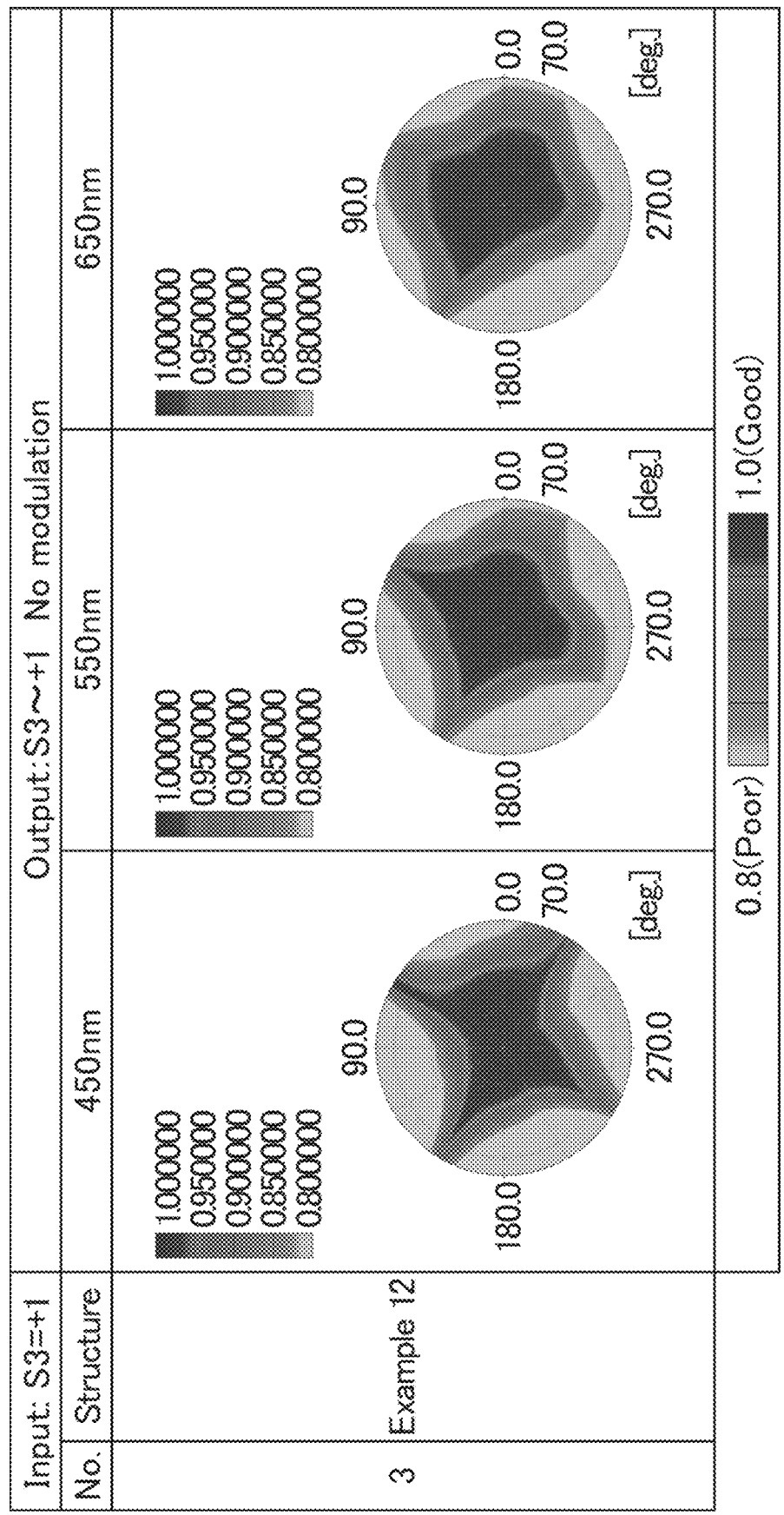
FIG. 105 shows the simulation results of the viewing angle characteristics during no modulation of the optical element of Example 12.
Figure 106:
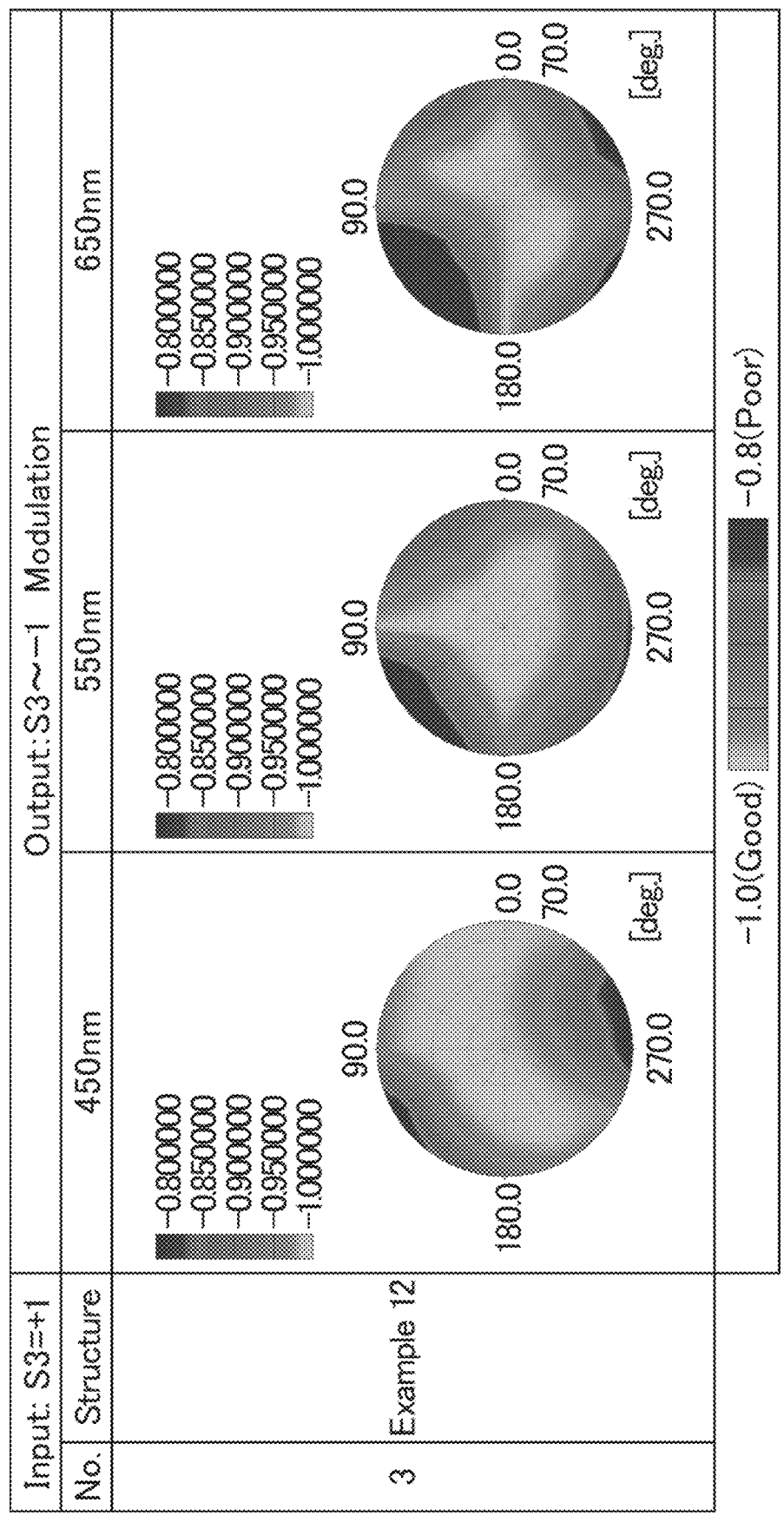
FIG. 106 shows the simulation results of the viewing angle characteristics during modulation of the optical element of Example 12.

The viewing angle characteristics in the optical elements of Example 9, Example 12, and Comparative Example 3 were evaluated by simulation. FIG. 101 to FIG. 106 show the results. FIG. 101 shows the simulation results of viewing angle characteristics during no modulation of the optical element of Comparative Example 3. FIG. 102 shows the simulation results of viewing angle characteristics during modulation of the optical element of Comparative Example 3. FIG. 103 shows the simulation results of viewing angle characteristics during no modulation of the optical element of Example 9. FIG. 104 shows the simulation results of viewing angle characteristics during modulation of the optical element of Example 9. FIG. 105 shows the simulation results of the viewing angle characteristics during no modulation of the optical element of Example 12. FIG. 106 shows the simulation results of the viewing angle characteristics during modulation of the optical element of Example 12.

In FIG. 101 to FIG. 106, a wider dark region in the graphs during no modulation indicates better performance while a wider light region in the graphs during modulation indicates better performance. As shown in FIG. 101 to FIG. 106, in Example 9 and Example 12, a good viewing angle range was achieved both during no modulation and during modulation in a wavelength range of 450 nm to 650 nm. Also, Example 12 resulted in a wider viewing angle range than Example 9 both during no modulation and during modulation in a wavelength range of 450 nm to 650 nm.

Example 13

Voltages were applied as in Example 12 to an optical element 10 of Example 13 having the same configuration as in Example 12, except that the quarter-wave film exhibiting flat wavelength dispersion (second quarter-wave film 13) was changed to a negative A plate.

Evaluation of Viewing Angle Characteristics in Example 12 and Example 13

Figure 107:
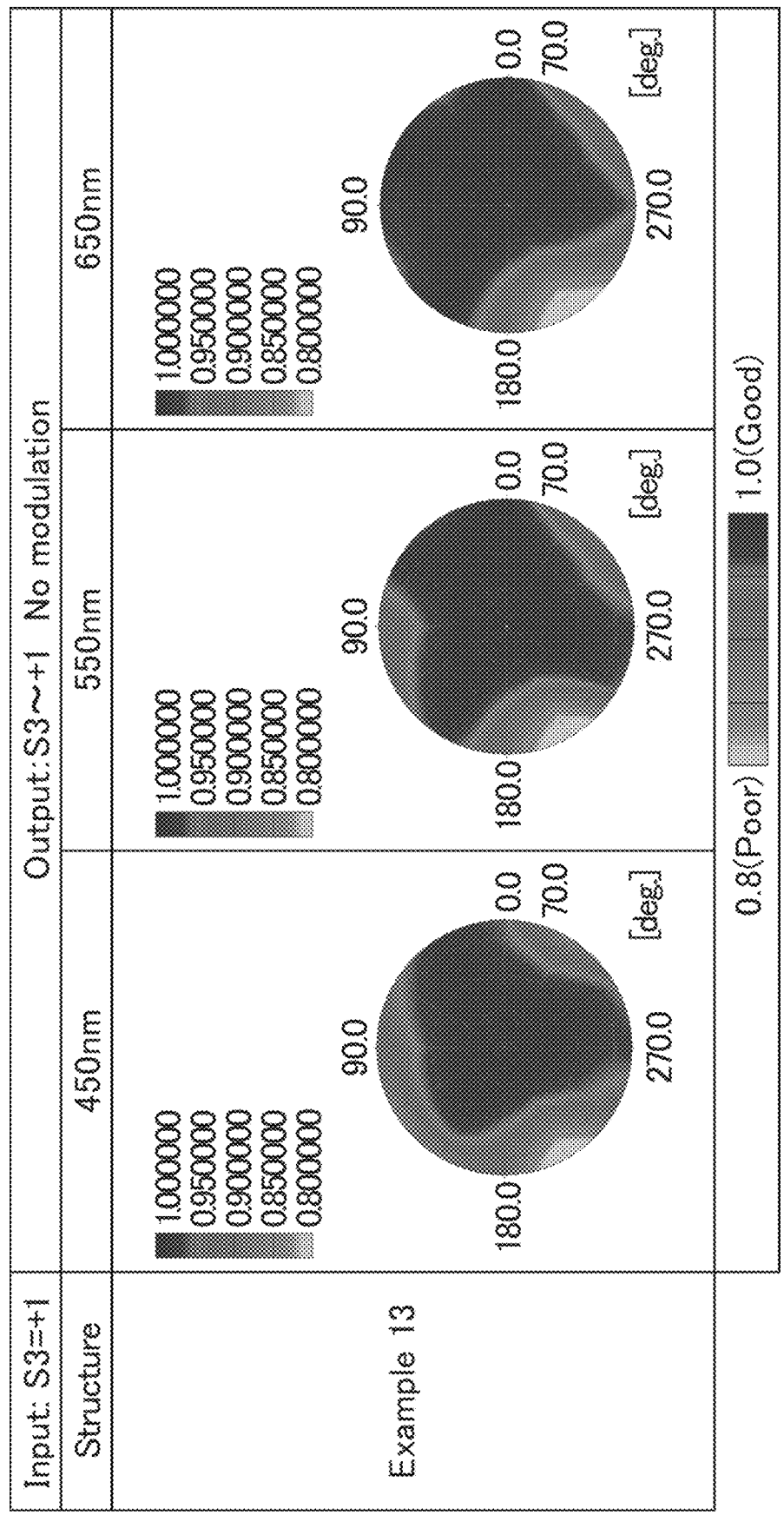
FIG. 107 shows the simulation results of the viewing angle characteristics during no modulation of the optical element of Example 13.
Figure 108:
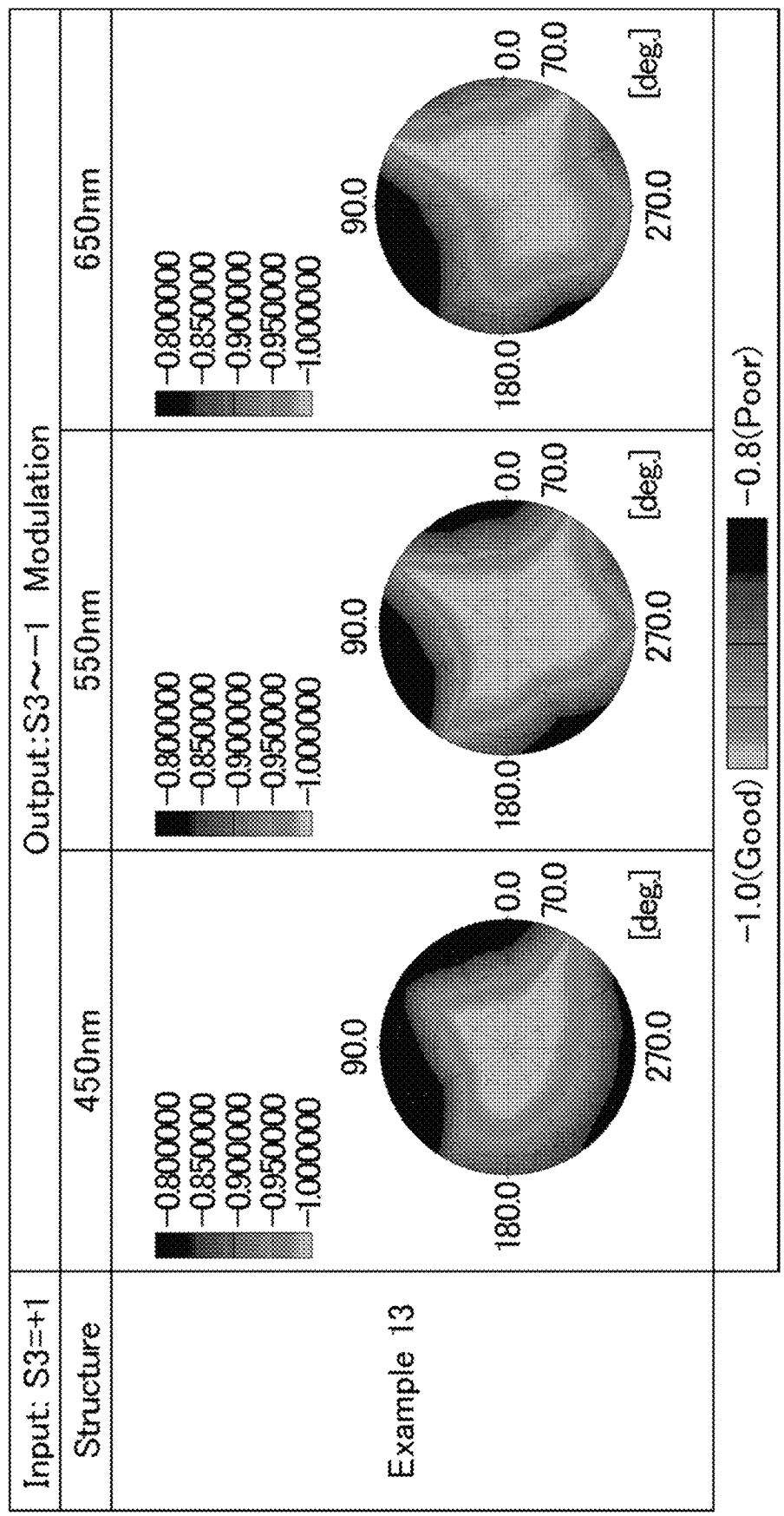
FIG. 108 shows the simulation results of the viewing angle characteristics during modulation of the optical element of Example 13.

The viewing angle characteristics in the optical elements of Example 12 and Example 13 were evaluated by simulation. FIG. 105 to FIG. 108 show the results. FIG. 107 shows the simulation results of the viewing angle characteristics during no modulation of the optical element of Example 13. FIG. 108 shows the simulation results of the viewing angle characteristics during modulation of the optical element of Example 13.

In FIG. 105 to FIG. 108, a wider dark region in the graphs during no modulation indicates better performance while a wider light region in the graphs during modulation indicates better performance. As shown in FIG. 105 to FIG. 108, in Example 12 and Example 13, a good viewing angle range was achieved both during no modulation and during modulation in a wavelength range of 450 nm to 650 nm. Example 13 was better than Example 12 in performance during no modulation.

Example 14

A varifocal element 30 of Example 14 corresponding to the modified example of Embodiment 13 was produced. The varifocal element 30 of Example 14 included, sequentially from the light incident side toward the light emitting side, a quarter-wave film exhibiting flat wavelength dispersion as the second quarter-wave film 13, a quarter-wave film exhibiting reverse wavelength dispersion as the first quarter-wave film 12, the first substrate 100, the weak anchoring first vertical alignment film 414, the liquid crystal layer 300, the second vertical alignment film 424, the PB lens 20, and the second substrate 200. The first substrate 100, the weak anchoring first vertical alignment film 414, the liquid crystal layer 300, the second vertical alignment film 424, and the second substrate 200 defining the liquid crystal cell 11 each had the same configuration as in Example 8, except for the axis azimuths. The PB lens 20 was disposed in the cell as in Example 7.

As shown in FIG. 80, the extension direction 132A of the slits 132S in the second electrode 132 was at an azimuthal angle of 90°, and the alignment direction 311X of the liquid crystal molecules 311 near the first substrate 100 with no voltage applied was at an azimuthal angle of 0°. The slow axis of the quarter-wave film exhibiting reverse wavelength dispersion (slow axis 12A of the first quarter-wave film 12) was at an azimuthal angle of 8.1°, and the slow axis of the quarter-wave film exhibiting flat wavelength dispersion (slow axis 13A of the second quarter-wave film 13) was at an azimuthal angle of 53.1°. Also, the alignment direction 311A of the liquid crystal molecules 311 near the first substrate 100 in the first state was at an azimuthal angle of 0°, and the alignment direction 311B of the liquid crystal molecules 311 near the first substrate 100 in the second state was at an azimuthal angle of 90°. The alignment direction 312A of the liquid crystal molecules 312 near the second substrate 200 in the first state was at an azimuthal angle of 70°, and the alignment direction 312B of the liquid crystal molecules 312 near the second substrate 200 in the second state was at an azimuthal angle of 160°.

The varifocal element 30 of Example 14 was capable of switching between polarization modulation and no polarization modulation in a broad bandwidth and had a thin profile.

REFERENCE SIGNS LIST

1: head mounted display
1P: display panel
10, 10R1, 10R2: optical element
11, 11R1: liquid crystal cell
11E: electrode
12, 13, 14R, 17R: quarter-wave film
12A, 13A: slow axis
15R, 16R: half-wave film
20, 20A1, 20A2, 20A3: Pancharatnam-Berry (PB) lens
30, 30A, 30B: varifocal element
40: phase difference plate
100: first substrate
110, 210: support substrate
120, 121, 122, 220: comb-teeth electrode
120A, 121A, 122A, 132A, 220A, 221A, 222A, 232A: extension direction
120E1, 120E2: electric field direction
131: first electrode
132: second electrode
231: third electrode
232: fourth electrode
240: solid electrode
132S, 232S: slit
140, 141, 241: insulating layer
200: second substrate
300: liquid crystal layer
300R1, 300R2, 300R3: TN liquid crystal layer
310, 311, 312, 320: liquid crystal molecule
311A, 311B, 311X, 312A, 312B, 312X: alignment direction
320A: optically anisotropic layer
410, 420: alignment film
411, 412, 421, 423: weak anchoring horizontal alignment film
413: bistable alignment film
414, 422, 424: vertical alignment film
510, 520, 530, 540: photomask
600: PB lens-forming film
LC0, LC1, LC2: left-handed circularly polarized light
R0, R1, R2: region

What is claimed is:
1. An optical element comprising:
a liquid crystal cell including a first substrate, a liquid crystal layer, and a second substrate; and
a quarter-wave film,
the liquid crystal layer containing liquid crystal molecules twist-aligned between the first substrate and the second substrate,
the liquid crystal cell including, in at least one of the first substrate or the second substrate, electrodes for voltage application to the liquid crystal layer, the electrodes disposed to enable switching between a first state and a second state by application of voltage to the liquid crystal layer, the first state aligning the liquid crystal molecules near the first substrate in a first alignment direction, the second state aligning the liquid crystal molecules near the first substrate in a second alignment direction perpendicular to the first alignment direction in a plan view, the switching between the first state and the second state controlling a polarization state of light incident on the liquid crystal cell, wherein circularly polarized light incident on the liquid crystal cell is converted to first linearly polarized light in the first state, while in the second state, converted to second linearly polarized light whose polarization direction is perpendicular to a polarization direction of the first linearly polarized light in a plan view, and wherein linearly polarized light incident on the liquid crystal cell is converted to first circularly polarized light in the first state, while in the second state, converted to second circularly polarized light whose rotation direction is reverse to a rotation direction of the first circularly polarized light.

2. The optical element according to claim 1, wherein the liquid crystal cell further includes a first weak anchoring horizontal alignment film between the first substrate and the liquid crystal layer, and a second weak anchoring horizontal alignment film between the liquid crystal layer and the second substrate, the electrodes include, in the first substrate, a first comb-teeth electrode composed of a comb-teeth-shaped pixel electrode and a comb-teeth-shaped common electrode with comb teeth of these electrodes fitting each other, and include, in the second substrate, a second comb-teeth electrode composed of a comb-teeth-shaped pixel electrode and a comb-teeth-shaped common electrode with comb teeth of these electrodes fitting each other, and in a plan view, an extension direction of the first comb-teeth electrode is oblique to the extension direction of the second comb-teeth electrode.

3. The optical element according to claim 1, wherein the liquid crystal cell further includes a weak anchoring horizontal alignment film between the first substrate and the liquid crystal layer and a vertical alignment film between the liquid crystal layer and the second substrate, the electrodes include, in the first substrate, a first comb-teeth electrode composed of a comb-teeth-shaped pixel electrode and a comb-teeth-shaped common electrode with comb teeth of these electrodes fitting each other, and a second comb-teeth electrode overlapping the first comb-teeth electrode via an insulating layer and composed of a comb-teeth-shaped pixel electrode and a comb-teeth-shaped common electrode with comb teeth of these electrodes fitting each other, and in a plan view, an extension direction of the first comb-teeth electrode is perpendicular to an extension direction of the second comb-teeth electrode.

4. The optical element according to claim 1, wherein the electrodes include, in the first substrate, a first comb-teeth electrode composed of a comb-teeth-shaped pixel electrode and a comb-teeth-shaped common electrode with comb teeth of these electrodes fitting each other, and a second comb-teeth electrode overlapping the first comb-teeth electrode via a first insulating layer and composed of a comb-teeth-shaped pixel electrode and a comb-teeth-shaped common electrode with comb teeth of these electrodes fitting each other, and include, in the second substrate, a third comb-teeth electrode composed of a comb-teeth-shaped pixel electrode and a comb-teeth-shaped common electrode with comb teeth of these electrodes fitting each other, and a fourth comb-teeth electrode overlapping the third comb-teeth electrode via a second insulating layer and composed of a comb-teeth-shaped pixel electrode and a comb-teeth-shaped common electrode with comb teeth of these electrodes fitting each other, and in a plan view, an extension direction of the first comb-teeth electrode is perpendicular to an extension direction of the second comb-teeth electrode, an extension direction of the third comb-teeth electrode is perpendicular to an extension direction of the fourth comb-teeth electrode, and the extension direction of the first comb-teeth electrode is oblique to the extension direction of the third comb-teeth electrode.

5. The optical element according to claim 1, wherein the liquid crystal cell further includes a bistable alignment film providing stable alignment in two directions, between the first substrate and the liquid crystal layer, the electrodes include, in the first substrate, a first comb-teeth electrode composed of a comb-teeth-shaped pixel electrode and a comb-teeth-shaped common electrode with comb teeth of these electrodes fitting each other, and include, in the second substrate, a second comb-teeth electrode composed of a comb-teeth-shaped pixel electrode and a comb-teeth-shaped common electrode with comb teeth of these electrodes fitting each other, and in a plan view, an extension direction of the first comb-teeth electrode is oblique to an extension direction of the second comb-teeth electrode.

6. The optical element according to claim 1, wherein the liquid crystal cell further includes a first vertical alignment film between the first substrate and the liquid crystal layer and a second vertical alignment film between the liquid crystal layer and the second substrate, the electrodes include, in the first substrate, a planar first electrode and a second electrode overlapping the first electrode via a first insulating layer and provided with slits, and include, in the second substrate, a planar third electrode and a fourth electrode overlapping the third electrode via a second insulating layer and provided with slits, and in a plan view, an extension direction of the slits in the second electrode is oblique to an extension direction of the slits in the fourth electrode.

7. The optical element according to claim 1, wherein an anisotropy of refractive index Δn of the liquid crystal layer is not greater than 0.12.

8. The optical element according to claim 1, wherein the quarter-wave film is a first quarter-wave film, and the optical element further comprises a second quarter-wave film facing the liquid crystal cell across the first quarter-wave film.

9. The optical element according to claim 8, wherein the first quarter-wave film exhibits reverse wavelength dispersion.

10. The optical element according to claim 8,
wherein an in-plane phase difference introduced by the first quarter-wave film at a wavelength of 450 nm is not less than 0.7 times and not more than 1 times the in-plane phase difference introduced by the first quarter-wave film at a wavelength of 550 nm.

11. The optical element according to claim 8,
wherein an in-plane phase difference introduced by the first quarter-wave film at a wavelength of 650 nm is not less than 1 times and not more than 1.3 times the in-plane phase difference introduced by the first quarter-wave film at a wavelength of 550 nm.

12. The optical element according to claim 8,
wherein an in-plane phase difference introduced by the first quarter-wave film at a wavelength of 550 nm is not less than 30 nm and not more than 230 nm.

13. The optical element according to claim 8,
wherein the second quarter-wave film exhibits flat wavelength dispersion.

14. The optical element according to claim 8,
wherein an in-plane phase difference introduced by the second quarter-wave film at a wavelength of 550 nm is not less than 110 nm and not more than 175 nm.

15. A varifocal element comprising:
the optical element according to claim 1; and
a Pancharatnam-Berry lens.

16. The varifocal element according to claim 15,
wherein the Pancharatnam-Berry lens is disposed in the optical element.

17. A head mounted display comprising
the varifocal element according to claim 15.

18. The optical element according to claim 1,
wherein the liquid crystal cell further includes a first vertical alignment film between the first substrate and the liquid crystal layer, and a second vertical alignment film between the liquid crystal layer and the second substrate,
the liquid crystal layer contains liquid crystal molecules having a negative anisotropy of dielectric constant, and
at least one of the first vertical alignment film or the second vertical alignment film is configured to control a tilt direction of the liquid crystal molecules with no voltage applied.

19. The optical element according to claim 18,
wherein the electrodes include, in at least one of the first substrate or the second substrate, a planar electrode and an electrode overlapping the planar electrode via an insulating layer and provided with slits.

20. The optical element according to claim 19,
wherein the pitch of the electrode provided with slits is not smaller than 1 μm and not greater than 5 μm.

21. The optical element according to claim 18,
wherein at least one of the first vertical alignment film or the second vertical alignment film is a weak anchoring vertical alignment film.

22. The optical element according to claim 18,
wherein a retardation Δnd introduced by the liquid crystal layer at a wavelength of 550 nm with voltage applied is not less than 180 nm and not more than 280 nm.

23. The optical element according to claim 18,
wherein an anisotropy of refractive index Δn of the liquid crystal layer is not greater than 0.12.

24. The optical element according to claim 18,
wherein light incident on the optical element is circularly polarized light.

25. A varifocal element comprising:
the optical element according to claim 18; and
a Pancharatnam-Berry lens.

26. The varifocal element according to claim 25,
wherein the Pancharatnam-Berry lens is disposed in the optical element.

27. A head mounted display comprising
the varifocal element according to claim 25.

28. The optical element according to claim 1,
wherein the liquid crystal molecules are dual frequency liquid crystal molecules.

\* \* \* \* \*